(12) United States Patent
Liang et al.

(10) Patent No.: US 12,551,548 B2
(45) Date of Patent: Feb. 17, 2026

(54) HIV VACCINE COMPOSITIONS, METHODS, AND USES THEREOF

(71) Applicant: Sichuan Clover Biopharmaceuticals, Inc., Sichuan (CN)

(72) Inventors: Peng Liang, Chengdu Sichuan (CN); Joshua Liang, Chengdu Sichuan (CN)

(73) Assignee: Sichuan Clover Biopharmaceuticals, Inc., Sichuan (CN)

( * ) Notice: Subject to any disclaimer, the term of this patent is extended or adjusted under 35 U.S.C. 154(b) by 600 days.

(21) Appl. No.: 18/009,684

(22) PCT Filed: Jun. 10, 2021

(86) PCT No.: PCT/CN2021/099292
§ 371 (c)(1),
(2) Date: Dec. 9, 2022

(87) PCT Pub. No.: WO2021/249455
PCT Pub. Date: Dec. 16, 2021

(65) Prior Publication Data
US 2023/0233663 A1    Jul. 27, 2023

Related U.S. Application Data

(63) Continuation of application No. PCT/CN2021/087054, filed on Apr. 13, 2021, and a continuation of application No. PCT/CN2020/095335, filed on Jun. 10, 2020.

(51) Int. Cl.
| | | |
|---|---|---|
| *C07K 14/78* | (2006.01) | |
| *A61K 39/00* | (2006.01) | |
| *A61K 39/21* | (2006.01) | |
| *A61P 31/18* | (2006.01) | |
| *C07K 14/005* | (2006.01) | |
| *C07K 14/16* | (2006.01) | |
| *C07K 16/10* | (2006.01) | |
| *C12N 7/00* | (2006.01) | |

(52) U.S. Cl.
CPC ............ *A61K 39/21* (2013.01); *A61P 31/18* (2018.01); *C07K 14/162* (2013.01); *C07K 14/78* (2013.01); *C07K 16/1045* (2013.01); *C12N 7/00* (2013.01); *A61K 2039/543* (2013.01); *A61K 2039/6031* (2013.01); *A61K 2039/64* (2013.01)

(58) Field of Classification Search
CPC .... A61K 39/12; A61K 2039/64; A61K 38/00; A61K 39/21; C07K 2319/00
See application file for complete search history.

(56) References Cited

U.S. PATENT DOCUMENTS

| | | |
|---|---|---|
| 4,703,017 A | 10/1987 | Campbell et al. |
| 4,722,848 A | 2/1988 | Paoletti et al. |
| 4,743,560 A | 5/1988 | Campbell et al. |
| 4,942,522 A | 7/1990 | Wilkie et al. |
| 4,956,302 A | 9/1990 | Gordon et al. |
| 5,073,484 A | 12/1991 | Swanson et al. |
| 5,120,643 A | 6/1992 | Ching et al. |
| 5,252,496 A | 10/1993 | Kang et al. |
| 5,559,041 A | 9/1996 | Kang et al. |
| 5,589,466 A | 12/1996 | Felgner et al. |
| 5,591,645 A | 1/1997 | Rosenstein et al. |
| 5,593,972 A | 1/1997 | Weiner et al. |
| 5,605,690 A | 2/1997 | Jacobs et al. |
| 5,622,871 A | 4/1997 | May et al. |
| 5,643,578 A | 7/1997 | Robinson et al. |
| 5,654,162 A | 8/1997 | Guire et al. |
| 5,656,448 A | 8/1997 | Kang et al. |
| 5,656,503 A | 8/1997 | May et al. |
| 5,714,389 A | 2/1998 | Charlton et al. |
| 5,728,587 A | 3/1998 | Kang et al. |
| 5,817,637 A | 10/1998 | Weiner et al. |
| 5,880,103 A | 3/1999 | Urban et al. |

(Continued)

FOREIGN PATENT DOCUMENTS

| | | |
|---|---|---|
| CN | 106928326 A | 7/2017 |
| CN | 111592602 A | 8/2020 |

(Continued)

OTHER PUBLICATIONS

Geall et al., "Nonviral delivery of self-amplifying RNA vaccines," PNAS, 109(36): 14604-14609, 2012.

(Continued)

*Primary Examiner* — Barry A Chestnut

(74) *Attorney, Agent, or Firm* — Knobbe, Martens, Olson & Bear, LLP

(57) ABSTRACT

The present invention discloses immunogenic compositions including recombinant peptides and proteins comprising human immunodeficiency viruses (HIV) antigens and immunogens, e.g., gp120 protein peptides. In some aspects, the immunogenic composition comprises a secreted fusion protein comprising a soluble HIV viral antigen joined by in-frame fusion to a C-terminal portion of a collagen which is capable of self-trimerization to form a disulfide bond-linked trimeric fusion protein. In some aspects, the immunogenic compositions provided herein are useful for generating an immune response, e.g., for treating or preventing an HIV infection. In some aspects, the immunogenic compositions provided herein may be used in a vaccine composition, e.g., as part of a prophylactic and/or therapeutic vaccine. Also provided herein are methods for producing the recombinant peptides and proteins, prophylactic, therapeutic, and/or diagnostic methods, and related kits.

20 Claims, 8 Drawing Sheets

Specification includes a Sequence Listing.

(56) References Cited

U.S. PATENT DOCUMENTS

| | | | |
|---|---|---|---|
| 5,989,921 | A | 11/1999 | Charlton et al. |
| 6,020,147 | A | 2/2000 | Guire et al. |
| 6,027,943 | A | 2/2000 | Kang et al. |
| 6,171,827 | B1 | 1/2001 | Bulleid et al. |
| 6,187,598 | B1 | 2/2001 | May et al. |
| 6,190,886 | B1 | 2/2001 | Hoppe et al. |
| 6,228,660 | B1 | 5/2001 | May et al. |
| 6,277,600 | B1 | 8/2001 | Tomita et al. |
| 6,352,862 | B1 | 3/2002 | Davis et al. |
| 6,485,982 | B1 | 11/2002 | Charlton |
| 6,506,612 | B2 | 1/2003 | Kang et al. |
| 6,534,320 | B2 | 3/2003 | Ching et al. |
| 6,541,277 | B2 | 4/2003 | Kang et al. |
| 6,617,431 | B1 | 9/2003 | Gruber et al. |
| 6,737,277 | B1 | 5/2004 | Kang et al. |
| 6,818,455 | B2 | 11/2004 | May et al. |
| 7,255,868 | B2 | 8/2007 | Fearon et al. |
| 7,268,116 | B2 | 9/2007 | Liang |
| 7,479,285 | B1 | 1/2009 | Van Nest et al. |
| 7,491,706 | B2 | 2/2009 | Yu et al. |
| 7,666,837 | B2 | 2/2010 | Liang |
| 7,691,815 | B2 | 4/2010 | Liang |
| 7,745,598 | B2 | 6/2010 | Wang et al. |
| 7,785,610 | B2 | 8/2010 | Fearon et al. |
| 8,003,115 | B2 | 8/2011 | Fearon et al. |
| 8,114,418 | B2 | 2/2012 | Fearon et al. |
| 8,133,874 | B2 | 3/2012 | Wang et al. |
| 8,222,398 | B2 | 7/2012 | Fearon et al. |
| 8,333,980 | B2 | 12/2012 | Van Nest et al. |
| 8,597,665 | B2 | 12/2013 | Fearon et al. |
| 8,669,237 | B2 | 3/2014 | Van Nest et al. |
| 9,028,845 | B2 | 5/2015 | Fearon et al. |
| 10,052,378 | B2 | 8/2018 | Wang et al. |
| 10,618,949 | B2 | 4/2020 | Liang |
| 10,722,571 | B2 | 7/2020 | Chang et al. |
| 10,906,944 | B2 | 2/2021 | He et al. |
| 10,960,070 | B2 | 3/2021 | Graham et al. |
| 11,111,284 | B2 | 9/2021 | Faustman et al. |
| 2001/0008774 | A1 | 7/2001 | May et al. |
| 2003/0143564 | A1 | 7/2003 | Burgeson et al. |
| 2003/0143755 | A1 | 7/2003 | Davis et al. |
| 2003/0148466 | A1 | 8/2003 | Fox et al. |
| 2003/0207465 | A1 | 11/2003 | Davis et al. |
| 2003/0219908 | A1 | 11/2003 | Davis et al. |
| 2004/0197876 | A1 | 10/2004 | Tschopp et al. |
| 2005/0202537 | A1 | 9/2005 | Liang |
| 2005/0244986 | A1 | 11/2005 | May et al. |
| 2007/0087413 | A1 | 4/2007 | Liang |
| 2007/0116690 | A1 | 5/2007 | Yang et al. |
| 2007/0117755 | A1 | 5/2007 | Liang |
| 2020/0002704 | A1 | 1/2020 | Huang et al. |
| 2020/0009244 | A1 | 1/2020 | He et al. |
| 2021/0246170 | A1 | 8/2021 | Langedijk et al. |
| 2021/0268102 | A1 | 9/2021 | Yan et al. |
| 2021/0275665 | A1 | 9/2021 | Cho et al. |
| 2021/0308257 | A1 | 10/2021 | Kuo et al. |
| 2021/0355170 | A1 | 11/2021 | Whitehead et al. |

FOREIGN PATENT DOCUMENTS

| | | |
|---|---|---|
| CN | 112220920 | 1/2021 |
| CN | 112266411 | 1/2021 |
| CN | 112480217 | 3/2021 |
| CN | 113185613 | 4/2021 |
| CN | 113234170 | 4/2021 |
| CN | 113480618 | 10/2021 |
| WO | WO 1997/017988 | 5/1997 |
| WO | WO 2016/029043 | 2/2016 |
| WO | WO 2021/154812 | 8/2021 |
| WO | WO 2021/160346 | 8/2021 |
| WO | WO 2021/163365 | 8/2021 |
| WO | WO 2021/170131 | 9/2021 |
| WO | WO 2021/174128 | 9/2021 |
| WO | WO 2021/178318 | 9/2021 |
| WO | WO 2021/178321 | 9/2021 |
| WO | WO 2021/178971 | 9/2021 |
| WO | WO 2021/189056 | 9/2021 |
| WO | WO 2021/198706 | 10/2021 |
| WO | WO 2021/204179 | 10/2021 |
| WO | WO 2021/205455 | 10/2021 |
| WO | WO 2021/214703 | 10/2021 |
| WO | WO 2021/216743 | 10/2021 |
| WO | WO 2021/226436 | 11/2021 |
| WO | WO 2021/228842 | 11/2021 |
| WO | WO 2021/243122 | 12/2021 |
| WO | WO 2021/245611 | 12/2021 |
| WO | WO 2021/249012 | 12/2021 |
| WO | WO 2021/249116 | 12/2021 |
| WO | WO 2021/249451 | 12/2021 |

OTHER PUBLICATIONS

Bette Korber et al., Human Retroviruses and AIDS 1998: A Compilation and Analysis of Nucleic Acid and Amino Acid Sequences.
Berrey et al., "Treatment of primary human immunodeficiency virus type 1 infection with potent antiretroviral therapy reduces frequency of rapid progression to Aids," J. Infect. Dis., 183, (10): 1466, 2001.
Acharya et al., "HIV-1 gp120 as a therapeutic target: navigating a moving labyrinth," Expert Opin Ther Targets (19)6: 765-783, 2015.
Buckland et al., "Technology transfer and scale-up of the Flublok recombinant hemagglutinin (HA) influenza vaccine manufacturing process," Vaccine (32) 5496-5502, 2014.
Brito et al., "Self-amplifying mRNA vaccines," Adv Genet., 89:179-233, 2015.
Sriwilaijaroen, "Molecular basis of the structure and function of H1 hemagglutinin of influenza virus," Proc Jpn Acad Ser B Phys Biol Sci (88) 226-249, 2012.
Liu et al., "Improvement of Pharmacokinetic Profile of Trail via Trimer-Tag Enhances its Antitumor Activity in vivo," 2017, Sci Rep 7(1):8953.
Neumann et al. "Generation of influenza A viruses entirely from cloned CDNAs," PNAS 96 (16) 9345-9350, 1999.
James et al., "Safe Administration of the Measles Vaccine to Children Allergic to Eggs," N. Engl. J. Med., (1995) 332:1262-6.
Corper et al., "Structure of the uncleaved human H1 hemagglutinin from the extinct 1918 influenza virus," Science (303) 1866-1870, 2004.
Lin et al., "Automatic Prediction of Rheumatoid Arthritis Disease Activity from the Electronic Medical Records," PLoS One (8), 2013.
Wang et al., "Expression and purification of an influenza hemagglutinin—one step closer to a recombinant protein-based influenza vaccine" Vaccine (24) 2176-2185, 2006.
Traynor, "First recombinant flu vaccine approved," Am J Health Syst Pharm (70) 382, 2013.
Lakey et al., "Recombinant Baculovirus Influenza A Hemagglutinin Vaccines are Well Tolerated and Immunogenic in Healthy Adults" J Infect Dis (174) 838-841, 1996.
Yang et al., "Recombinant Trivalent Influenza Vaccine (Flublok®): A Review of Its Use in the Prevention of Seasonal Influenza in Adults," Drugs 73:1357-1366, 2013.
Pica et al., ",Hemagglutinin stalk antibodies elicited by the 2009 pandemic influenza virus as a mechanism for the extinction of seasonal H1N1 viruses" 2012, PNAS 109:2573-78.
Wiley et al., "Structural identification of the antibody-binding sites of Hong Kong influenza haemagglutinin and their involvement in antigenic variation," 1981, Nature 29:373-78.
Smith et al,. "Emergence and predominance of an H5N1 influenza variant in China," PNAS (103)16936-16941, 2006.
Peiris et al., "Emergence of a novel swine-origin influenza A virus (S-OIV) H1N1 virus in humans." J Clin Virol 45:169-173, 2009.
Johnson NP et al., "Global Morality of the 1918-1920 "Spanish" Influenza Pandemic," Bull Hist Med 76:105-115, 2002.
Zhu et al., "From Variation of Influenza Viral Proteins to Vaccine Development," Int J Mol Sci (18), 2017.
Monto, "Vaccine and Antiviral Drug in Pandemic Population," Emerging Infectious Diseases 12:55-60, 2006.

(56) References Cited

OTHER PUBLICATIONS

Ahmed et al., "Evaluation of Bacteroides markers for the detection of human faecal pollution," Applied Microbiology, ISSN 0266-8254 2007.
Thompson et al., "Influenza-associated hospitalizations in the United States," JAMA (11):1330, 2004.
Murata, Y., "Respiratory syncytial virus vaccine development," (2009) Clin. Lab. Med. 29, 725-739.
James et al., "Field Evaluation of a Respiratory Syncytial Virus Vaccine and a Trivalent Parainfluenza Virus Vaccine in a Pediatric Population," Am. J. Epidemiol. 89, 449-463.
Kim et al., "Respiratory syncytial virus disease in infants despite prior administration of antigenic inactivated vaccine," (1969) Am. J, Epidemiol. 89, 422-434; Chin et al., (1969).
Swanson et al., "Structural basis for immunization with postfusion respiratory syncytial virus fusion F glycoprotein (RSV F) to elicit high neutralizing antibody titers," (2011) Prot. Natl. Acad. Sci. U.S.A. 108, 9619-9624.
Remingtons Pharmaceutical Sciences, 19th Ed., Mack Publishing Company, Easton, Pa., 1995.
Jiang et al., "Immunostimulatory polynucleotide/immunomodulatory molecule conjugates," J. Biol. Stand., (1986) 14:103-9.
Addetia et al., "Neutralizing Antibodies Correlate with Protection from SARS-CoV-2 in Humans during a Fishery Vessel Outbreak with a High Attack Rate," J Clin Microbiol. (2020) 58(11):e02107-20.
Baker et al., "Structures of bovine and human papillomaviruses. Analysis by cryoelectron microscopy and three-dimensional image reconstruction," Biophys J. (1991) 60(6):1445-56.
Barouch et al., "A human T-cell leukemia virus type 1 regulatory element enhances the immunogenicity of human immunodeficiency virus type 1 DNA vaccines in mice and nonhuman primates," J Virol. (2005) 79(14):8828-34.
Bode et al., "CpG DNA as a vaccine adjuvant," Expert Rev Vaccines. (2011) 10(4):499-511.
Bradley et al., "Hepatitis A virus: growth characteristics of in vivo and in vitro propagated wild and attenuated virus strains," J Med Virol. (1984) 14(4): 373-86. (Abstract only).
Braun et al., "Immunogenic duplex nucleic acids are nuclease resistant," J Immunol. (1988) 141(6): 2084-9. (Abstract only).
Brito et al., "Self-amplifying mRNA vaccines," Adv Genet. (2015); 89:179-233. (Abstract only).
Cai et al., "Distinct conformational states of SARS-CoV-2 spike protein," Science. (2020) 369(6511): 1586-1592.
Clover Biopharmaceuticals & GSK, "Clover and GSK announce research collaboration to evaluate coronavirus (COVID-19) vaccine candidate with pandemic adjuvant system,", Feb. 24, 2020 (Feb. 24, 2020).
Clover Biopharmaceuticals & GSK, "GlaxoSmithKline and Clover collaborate to evaluate the combination of novel coronavirus vaccine candidate and pandemic vaccine adjuvant system," Feb. 24, 2020 (Feb. 24, 2020).
Coffman et al., "Vaccine adjuvants: putting innate immunity to work," Immunity. (2010) 33(4):492-503.
De Felipe, "Skipping the co-expression problem: the new 2A "Chysel" technology," Genet Vaccines Ther Sep. 13, 2004;2(1):13.
De Felipe, "Targeting of proteins derived from self-processing polyproteins containing multiple signal sequences," Traffic (2004) 5(8):616-626.
Gao et al., "Development of an inactivated vaccine candidate for SARS-CoV-2," Science. (2020) 369(6499): 77-81.
Garcon et al., "Development and evaluation of AS03, an Adjuvant System containing α-tocopherol and squalene in an oil-in-water emulsion," Expert Rev Vaccines. (2012) 11(3):349-66.
Geall et al., "Nonviral delivery of self-amplifying RNA vaccines," Proc Natl Acad Sci U S A. (2012) 109(36): 14604-9.
Hagansee et al., "Three-dimensional structure of vaccinia virus-produced human papillomavirus type 1 capsids," J Virol. (1994) 68(7): 4503-5.

Harbury et al., "A switch between two-, three-, and four-stranded coiled coils in GCN4 leucine zipper mutants," Science. (1993) 262(5138):1401-7.
Hoppe et al., "A parallel three stranded alpha-helical bundle at the nucleation site of collagen triple-helix formation," FEBS Lett. (1994) 344(2-3): 191-5.
James et al., "Safe administration of the measles vaccine to children allergic to eggs," N Engl J Med. (1995) 332(19):1262-6.
Kirchdoerfer et al., "Pre-fusion structure of a human coronavirus spike protein," Nature. (2016) 531(7592): 118-21.
Latimer et al., "Specificity of monoclonal antibodies produced against phosphorothioate and ribo modified DNAs," Mol Immunol. (1995) 32(14-15): 1057-64. (Abstract only).
Liang et al., "S-Trimer, a Covid-19 subunit vaccine candidate, induces protective immunity in nonhuman primates," Nat Commun. (2021) 12(1):1346.
Liu et al., "Improvement of Pharmacokinetic Profile of Trail via Trimer-Tag Enhances its Antitumor Activity in vivo," Sci Rep. (2017) 7(1): 8953.
Ma et al. "Cryo-EM structure of S-Trimer, a subunit vaccine candidate for Covid-19," bioRxiv 2020.09.21.306357. doi:10.1101/2020.09.21.306357.
Ma et al., "Cryo-EM structure of S-Trimer, a subunit vaccine candidate for Covid-19," J Virol. (2021) 95(11): e00194-21. doi:10.1128/JVI.00194-21.
Magini et al., "Self-Amplifying mRNA Vaccines Expressing Multiple Conserved Influenza Antigens Confer Protection against Homologous and Heterosubtypic Viral Challenge," PLoS One. (2016) 11(8):e0161193.
McAlinden et al., "Alpha-helical coiled-coil oligomerization domains are almost ubiquitous in the collagen superfamily," J Biol Chem. (2003) 278(43): 42200-42207.
Miroshnikov et al., "Engineering trimeric fibrous proteins based on bacteriophage T4 adhesins," Protein Eng. (1998) 11(4):329-32.
Mohler et al., "Soluble Tumor Necrosis Factor (TNF) Receptors Are Effective Therapeutic Agents in Lethal Endotoxemia and Function Simultaneously as Both TNF Carriers and TNF Antagonists," J. of Immunology, vol. 151, No. 3, p. 1548-1561, 1993.
Morel et al., "Adjuvant System AS03 containing α-tocopherol modulates innate immune response and leads to improved adaptive immunity," Vaccine. (2011) 29(13): 2461-73.
Mowat et al., "ISCOMS—a novel strategy for mucosal immunization?," Immunol Today. (1991) 12(11): 383-5. (Abstract only).
Munster et al., Respiratory disease and virus shedding in rhesus macaques inoculated with SARS-CoV-2, Nature. (2020) 585: 268-272.
Newman et al., "Use of nonionic block copolymers in vaccines and therapeutics," Crit Rev Ther Drug Carrier Syst. (1998); 15(2): 89-142. (Abstract only).
O'Hagen et al., "The history of MF59(®) adjuvant: a phoenix that arose from the ashes," Expert Rev Vaccines. (2013) 12(1): 13-30.
Petsch et al., "Protective efficacy of in vitro synthesized, specific mRNA vaccines against influenza A virus infection," Nat Biotechnol. (2012) 30(12): 1210-6.
Pramanick et al., "Excipient Selection in Parenteral Formulation Development," Pharma Times. (2013) 45: 65-77.
Richmond et al., "Safety and immunogenicity of S-Trimer (SCB-2019), a protein subunit vaccine candidate for Covid-19 in healthy adults: a phase 1, randomised, double-blind, placebo-controlled trial," Lancet. (2021) ;397(10275): 682-694.
Shah et al., "Overview of Vaccine Adjuvants: Introduction, History, and Current Status," Methods Mol Biol. (2017) 1494:1-13. (Abstract only).
Shaw et al., "Heterologous prime-boost Covid-19 vaccination: initial reactogenicity data," Lancet. (2021) 397(10289): 2043-2046.
Stover et al., "New use of BCG for recombinant vaccines," Nature. (1991) 351(6326): 456-60.
Takahashi et al., "Induction of CD8+ cytotoxic T cells by immunization with purified HIV-1 envelope protein in ISCOMs," Nature. (1990) 344(6269): 873-875. (Abstract only).
Vatti et al., "Original antigenic sin: A comprehensive review," J Autoimmun. (2017) 83:12-21.

(56) References Cited

OTHER PUBLICATIONS

Walls et al., "Structure, Function, and Antigenicity of the SARS-CoV-2 Spike Glycoprotein," Cell. (2020) 181(2): 281-292.e6.
Wu et al., "Variant SARS-CoV-2 mRNA vaccines confer broad neutralization as primary or booster series in mice," bioRxiv. Oct. 7, 2021;2021.04.13.439482.
Wu et al., "Serum Neutralizing Activity Elicited by mRNA-1273 Vaccine," N Engl J Med. (2021) 384(15): 1468-1470.
Wu et al., "A new coronavirus associated with human respiratory disease in China," Nature. (2020) 579(7798): 265-269.

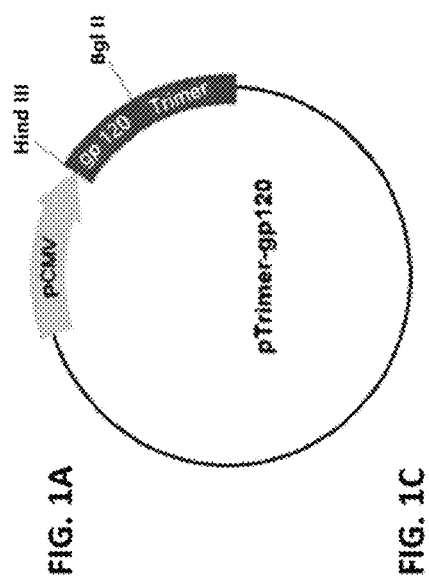
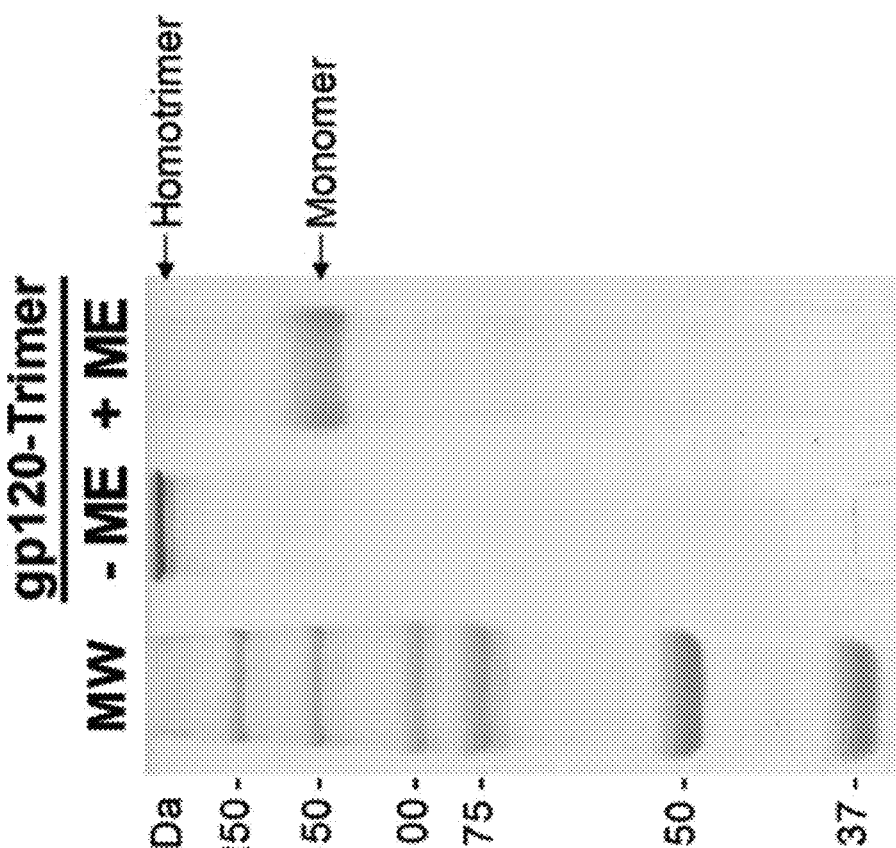
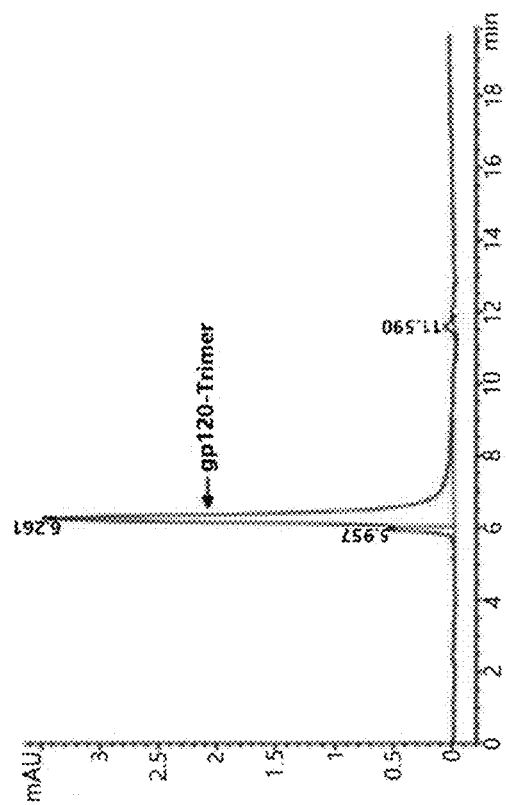
FIG. 1A
FIG. 1B
FIG. 1C

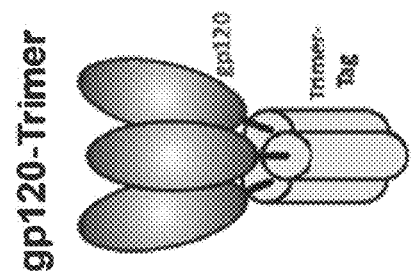
FIG. 2A  FIG. 2B
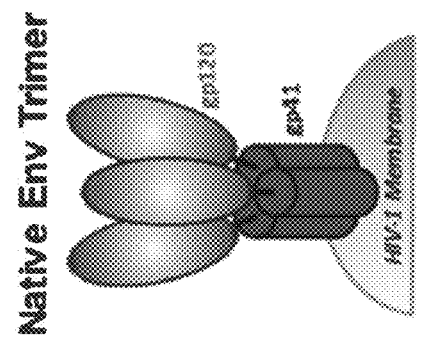
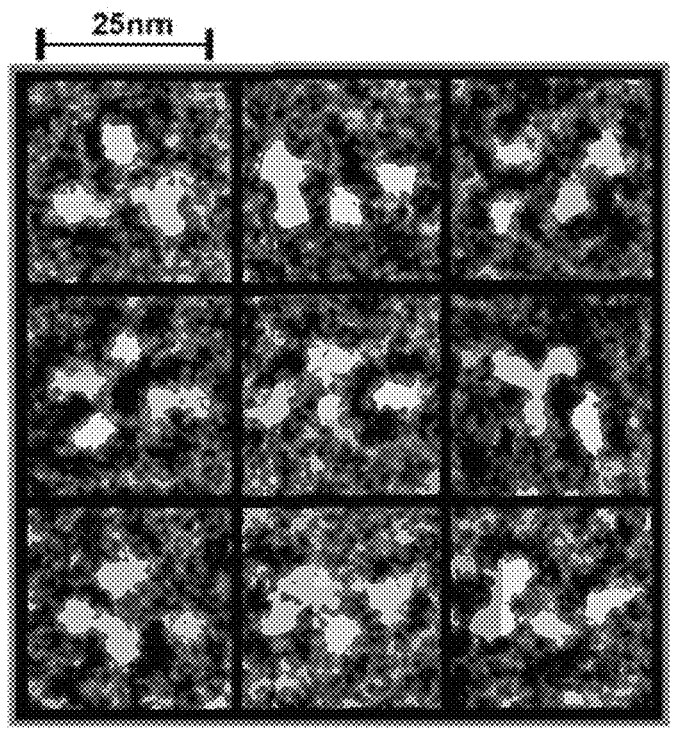
FIG. 2C

FIG. 5

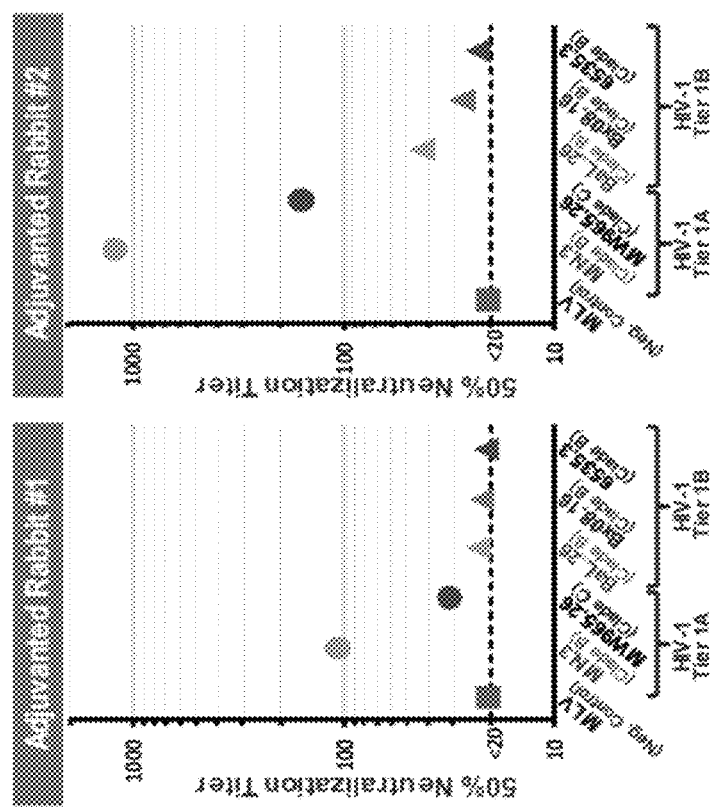
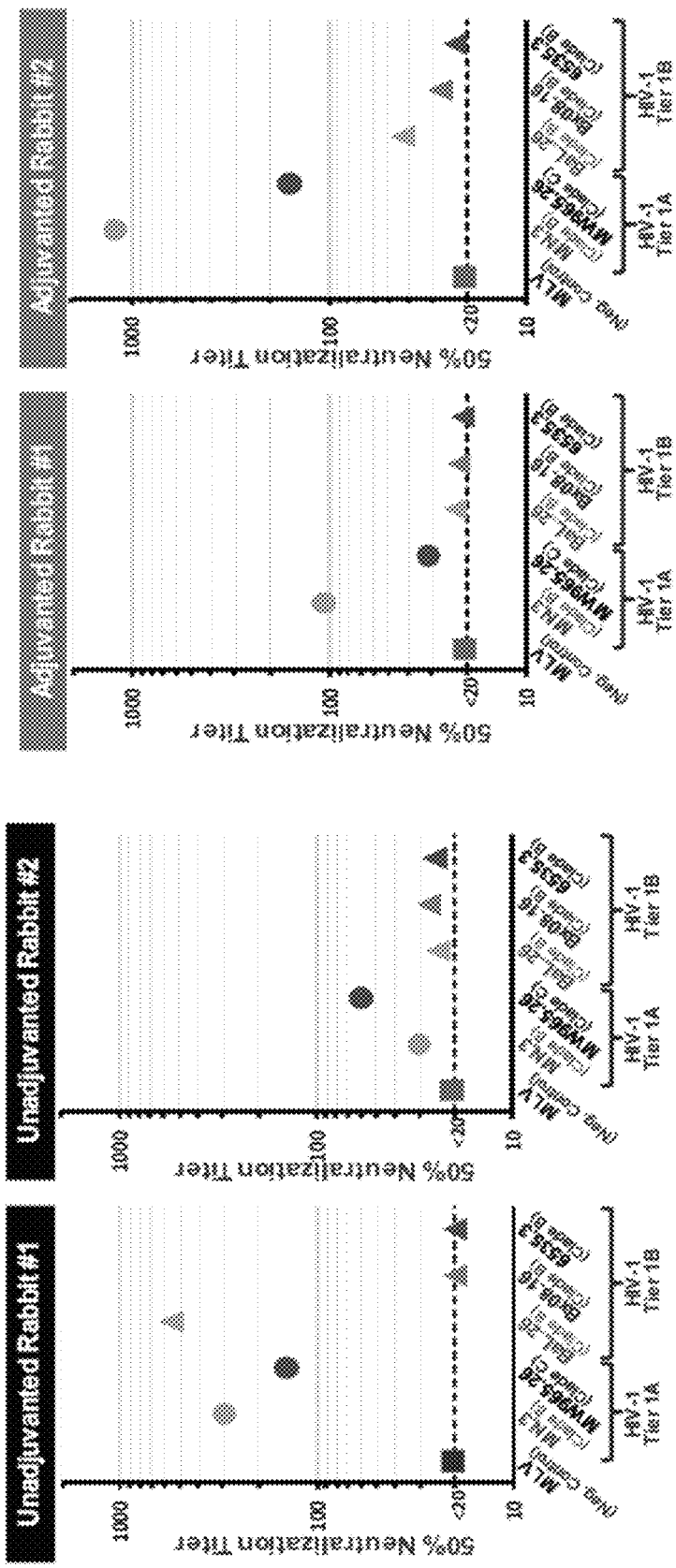
FIG. 6A  Tier 1A & 1B Neutralization (Week 22)

HIV VACCINE COMPOSITIONS, METHODS, AND USES THEREOF

CROSS-REFERENCE TO RELATED APPLICATIONS

This application claims priority to and the benefit of International Patent Application Nos. PCT/CN2020/095335, filed Jun. 10, 2020, and PCT/CN2021/087054, filed Apr. 13, 2021, the disclosures of which applications are incorporated herein by reference in their entireties for all purposes.

SUBMISSION OF SEQUENCE LISTING AS ASCII TEXT FILE

The content of the following submission on ASCII text file is incorporated herein by reference in its entirety: a computer readable form (CRF) of the Sequence Listing (file name: 165762000442SEQLIST.TXT, date recorded: Jun. 9, 2021, size: 186 KB).

FIELD

The present disclosure relates in some aspects to immunogenic compositions including recombinant peptides and proteins comprising human immunodeficiency virus (HIV) 1 viral antigens and immunogens, e.g., gp120 protein peptides, for treating and/or preventing an HIV infection.

BACKGROUND

Human immunodeficiency viruses (HIV) include two species of lentivirus that infect humans, and over time can cause acquired immunodeficiency syndrome (AIDS). Immunization against HIV 1 is currently not available. Clinical trials have been unsuccessful in generating broadly neutralizing antibodies against all tiers of HIV. Improved strategies are needed.

SUMMARY

In some embodiments, disclosed herein are recombinant subunit vaccines that comprise an ecto-domain (e.g., without transmembrane and cytoplasmic domains) of an HIV protein or its fragments, such as the HIV gp120 protein, which is fused in-frame to a C-propeptide of a collagen that is capable of forming disulfide bond-linked homo-trimer. The resulting recombinant subunit vaccines, such as an gp120-trimer, can be expressed and purified from transfected cells, and are expected to be in native-like conformation in trimeric form. This solves the problems of mis-folding of a viral antigen often encountered when it is expressed as a recombinant peptide or protein in soluble forms without the transmembrane and/or cytoplasmic domains. Such mis-folded viral antigens do not faithfully preserve the native viral antigen conformation, and often fail to evoke neutralizing antibodies.

In one aspect, provided herein is a protein comprising a plurality of recombinant polypeptides, each recombinant polypeptide comprising a HIV gp120 protein peptide or a fragment or epitope thereof linked to a C-terminal propeptide of collagen, wherein the C-terminal propeptides of the recombinant polypeptides form inter-polypeptide disulfide bonds.

In some of any embodiments, the HIV is an HIV-1, optionally a tier 1B, tier 1A, tier 2, or tier 3 virus. In some of any embodiments, the epitope is a linear epitope or a conformational epitope.

In some of any embodiments, the gp120 protein peptide comprises an outer domain subunit peptide, an inner domain subunit peptide, or any combination thereof, and wherein the protein comprises three recombinant polypeptides. In some of any embodiments, the gp120 protein comprises one, two, three, four, or five C regions, and one, two, three, four, or five variable regions, optionally separated by a bridging sheet. In some embodiments, the gp120 protein peptide comprises an outer subunit or an inner subunit the gp120 protein. In some of any embodiments, the gp120 protein peptide comprises an inner subunit and an outer subunit of the gp120 protein, optionally wherein the outer subunit and the inner subunit are linked by a disulfide bond or an artificially introduced linker. In some of any embodiments, the gp120 protein peptide does not comprise a transmembrane (TM) domain peptide and/or a cytoplasm (CP) domain peptide.

In some of any embodiments, the gp120 protein peptide comprises a protease cleavage site, wherein the protease is optionally furin, a transmembrane serine protease such as TMPRSS2, trypsin, factor Xa, thrombin, or cathepsin L. In some of any embodiments, the gp120 protein peptide does not comprise a protease cleavage site, wherein the protease is optionally furin, a transmembrane serine protease such as TMPRSS2, trypsin, factor Xa, thrombin, or cathepsin L.

In some of any embodiments, the gp120 protein peptide is soluble or does not directly bind to a lipid bilayer, e.g., a membrane or viral envelope. In some of any embodiments, the gp120 protein peptides are the same or different among the recombinant polypeptides of the protein. In some of any of the embodiments, the gp120 protein peptide is directly fused to the C-terminal propeptide, or is linked to the C-terminal propeptide via a linker, such as a linker comprising glycine-X-Y repeats, wherein X and Y and independently any amino acid and optionally proline or hydroxyproline.

In some of any embodiments, the provided protein is soluble. In some of any embodiments, the protein does not directly bind to a lipid bilayer, e.g., a membrane or viral envelope. In some of any embodiments, the protein is capable of binding to a cell surface attachment factor or receptor of a subject, optionally wherein the subject is a mammal such as a primate, e.g., human.

In some of any embodiments, the C-terminal propeptide is of human collagen. In some of any embodiments, the C-terminal propeptide comprises a C-terminal polypeptide of proα1(I), proα1(II), proα1(III), proα1(V), proα1(XI), proα2(I), proα2(V), proα2(XI), or proα3(XI), or a fragment thereof. In some of any embodiments, the C-terminal propeptides are the same or different among the recombinant polypeptides.

In some of any embodiments, the C-terminal propeptide comprises any one of SEQ ID NOs: 31-46 or an amino acid sequence at least 90% identical thereto capable of forming inter-polypeptide disulfide bonds and trimerizing the recombinant polypeptides.

In some of any embodiments, the gp120 protein peptide in each recombinant polypeptide is in a prefusion conformation or a postfusion conformation.

In some of any embodiments, the gp120 protein peptide in each recombinant polypeptide comprises any of SEQ ID NOs: 19-30 or an amino acid sequence at least 80% identical thereto.

In some of any embodiments, the recombinant polypeptide comprises any of SEQ ID NOS: 1-18 or an amino acid sequence at least 80% identical thereto.

Provided herein is an immunogen, such as an immunogen comprising any of the provided proteins. Also provided herein is a protein nanoparticle, such as a protein nanoparticle comprising any of the provided proteins directly or indirectly linked to a nanoparticle. Also provided here in a virus-like particle (VLP), such as a VLP comprising any of the provided proteins Also provided herein is a nucleic acid, such as an isolated nucleic acid encoding one, two, three or more of the recombinant polypeptides of any of the provided proteins. In some embodiments, a polypeptide encoding the gp120 protein peptide is fused in-frame to a polypeptide encoding the C-terminal propeptide of collagen.

In some embodiments, the isolated nucleic acid is operably linked to a promoter. In some embodiments, the isolated nucleic acid is operably linked to a promoter. In some embodiments, the isolated nucleic acid is DNA molecule.

In some embodiments, the isolated nucleic acid is an RNA molecule. Optionally, an mRNA molecule such as a nucleoside-modified mRNA, a non-amplifying mRNA, a self-amplifying mRNA, or a trans-amplifying mRNA.

Provided herein is a vector, such as a vector comprising any of the provided nucleic acids. In some embodiments, the vector is a viral vector.

Also provided herein is a virus, a pseudovirus, or a cell comprising any of the vector provided herein. Optionally, wherein the virus or cell has a recombinant genome.

Provided herein is an immunogenic composition comprising any of the provided proteins, immunogens, protein nanoparticle, VLP, isolated nucleic acid, vector, virus, pseudovirus, or cell and a pharmaceutically acceptable carrier.

Provided herein is a vaccine comprising any of the provided immunogenic compositions. Optionally, in an adjuvant, wherein the vaccine is optionally a subunit vaccine. In some embodiments, the vaccine is a prophylactic and/or therapeutic vaccine.

Also provided herein is a method of producing a protein, said method comprising expressing any of the provided isolated nucleic acids or vectors in a host cell to produce any of the provided proteins; and purifying the protein. Provided herein are proteins produced by this method.

Provided herein is a method for generating an immune response to an gp120 protein peptide or fragment or epitope thereof of an HIV virus in a subject, the method comprising administering to the subject an effective amount of any of the provided protein, immunogen, protein nanoparticle, VLP, isolated nucleic acid, vector, virus, pseudovirus, cell, immunogenic composition, or vaccine to generate the immune response.

In some of any embodiments, the method is for treating or preventing infection with the HIV virus. In some embodiments, generating the immune response inhibits or reduces replication of HIV in the subject. In some embodiments, the immune response comprises a cell-mediated response and/or a humoral response, optionally comprising production of one or more neutralizing antibody, such as a polyclonal antibody or a monoclonal antibody. In some embodiments, the immune response is against the gp120 protein peptide or fragment or epitope thereof of HIV but not against the C-terminal propeptide.

In some of any embodiments, the administering does not lead to antibody dependent enhancement (ADE) in the subject due to prior exposure to one or more HIV virus. In some embodiments, the administering does not lead to antibody dependent enhancement (ADE) in the subject when subsequently exposed to one or more HIV virus.

In some of any embodiments, the method further comprises a priming step and/or a boosting step.

In some of any embodiments, the administering step is performed via topical, transdermal, subcutaneous, intradermal, oral, intranasal (e.g., intranasal spray), intratracheal, sublingual, buccal, rectal, vaginal, inhaled, intravenous (e.g., intravenous injection), intraarterial, intramuscular (e.g., intramuscular injection), intracardiac, intraosseous, intraperitoneal, transmucosal, intravitreal, subretinal, intraarticular, peri-articular, local, or epicutaneous administration. In some of any embodiments, the effective amount is administered in a single dose or a series of doses separated by one or more interval. In some of any embodiments, the effective amount is administered without an adjuvant. In some of any embodiments, the effective amount is administered with an adjuvant.

Provided herein is a method comprising administering to a subject an effective amount of any of the provided proteins to generate in the subject a neutralizing antibody or neutralizing antisera to the HIV virus. In some embodiments, the subject is a mammal. Optionally, a human or a non-human primate.

In some of any embodiments, the method further comprises isolating the neutralizing antibody or neutralizing antisera from the subject. In some of any embodiments, the method further comprises administering an effective amount of the isolated neutralizing antibody or neutralizing antisera to a human subject via passive immunization to prevent or treat an infection by the HIV virus. In some of any embodiments, the neutralizing antisera comprises polyclonal antibodies to the gp120 protein peptide or fragment or epitope thereof, optionally wherein the neutralizing antibody is free or substantially free of antibodies to the C-terminal propeptide of collagen. In some of any embodiments, the neutralizing antibody comprises a monoclonal antibody to the gp120 protein peptide or fragment or epitope thereof, optionally wherein the neutralizing antibody is free or substantially free of antibodies to the C-terminal propeptide of collagen.

In some of any embodiments, any of the provided proteins, immunogens, protein nanoparticles, VLPs, isolated nucleic acids, vectors, viruses, pseudoviruses, cells, immunogenic compositions, or vaccines, are for use in inducing an immune response to an HIV virus in a subject, and/or in treating or preventing an infection by the HIV virus.

Provided herein is the use of any of the provided protein, immunogen, protein nanoparticle, VLP, isolated nucleic acid, vector, virus, pseudovirus, cell, immunogenic composition, or vaccine for inducing an immune response to an HIV virus in a subject, and/or for treating or preventing an infection by the HIV virus.

Provided herein is the use of any of the provided protein, immunogen, protein nanoparticle, VLP, isolated nucleic acid, vector, virus, pseudovirus, cell, immunogenic composition, or vaccine for the manufacture of a medicament or a prophylactic for inducing an immune response to an HIV virus in a subject, and/or for treating or preventing an infection by the HIV virus.

Also provided herein is a method for analyzing a sample, the method comprising: contacting a sample with any of the provided proteins, and detecting a binding between the protein and an analyte capable of specific binding to the gp120 protein peptide or fragment or epitope thereof of the HIV virus.

In some of any embodiments, the analyte is an antibody, a receptor, or a cell recognizing the gp120 protein peptide or fragment or epitope thereof. In some of any embodiments, the binding indicates the presence of the analyte in the sample, and/or an infection by HIV in a subject from which the sample is derived.

Also provided herein is a kit, the kit comprising any of the provided proteins and a substrate, pad, or vial containing or immobilizing the protein, optionally wherein the kit is an ELISA or lateral flow assay kit.

BRIEF DESCRIPTION OF THE DRAWINGS

FIG. 1 shows the expression level of an exemplary fusion protein comprising HIV gp120. 85US_Ba-L gp120 env gene was synthesized after optimization for Chinese hamster ovary (CHO) expression by Genscript (Nanjing), using gp120 NCBI accession DQ318210.1. The gene fragment encoding the gp120 glycoprotein was cloned into the pTrimer-tag vector through HindIII and BglII sites as shown in FIG. 1A.

The construct was stably transfected into the CHO-S dhfr−/− cell line and supernatants were first run over a 5 mL Blue-Sepharose affinity purification column. The trimeric fractions were isolated with purity of the isolated exemplary fusion protein comprising HIV gp120 shown in FIGS. 1B and 1C.

FIG. 2A depicts a representative illustration of mature Env trimer protein on surface of HIV-1 membrane, while a representative illustration of gp120-Trimer fusion protein based on gp120-Trimer negative-stain electron microscopy (EM) images is shown in FIG. 2B. Exemplary fusion protein alone and in complex with B12 or CD4 were analyzed by negative-stain electron microcopy as shown in FIG. 2C. The results show native-like structure of gp120-Trimer fusion protein.

Figure 3:
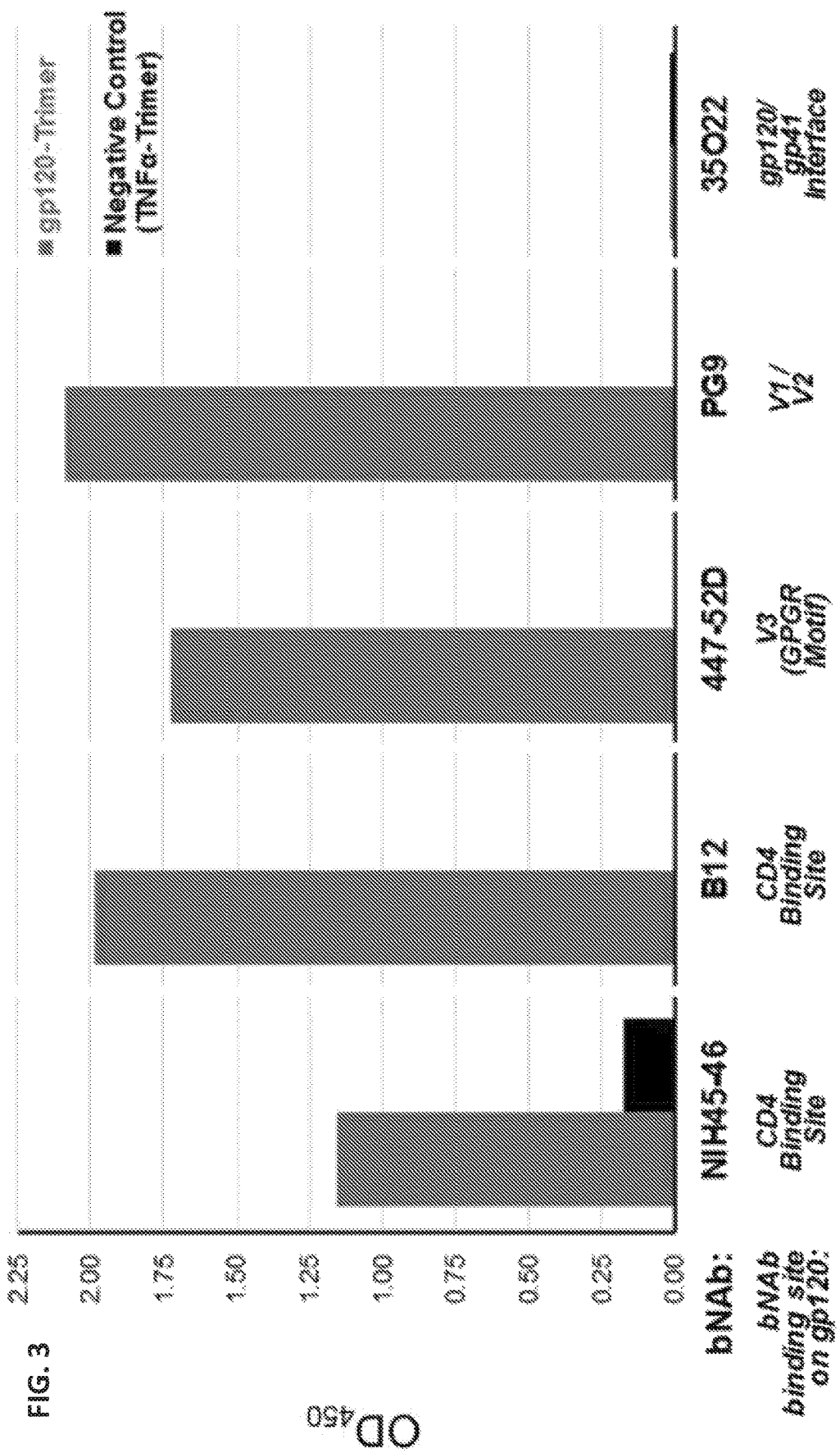

Binding kinetics of the exemplary fusion protein comprising HIV gp120 were assessed against several broadly neutralizing antibodies (bNAbs) are depicted in FIG. 3. The results show that gp120-Trimer fusion protein binds to bNAbs with high specificity.

Figure 4:
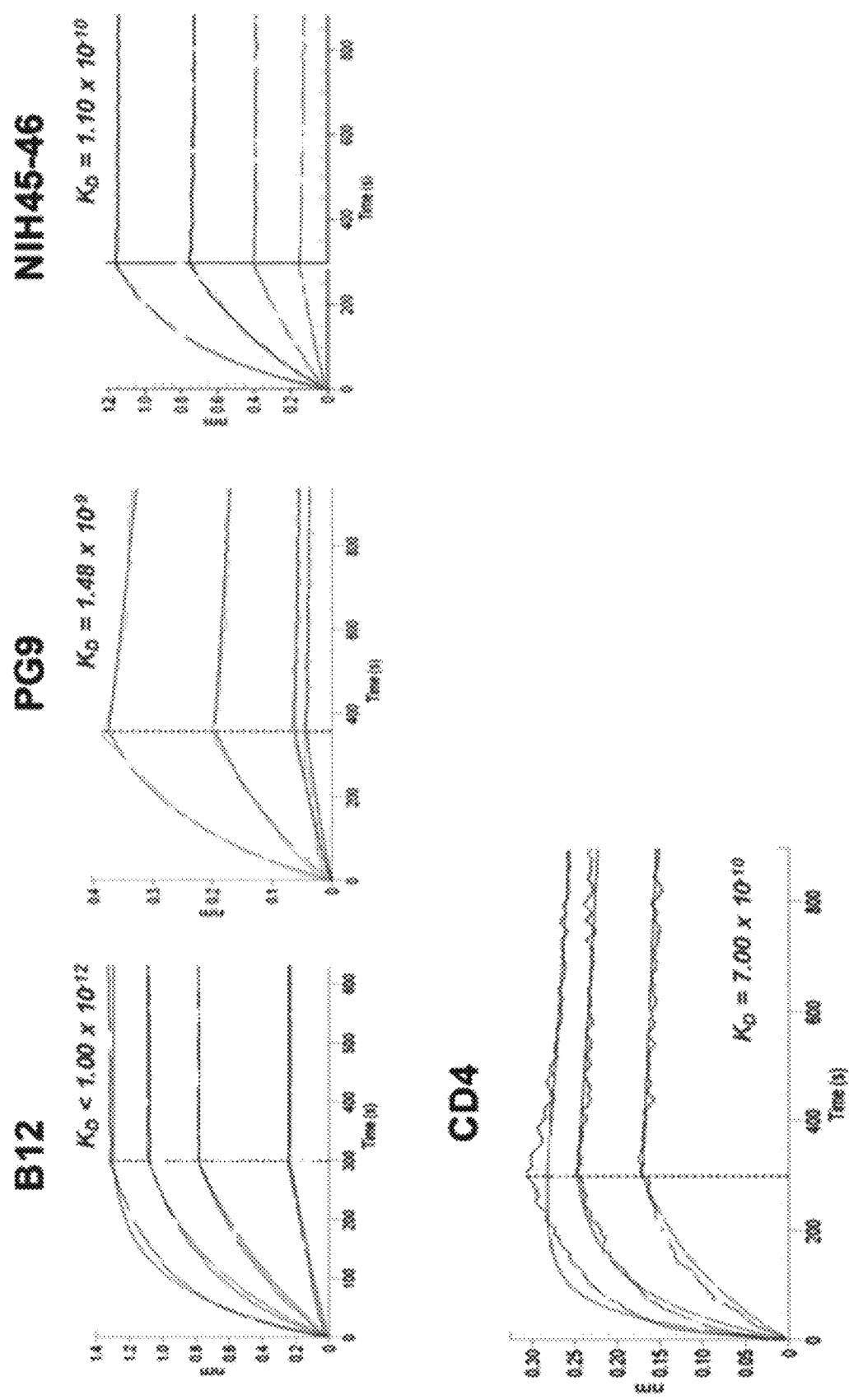

The exemplary fusion proteins were biotin labeled with 20 mM EZ-Link NHS-PEG4-biotin (ThermoFisher), then attached to the streptavidin (SA) sensors and loaded within the plate coating with 10 μg/mL biotin-gp120-Trimer for 300 s. Binding kinetics were additional measured at 30° C. by fortebio OCTET QKe Bio-layer interferometry (BLI) system (Pall Life Science Corp) and are shown in FIG. 4. The results show that gp120-Trimer fusion protein exhibits high affinity and tight binding kinetics to bNAbs and CD4.

Figure 5:
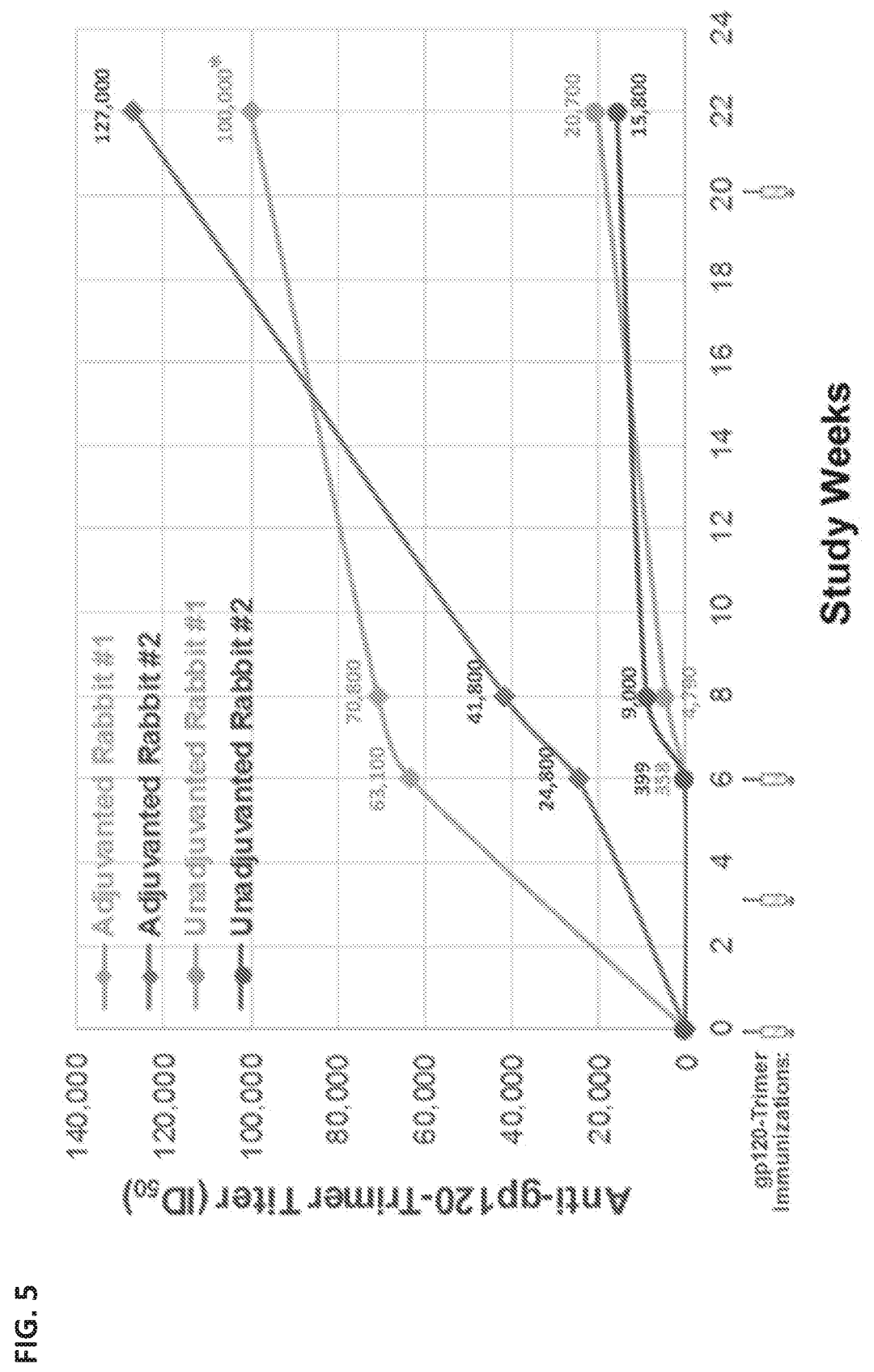

The binding kinetics to bNAb, such as NIH45-46, PG9 and 447-52D, is depicted in FIG. 5. The results show that gp120-Trimer is highly immunogenic and induces antibodies in rabbit immunization model.

Figure 6B:
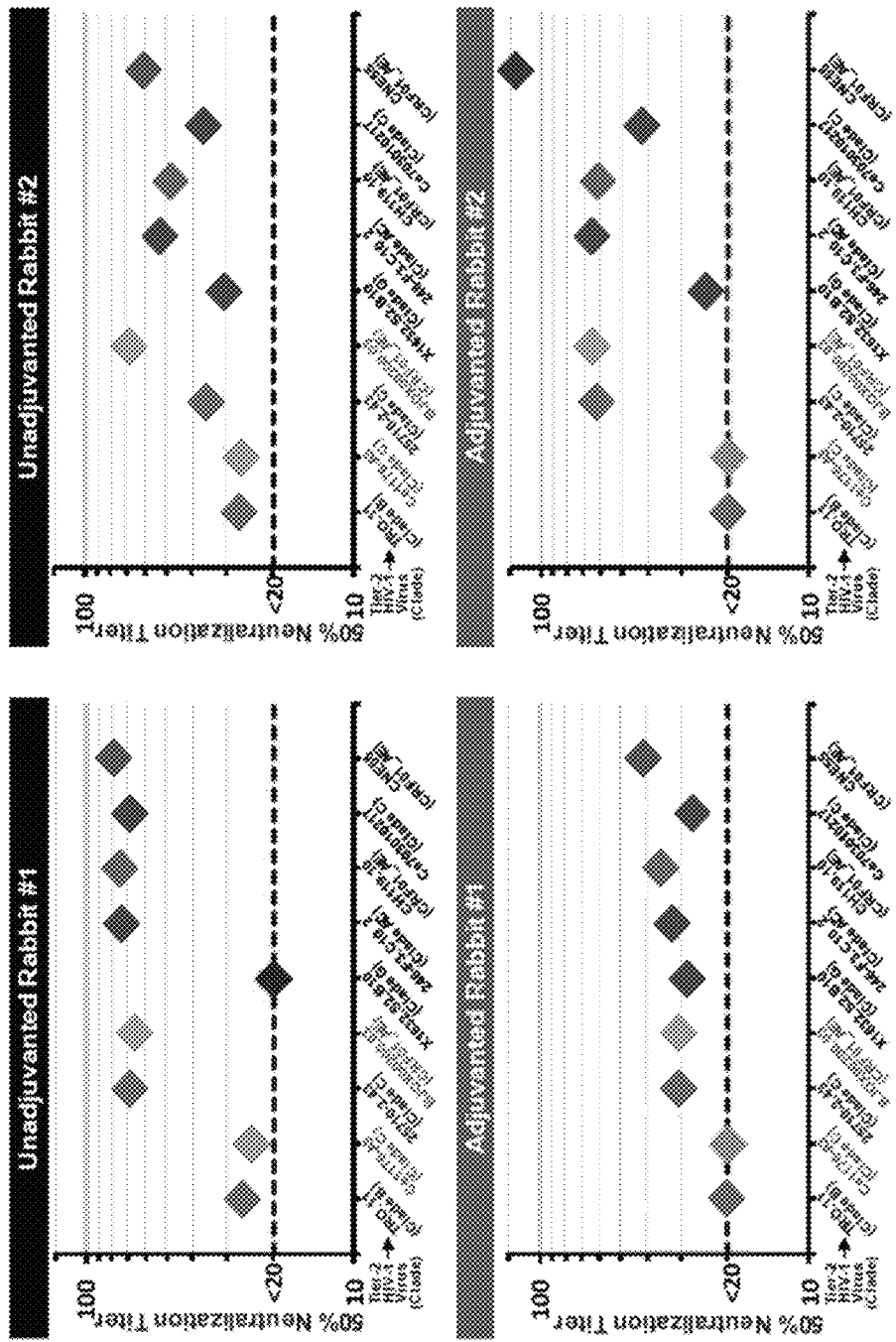
Figure 6C:
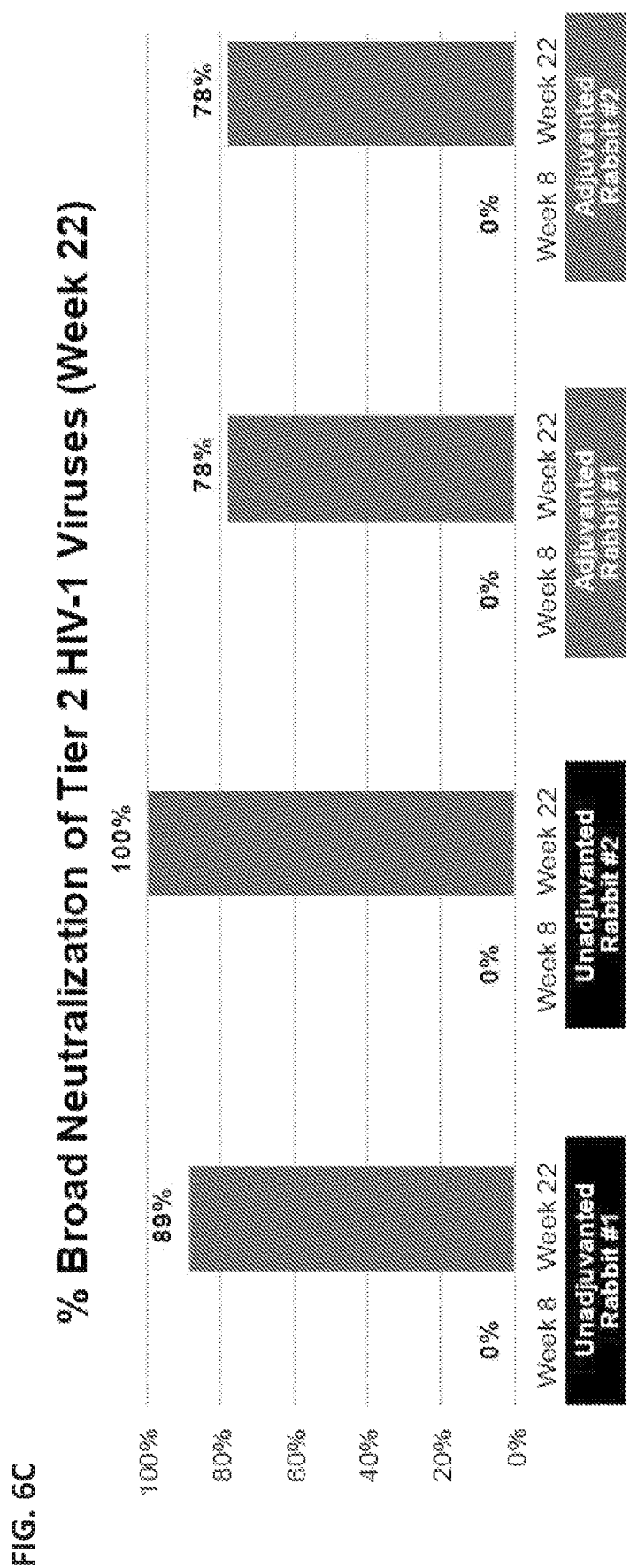

Immunization with exemplary HIV gp120 fusion protein was observed to induce HIV-1 neutralizing antibodies, including against Tier 1A and 1B (FIG. 6A) as well as Tier 2 viruses (FIG. 6B) Tier in rabbit immunization model. Immunization with exemplary HIV gp120 fusion protein was also seen to induce a high percent of broadly neutralizing antibodies (FIG. 6C). The results show that gp120-Trimer induces HIV-1 neutralizing antibodies in rabbit immunization model.

DETAILED DESCRIPTION

In some embodiments, compositions and methods of use of recombinant soluble surface antigens from RNA viruses in covalently linked trimeric forms are disclosed. In some embodiments, the resulting fusion proteins are secreted as disulfide bond-linked homo-trimers, which are more stable in structure, while preserving the conformations of native-like trimeric viral antigens, thereby can be used as more effective vaccines against these dangerous pathogens.

In some embodiments, disclosed herein are methods for using viral antigen trimers as a vaccine or as part of a multivalent vaccine to prevent viral infections, without or with adjuvant, or with more than one adjuvant, optionally via either intra-muscular injections or intra-nasal administrations.

In some embodiments, disclosed herein are methods for using viral antigen trimers as an antigen for diagnosis of viral infections through detection of antibodies, e.g., IgM or IgG, that recognize the viral antigen, such as neutralizing antibodies.

In some embodiments, disclosed herein are methods for using viral antigen trimers as an antigen to generate polyclonal or monoclonal antibodies which can be used for passive immunization, e.g., neutralizing mAb for preventing or treating an HIV infection.

In some embodiments, disclosed herein is a viral antigen trimer as a vaccine or as part of a multivalent vaccine, wherein the vaccine comprises a plurality of trimeric subunit vaccines comprising viral antigens of the same protein of a virus or comprising viral antigens of two or more different proteins of one or more viruses or one or more strains of the same virus.

In some embodiments, disclosed herein is a monovalent vaccine comprising a viral antigen trimer disclosed herein. In some embodiments, disclosed herein is a bi-valent vaccine comprising a viral antigen trimer disclosed herein. In some embodiments, disclosed herein is a tri-valent vaccine comprising a viral antigen trimer disclosed herein. In some embodiments, disclosed herein is a quadrivalent vaccine comprising a viral antigen trimer disclosed herein.

In some embodiments, disclosed herein is a monovalent vaccine comprising an envelope glycoprotein-trimer (e.g., gp160- or gp120- or gp41-Trimer) disclosed herein. In some embodiments, disclosed herein is a bi-valent vaccine comprising an envelope glycoprotein-trimer (e.g., gp160- or gp120- or gp41-Trimer) disclosed herein. In some embodiments, disclosed herein is a bi-valent vaccine comprising at least one envelope glycoprotein-trimer (e.g., gp160- or gp120- or gp41-Trimer) comprising a first envelope glycoprotein antigen and at least one envelope glycoprotein-trimer (e.g., gp160- or gp120- or gp41-Trimer) comprising a second envelope glycoprotein antigen. In some embodiments, the first and second envelope glycoprotein antigens are from the same envelope glycoprotein of one or more virus species or strains/subtypes, or from two or more different envelope glycoproteins of one or more virus species or one or more strains/subtypes of the same virus species. In some embodiments, disclosed herein is a tri-valent vaccine comprising an envelope glycoprotein-trimer (e.g., gp160- or gp120- or gp41-Trimer) disclosed herein. In some embodiments, disclosed herein is a tri-valent vaccine comprising at least one envelope glycoprotein-trimer (e.g., gp160- or gp120- or gp41-Trimer) comprising a first envelope glycoprotein antigen, at least one envelope glycoprotein-trimer (e.g., gp160- or gp120- or gp41-Trimer) comprising a second envelope glycoprotein antigen, and at least one envelope glycoprotein-trimer (e.g., gp160- or gp120- or gp41-Trimer) comprising a third envelope glycoprotein antigen. In some embodiments, the first, second and third envelope glycoprotein antigens are from the same envelope glycoprotein of one or more virus species or strains/subtypes, or from two, three, or more different envelope glycoproteins of one or more virus species or one or more strains/subtypes of the same virus species. In some embodiments, disclosed herein is a quadrivalent vaccine comprising an envelope glycoprotein-trimer (e.g., gp160- or gp120- or gp41-Trimer) disclosed herein. In some embodiments, disclosed herein is quadrivalent vaccine comprising at least one envelope glycoprotein-trimer (e.g., gp160- or gp120- or gp41-Trimer) comprising a first envelope glycoprotein antigen, at least one envelope glycoprotein-trimer (e.g., gp160- or gp120- or gp41-Trimer) comprising a second envelope glycoprotein antigen, at least one envelope glycoprotein-trimer (e.g., gp160- or gp120- or gp41-Trimer) comprising a third envelope glycoprotein antigen, and at least one envelope glycoprotein-trimer (e.g., gp160- or gp120- or gp41-Trimer) comprising a fourth envelope glycoprotein antigen. In some embodiments, the first, second, third, and fourth envelope glycoprotein antigens are from the same envelope glycoprotein of one or more virus species or strains/subtypes, or from two, three, four, or more different envelope glycoproteins of one or more virus species or one or more strains/subtypes of the same virus species. In some embodiments, disclosed herein is a vaccine comprising at least one gp120-Trimer from BG505, at least one gp120-Trimer from B41, and at least one gp120-Trimer from CH505.

Provided herein are immunogenic compositions, methods, and uses of recombinant polypeptides peptides and proteins comprising HIV viral antigens or immunogens for the treatment, e.g., prophylactic, therapeutic, of HIV infection. HIV includes two species of lentivirus that infect humans, and over time can cause acquired immunodeficiency syndrome (AIDS). AIDS is a condition in which progressive failure of the immune system allows life-threatening infections and cancers to thrive. In the absence of treatment, the average survival time after infection with HIV is estimated to be 9 to 11 years.

HIV infection can be sexually transmitted by contact with or transfer of blood, pre-ejaculate, semen, and vaginal fluids. HIV infection can also be transmitted non-sexually, for example from an infected mother to her infant during pregnancy, birth, and/or breast milk.

The primary immunologic abnormality resulting from infection by human immunodeficiency virus (HIV) is the progressive depletion and functional impairment of T lymphocytes expressing the CD4 cell surface glycoprotein. The loss of CD4 helper/inducer T cell function probably underlies the profound defects in cellular and humoral immunity leading to the opportunistic infections and malignancies characteristic of AIDS (Lane et al., *Ann. Rev. Immunol.*, 3: 477, 1985). Studies of HIV-1 infection of fractionated CD4 and CD8 T-cells from normal donors and AIDS patients have revealed that depletion of CD4 T-cells results from the ability of HIV-1 to selectively infect, replicate in, and ultimately destroy this T lymphocyte subset (Klatzmann et al., *Science*, 225: 59, 1984). Since its discovery in the early 1980s, AIDS has become a pandemic and caused more than 25 million deaths. Approximately 35 million people are currently living with HIV/AIDS globally, urgently in need of effective, affordable, long-term treatment and management of the disease.

While HIV can infect a variety of cell types, CD4+ T cells and macrophages are the primary cellular targets in vivo. Entry into host cells is an essential step in HIV-1 life cycle that can be targeted by anti-HIV-1 drugs. HIV-1 entry is mediated by the viral spike (Env), which comprises three gp120 and three gp41 subunits (FIG. 2A). The gp120 envelope glycoprotein, which HIV uses for attachment, undergoes receptor-driven conformational changes, first upon engaging the CD4 receptor, then on CCR5 co-receptor binding, to trigger fusion of viral and host cell membranes. Apart from being critical in entry of cell-free virus particles into host cells, interaction of gp120 with CD4 and CCR5 is also implicated in spread of virus through cell-to-cell transfer via the virological synapse (Acharya et al., Expert Opin Ther Targets (19)6: 765-783, 2015).

The widespread use of highly active antiretroviral therapy (HAART) has dramatically improved the clinical course for many individuals infected with HIV (Berrey et al., *J. Infect. Dis.*, 183, (10): 1466, 2001). However, toxicities associated with long term HAART have put a high priority on the design and development of less toxic therapies.

Prior unsuccessful HIV vaccine attempts include utilizing gp120 monomers, non-native gp140 proteins, gp120 core and outer domain (OD) proteins, epitope-specific scaffolds and epitope-based peptides (Sliepen 2016). One well-studied approach for making soluble trimers is BG505 SOSIP.664, which attempts to mimic the natural gp140-trimer conformation by introducing an intermolecular disulfide bond to strengthen the gp120-gp41ECTO interaction (Binley 2000, Binley 2002, Sanders 2002, Klasse 2013, Khayat 2013). BG505 SOSIP.664 adopts a stable trimer conformation based on electron microscopy (EM) (Sanders 2015), and it displays many known bNAb epitopes while binding to non-NAbs weakly (Sanders 2013). However, in rabbit immunization studies, BG505 SOSIP.664 only induced NAbs against autologous Tier-2 virus, while bNAbs against heterologous Tier-2 viruses were not observed (Sanders 2015).

Since the discovery of human immunodeficiency virus (HIV) as the cause for AIDS in 1983 (Gallo, 2003), the development of an effective vaccine has been an ongoing global health priority. A successful vaccine must be able to induce broadly neutralizing antibodies (bNAbs) conferring protective immunity against the vast genetic diversity of circulating HIV-1 isolates, especially neutralization resistant Tier-2 viruses (M. S. Seaman, 2010). Unfortunately, after decades of intensive efforts, a vaccine candidate capable of inducing bNAbs remains elusive, with success yet to be achieved even in animal models let alone humans.

The proteins and recombinant polypeptides comprising HIV viral antigens and immunogens provided herein are useful for effectively and safely treating (e.g., therapeutically, prophylactically) IRV infection. In some aspects, the provided methods allow for a subunit vaccine to be produced safely, with a simple and robust manufacturing process. In some aspects, the provided compositions and methods allow for the IRV viral antigens or immunogens to maintain their native conformation. This may be advantageous for eliciting an immune response to native antigenic sites, e.g., linear or conformational epitopes.

In some embodiments, the HIV viral antigen or immunogen is a gp120 protein peptide, or a fragment or epitope thereof. In some embodiments, the HIV viral antigen or immunogen, e.g., gp120 protein peptide, as described herein, is linked to a C-terminal propeptide of collagen to form the recombinant polypeptide, wherein the C-terminal propeptides of the recombinant polypeptides form inter-polypeptide disulfide bonds. In some embodiments, the C-terminal propeptides of the recombinant polypeptides form inter-polypeptide disulfide bonds resulting in multimerization, e.g., trimerization, of the recombinant polypeptides. In some aspects, multimerization, e.g., trimerization, allows for the gp120 protein peptide to acquire a native gp120 trimeric conformation, for example resembling the organization of the gp120 on the native viral surface. In some embodiments, the native confirmation elicits robust immune responses targeting protective conformational epitopes in the gp120.

In some embodiments, a protein as described herein contains a plurality of recombinant proteins described here. In some embodiments, the protein forms a macrostructure. In some embodiments, the proteins or recombinant polypeptides provided herein are comprised in nanoparticles or virus-like-particles (VLPs). Also provided are nucleic acids, e.g., isolated nucleic acids, encoding the recombinant polypeptides. In some embodiments, the nucleic acids encoding the recombinant polypeptides are contained in vectors, such as viral vectors or pseudovirus vectors. In some embodiments, the nucleic acids encoding the recombinant polypeptides or the vectors containing the nucleic acid vectors are comprised in cells. In some embodiments, cells containing the nucleic acids or vectors may be used to produce the recombinant polypeptides.

In some embodiments, the proteins, recombinant receptors, protein nanoparticles, VLPs, nucleic acids, vectors, viruses, pseudoviruses, or cells are or comprise an immunogenic composition. In some embodiments, the immunogenic composition contains a pharmaceutically acceptable carrier. In some embodiments, the immunogenic composition is used as a vaccine. In some embodiments, the vaccine contains or is administered in combination with one or more adjuvants.

Also provided herein are methods of producing proteins provided herein, methods of treating subjects with proteins and compositions provided herein, and kits.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

The section headings used herein are for organizational purposes only and are not to be construed as limiting the subject matter described.

I. Viral Antigens and Immunogens

The proteins provided herein comprise HIV viral antigens and immunogens. The HIV viral antigens and immunogens contemplated herein are capable of promoting or stimulating a cell-mediated response and/or a humoral response. In some embodiments, the response, e.g., cell-mediated or humoral response, comprises the production of antibodies, e.g., neutralizing antibodies.

Genomic viral RNA must be packaged inside of viral particles so that the virus is transmitted. Some viral RNA capsids are enveloped, or enclosed by lipid membranes of the infected host cell and others have an outer shell of viral protein without a lipid bilayer. Viral proteins are generally classified as structural and non-structural proteins. In general, the non-structural proteins are involved in genomic replication, transcriptional regulation, and packaging. Structural proteins generally perform three major functions that include: (1) Genomic RNA binding (i.e., the nucleocapsid protein for HIV A virus), (2) Maintaining the relationship between packaged RNA and other proteins (i.e. matrix protein) and (3) Building the outermost external viral layer (i.e. surface proteins, such as gp120). Assembly into viral particles ensures the effective transmission of the viral RNA genome to another host within the same species or across species.

TABLE 1

Exemplary RNA viruses

| Negative Strand Polarity | Positive Strand Polarity |
|---|---|
| Rhabdoviridae (e.g., rabies virus etc.) | Togaviridae (e.g., togavirus, rubella virus) |
| Filoviridae (e.g., Ebola virus) | Flaviviridae (e.g., West Nile virus, Dengue Virus, Zika Virus, etc.) |
| Orthomyxoviridae (e.g., influenza A and B viruses) | Coronaviridae (e.g., SARS CoV-1, SARS CoV-2, etc.) |
| Paramyxoviridae (e.g., RSV, mumps virus, measles virus etc.) | Retroviridae (e.g., HIV-1, HIV-2, etc.) |
| Bunyaviridae (e.g., Lassa virus etc.) | Picornaviridae (e.g., enterovirus, coxsackie virus, norovirus etc.) |
| Reoviridae (Double stranded) | |

In some embodiments, the virus is a human immunodeficiency virus (HIV). In some embodiments, the HIV is HIV-1. HIV-1 isolates are often classified on the basis of neutralization 'tier' phenotype. Four tiers are defined in relationship with the at least three confirmations through which the trimeric HIV-1 envelope glycoprotein spike can spontaneously transition. Neutralization tier phenotypes correspond to the frequency by which the trimer exists in an open (tier 1A), closed (tiers 2 and 3), or intermediate (tier 1B) conformation. In some respects, an open confirmation exposes more internal epitopes. In some cases, the closed conformation is stabilized and can be bound by many broadly neutralizing antibodies.

Tier 1A is the most sensitive neutralization phenotype and represents a very minor fraction of circulating strains. Tier 1B is the next most sensitive and represents a larger but still relatively small fraction of circulating strains. Most circulating strains exhibit a moderately sensitive tier 2 phenotype that is considered the most important to target with vaccines; this phenotype comprises the majority of reference strains. Tier 3 is the least sensitive phenotype (Montefiori et al., Curr Opin HIV AIDS (13)2:128-136, 2018).

In some embodiments, the viral antigen or immunogen is an HIV gp120 protein peptide or a fragment or epitope thereof.

The envelope protein of HIV is initially synthesized as a longer precursor gp160 protein of 845-870 amino acids in size. Gp160 can form a homotrimer and undergoes glycosylation within the Golgi apparatus of an infected host cell. In vivo, gp160 is then cleaved by a cellular furin protease into gp120 and gp41. Gp41 contains a transmembrane domain and remains in a trimeric configuration. Gp120 contains most of the cell surface external domains of the envelope glycoprotein complex. Gp120 binds both to the cellular CD4 receptor and to the cellular chemokine receptors (such as CCR5), which facilitates viral entry into host cells. Gp41 and gp120 can interact via non-covalent bonding.

The mature gp120 polypeptide has about 500 amino acids in the primary sequence. Gp120 is a heavily N-glycosylated protein in vivo, giving rise to an molecular weight of 120 kD when visualized via western blot and it's name. The gp120 polypeptide is comprised of five conserved regions (C1-C5) and five regions of high variability (V1-V5). Exemplary sequences of wild type gp160 polypeptides are shown on GENBANK, for example accession numbers AAB05604 and AAD12142, as available on Sep. 6, 2007, which are incorporated herein by reference.

The gp120 core has a unique molecular structure, which comprises two domains: an "inner" domain (which faces gp41) and an "outer" domain (which is mostly exposed on the surface of the oligomeric envelope glycoprotein complex). The two gp120 domains are separated by a "bridging sheet" that is not part of either domain. The gp120 core comprises 25 beta strands, 5 alpgp120 helices, and 10 defined loop segments.

Gp120 polypeptides also include "gp120-derived molecules" which encompasses analogs (non-protein organic molecules), derivatives (chemically functionalized protein molecules obtained starting with the disclosed protein sequences) or mimetics (three-dimensionally similar chemicals) of the native gp120 structure, as well as proteins sequence variants (such as mutants), genetic alleles, fusions proteins of gp120, or combinations thereof. In some embodiments, the gp120 is a peptide fragment, epitope, or a derivative thereof.

The third variable region referred to herein as the V3 loop is a loop of about 35 amino acids critical for the binding of the co-receptor and determination of which of the co-receptors will bind. In some embodiments, the V3 loop comprises residues 296-331.

Gp120 is the most common target for neutralizing antibodies against HIV-1 due to its exposed nature on the trimeric complex, while gp41 antigenic epitopes are typically unexposed, are located near the viral membrane, or are only transiently exposed during the fusion process of the HIV-1 virus and CD4+T lymphocyte membranes (Burton 2004). Interestingly, gp120 commonly elicits non-neutralizing antibodies during the course of natural infection. Such non-neutralizing antibodies may be directed against gp120 regions that are occluded on the assembled trimer but are subsequently exposed upon gp120 shedding from gp41 into soluble gp120 monomers (Moore 1996, Wyatt 1997). In contrast, neutralizing antibodies typically bind to the mature trimeric complex with higher affinity than to gp120 monomers, and such binding can be trimer-specific (Sattentau 1995, Burton 2004, de Taeye 2016).

The amino acids residues in gp120 can be numbered using the HXB2 numbering scheme as set forth in *Numbering Positions in HIV Relative to HXB2CG* Bette Korber et al., Human Retroviruses and AIDS 1998: A Compilation and Analysis of Nucleic Acid and Amino Acid Sequences. Korber B, Kuiken C L, Foley B, Hahn B, McCutchan F, Mellors J W, and Sodroski J, Eds. Theoretical Biology and Biophysics Group, Los Alamos National Laboratory, Los Alamos, N. Mex. which is incorporated by reference herein in its entirety.

In some embodiments, gp120 protein peptide comprises an outer domain subunit peptide, an inner domain subunit peptide, or any combination thereof. In some embodiments, the protein comprises three recombinant polypeptides. In some embodiments, the gp120 protein comprises one, two, three, four, or five C regions, and one, two, three, four, or five variable regions, optionally separated by a bridging sheet. In some embodiments, the gp120 protein peptide comprises an outer subunit or an inner subunit of the gp120 protein. In some embodiments, the gp120 protein peptide comprises an inner subunit and an outer subunit of the gp120 protein, optionally wherein the outer subunit and the inner subunit are linked by a disulfide bond or an artificially introduced linker. In some embodiments, the gp120 protein peptide does not comprise a transmembrane (TM) domain peptide and/or a cytoplasm (CP) domain peptide. In some embodiments, the gp120 protein peptide comprises a protease cleavage site, wherein the protease is optionally furin, a transmembrane serine protease such as TMPRSS2, trypsin, factor Xa, or cathepsin L. In some embodiments, the gp120 protein peptide does not comprise a protease cleavage site, wherein the protease is optionally furin, a transmembrane serine protease such as TMPRSS2, trypsin, factor Xa, or cathepsin L. In some embodiments, the gp120 protein peptide is soluble or does not directly bind to a lipid bilayer, e.g., a membrane or viral envelope. In some embodiments, the gp120 protein peptides are the same or different among the recombinant polypeptides of the protein.

In some embodiments, the gp120 protein peptide in each recombinant polypeptide is in a prefusion conformation or a postfusion conformation. In some embodiments, the gp120 protein peptide in each recombinant polypeptide is or includes the sequence set forth in any of SEQ ID NOs: 19-30. In some embodiments, the gp120 protein peptide in each recombinant polypeptide is or includes a sequence of amino acids that exhibits at least or about 85%, at least or about 90%, at least or about 92%, at least or about 95%, at least or about 97% sequence identity to the sequence set forth in any of SEQ ID NOs: 19-30.

In some embodiments, the viral antigen or immunogen comprises an amino acid sequence having at least or about 80%, 81%, 82%, 83%, 84%, 85%, 86%, 87%, 88%, 89%, 90%, 91%, 92%, 93%, 94%, 95%, 96%, 97%, 98%, or 99% sequence identity to any of SEQ ID NOs: 19-30, including a sequence comprising substitution, deletion, and/or insertion at one or more amino acid positions.

Provided herein are polynucleic acids encoding recombinant peptides, such as HIV gp120. In some embodiments, the polynucleic acid encodes one, two, three, or more of the recombinant peptides.

In some embodiments, the viral antigen or immunogen is produced from a nucleic acid sequence that has been codon optimized. In some embodiments, the viral antigen or immunogen is produced from a nucleic acid sequence that has not been codon optimized.

II. Recombinant Polypeptides and Proteins

In some embodiments, compositions and methods of use of recombinant soluble surface antigens from RNA viruses in covalently linked trimeric forms are disclosed. In some embodiments, the resulting fusion proteins are secreted as disulfide bond-linked homo-trimers, which are more stable in structure, while preserving the conformations of native-like trimeric viral antigens, thereby can be used as more effective vaccines against these dangerous pathogens.

It is contemplated that the HIV viral antigens and immunogens provided herein, e.g., gp120 protein peptides (see, Section I-1), can be combined, e.g., linked, to other proteins or peptides to form recombinant polypeptides, including fusion peptides. In some embodiments, individual recombinant polypeptides (e.g., monomers) provided herein associate to form multimers, e.g., trimers, of recombinant polypeptides. In some embodiments, association of the individual recombinant polypeptide monomers occurs via covalent interactions. In some embodiments, association of the individual recombinant polypeptide monomers occurs via non-covalent interactions. In some embodiments, the interaction, e.g., covalent or non-covalent, is effected by the protein or peptide to which the HIV viral antigen or immunogen, e.g., gp120 protein peptide, is linked. In some embodiments, for example when the HIV viral antigen or immunogen is a gp120 protein peptide as described herein, the protein or peptide to which it will be linked can be selected such that the native homotrimeric structure of the glycoprotein is preserved. This can be advantageous for evoking a strong and effective immunogenic response to the gp120 protein peptide. For example, preservation and/or maintenance of the native conformation of the HIV viral antigens or immunogens (e.g., gp120 protein peptide) may improve or allow access to antigenic sites capable to generating an immune response. In some cases, the recombinant polypeptide comprising a gp120 protein peptide described herein, e.g., see Section I-1, is referred to herein alternatively as a recombinant HIV antigen, recombinant HIV immunogen, or a recombinant HIV protein. a recombinant HIV gp120 antigen.

It is further contemplated that in some cases, the recombinant polypeptides or multimerized recombinant polypeptides thereof aggregate or can be aggregated to form a protein comprising a plurality of HIV viral antigen and/or immunogen recombinant polypeptides. Formation of such proteins may be advantageous for generating a strong and effective immunogenic response to the HIV viral antigens and/or immunogens. For instance, formation of a protein comprising a plurality of recombinant polypeptides, and thus a plurality of HIV viral antigens, e.g., gp120 protein peptides, may preserve the tertiary and/or quaternary structures of the viral antigen, allowing an immune response to be mounted against the native structure. In some cases, the aggregation may confer structural stability of the HIV viral antigen or immunogen, which in turn can afford access to potentially antigenic sites capable of promoting an immune response.

1. Fusion Peptides and Recombinant Polypeptides

In some embodiments, the HIV viral antigen or immunogen can be linked at their C-terminus (C-terminal linkage) to a trimerization domain to promote trimerization of the monomers. In some embodiments, the trimerization stabilizes the membrane proximal aspect of the HIV viral antigen or immunogen in a trimeric configuration.

Non-limiting examples of exogenous multimerization domains that promote stable trimers of soluble recombinant proteins include: the GCN4 leucine zipper (Harbury et al. 1993 Science 262:1401-1407), the trimerization motif from the lung surfactant protein (Hoppe et al. 1994 FEBS Lett 344:191-195), collagen (McAlinden et al. 2003 J Biol Chem 278:42200-42207), and the phage T4 fibritin Foldon (Miroshnikov et al. 1998 Protein Eng 11:329-414), any of which can be linked to a recombinant HIV viral antigen or immunogen described herein (e.g., by linkage to the C-terminus of a gp120 domain) to promote trimerization of the recombinant viral antigen or immunogen. See also U.S. Pat. Nos. 7,268,116, 7,666,837, 7,691,815, 10,618,949, 10,906,944, and 10,960,070, and US 2020/0009244, which are incorporated herein by reference in their entireties for all purposes.

In some embodiments, one or more peptide linkers (such as a gly-ser linker, for example, a 10 amino acid glycine-serine peptide linker can be used to link the recombinant viral antigen or immunogen to the transmembrane domain. The trimer can include any of the stabilizing mutations provided herein (or combinations thereof) as long as the recombinant viral antigen or immunogen trimer retains the desired properties (e.g., the prefusion conformation).

To be therapeutically feasible, a desired trimerizing protein moiety for biologic drug designs should satisfy the following criteria. Ideally it should be part of a naturally secreted protein, like immunoglobulin Fc, that is also abundant (non-toxic) in the circulation, human in origin (lack of immunogenicity), relatively stable (long half-life) and capable of efficient self-trimerization which is strengthened by inter-chain covalent disulfide bonds so the trimerized HIV viral antigens or immunogens are structurally stable.

Collagen is a family of fibrous proteins that are the major components of the extracellular matrix. It is the most abundant protein in mammals, constituting nearly 25% of the total protein in the body. Collagen plays a major structural role in the formation of bone, tendon, skin, cornea, cartilage, blood vessels, and teeth. The fibrillar types of collagen I, II, III, IV, V, and XI are all synthesized as larger trimeric precursors, called procollagens, in which the central uninterrupted triple-helical domain consisting of hundreds of "G-X-Y" repeats (or glycine repeats) is flanked by non-collagenous domains (NC), the N-propeptide and the C-propeptide. Both the C- and N-terminal extensions are processed proteolytically upon secretion of the procollagen, an event that triggers the assembly of the mature protein into collagen fibrils which forms an insoluble cell matrix. BMP-1 is a protease that recognizes a specific peptide sequence of procollagen near the junction between the glycine repeats and the C-prodomain of collagens and is responsible for the removal of the propeptide. The shed trimeric C-propeptide of type I collagen is found in human sera of normal adults at a concentration in the range of 50-300 ng/mL, with children having a much higher level which is indicative of active bone formation. In people with familial high serum concentration of C-propeptide of type I collagen, the level could reach as high as 1-6 μg/mL with no apparent abnormality, suggesting the C-propeptide is not toxic. Structural study of the trimeric C-propeptide of collagen suggested that it is a tri-lobed structure with all three subunits coming together in a junction region near their N-termini to connect to the rest of the procollagen molecule. Such geometry in projecting proteins to be fused in one direction is similar to that of Fc dimer.

Type I, IV, V and XI collagens are mainly assembled into heterotrimeric forms consisting of either two α-1 chains and one α-2 chain (for Type I, IV, V), or three different a chains (for Type XI), which are highly homologous in sequence. The type II and III collagens are both homotrimers of α-1 chain. For type I collagen, the most abundant form of collagen, stable α(I) homotrimer is also formed and is present at variable levels in different tissues. Most of these collagen C-propeptide chains can self-assemble into homotrimers, when over-expressed alone in a cell. Although the N-propeptide domains are synthesized first, molecular assembly into trimeric collagen begins with the in-register association of the C-propeptides. It is believed the C-propeptide complex is stabilized by the formation of interchain disulfide bonds, but the necessity of disulfide bond formation for proper chain registration is not clear. The triple helix of the glycine repeats and is then propagated from the associated C-termini to the N-termini in a zipper-like manner. This knowledge has led to the creation of non-natural types of collagen matrix by swapping the C-propeptides of different collagen chains using recombinant DNA technology. Non-collagenous proteins, such as cytokines and growth factors, also have been fused to the N-termini of either procollagens or mature collagens to allow new collagen matrix formation, which is intended to allow slow release of the noncollagenous proteins from the cell matrix. However, under both circumstances, the C-propeptides are required to be cleaved before recombinant collagen fibril assembly into an insoluble cell matrix.

Although other protein trimerization domains, such as those from GCN4 from yeast fibritin from bacteria phage T4 and aspartate transcarbamoylase of *Escherichia coli*, have been described previously to allow trimerization of heterologous proteins, none of these trimerizing proteins are human in nature, nor are they naturally secreted proteins. As such, any trimeric fusion proteins would have to be made intracellularly, which not only may fold incorrectly for naturally secreted proteins such as soluble receptors, but also make purification of such fusion proteins from thousands of other intracellular proteins difficult. Moreover, the fatal drawback of using such non-human protein trimerization domains (e.g. from yeast, bacteria phage and bacteria) for trimeric biologic drug design is their presumed immunogenicity in the human body, rendering such fusion proteins ineffective shortly after injecting them into the human body.

The use of collagen in a recombinant polypeptide as described herein thus has many advantages, including: (1) collagen is the most abundant protein secreted in the body of a mammal, constituting nearly 25% of the total proteins in the body; (2) the major forms of collagen naturally occur as trimeric helices, with their globular C-propeptides being responsible for the initiating of trimerization; (3) the trimeric C-propeptide of collagen proteolytically released from the mature collagen is found naturally at sub microgram/mL level in the blood of mammals and is not known to be toxic to the body; (4) the linear triple helical region of collagen can be included as a linker with predicted 2.9 Å spacing per residue, or excluded as part of the fusion protein so the distance between a protein to be trimerized and the C-propeptide of collagen can be precisely adjusted to achieve an optimal biological activity; (5) the recognition site of BMP1 which cleaves the C-propeptide off the pro-collagen can be mutated or deleted to prevent the disruption of a trimeric fusion protein; (6) the C-propeptide domain self-trimerizes via disulfide bonds and it provides a universal affinity tag, which can be used for purification of any secreted fusion proteins created. In some embodiments, the C-propeptide of collagen to which the HIV viral antigen and immunogen, e.g., gp120 protein peptide, enables the recombinant production of soluble, covalently-linked homotrimeric fusion proteins.

In some embodiments, the HIV viral antigen or immunogen is linked to a C-terminal propeptide of collagen to form a recombinant polypeptide. In some embodiments, the C-terminal propeptides of the recombinant polypeptides form inter-polypeptide disulfide bonds. In some embodiments, the recombinant proteins form trimers. In some embodiments, the HIV viral antigen or immunogen is a gp120 protein peptide as described in Section I-1.

In some embodiments, the C-terminal propeptide is of human collagen. In some embodiments, the C-terminal propeptide comprises a C-terminal polypeptide of proα1(1), proα1(II), proα1(III), proα1(V), proα1(XI), proα2(I), proα2(V), proα2(XI), or proα3(XI), or a fragment thereof. In some embodiments, the C-terminal propeptide is or comprises a C-terminal polypeptide of proα1(I).

In some embodiments, the C-terminal propeptide is or comprises the amino acid sequence set forth by any of SEQ ID NOs: 31-46. In some embodiments, the C-terminal propeptide is an amino acid sequence having at least or about 85%, 90%, 92%, 95%, or 97% sequence identity to sequence of any of SEQ ID NOs: 31-46.

In some embodiments, the C-terminal propeptide is or comprises the amino acid sequence of a collagen trimerization domain (e.g., C-propeptide of human α1(I) collagen) with an aspartic acid (D) to asparagine (N) substitution in the BMP-1 site, for instance where RA<u>D</u> is mutated to RA<u>N</u>. In some embodiments, the C-terminal propeptide is or comprises the amino acid sequence of a collagen trimerization domain (e.g., C-propeptide of human α1(I) collagen) with an alanine (A) to asparagine (N) substitution in the BMP-1 site, for instance where R<u>A</u>D is mutated to R<u>N</u>D. In some embodiments, the C-terminal propeptide herein may comprise a mutated BMP-1 site, e.g., RSAN instead of DDAN. In some embodiments, the C-terminal propeptide herein may comprise a BMP-1 site, e.g., a sequence comprising the RAD (e.g., RADDAN) sequence instead of RAN (e.g., RANDAN) or RND (e.g., RNDDAN) may be used in a fusion polypeptide disclosed herein.

In some embodiments, the C-terminal propeptide can comprise a sequence comprising glycine-X-Y repeats linked to the N-terminus of any of SEQ ID NOs: 31-46, wherein X and Y are independently any amino acid, or an amino acid sequence at least 85%, 90%, 92%, 95%, or 97% identical thereto capable of forming inter-polypeptide disulfide bonds and trimerizing the recombinant polypeptides. In some embodiments, X and Y are independently proline or hydroxyproline.

In some cases where a gp120 peptide protein (e.g., HIV viral antigen or immunogen, e.g., see, Section I-1) is linked to the C-terminal propeptide to form the recombinant polypeptide, the recombinant polypeptides form a trimer resulting in a homotrimer of gp120 protein peptides. In some embodiments, the gp120 protein peptides of the trimerized recombinant polypeptides are in a prefusion conformation. In some embodiments, the gp120 protein peptides of the trimerized recombinant polypeptides are in a postfusion conformation. In some embodiments, the confirmation state allows for access to different antigenic sites on the gp120 protein peptides. In some embodiments, the antigenic sites are epitopes, such as linear epitopes or conformational epitopes. An advantage of having a trimerized recombinant polypeptides as described is that an immune response can be mounted against a variety of potential and diverse antigenic sites.

In some embodiments, trimerized recombinant polypeptides include individual recombinant polypeptides comprising the same viral antigen or immunogen. In some embodiments, trimerized recombinant polypeptides include individual recombinant polypeptides each comprising a different viral antigen or immunogen from the other recombinant polypeptides. In some embodiments, trimerized recombinant polypeptides include individual recombinant polypeptides wherein one of the individual recombinant polypeptides comprises a viral antigen or immunogen different from the other recombinant polypeptides. In some embodiments, trimerized recombinant polypeptides include individual recombinant polypeptides wherein two of the individual recombinant polypeptides comprise the same viral antigen or immunogen, and the viral antigen or immunogen is different from the viral antigen or immunogen comprised in the remaining recombinant polypeptide.

In some embodiments, the recombinant polypeptide comprises any HIV viral antigen or immunogen described in Section I-1. In some embodiments, the recombinant polypeptide comprises any HIV viral antigen or immunogen described in Section I-1 linked, as described herein, to the C-terminal propeptide of collagen as described herein.

In some embodiments, the recombinant polypeptide is or comprises the amino acid sequence set forth by any of SEQ ID NOs: 1-18. In some embodiments, the recombinant polypeptide is an amino acid sequence having at least or about 80%, 85%, 9/o, 92%, 95%, or 97% sequence identity to sequence of any of SEQ ID NOs: 1-18.

As indicated above, in some embodiments, the recombinant polypeptides provided herein associate not only to form trimers, but can also aggregate or be aggregated to generate proteins comprising a plurality of recombinant polypeptides. In some embodiments, the proteins formed have macrostructures. In some cases, the macrostructure may confer structural stability of the HIV viral antigen or immunogen recombinant polypeptides, which in turn can afford access to potentially antigenic sites capable of promoting an immune response.

In some embodiments, the proteins described herein comprising a plurality of recombinant polypeptides are an immunogen. In some embodiments, the proteins described herein comprising a plurality of recombinant polypeptides are comprised in a nanoparticle. For example, in some embodiments, the proteins are linked directly to a nanoparticle, e.g., protein nanoparticle. In some embodiments, the proteins are linked indirectly to a nanoparticle. In some embodiments, the proteins described herein comprising a plurality of recombinant polypeptides are comprised in virus-like particle (VLP).

2. Polynucleotides and Vectors

Also provided are polynucleotides (nucleic acid molecules) encoding the HIV antigens or immunogens and recombinant polypeptides provided herein, and vectors for genetically engineering cells to express such HIV antigens or immunogens and recombinant polypeptides.

In some embodiments, provided are polynucleotides that encode recombinant polypeptides provided herein. In some aspects, the polynucleotide contains a single nucleic acid sequence, such as a nucleic acid sequence encoding a recombinant polypeptide. In other instances, the polynucleotide contains a first nucleic acid sequence encoding a recombinant polypeptide a particular HIV viral antigen or immunogen and a second nucleic acid sequence encoding a recombinant polypeptide comprising a different HIV viral antigen or immunogen.

In some embodiments, the polynucleotide encoding the recombinant polypeptide contains at least one promoter that is operatively linked to control expression of the recombinant polypeptide. In some embodiments, the polynucleotide contains two, three, or more promoters operatively linked to control expression of the recombinant polypeptide.

In some embodiments, for example when the polynucleotide contains two or more nucleic acid coding sequences, such as a sequences encoding recombinant polypeptides comprising different HIV viral antigens or immunogens, at least one promoter is operatively linked to control expression of the two or more nucleic acid sequences. In some embodiments, the polynucleotide contains two, three, or more promoters operatively linked to control expression of the recombinant polypeptides.

In some embodiments, expression of the recombinant polypeptide(s) is inducible or conditional. Thus, in some aspects, the polynucleotide encoding the recombinant polypeptide(s) contains a conditional promoter, enhancer, or transactivator. In some such aspects, the conditional promoter, enhancer, or transactivator is an inducible promoter, enhancer, or transactivator or a repressible promoter, enhancer, or transactivator. For example, in some embodiments, an inducible or conditional promoter can be used to restrict expression of the recombinant polypeptides to a specific microenvironment. In some embodiments, expression driven by the inducible or conditional promoter is regulated by exposure to an exogenous agent, such as heat, radiation, or drug.

In cases where the polynucleotide contains more than one nucleic acid sequence encoding a recombinant polypeptide, the polynucleotide may further include a nucleic acid sequence encoding a peptide between the one or more nucleic acid sequences. In some cases, the nucleic acid positioned between the nucleic acid sequences encodes a peptide that separates the translation products of the nucleic acid sequences during or after translation. In some embodiments, the peptide contains an internal ribosome entry site (IRES), a self-cleaving peptide, or a peptide that causes ribosome skipping, such as a T2A peptide.

In some embodiments, the polynucleotide encoding the recombinant polypeptide(s) is introduced into a composition containing cultured cells (e.g., host cells), such as by retroviral transduction, transfection, or transformation. In some embodiments, this can allow for expression (e.g., production) of the recombinant polypeptides. In some embodiments, the expressed recombinant polypeptides are purified.

In some embodiments, the polynucleotide (nucleic acid molecule) provided herein encodes an HIV viral antigen or immunogen as described herein. In some embodiments, the polynucleotide (nucleic acid molecule) provided herein encodes a recombinant polypeptide comprising HIV viral antigen or immunogen, e.g., HIV gp120 protein peptide, as described herein.

Also provided are vectors or constructs containing nucleic acid molecules as described herein. In some embodiments, the vectors or constructs contain one or more promoters operatively linked to the nucleic acid molecule encoding the recombinant polypeptide to drive expression thereof. In some embodiments, the promoter is operatively linked to one or more than one nucleic acid molecule, e.g., nucleic acid molecule encoding recombinant polypeptides containing different HIV viral antigens or immunogens.

In some embodiments, the vector is a viral vector. In some embodiments the viral vector is a retroviral vector. In some embodiments, the retroviral vector is a lentiviral vector. In some embodiments, the retroviral vector is a gammaretroviral vector.

In some embodiments, the vector or construct includes a single promoter that drives the expression of one or more nucleic acid molecules of the polynucleotide. In some embodiments, such promoters can be multicistronic (bicistronic or tricistronic, see e.g., U.S. Pat. No. 6,060,273). For example, in some embodiments, transcription units can be engineered as a bicistronic unit containing an IRES (internal ribosome entry site), which allows coexpression of gene products (e.g., encoding different recombinant polypeptides) by a message from a single promoter. In some embodiments, the vectors provided herein are bicistronic, allowing the vector to contain and express two nucleic acid sequences. In some embodiments, the vectors provided herein are tricistronic, allowing the vector to contain and express three nucleic acid sequences.

In some embodiments, a single promoter directs expression of an RNA that contains, in a single open reading frame (ORF), two or three genes (e.g. encoding the chimeric signaling receptor and encoding a recombinant receptor) separated from one another by sequences encoding a self-cleavage peptide (e.g., 2A sequences) or a protease recognition site (e.g., furin). The ORF thus encodes a single polypeptide, which, either during (in the case of 2A) or after translation, is processed into the individual proteins. In some cases, the peptide, such as T2A, can cause the ribosome to skip (ribosome skipping) synthesis of a peptide bond at the C-terminus of a 2A element, leading to separation between the end of the 2A sequence and the next peptide downstream (see, for example, de Felipe. *Genetic Vaccines and Ther.* 2:13 (2004) and deFelipe et al. *Traffic* 5:616-626 (2004)). Many 2A elements are known in the art. Examples of 2A sequences that can be used in the methods and nucleic acids disclosed herein include, without limitation, 2A sequences from the foot-and-mouth disease virus (F2A), equine rhinitis A virus (E2A), *Thosea asigna* virus (T2A), and porcine teschovirus-1 (P2A) as described in U.S. Patent Publication No. 20070116690.

In some embodiments, the vector is comprised in a virus. In some embodiments, the virus is a pseudovirus. In some embodiments, the virus is a viral-like particle. In some embodiments, the vector is comprised in a cell. In some embodiments, the virus or cell in which the vector is comprised contains a recombinant genome.

III. Immunogenic Compositions and Formulations

In some embodiments, provided herein is an immunogenic composition comprising a trimer of a recombinant polypeptide comprising a sequence selected from the group consisting of SEQ ID NOs: 1-18 or a fragment, variant, or mutant thereof, or a combination of any two or more of the trimers. In some embodiments, a unit dose of the immunogenic composition may comprise from about 10 µg to about 100 µg of the HIV antigen, preferably from about 25 µg to about 75 µg of the HIV antigen, preferably from about 40 µg to about 60 µg of the HIV antigen, or about 50 µg of the HIV antigen. In some embodiments, the dose contains 3 µg of the HIV antigen. In other embodiments, the dose contains 9 µg of the HIV antigen. In further embodiments, the dose contains 30 µg of the HIV antigen.

Immunogenic compositions comprising a disclosed immunogen (e.g., a disclosed recombinant HIV gp120 trimer or nucleic acid molecule encoding a protomer of disclosed recombinant HIV gp120 trimer) and a pharmaceutically acceptable carrier are also provided. In some embodiments, the immunogenic composition comprises trimerized recombinant polypeptides provided herein, and optionally a pharmaceutically acceptable carrier. In some embodiments, the immunogenic composition comprises a protein comprising a plurality of trimerized recombinant polypeptides provided herein, and optionally a pharmaceutically acceptable carrier. In some embodiments, the immunogenic composition a protein nanoparticle provided herein, and optionally a pharmaceutically acceptable carrier. In some embodiments, the immunogenic composition comprises a VLP as provided herein, and optionally a pharmaceutically acceptable carrier. In some embodiments, the immunogenic composition comprises an isolated nucleic acid provided herein, and optionally a pharmaceutically acceptable carrier. In some embodiments, the immunogenic composition comprises a vector as provided herein, and optionally a pharmaceutically acceptable carrier. In some embodiments, the immunogenic composition comprises a virus as provided herein, and optionally a pharmaceutically acceptable carrier. In some embodiments, the immunogenic composition comprises a pseudovirus provided herein, and optionally a pharmaceutically acceptable carrier. In some embodiments, the immunogenic composition comprises a cell as provided herein, and optionally a pharmaceutically acceptable carrier. In some embodiments, the immunogenic composition, such as described herein, is a vaccine. In some embodiments, the vaccine is a prophylactic vaccine. In some embodiments, the vaccine is a therapeutic vaccine. In some embodiments, the vaccine is a prophylactic vaccine and a therapeutic vaccine. Such pharmaceutical compositions can be administered to subjects by a variety of administration modes known to the person of ordinary skill in the art, for example, intramuscular, intradermal, subcutaneous, intravenous, intra-arterial, intra-articular, intraperitoneal, intranasal, sublingual, tonsillar, oropharyngeal, or other parenteral and mucosal routes. In several embodiments, pharmaceutical compositions including one or more of the disclosed immunogens are immunogenic compositions. Actual methods for preparing administrable compositions will be known or apparent to those skilled in the art and are described in more detail in such publications as Remingtons Pharmaceutical Sciences, 19th Ed., Mack Publishing Company, Easton, Pa., 1995.

Thus, an immunogen, e.g., recombinant HIV gp120 antigen, e.g., trimer, protein described herein can be formulated with pharmaceutically acceptable carriers to help retain biological activity while also promoting increased stability during storage within an acceptable temperature range. Potential carriers include, but are not limited to, physiologically balanced culture medium, phosphate buffer saline solution, water, emulsions (e.g., oil/water or water/oil emulsions), various types of wetting agents, cryoprotective additives or stabilizers such as proteins, peptides or hydrolysates (e.g., albumin, gelatin), sugars (e.g., sucrose, lactose, sorbitol), amino acids (e.g., sodium glutamate), or other protective agents. The resulting aqueous solutions may be packaged for use as is or lyophilized. Lyophilized preparations are combined with a sterile solution prior to administration for either single or multiple dosing.

Formulated compositions, especially liquid formulations, may contain a bacteriostat to prevent or minimize degradation during storage, including but not limited to effective concentrations (usually 1% w/v) of benzyl alcohol, phenol, m-cresol, chlorobutanol, methylparaben, and/or propylparaben. A bacteriostat may be contraindicated for some patients; therefore, a lyophilized formulation may be reconstituted in a solution either containing or not containing such a component.

The immunogenic compositions of the disclosure can contain as pharmaceutically acceptable vehicles substances as required to approximate physiological conditions, such as pH adjusting and buffering agents, tonicity adjusting agents, wetting agents and the like, for example, sodium acetate, sodium lactate, sodium chloride, potassium chloride, calcium chloride, sorbitan monolaurate, and triethanolamine oleate. The immunogenic composition may optionally include an adjuvant to enhance an immune response of the host. Suitable adjuvants are, for example, toll-like receptor agonists, alum, AlPO4, alhydrogel, Lipid-A and derivatives or variants thereof, oil-emulsions, saponins, neutral liposomes, liposomes containing the vaccine and cytokines, non-ionic block copolymers, and chemokines. Non-ionic block polymers containing polyoxyethylene (POE) and polyoxypropylene (POP), such as POE-POP-POE block copolymers, MPL™ (3-O-deacylated monophosphoryl lipid A; Corixa, Hamilton, Ind.) and IL-12 (Genetics Institute, Cambridge, Mass.), among many other suitable adjuvants well known in the art, may be used as an adjuvant (Newman et al., 1998, *Critical Reviews in Therapeutic Drug Carrier Systems* 15:89-142). These adjuvants have the advantage in that they help to stimulate the immune system in a non-specific way, thus enhancing the immune response to a pharmaceutical product. In some embodiments, the immunogenic compositions of the disclosure may include or be administered with more than one adjuvant. In some embodiments, the immunogenic compositions of the disclosure may include or be administered with two adjuvants. In some embodiments, the immunogenic compositions of the disclosure may include or be administered with a plurality of adjuvants. For example, in some cases, a vaccine, e.g., comprising an immunogenic composition provided herein, may include or be administered in combination with a plurality of adjuvants.

For vaccine compositions, examples of suitable adjuvants include, e.g., aluminum hydroxide, lecithin, Freund's adjuvant, MPL™ and IL-12 In some embodiments, the vaccine compositions or nanoparticle immunogens disclosed herein (e.g., HIV vaccine composition) can be formulated as a controlled-release or time-release formulation. This can be achieved in a composition that contains a slow release polymer or via a microencapsulated delivery system or bioadhesive gel. The various pharmaceutical compositions can be prepared in accordance with standard procedures well known in the art.

In some embodiments, the immunogenic compositions of the disclosure can contain an adjuvant formulation comprising a metabolizable oil (e.g., squalene) and alpha tocopherol in the form of an oil-in-water emulsion, and polyoxyethylene sorbitan monooleate (Tween-80). In some embodiments, the adjuvant formulation can comprise from about 2% to about 10% squalene, from about 2 to about 10% alpha tocopherol (e.g., D-alpha-tocopherol) and from about 0.3 to about 3% polyoxyethylene sorbitan monooleate. In some embodiments, the adjuvant formulation can comprise about 5% squalene, about 5% tocopherol, and about 0.4% polyoxyethylene sorbitan monooleate. In some embodiments, the immunogenic compositions of the disclosure can contain 3 de-O-acylated monophosphoryl lipid A (3D-MPL), and an adjuvant in the form of an oil in water emulsion, which adjuvant contains a metabolizable oil, alpha tocopherol, and polyoxyethylene sorbitan monoleate. In some embodiments, the immunogenic compositions of the disclosure can contain QS21 (extract of *Quillaja saponaria* Molina: fraction 21), 3D-MPL and an oil in water emulsion wherein the oil in water emulsion comprises a metabolizable oil, alpha tocopherol and polyoxyethylene sorbitan monooleate. In some embodiments, the immunogenic compositions of the disclosure can contain QS21, 3D-MPL and an oil in water emulsion wherein the oil in water emulsion has the following composition: a metabolisible oil, such as squalene, alpha tocopherol and Tween-80. In some embodiments, the immunogenic compositions of the disclosure can contain an adjuvant in the form of a liposome composition.

In some embodiments, the immunogenic compositions of the disclosure can contain an adjuvant formulation comprising a metabolizable oil (e.g., squalene), polyoxyethylene sorbitan monooleate (Tween-80), and Span 85. In some embodiments, the adjuvant formulation can comprise about 5% (w/v) squalene, about 0.5% (w/v) polyoxyethylene sorbitan monooleate, and about 0.5% (w/v) Span 85.

In some embodiments, the immunogenic compositions of the disclosure can contain an adjuvant formulation comprising *Quillaja* saponins, cholesterol, and phosphorlipid, e.g., in the form of a nanoparticle composition. In some embodiments, the immunogenic compositions of the disclosure can contain a mixture of separately purified fractions of *Quillaja saponaria* Molina where are subsequently formulated with cholesterol and phospholipid.

In some embodiments, the immunogenic compositions of the disclosure can contain an adjuvant selected from the group consisting of MF59™, Matrix-A™, Matrix-C™, Matrix-M™, AS01, AS02, AS03, and AS04.

In some embodiments, the immunogenic compositions of the disclosure can contain a toll-like receptor 9 (TLR9) agonist, wherein the TLR9 agonist is an oligonucleotide of from 8 to 35 nucleotides in length comprising an unmethylated cytidine-phospho-guanosine (also referred to as CpG or cytosine-phosphate-guanosine) motif, and the HIV antigen (e.g., gp120 proteins) and the oligonucleotide are present in the immunogenic composition in amounts effective to stimulate an immune response against the HIV antigen in a mammalian subject, such as a human subject in need thereof. TLR9 (CD289) recognizes unmethylated cytidine-phospho-guanosine (CpG) motifs found in microbial DNA, which can be mimicked using synthetic CpG-containing oligodeoxynucleotides (CpG-ODNs). CpG-ODNs are known to enhance antibody production and to stimulate T helper 1 (Th1) cell responses (Coffman et al., Immunity, 33:492-503, 2010). Optimal oligonucleotide TLR9 agonists often contain a palindromic sequence following the general formula of: 5'-purine-purine-CG-pyrimidine-pyrimidine-3', or 5'-purine-purine-CG-pyrimidine-pyrimidine-CG-3'. U.S. Pat. No. 6,589,940, which is incorporated herein by reference in its entirety. In some embodiments, the CpG oligonucleotide is linear. In other embodiments, the CpG oligonucleotide is circular or includes hairpin loop(s). The CpG oligonucleotide may be single stranded or double stranded. In some embodiments, the CpG oligonucleotide may contain modifications. Modifications include but are not limited to, modifications of the 3'OH or 5'OH group, modifications of the nucleotide base, modifications of the sugar component, and modifications of the phosphate group. Modified bases may be included in the palindromic sequence of the CpG oligonucleotide as long as the modified base(s) maintains the same specificity for its natural complement through Watson-Crick base pairing (e.g., the palindromic portion is still self-complementary). In some embodiments, the CpG oligonucleotide comprises a non-canonical base. In some embodiments, the CpG oligonucleotide comprises a modified nucleoside. In some embodiments, the modified nucleoside is selected from the group consisting of 2'-deoxy-7-deazaguanosine, 2'-deoxy-6-thioguanosine, arabinoguanosine, 2'-deoxy-2'substituted-arabinoguanosine, and 2'-O-substituted-arabinoguanosine. The CpG oligonucleotide may contain a modification of the phosphate group. For example, in addition to phosphodiester linkages, phosphate modifications include, but are not limited to, methyl phosphonate, phosphorothioate, phosphoramidate (bridging or non-bridging), phosphotriester and phosphorodithioate and may be used in any combination. Other non-phosphate linkages may also be used. In some embodiments, the oligonucleotides comprise only phosphorothioate backbones. In some embodiments, the oligonucleotides comprise only phosphodiester backbones. In some embodiments, the oligonucleotide comprises a combination of phosphate linkages in the phosphate backbone such as a combination of phosphodiester and phosphorothioate linkages. Oligonucleotides with phosphorothioate backbones can be more immunogenic than those with phosphodiester backbones and appear to be more resistant to degradation after injection into the host (Braun et al., J Immunol, 141:2084-2089, 1988; and Latimer et al., Mol Immunol, 32:1057-1064, 1995). The CpG oligonucleotides of the present disclosure include at least one, two or three internucleotide phosphorothioate ester linkages. In some embodiments, when a plurality of CpG oligonucleotide molecules are present in a pharmaceutical composition comprising at least one excipient, both stereoisomers of the phosphorothioate ester linkage are present in the plurality of CpG oligonucleotide molecules. In some embodiments, all of the internucleotide linkages of the CpG oligonucleotide are phosphorothioate linkages, or said another way, the CpG oligonucleotide has a phosphorothioate backbone.

Any suitable CpG oligodeoxynucleotides (ODNs) or combinations thereof can be used as adjuvants in the present disclosure. For instance, K-type ODNs (also referred to as B type) encode multiple CpG motifs on a phosphorothioate backbone. K-type ODNs may be based on the following sequence TCCATGGA<u>CG</u>TTCCTGAG<u>CG</u>TT. The use of phosphorothioate nucleotides enhances resistance to nuclease digestion when compared with native phosphodiester nucleotides, resulting in a substantially longer in vivo half life. K-type ODNs trigger pDCs to differentiate and produce TNF-α, and B cells to proliferate and secrete IgM. D-type ODNs (also referred to as A type) are constructed of a mixed phosphodiester/phosphorothioate backbone, contain a single CpG motif flanked by palindromic sequences and have poly G tails at the 3' and 5' ends (a structural motif that facilitates the formation of concatamers). D-type ODNs may be based on the following sequence GGTGCAT<u>C-G</u>ATGCAGGGGGG. D-type ODNs trigger pDCs to mature and secrete IFN-α, but have no effect on B cells. C-type ODNs resemble K-type in being composed entirely of phosphorothioate nucleotides, but resemble D-type in containing palindromic CpG motifs. C-type ODNs may be based on the following sequence T<u>CG</u>T<u>CG</u>TT<u>CG</u>AA<u>CG</u>A<u>CG</u>TTGAT. This class of ODNs stimulate B cells to secrete IL-6 and pDCs to produce IFN-α. P-type ODNs contain two palindromic sequences, enabling them to form higher ordered structures. P-type ODNs may be based on the following sequence T<u>CG</u>T<u>CG</u>A<u>CG</u>AT<u>CG</u>G<u>CG</u><u>CG</u><u>CG</u>CCG. P-type ODNs activate B cells and pDCs, and induce substantially greater IFN-α production when compared with C-type ODNs. In this paragraph, bold letters in ODN sequences indicate self-complementary palindromes and CpG motifs are underlined.

Exemplary CpG ODNs, e.g., CpG 7909 (5'-TCGTCGTTTTGTCGTTTTGTCGTT-3') and CpG 1018 (5'-TGACTGTGAACGTTCGAGATGA-3'), are known and disclosed in U.S. Pat. Nos. 7,255,868, 7,491,706, 7,479,285, 7,745,598, 7,785,610, 8,003,115, 8,133,874, 8,114,418, 8,222,398, 8,333,980, 8,597,665, 8,669,237, 9,028,845, and 10,052,378; application publication US 2020/0002704; and Bode et al., "CpG DNA as a vaccine adjuvant", *Expert Rev Vaccines* (2011), 10(4): 499-511, all of which are incorporated herein by reference in their entireties for all purposes.

One or more adjuvants may be used in combination and may include, but are not limited to, alum (aluminum salts), oil-in-water emulsions, water-in-oil emulsions, liposomes, and microparticles, such as poly(lactide-co-glycolide) microparticles (Shah et al., Methods Mol Biol, 1494:1-14, 2017). In some embodiments, the immunogenic compositions further comprises an aluminum salt adjuvant to which the HIV antigen is adsorbed. In some embodiments, the aluminum salt adjuvant comprises one or more of the group consisting of amorphous aluminum hydroxyphosphate sulfate, aluminum hydroxide, aluminum phosphate, and potassium aluminum sulfate. In some embodiments, the aluminum salt adjuvant comprises one or both of aluminum hydroxide and aluminum phosphate. In some embodiments, the aluminum salt adjuvant comprises aluminum hydroxide. In some embodiments, a unit dose of the immunogenic composition comprises from about 0.25 to about 0.50 mg $Al^{3+}$, or about 0.35 mg $Al^{3+}$. In some embodiments, the immunogenic composition further comprises an additional adjuvant. Other suitable adjuvants include, but are not limited to, squalene-in-water emulsion (e.g., MF59 or AS03), TLR3 agonists (e.g., poly-IC or poly-ICLC), TLR4 agonists (e.g., bacterial lipopolysaccharide derivatives such monophosphoryl lipid A (MPL), and/or a saponin such as Quil A or QS-21, as in AS01 or AS02), a TLR5 agonist (bacterial flagellin), and TLR7, TLR8 and/or TLR9 agonists (imidazoquinoline derivatives such as imiquimod, and resiquimod) (Coffman et al., *Immunity,* 33:492-503, 2010). In some embodiments, the additional adjuvant comprises MPL and alum (e.g., AS04). For veterinary use and for production of antibodies in non-human animals, mitogenic components of Freund's adjuvant (both complete and incomplete) can be used.

In some embodiments, the immunogenic compositions comprise pharmaceutically acceptable excipients including for instance, solvents, bulking agents, buffering agents, tonicity adjusting agents, and preservatives (Pramanick et al., Pharma Times, 45:65-77, 2013). In some embodiments the immunogenic compositions may comprise an excipient that functions as one or more of a solvent, a bulking agent, a buffering agent, and a tonicity adjusting agent (e.g., sodium chloride in saline may serve as both an aqueous vehicle and a tonicity adjusting agent).

In some embodiments, the immunogenic compositions comprise an aqueous vehicle as a solvent. Suitable vehicles include for instance sterile water, saline solution, phosphate buffered saline, and Ringer's solution. In some embodiments, the composition is isotonic.

The immunogenic compositions may comprise a buffering agent. Buffering agents control pH to inhibit degradation of the active agent during processing, storage and optionally reconstitution. Suitable buffers include for instance salts comprising acetate, citrate, phosphate or sulfate. Other suitable buffers include for instance amino acids such as arginine, glycine, histidine, and lysine. The buffering agent may further comprise hydrochloric acid or sodium hydroxide. In some embodiments, the buffering agent maintains the pH of the composition within a range of 6 to 9. In some embodiments, the pH is greater than (lower limit) 6, 7 or 8. In some embodiments, the pH is less than (upper limit) 9, 8, or 7. That is, the pH is in the range of from about 6 to 9 in which the lower limit is less than the upper limit.

The immunogenic compositions may comprise a tonicity adjusting agent. Suitable tonicity adjusting agents include for instance dextrose, glycerol, sodium chloride, glycerin and mannitol.

The immunogenic compositions may comprise a bulking agent. Bulking agents are particularly useful when the pharmaceutical composition is to be lyophilized before administration. In some embodiments, the bulking agent is a protectant that aids in the stabilization and prevention of degradation of the active agents during freeze or spray drying and/or during storage. Suitable bulking agents are sugars (mono-, di- and polysaccharides) such as sucrose, lactose, trehalose, mannitol, sorbital, glucose and raffinose.

The immunogenic compositions may comprise a preservative. Suitable preservatives include for instance antioxidants and antimicrobial agents. However, in preferred embodiments, the immunogenic composition is prepared under sterile conditions and is in a single use container, and thus does not necessitate inclusion of a preservative.

In some instances it may be desirable to combine a disclosed immunogen, with other pharmaceutical products (e.g., vaccines) which induce protective responses to other agents. For example, a composition including a recombinant paramyxovirus as described herein can be can be administered simultaneously (typically separately) or sequentially with other vaccines recommended by the Advisory Committee on Immunization Practices (ACIP; cdc.gov/vaccines/acip/index.html) for the targeted age group (e.g., infants from approximately one to six months of age), such as an HIV vaccine or a varicella zoster vaccine. As such, a disclosed immunogen including a recombinant HIV gp120 trimer described herein may be administered simultaneously or sequentially with vaccines against, for example, hepatitis B (HepB), diphtheria, tetanus and pertussis (DTaP), pneumococcal bacteria (PCV), Haemophilus HIVe type b (Hib), polio, HIV and rotavirus.

Multivalent or combination vaccines provide protection against multiple pathogens. In some aspects, multivalent vaccines can protect against multiple strains of the same pathogen. In some aspects, multivalent vaccines protect against multiple pathogens, such as the combination vaccine Tdap, which protects against strains of tentus, pertussis, and diphtheria. Multivalent vaccines are highly desirable to minimize the number of immunizations required to confer protection against multiple pathogens or pathogenic strains, to reduce administration costs, and to increase coverage rates. This can be particularly useful, for example, when vaccinating babies or children.

In some embodiments, the vaccine, e.g., comprising an immunogenic composition described herein, is a multivalent vaccine. In some embodiments, the antigenic material for incorporation into the multivalent vaccine compositions of the invention is derived from HIV strains, or a combination thereof. Antigens for incorporation into the multivalent vaccine compositions of the invention may be derived from one strain of HIV or multiple strains, for example, between two and five strains, in order to provide a broader spectrum of protection. In one embodiment, antigens for incorporation into the multivalent vaccine compositions of the invention are derived from multiple strains of HIV. Other useful antigens include live, attenuated and inactivated viruses such as inactivated polio virus (Jiang et al., J. Biol. Stand., (1986) 14:103-9), attenuated strains of Hepatitis A virus (Bradley et al., J. Med. Virol., (1984) 14:373-86), attenuated measles virus (James et al., N. Engl. J. Med., (1995) 332:1262-6), and epitopes of pertussis virus (for example, ACEL-IMUNErM acellular DTP, Wyeth-Lederle Vaccines and Pediatrics).

In some aspects, a universal vaccine is a vaccine which protects against multiple strains of the same virus, such as multiple strains of HIV. Development of an effective universal HIV vaccine would reduce cost and labor with vaccine formulations and allow for more robust pandemic preparedness.

In some aspects, a universal vaccine is one comprised of multiple epitopes derived from distinct viral strains. In some aspects, a universal vaccine is comprised of a single epitope that is conserved across distinct viral strains. For example, a universal vaccine can be based on the relatively conserved domain(s) of an HIV surface protein, such as a conserved region of the gp120 protein.

In some embodiments, the composition can be provided as a sterile composition. The pharmaceutical composition typically contains an effective amount of a disclosed immunogen and can be prepared by conventional techniques. Typically, the amount of immunogen in each dose of the immunogenic composition is selected as an amount which induces an immune response without significant, adverse side effects. In some embodiments, the composition can be provided in unit dosage form for use to induce an immune response in a subject. A unit dosage form contains a suitable single preselected dosage for administration to a subject, or suitable marked or measured multiples of two or more preselected unit dosages, and/or a metering mechanism for administering the unit dose or multiples thereof. In other embodiments, the composition further includes an adjuvant.

IV. Methods of Inducing an Immune Response

In some embodiments, disclosed herein are methods for using viral antigen trimers as a vaccine or as part of a multivalent vaccine to prevent viral infections, without or with adjuvant, or with more than one adjuvant, optionally via either intra-muscular injections or intra-nasal administrations.

In some embodiments, disclosed herein are methods for using viral antigen trimers as a vaccine or as part of a multivalent vaccine to prevent infections, without or with adjuvant, or with more than one adjuvant, optionally via either intra-muscular injections or intra-nasal administrations.

In some embodiments, disclosed herein are methods for using viral antigen trimers as an antigen for diagnosis of viral infections through detection of antibodies, e.g., IgM or IgG, that recognize the viral antigen, such as neutralizing antibodies.

In some embodiments, disclosed herein are methods for using viral antigen trimers as an antigen to generate polyclonal or monoclonal antibodies which can be used for passive immunization, e.g., neutralizing mAb for treating an HIV infection.

In some embodiments, disclosed herein is a viral antigen trimer as a vaccine or as part of a multivalent vaccine, wherein the vaccine comprises a plurality of trimeric subunit vaccines comprising viral antigens of the same protein of a virus or comprising viral antigens of two or more different proteins of one or more viruses or one or more strains of the same virus.

The disclosed immunogens (e.g., recombinant HIV gp120 trimer, a nucleic acid molecule (such as an RNA molecule) or vector encoding a protomer of a disclosed recombinant HIV gp120 trimer, or a protein nanoparticle or virus like particle comprising a disclosed recombinant HIV gp120 trimer) can be administered to a subject to induce an immune response to the corresponding HIV gp120 in the subject. In a particular example, the subject is a human. The immune response can be a protective immune response, for example a response that inhibits subsequent infection with the corresponding HIV gp120. Elicitation of the immune response can also be used to treat or inhibit infection and illnesses associated with the corresponding HIV gp120.

A subject can be selected for treatment that has, or is at risk for developing infection with the HIV corresponding to the gp120 protein in the immunogen, for example because of exposure or the possibility of exposure to HIV. Following administration of a disclosed immunogen, the subject can be monitored for infection or symptoms associated with HIV, or both.

Typical subjects intended for treatment with the therapeutics and methods of the present disclosure include humans, as well as non-human primates and other animals. To identify subjects for prophylaxis or treatment according to the methods of the disclosure, accepted screening methods are employed to determine risk factors associated with a targeted or suspected disease or condition, or to determine the status of an existing disease or condition in a subject.

These screening methods include, for example, conventional work-ups to determine environmental, familial, occupational, and other such risk factors that may be associated with the targeted or suspected disease or condition, as well as diagnostic methods, such as various ELISA and other immunoassay methods to detect and/or characterize HIV infection. These and other routine methods allow the clinician to select patients in need of therapy using the methods and pharmaceutical compositions of the disclosure. In accordance with these methods and principles, a composition can be administered according to the teachings herein, or other conventional methods, as an independent prophylaxis or treatment program, or as a follow-up, adjunct or coordinate treatment regimen to other treatments.

The administration of a disclosed immunogen can be for prophylactic or therapeutic purpose. When provided prophylactically, the disclosed therapeutic agents are provided in advance of any symptom, for example, in advance of infection. The prophylactic administration of the disclosed therapeutic agents serves to prevent or ameliorate any subsequent infection. When provided therapeutically, the disclosed therapeutic agents are provided at or after the onset of a symptom of disease or infection, for example, after development of a symptom of infection with the HIV corresponding to the gp120 protein in the immunogen, or after diagnosis with the HIV infection. The therapeutic agents can thus be provided prior to the anticipated exposure to the HIV so as to attenuate the anticipated severity, duration or extent of an infection and/or associated disease symptoms, after exposure or suspected exposure to the virus, or after the actual initiation of an infection.

The immunogens described herein, and immunogenic compositions thereof, are provided to a subject in an amount effective to induce or enhance an immune response against the HIV virus gp120 protein in the immunogen in the subject, preferably a human. The actual dosage of disclosed immunogen will vary according to factors such as the disease indication and particular status of the subject (for example, the subject's age, size, fitness, extent of symptoms, susceptibility factors, and the like), time and route of administration, other drugs or treatments being administered concurrently, as well as the specific pharmacology of the composition for eliciting the desired activity or biological response in the subject. Dosage regimens can be adjusted to provide an optimum prophylactic or therapeutic response.

An immunogenic composition including one or more of the disclosed immunogens can be used in coordinate (or prime-boost) vaccination protocols or combinatorial formulations. In certain embodiments, novel combinatorial immunogenic compositions and coordinate immunization protocols employ separate immunogens or formulations, each directed toward eliciting an anti-viral immune response, such as an immune response to HIV gp120 proteins. Separate immunogenic compositions that elicit the anti-viral immune response can be combined in a polyvalent immunogenic composition administered to a subject in a single immunization step, or they can be administered separately (in monovalent immunogenic compositions) in a coordinate (or prime-boost) immunization protocol.

There can be several boosts, and each boost can be a different disclosed immunogen. In some examples that the boost may be the same immunogen as another boost, or the prime. The prime and boost can be administered as a single dose or multiple doses, for example two doses, three doses, four doses, five doses, six doses or more can be administered to a subject over days, weeks or months. Multiple boosts can also be given, such one to five (e.g., 1, 2, 3, 4 or 5 boosts), or more. Different dosages can be used in a series of sequential immunizations. For example a relatively large dose in a primary immunization and then a boost with relatively smaller doses.

In some embodiments, the boost can be administered about two, about three to eight, or about four, weeks following the prime, or about several months after the prime. In some embodiments, the boost can be administered about 5, about 6, about 7, about 8, about 10, about 12, about 18, about 24, months after the prime, or more or less time after the prime. Periodic additional boosts can also be used at appropriate time points to enhance the subject's "immune memory." The adequacy of the vaccination parameters chosen, e.g., formulation, dose, regimen and the like, can be determined by taking aliquots of serum from the subject and assaying antibody titers during the course of the immunization program. In addition, the clinical condition of the subject can be monitored for the desired effect, e.g., prevention of infection or improvement in disease state (e.g., reduction in viral load). If such monitoring indicates that vaccination is sub-optimal, the subject can be boosted with an additional dose of immunogenic composition, and the vaccination parameters can be modified in a fashion expected to potentiate the immune response.

In some embodiments, the prime-boost method can include DNA-primer and protein-boost vaccination protocol to a subject. The method can include two or more administrations of the nucleic acid molecule or the protein.

For protein therapeutics, typically, each human dose will comprise 1-1000 µg of protein, such as from about 1 µg to about 100 µg, for example, from about 1 µg to about 50 µg, such as about 1 µg, about 2 µg, about 5 µg, about 10 µg, about 15 µg, about 20 µg, about 25 µg, about 30 µg, about 40 µg, or about 50 µg.

The amount utilized in an immunogenic composition is selected based on the subject population (e.g., infant or elderly). An optimal amount for a particular composition can be ascertained by standard studies involving observation of antibody titers and other responses in subjects. It is understood that a therapeutically effective amount of a disclosed immunogen, such as a disclosed recombinant HIV gp120 trimer, viral vector, or nucleic acid molecule in a immunogenic composition, can include an amount that is ineffective at eliciting an immune response by administration of a single dose, but that is effective upon administration of multiple dosages, for example in a prime-boost administration protocol.

Upon administration of a disclosed immunogen of this disclosure, the immune system of the subject typically responds to the immunogenic composition by producing antibodies specific for the HIV gp120 trimer included in the immunogen. Such a response signifies that an immunologically effective dose was delivered to the subject.

In some embodiments, the antibody response of a subject will be determined in the context of evaluating effective dosages/immunization protocols. In most instances it will be sufficient to assess the antibody titer in serum or plasma obtained from the subject. Decisions as to whether to administer booster inoculations and/or to change the amount of the therapeutic agent administered to the individual can be at least partially based on the antibody titer level. The antibody titer level can be based on, for example, an immunobinding assay which measures the concentration of antibodies in the serum which bind to an antigen including, for example, the recombinant HIV gp120 trimer included in the immunogen.

HIV infection does not need to be completely eliminated or reduced or prevented for the methods to be effective. For example, elicitation of an immune response to HIV with one or more of the disclosed immunogens can reduce or inhibit infection with the HIV by a desired amount, for example, by at least 10%, at least 20%, at least 50%, at least 60%, at least 70%, at least 80%, at least 90%, at least 95%, at least 98%, or even at least 100% (elimination or prevention of detectable infected cells), as compared to infection with HIV in the absence of the immunogen. In additional examples, HIV replication can be reduced or inhibited by the disclosed methods. HIV replication does not need to be completely eliminated for the method to be effective. For example, the immune response elicited using one or more of the disclosed immunogens can reduce replication of the corresponding HIV by a desired amount, for example, by at least 10%, at least 20%, at least 50%, at least 60%, at least 70%, at least 80%, at least 90%, at least 95%, at least 98%, or even at least 100% (elimination or prevention of detectable replication of HIV), as compared to replication of HIV in the absence of the immune response.

In some embodiments, the disclosed immunogen is administered to the subject simultaneously with the administration of the adjuvant. In other embodiments, the disclosed immunogen is administered to the subject after the administration of the adjuvant and within a sufficient amount of time to induce the immune response.

One approach to administration of nucleic acids is direct immunization with plasmid DNA, such as with a mammalian expression plasmid. Immunization by nucleic acid constructs is well known in the art and taught, for example, in U.S. Pat. No. 5,643,578 (which describes methods of immunizing vertebrates by introducing DNA encoding a desired antigen to elicit a cell-mediated or a humoral response), and U.S. Pat. Nos. 5,593,972 and 5,817,637 (which describe operably linking a nucleic acid sequence encoding an antigen to regulatory sequences enabling expression). U.S. Pat. No. 5,880,103 describes several methods of delivery of nucleic acids encoding immunogenic peptides or other antigens to an organism. The methods include liposomal delivery of the nucleic acids (or of the synthetic peptides themselves), and immune-stimulating constructs, or ISCOMS™, negatively charged cage-like structures of 30-40 nm in size formed spontaneously on mixing cholesterol and Quil A™ (saponin). Protective immunity has been generated in a variety of experimental models of infection, including toxoplasmosis and Epstein-Barr virus-induced tumors, using ISCOMS™ as the delivery vehicle for antigens (Mowat and Donachie, *Immunol. Today* 12:383, 1991). Doses of antigen as low as 1 µg encapsulated in ISCOMS™ have been found to produce Class I mediated CTL responses (Takahashi et al., *Nature* 344:873, 1990).

In some embodiments, a plasmid DNA vaccine is used to express a disclosed immunogen in a subject. For example, a nucleic acid molecule encoding a disclosed immunogen can be administered to a subject to induce an immune response to the HIV gp120 protein included in the immunogen. In some embodiments, the nucleic acid molecule can be included on a plasmid vector for DNA immunization, such as the pVRC8400 vector (described in Barouch et al., *J. Virol*, 79, 8828-8834, 2005, which is incorporated by reference herein).

In another approach to using nucleic acids for immunization, a disclosed recombinant HIV gp120 or recombinant HIV gp120 trimer can be expressed by attenuated viral hosts or vectors or bacterial vectors. In another embodiments, a viral-vector based immunization protocol can be used to deliver a nucleic acid encoding a disclosed recombinant HIV gp120 or HIV gp120 trimer directly into cells. A number of viral based systems for gene transfer purposes have been described, such as retroviral and adenoviral systems. Recombinant vaccinia virus, adeno-associated virus (AAV), herpes virus, retrovirus, cytogmeglo virus or other viral vectors can be used to express the peptide or protein, thereby eliciting a CTL response. For example, vaccinia vectors and methods useful in immunization protocols are described in U.S. Pat. No. 4,722,848. BCG (*Bacillus* Calmette Guerin) provides another vector for expression of the peptides (see Stover, *Nature* 351:456-460, 1991).

In one embodiment, a nucleic acid encoding a disclosed recombinant HIV gp120 or HIV gp120 trimer is introduced directly into cells. For example, the nucleic acid can be loaded onto gold microspheres by standard methods and introduced into the skin by a device such as Bio-Rad's HELIOS™ Gene Gun. The nucleic acids can be "naked," consisting of plasmids under control of a strong promoter. Typically, the DNA is injected into muscle, although it can also be injected directly into other sites. Dosages for injection are usually around 0.5 µg/kg to about 50 mg/kg, and typically are about 0.005 mg/kg to about 5 mg/kg (see, e.g., U.S. Pat. No. 5,589,466).

For example, the nucleic acid can be loaded onto gold microspheres by standard methods and introduced into the skin by a device such as Bio-Rad's HELIOS™ Gene Gun. The nucleic acids can be "naked," consisting of plasmids under control of a strong promoter. Typically, the DNA is injected into muscle, although it can also be injected directly into other sites. Dosages for injection are usually around 0.5 µg/kg to about 50 mg/kg, and typically are about 0.005 mg/kg to about 5 mg/kg (see, e.g., U.S. Pat. No. 5,589,466).

In another embodiment, an mRNA-based immunization protocol can be used to deliver a nucleic acid encoding a disclosed recombinant HIV gp120 or HIV gp120 trimer directly into cells. In some embodiments, nucleic acid-based vaccines based on mRNA may provide a potent alternative to the previously mentioned approaches. mRNA vaccines preclude safety concerns about DNA integration into the host genome and can be directly translated in the host cell cytoplasm. Moreover, the simple cell-free, in vitro synthesis of RNA avoids the manufacturing complications associated with viral vectors. Two exemplary forms of RNA-based vaccination that can be used to deliver a nucleic acid encoding a disclosed recombinant HIV gp120 or HIV gp120 trimer include conventional non-amplifying mRNA immunization. Such methods have been used with viruses like HIV and are familiar to those of skill in the art (see, e.g., Petsch et al., "Protective efficacy of in vitro synthesized, specific mRNA vaccines against HIV virus infection," Nature biotechnology, 30(12):1210-6, 2012) and self-amplifying mRNA immunization (see, e.g., Geall et al., "Nonviral delivery of self-amplifying RNA vaccines," PNAS, 109(36): 14604-14609, 2012; Magini et al., "Self-Amplifying mRNA Vaccines Expressing Multiple Conserved Influenza Antigens Confer Protection against Homologous and Heterosubtypic Viral Challenge," PLoS One, 11(8):e0161193, 2016; and Brito et al., "Self-amplifying mRNA vaccines," Adv Genet., 89:179-233, 2015). In some embodiments, the isolated nucleic acid an RNA molecule. In some embodiments, the nucleic acid is an mRNA molecule, such as a nucleoside-modified mRNA, a non-amplifying mRNA, a self-amplifying mRNA, or a trans-amplifying mRNA.

In some embodiments, a nucleic acid encoding a disclosed recombinant HIV gp120 or HIV gp120 trimer is introduced directly into cells. For example, the nucleic acid or protein can be comprised within a virus-like particle (VLP). Virus-like particles (VLPs) are multiprotein structures that mimic the organization and structure of standard natural viruses, but lack the viral genome.

In some embodiments, administration of a therapeutically effective amount of one or more of the disclosed immunogens to a subject induces a neutralizing immune response in the subject. To assess neutralization activity, following immunization of a subject, serum can be collected from the subject at appropriate time points, frozen, and stored for neutralization testing. Methods to assay for neutralization activity are known to the person of ordinary skill in the art and are further described herein, and include, but are not limited to, plaque reduction neutralization (PRNT) assays, microneutralization assays, flow cytometry based assays, single-cycle infection assays.

In some embodiments, administration of a therapeutically effective amount of one or more of the disclosed immunogens to a subject induces a neutralizing immune response in the subject. To assess neutralization activity, following immunization of a subject, serum can be collected from the subject at appropriate time points, frozen, and stored for neutralization testing. Methods to assay for neutralization activity are known to the person of ordinary skill in the art and are further described herein, and include, but are not limited to, plaque reduction neutralization (PRNT) assays, microneutralization assays, flow cytometry based assays, single-cycle infection assays. In some embodiments, the serum neutralization activity can be assayed using a panel of HIV pseudoviruses.

In some embodiments, a neutralizing immune response induced by the disclosed immunogens herein generates a neutralizing antibody against an RNA virus such as HIV. In some embodiments, the neutralizing antibody herein binds to a cellular receptor of an RNA virus such as HIV or component thereof. In some embodiments, the viral receptor is retrovirus receptor or coreceptor, preferably an HIV-1 or HIV-2 receptor or coreceptor. In some embodiments, the neutralizing antibody herein modulates, decreases, antagonizes, mitigates, blocks, inhibits, abrogates and/or interferes with at least one RNA virus such as HIV activity or binding, or with an RNA virus receptor such as HIV receptor activity or binding, in vitro, in situ and/or in vivo, such as HIV release, HIV receptor signaling, membrane HIV cleavage, HIV activity, HIV production and/or synthesis. In some embodiments, the disclosed immunogens herein induce neutralizing antibodies against an RNA virus such as HIV that modulate, decrease, antagonize, mitigate, block, inhibit, abrogate and/or interfere with HIV virus binding to a receptor or coreceptor, such as CD4 and a co-receptor (e.g., CCR5 or CXCR4).

V. Articles of Manufacture or Kits

Also provided are articles of manufacture or kits containing the provided recombinant polypeptide, proteins, and immunogenic compositions provided herein. The articles of manufacture may include a container and a label or package insert on or associated with the container. Suitable containers include, for example, bottles, vials, syringes, test tubes, IV solution bags, etc. The containers may be formed from a variety of materials such as glass or plastic. In some embodiments, the container has a sterile access port. Exemplary containers include an intravenous solution bags, vials, including those with stoppers pierceable by a needle for injection. The article of manufacture or kit may further include a package insert indicating that the compositions can be used to treat a particular condition such as a condition described herein (e.g., HIV infection). Alternatively, or additionally, the article of manufacture or kit may further include another or the same container comprising a pharmaceutically-acceptable buffer. It may further include other materials such as other buffers, diluents, filters, needles, and/or syringes.

The label or package insert may indicate that the composition is used for treating an HIV infection in an individual. The label or a package insert, which is on or associated with the container, may indicate directions for reconstitution and/or use of the formulation. The label or package insert may further indicate that the formulation is useful or intended for subcutaneous, intravenous, or other modes of administration for treating or preventing an HIV infection in an individual.

The container in some embodiments holds a composition which is by itself or combined with another composition effective for treating, preventing and/or diagnosing the condition. The article of manufacture or kit may include (a) a first container with a composition contained therein (i.e., first medicament), wherein the composition includes the immunogenic composition or protein or recombinant polypeptide thereof: and (b) a second container with a composition contained therein (i.e., second medicament), wherein the composition includes a further agent, such as an adjuvant or otherwise therapeutic agent, and which article or kit further comprises instructions on the label or package insert for treating the subject with the second medicament, in an effective amount.

Terminology

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

The terms "polypeptide" and "protein" are used interchangeably to refer to a polymer of amino acid residues, and are not limited to a minimum length. Polypeptides, including the provided receptors and other polypeptides, e.g., linkers or peptides, may include amino acid residues including natural and/or non-natural amino acid residues. The terms also include post-expression modifications of the polypeptide, for example, glycosylation, sialylation, acetylation, and phosphorylation. In some aspects, the polypeptides may contain modifications with respect to a native or natural sequence, as long as the protein maintains the desired activity. These modifications may be deliberate, as through site-directed mutagenesis, or may be accidental, such as through mutations of hosts which produce the proteins or errors due to PCR amplification.

As used herein, a "subject" is a mammal, such as a human or other animal, and typically is human. In some embodiments, the subject, e.g., patient, to whom the agent or agents, cells, cell populations, or compositions are administered, is a mammal, typically a primate, such as a human. In some embodiments, the primate is a monkey or an ape. The subject can be male or female and can be any suitable age, including infant, juvenile, adolescent, adult, and geriatric subjects. In some embodiments, the subject is a non-primate mammal, such as a rodent.

As used herein, "treatment" (and grammatical variations thereof such as "treat" or "treating") refers to complete or partial amelioration or reduction of a disease or condition or disorder, or a symptom, adverse effect or outcome, or phenotype associated therewith. Desirable effects of treatment include, but are not limited to, preventing occurrence or recurrence of disease, alleviation of symptoms, diminishment of any direct or indirect pathological consequences of the disease, preventing metastasis, decreasing the rate of disease progression, amelioration or palliation of the disease state, and remission or improved prognosis. The terms do not imply complete curing of a disease or complete elimination of any symptom or effect(s) on all symptoms or outcomes.

As used herein, "delaying development of a disease" means to defer, hinder, slow, retard, stabilize, suppress and/or postpone development of the disease (such as cancer). This delay can be of varying lengths of time, depending on the history of the disease and/or individual being treated. In some embodiments, sufficient or significant delay can, in effect, encompass prevention, in that the individual does not develop the disease. For example, a late stage cancer, such as development of metastasis, may be delayed.

"Preventing," as used herein, includes providing prophylaxis with respect to the occurrence or recurrence of a disease in a subject that may be predisposed to the disease but has not yet been diagnosed with the disease. In some embodiments, the provided cells and compositions are used to delay development of a disease or to slow the progression of a disease.

As used herein, to "suppress" a function or activity is to reduce the function or activity when compared to otherwise same conditions except for a condition or parameter of interest, or alternatively, as compared to another condition. For example, cells that suppress tumor growth reduce the rate of growth of the tumor compared to the rate of growth of the tumor in the absence of the cells.

An "effective amount" of an agent, e.g., a pharmaceutical formulation, cells, or composition, in the context of administration, refers to an amount effective, at dosages/amounts and for periods of time necessary, to achieve a desired result, such as a therapeutic or prophylactic result.

A "therapeutically effective amount" of an agent, e.g., a pharmaceutical formulation or cells, refers to an amount effective, at dosages and for periods of time necessary, to achieve a desired therapeutic result, such as for treatment of a disease, condition, or disorder, and/or pharmacokinetic or pharmacodynamic effect of the treatment. The therapeutically effective amount may vary according to factors such as the disease state, age, sex, and weight of the subject, and the populations of cells administered. In some embodiments, the provided methods involve administering the cells and/or compositions at effective amounts, e.g., therapeutically effective amounts.

A "prophylactically effective amount" refers to an amount effective, at dosages and for periods of time necessary, to achieve the desired prophylactic result. Typically but not necessarily, since a prophylactic dose is used in subjects prior to or at an earlier stage of disease, the prophylactically effective amount will be less than the therapeutically effective amount. In the context of lower tumor burden, the prophylactically effective amount in some aspects will be higher than the therapeutically effective amount.

The term "about" as used herein refers to the usual error range for the respective value readily known to the skilled person in this technical field. Reference to "about" a value or parameter herein includes (and describes) embodiments that are directed to that value or parameter per se.

As used herein, the singular forms "a," "an," and "the" include plural referents unless the context clearly dictates otherwise. For example, "a" or "an" means "at least one" or "one or more."

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

As used herein, a composition refers to any mixture of two or more products, substances, or compounds, including cells. It may be a solution, a suspension, liquid, powder, a paste, aqueous, non-aqueous or any combination thereof.

The term "vector," as used herein, refers to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors."

"Polyvalency" and "multivalency" are used interchangeably herein and refer to a feature of a nucleic acid or protein composition, e.g., protein or fragment thereof, that encodes or comprises a plurality of different proteins. Each nucleic acid, e.g., plasmid, encodes either a different HIV envelope glycoprotein (Env gp) or Env gp in the form of defective HIV viral particles, or an HIV envelope glycoprotein from different clades, or a combination of these possibilities, allowing for flexibility of this polyvalent nucleic acid, e.g., DNA plasmid, vaccine. As used herein, "envelope glycoproteins" (Env gps) refer not only to isolated Env gps, but also to Env gps in the form of defective viral particles. "3-valent" refers to a composition of three distinct antigens (e.g., an env gene of a clade A isolate, and env gene of a clade β isolate, and an env gene of a clade C isolate). Likewise, "4-valent" and "8-valent" refer to compositions with 4 and 8 unique antigens, respectively.

Exemplary Embodiments

1. A protein comprising a plurality of recombinant polypeptides, each recombinant polypeptide comprising a human immunodeficiency virus gp120 protein peptide or a fragment or epitope thereof linked to a C-terminal propeptide of collagen, wherein the C-terminal propeptides of the recombinant polypeptides form inter-polypeptide disulfide bonds.

2. The protein of embodiment 1, wherein the HIV is an HIV-1, optionally a tier 1B, tier 1A, tier 2, or tier 3 virus.

3. The protein of embodiment 1 or 2, wherein the epitope is a linear epitope or a conformational epitope.

4. The protein of any of embodiments 1-3, wherein the gp120 protein peptide comprises an outer domain subunit peptide, an inner domain subunit peptide, or any combination thereof, and wherein the protein comprises three recombinant polypeptides.

5. The protein of any of embodiments 1-4, wherein the gp120 protein peptide comprises one, two, three, four, or five C regions, and one, two, three, four, or five variable regions, optionally separated by a bridging sheet.

6. The protein of any of embodiments 1-5, wherein the gp120 protein peptide comprises an outer subunit or an inner subunit of the gp120 protein.

7. The protein of any of embodiments 1-6, wherein the gp120 protein peptide comprises an inner subunit and an outer subunit of the gp120 protein, optionally wherein the outer subunit and the inner subunit are linked by a disulfide bond or an artificially introduced linker.

8. The protein of any of embodiments 1-7, wherein the gp120 protein peptide does not comprise a transmembrane (TM) domain peptide and/or a cytoplasm (CP) domain peptide.

9. The protein of any of embodiments 1-8, wherein the gp120 protein peptide comprises a protease cleavage site, wherein the protease is optionally furin, a transmembrane serine protease such as TMPRSS2, trypsin, factor Xa, or cathepsin L.

10. The protein of any of embodiments 1-8, wherein the gp120 protein peptide does not comprise a protease cleavage site, wherein the protease is optionally furin, a transmembrane serine protease such as TMPRSS2, trypsin, factor Xa, or cathepsin L.

11. The protein of any of embodiments 1-10, wherein the gp120 protein peptide is soluble or does not directly bind to a lipid bilayer, e.g., a membrane or viral envelope.

12. The protein of any of embodiments 1-11, wherein the gp120 protein peptides are the same or different among the recombinant polypeptides of the protein.

13. The protein of any of embodiments 1-12, wherein the gp120 protein peptide is directly fused to the C-terminal propeptide, or is linked to the C-terminal propeptide via a linker, such as a linker comprising glycine-X-Y repeats, wherein X and Y and independently any amino acid and optionally proline or hydroxyproline.

14. The protein of any of embodiments 1-13, which is soluble.

15. The protein of any of embodiments 1-14, wherein the protein does not directly bind to a lipid bilayer, e.g., a membrane or viral envelope.

16. The protein of any of embodiments 1-15, wherein the protein is capable of binding to a cell surface attachment factor or receptor of a subject, optionally wherein the subject is a mammal such as a primate, e.g., human.

17. The protein of any of embodiments 1-16, wherein the C-terminal propeptide is of human collagen.

18. The protein of any of embodiments 1-17, wherein the C-terminal propeptide comprises a C-terminal polypeptide of proα1(I), proα1(II), proα1(III), proα1(V), proα1(XI), proα2(I), proα2(V), proα2(XI), or proα3(XI), or a fragment thereof.

19. The protein of any of embodiments 1-18, wherein the C-terminal propeptides are the same or different among the recombinant polypeptides.

20. The protein of any of embodiments 1-19, wherein the C-terminal propeptide comprises any of SEQ ID NOs: 31-46 or an amino acid sequence at least 90% identical thereto capable of forming inter-polypeptide disulfide bonds and trimerizing the recombinant polypeptides.

21. The protein of any of embodiments 1-20, wherein the C-terminal propeptide comprises SEQ ID NO: 31 or an amino acid sequence at least 90% identical thereto capable of forming inter-polypeptide disulfide bonds and trimerizing the recombinant polypeptides.

22. The protein of any of embodiments 1-20, wherein the C-terminal propeptide comprises SEQ ID NO: 32 or an amino acid sequence at least 9/o identical thereto capable of forming inter-polypeptide disulfide bonds and trimerizing the recombinant polypeptides.

23. The protein of any of embodiments 1-20, wherein the C-terminal propeptide comprises SEQ ID NO: 33 or an amino acid sequence at least 90% identical thereto capable of forming inter-polypeptide disulfide bonds and trimerizing the recombinant polypeptides.

24. The protein of any of embodiments 1-20, wherein the C-terminal propeptide comprises SEQ ID NO:34 or an amino acid sequence at least 90% identical thereto capable of forming inter-polypeptide disulfide bonds and trimerizing the recombinant polypeptides.

25. The protein of any of embodiments 1-20, wherein the C-terminal propeptide comprises SEQ ID NO: 35 or an amino acid sequence at least 90% identical thereto capable of forming inter-polypeptide disulfide bonds and trimerizing the recombinant polypeptides.

26. The protein of any of embodiments 1-20, wherein the C-terminal propeptide comprises SEQ ID NO: 36 or an amino acid sequence at least 90% identical thereto capable of forming inter-polypeptide disulfide bonds and trimerizing the recombinant polypeptides.

27. The protein of any of embodiments 1-20, wherein the C-terminal propeptide comprises SEQ ID NO: 37 or an amino acid sequence at least 90% identical thereto capable of forming inter-polypeptide disulfide bonds and trimerizing the recombinant polypeptides.

28. The protein of any of embodiments 1-20, wherein the C-terminal propeptide comprises SEQ ID NO: 38 or an amino acid sequence at least 90% identical thereto capable of forming inter-polypeptide disulfide bonds and trimerizing the recombinant polypeptides.

29. The protein of any of embodiments 1-20, wherein the C-terminal propeptide comprises SEQ ID NO: 39 or an amino acid sequence at least 90% identical thereto capable of forming inter-polypeptide disulfide bonds and trimerizing the recombinant polypeptides.

30. The protein of any of embodiments 1-29, wherein the C-terminal propeptide comprises a sequence comprising glycine-X-Y repeats linked to the N-terminus of any of SEQ ID NOs: 31-46, wherein X and Y and independently any amino acid and optionally proline or hydroxyproline, or an amino acid sequence at least 90% identical thereto capable of forming inter-polypeptide disulfide bonds and trimerizing the recombinant polypeptides.

31. The protein of any of embodiments 1-30, wherein the gp120 protein peptide in each recombinant polypeptide is in a prefusion conformation or a postfusion conformation.

32. The protein of any of embodiments 1-31, wherein the gp120 protein peptide in each recombinant polypeptide comprises SEQ ID NO: 19-30 or an amino acid sequence at least 80% identical thereto.

33. The protein of any of embodiments 1-32, wherein the recombinant polypeptide comprises SEQ ID NO: 1-18 or an amino acid sequence at least 80% identical thereto.

34. An immunogen comprising the protein of any of embodiments 1-33.

35. A protein nanoparticle comprising the protein of any of embodiments 1-33 directly or indirectly linked to a nanoparticle.

36. A virus-like particle (VLP) comprising the protein of any of embodiments 1-33.

37. An isolated nucleic acid encoding one, two, three or more of the recombinant polypeptides of the protein of any of embodiments 1-33.

38. The isolated nucleic acid of embodiment 37, wherein a polypeptide encoding the gp120 protein peptide is fused in-frame to a polypeptide encoding the C-terminal propeptide of collagen.

39. The isolated nucleic acid of embodiment 37 or 38, which is operably linked to a promoter.

40. The isolated nucleic acid of any of embodiments 37-39, which is a DNA molecule.

41. The isolated nucleic acid of any of embodiments 37-39, which is an RNA molecule, optionally an mRNA molecule such as a nucleoside-modified mRNA, a non-amplifying mRNA, a self-amplifying mRNA, or a trans-amplifying mRNA.

42. A vector comprising the isolated nucleic acid of any of embodiments 37-41.

43. The vector of embodiment 42, which is a viral vector.

44. A virus, a pseudovirus, or a cell comprising the vector of embodiment 42 or 43, optionally wherein the virus or cell has a recombinant genome.

45. An immunogenic composition comprising the protein, immunogen, protein nanoparticle, VLP, isolated nucleic acid, vector, virus, pseudovirus, or cell of any one of embodiments 1-44, and a pharmaceutically acceptable carrier.

46. A vaccine comprising the immunogenic composition of embodiment 45 and optionally an adjuvant, wherein the vaccine is optionally a subunit vaccine, and/or optionally wherein the vaccines is a prophylactic and/or therapeutic vaccine.

47. The vaccine of embodiment 46, wherein the vaccine comprises a plurality of different adjuvants.

48. A method of producing a protein, comprising: expressing the isolated nucleic acid or vector of any one of embodiments 37-43 in a host cell to produce the protein of any of embodiments 1-33; and purifying the protein.

49. The protein produced by the method of embodiment 48.

50. A method for generating an immune response to an gp120 protein peptide or fragment or epitope thereof of HIV in a subject, comprising administering to the subject an effective amount of the protein, immunogen, protein nanoparticle, VLP, isolated nucleic acid, vector, virus, pseudovirus, cell, immunogenic composition, or vaccine of any one of embodiments 1-47 and 49 to generate the immune response.

51. The method of embodiment 50, for treating or preventing infection with HIV.

52. The method of embodiment 50 or 51, wherein generating the immune response inhibits or reduces replication of HIV in the subject.

53. The method of any of embodiments 50-52, wherein the immune response comprises a cell-mediated response and/or a humoral response, optionally comprising production of one or more neutralizing antibody, such as a polyclonal antibody or a monoclonal antibody.

54. The method of any of embodiments 50-53, wherein the immune response is against the gp120 protein peptide or fragment or epitope thereof of HIV but not against the C-terminal propeptide.

55. The method of any of embodiments 50-54, wherein the administering does not lead to antibody dependent enhancement (ADE) in the subject due to prior exposure to one or more HIV viruses.

56. The method of any of embodiments 50-55, wherein the administering does not lead to antibody dependent enhancement (ADE) in the subject when subsequently exposed to one or more HIV viruses.

57. The method of any of embodiments 50-56, further comprising a priming step and/or a boosting step.

58. The method of any of embodiments 50-57, wherein the administering step is performed via topical, transdermal, subcutaneous, intradermal, oral, intranasal (e.g., intranasal spray), intratracheal, sublingual, buccal, rectal, vaginal, inhaled, intravenous (e.g., intravenous injection), intraarterial, intramuscular (e.g., intramuscular injection), intracardiac, intraosseous, intraperitoneal, transmucosal, intravitreal, subretinal, intraarticular, peri-articular, local, or epicutaneous administration.

59. The method of any of embodiments 50-58, wherein the effective amount is administered in a single dose or a series of doses separated by one or more interval.

60. The method of any of embodiments 50-59, wherein the effective amount is administered without an adjuvant.

61. The method of any of embodiments 50-59, wherein the effective amount is administered with an adjuvant.

62. A method comprising administering to a subject an effective amount of the protein of any one of embodiments 1-33 to generate in the subject a neutralizing antibody or neutralizing antisera to HIV.

63. The method of embodiment 62, wherein the subject is a mammal, optionally a human or a non-human primate.

64. The method of embodiment 62 or 63, further comprising isolating the neutralizing antibody or neutralizing antisera from the subject.

65. The method of embodiment 64, further comprising administering an effective amount of the isolated neutralizing antibody or neutralizing antisera to a human subject via passive immunization to prevent or treat an infection by HIV.

66. The method of any of embodiments 62-65, wherein the neutralizing antisera comprises polyclonal antibodies to the gp120 protein peptide or fragment or epitope thereof, optionally wherein the neutralizing antibody is free or substantially free of antibodies to the C-terminal propeptide of collagen.

67. The method of any of embodiments 62-65, wherein the neutralizing antibody comprises a monoclonal antibody to the gp120 protein peptide or fragment or epitope thereof, optionally wherein the neutralizing antibody is free or substantially free of antibodies to the C-terminal propeptide of collagen.

68. The protein, immunogen, protein nanoparticle, VLP, isolated nucleic acid, vector, virus, pseudovirus, cell, immunogenic composition, or vaccine of any one of embodiments 1-47 and 49, for use in inducing an immune response to HIV in a subject, and/or in treating or preventing an infection by HIV.

69. Use of the protein, immunogen, protein nanoparticle, VLP, isolated nucleic acid, vector, virus, pseudovirus, cell, immunogenic composition, or vaccine of any one of embodiments 1-47 and 49, for inducing an immune response to HIV in a subject, and/or for treating or preventing an infection by HIV.

70. Use of the protein, immunogen, protein nanoparticle, VLP, isolated nucleic acid, vector, virus, pseudovirus, cell, immunogenic composition, or vaccine of any one of embodiments 1-47 and 49, for the manufacture of a medicament or a prophylactic for inducing an immune response to an HIV in a subject, and/or for treating or preventing an infection by HIV.

71. A method for analyzing a sample, comprising: contacting a sample with the protein of any of embodiments 1-33, and detecting a binding between the protein and an analyte capable of specific binding to the gp120 protein peptide or fragment or epitope thereof of HIV.

72. The method of embodiment 71, wherein the analyte is an antibody, a receptor, or a cell recognizing the gp120 protein peptide or fragment or epitope thereof.

73. The method of embodiment 71 or 72, wherein the binding indicates the presence of the analyte in the sample, and/or an infection by HIV in a subject from which the sample is derived.

74. A kit comprising the protein of any of embodiments 1-33 and a substrate, pad, or vial containing or immobilizing the protein, optionally wherein the kit is an ELISA or lateral flow assay kit.

EXAMPLES

The following examples are included for illustrative purposes only and are not intended to limit the scope of the invention.

Example 1: Characterization of Exemplary Gp120 Fusion Protein Vaccination Efficacy An exemplary gp120 fusion protein was generated, characterized in vitro and evaluated for in vivo efficacy. This exemplary gp120 fusion protein was observed to be highly native-like based on negative-stain electron microscopy. The exemplary gp120 fusion protein was observed to bind CD4 and various broadly neutralizing antibodies (bNAbs) with high affinity and tight binding kinetics. It was also demonstrated the exemplary gp120 fusion protein was able to induce bNAbs against a diverse panel of Tier-2 viruses in a rabbit immunization study.

A. In Vitro Evaluation of Gp120-Trimer Fusion Protein

85US_Ba-L gp120 env gene was synthesized after optimization for Chinese hamster ovary (CHO) expression by Genscript (Nanjing), using gp120 NCBI accession DQ318210.1. The gene fragment encoding the gp120 glycoprotein was cloned into the pTrimer-tag vector through HindIII and BglII sites as shown in FIG. 1A. The construct was verified by DNA sequence analysis and colony PCR.

The construct was stably transfected into the CHO-S dhfr−/− cell line using 1 μg gp120-Trimer plasmid by FuGENE6. After clone selection, the high-expression clone was used to produce the exemplary fusion protein comprising HIV gp120 in Serum Free Medium (SFM). The supernatants in the bioreactor were harvested after 9 days by centrifugation at 4000 g for 20 min at 4° C. Cell debris were removed by 0.2 μm filter before purification. Supernatants were first run over a 5 mL Blue-Sepharose affinity purification column. The eluate was concentrated with 50 mL ultra-filters and immediately buffer exchanged into PBS, further purified by SEC using superdex 200 and elute with PBS, pH 7.4. The flow rate was maintained above at 5 mL/min. The trimeric fractions were isolated, concentrated and stored at −80° C. The protein concentrations were detected using BCA assay (ThermoFisher). Purity of the isolated exemplary fusion protein comprising HIV gp120 is shown in FIGS. 1B and 1C.

Exemplary fusion protein alone and in complex with B12 or CD4 were analyzed by negative-stain electron microcopy as shown in FIG. 2C. Complexes were prepared at a 1:1 ratio with B12 or at a 1:2 ratio with CD4. The samples were diluted to 10 ug/mL and applied for 5 s onto the carbon-coated 400 CU mesh grid that had been glow discharged at 12 mA for 20 s. The grids were negatively stained with 1% (w/v) uranyl formate for 20 s. The sample were collected through FEI Tecnai spirit electron microscopy operating 120 KeV, and images were acquired using an FEI Eagle CCD camera and a nominal defocus range of 900-1500 nm.

The binding kinetics of the exemplary fusion protein comprising HIV gp120 were assessed against several broadly neutralizing antibodies (bNAbs) is shown in FIG. 3. 96-well plates were coated with 5 μg/mL exemplary fusion protein overnight at 4° C. The coated plates were blocked using 1 mg/mL bovine serum albumin (BSA), incubated with serially diluted bNAbs B12, NIH45-46, PG9, 447-52D, 35022, and coated with mouse anti-human IgG linked with horseradish peroxidase (HRP) (Southern Biotech). The plates were washed 4 times by PBST and incubated with 1 h at the room temperature between every step. Finally, plated were added the 3,3',5,5'-tetramethylbenzidine (TMB) and absorbance measured at 450 nM.

Binding kinetics were additional measured at 30° C. by fortebio OCTET QKe Bio-layer interferometry (BLI) system (Pall Life Science Corp), as shown in FIG. 4. The exemplary fusion proteins were biotin labeled with 20 mM EZ-Link NHS-PEG4-biotin (ThermoFisher), then, under the 1000 rpm shaking, attached to the streptavidin (SA) sensors were loaded at the plate coating with 10 μg/mL biotin-gp120-Trimer for 300 s. In the association step, the SA sensors were loaded in 4, 2, 1 μg/mL CD4 dilution in PBS for 300 s. Disassociation was carried out by dipping in PBS for 600 s.

B. In Vivo Evaluation of Gp120-Trimer Fusion Protein

Female New Zealand White rabbits were immunized intramuscularly with either 50 μg of exemplary fusion protein (n=2) or 50 μg of exemplary fusion protein plus alum adjuvant (n=2) on Days 0, 21, 42 and 140. As shown in FIG. 5, it was observed that the exemplary fusion protein was highly immunogenic and induces antibodies in rabbit immunization model. The binding kinetics to bNAb as depicted in FIG. 5 were performed as previously described. The protein A sensors were loaded at the plate for 300 s that coating with 2.5 μg/mL B12, 5 μg/mL other bNAb such as NIH45-46, PG9 and 447-52D. Association was established using immersing the protein A sensors that had loaded the bNAbs in difference concentrations 10, 5, 2.5, 1, 0 μg/mL in PBS of exemplary fusion protein. Disassociation was carried out by dipping in PBS. Every well above was added 200 μL sample.

Immunization with exemplary HIV gp120 fusion protein was observed to induce HIV-1 neutralizing antibodies, including against Tier 1A and 1B (FIG. 6A) as well as Tier 2 viruses (FIG. 6B) in rabbit immunization model. Immunization with exemplary HIV gp120 fusion protein was also seen to induce a high percent of broadly neutralizing antibodies (FIG. 6C). Antibodies induced in rabbits were competitive with various bNAbs in binding to the exemplary HIV gp120 fusion protein.

The present invention is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure.

SEQUENCES

| SEQ ID NO. | SEQUENCE | DESCRIPTION |
|---|---|---|
| 1 | MRVKGIRRNCQHSWRWGTTLTMLLGILMICRAAEQLWVTVYYGVPVWREAKTTLFCASD<br>AKAYDTEVHNVWATHACVPTDPNPQELVLVNVTENFNAWENNMVEQMHEDIISLWDQSL<br>KPCVKLTPLCVTLNCNDLNTTTSNTTGTEGLTMDKGEMKNCSFNITTDISNKKQKQYAL<br>FYKLDVVQMNNNNNSYRLISCNTSVITQACPKVSFEPIPIYYCAPAGFAILKCNDKSFS<br>GKGECKNVSTVQCTHGIRPVVSTQLLLNGSLAEEDVIIRSDNFTDNAKTIIVQLNETVD<br>IHCIRPNNNTRKRITMGPGKVYYTTGQIIGDIRQAHCNLSEAKWNNTLRRVVRKLREKE<br>NKTIVFNQSSGGDPEIVMHTFNCGGEFFYCNSTKLFNSIWDNNKDSTKINEPNDGKNIT<br>LPCRIKQIINMWOGVGKAMYAPPIRGQIRCTSNITGLLLTRDGGKNNGTNGTEVFRPGG<br>GNMKDNWRSELYKYKVVKIEPLGVAPTTAKRRVVQREKRRSNGLPGPIGPPGPRGRTGD<br>AGPVGPPGPPGPPGPPGPPSAGFDFSFLPQPPQEKAHDGGRYYRANDANVVRDRDLEVD<br>TTLKSLSQQIENIRSPEGSRKNPARTCRDLKMCHSDWKSGEYWIDPNQGCNLDAIKVFC<br>NMETGETCVYPTQPSVAQKNWYISKNPKDKRHVWFGESMTDGFQFEYGGQGSDPADVAI<br>QLTFLRLMSTEASQNITYHCKNSVAYMDQQTGNLKKALLLKGSNEIEIRAEGNSRFTYS<br>VTVDGCTSHTGAWGKTVIEYKTTKSSRLPIIDVAPLDVGAPDQEFGFDVGPVCFL | Full Length gp120 recombinant polypeptide (B41 Strain) 822 aa |
| 2 | AEQLWVTVYYGVPVWREAKTTLFCASDAKAYDTEVHNVWATHACVPTDPNPQELVLVNV<br>TENFNAWENNMVEQMHEDIISLWDQSLKPCVKLTPLCVILNCNDLNTTTSNTTGTEGLT<br>MDKGEMKNCSFNITTDISNKKQKQYALFYKLDVVQMNNNNNSYRLISCNTSVITQACPK<br>VSFEPIPIYYCAPAGFAILKCNDKSFSGKGECKNVSTVQCTHGIRPVVSTQLLLNGSLA<br>EEDVIIRSDNFTDNAKTIIVQLNETVDIHCIRPNNNTRKRITMGPGKVYYTTGQIIGDI<br>RQAACNLSEAKWNNTLRRVVRKLREKFNKTIVFNQSSGGDPEIVMHTFNCGGEFFYCNS<br>TKLFNSIWDNNKDSTKTNEPNDGKNITLPCRIKQIINMWQGVGKAMYAPPIRGQIRCTS<br>NITGLLLTRDGGKNNGTNGTEVFRPGGGNMKDNWRSELYKYKVVKIEPLGVAPTTAKRR<br>VVQREKRRSNGLPGPIGPPGPRGRTGDAGPVGPPGPPGPPGPPGPPSAGFDFSFLPQPP<br>QEKAHDGGRYYRANDANVVRDRDLEVDTTLKSLSQQIENIRSPEGSRKNPARTCRDLKM<br>CHSDWKSGEYWIDPNQGCNLDAIKVFCNMETGETCVYPTQPSVAQKNWYISKNPKDKRH<br>VWFGESMTDGFQFEYGGQGSDPADVAIQLTFLRLMSTEASQNITYHCKNSVAYMDQQTG<br>NLKKALLLKGSNEIEIRAEGNSRFTYSVTVDGCTSHTGAWGKTVIEYKTTKSSRLPIID<br>VAPLDVGAPDQEFGFDVGPVCFL | Mature gp120 recombinant polypeptide (B41 Strain) |
| 3 | MRVMGIQRNCQHLFRWGTMILGMIIICSAAENLWVTVYYGVPVWKDAETTLFCASDAKA<br>YETEKHNVWATHACVPTDPNPQEIHLENVTEEFNMWKNNMVEQMHTDIISLWDQSLKPC<br>VKLTPLCVTLQCTNVTNNITDDMRGELKNCSFNMTTELRDKKQKVYSLFYRLDVVQINE<br>NQGNRSNNSNKEYRLINCNTSAITQACPKVSFEPIPIHYCAPAGFAILKCKDKKFNGTG<br>PCPSVSTVQCTHGIKPVVSTQLLLNGSLAEEEVMIRSENITNNAKNILVQFNTPVQINC<br>TRPNNNTRKSIRIGPGQAFYATGDIIGDIRQAHCTVSKATWNETLGKVVKQLRKHFGNN<br>TIIRFANSSGGDLEVTTHSFNCGGEFFYCNTSGLFNSTWISNTSVOGSNSTGSNDSITL<br>PCRIKQIINMWQRIGQAMYAPPIQGVIRCVSNITGLILTRDGGSTNSTTETFRPGGGDM<br>RDNWRSELYKYKVVKIEPLGVAPTRAKRRVVGREKRRSNGLPGPIGPPGPRGRTGDAGP<br>VGPPGPPGPPGPPGPPSAGFDFSFLPQPPQEKAHDGGRYYRANDANVVRDRDLEVDTTL<br>KSLSQQIENIRSPEGSRKNPARTCRDLKMCHSDWKSGEYWIDPNQGCNLDAIKVFCNME<br>TGETCVYPTQPSVAQKNWYISKNPKDKRHVWFGESMTDGFQFEYGGQGSDPADVAIQLT<br>FLRLMSTEASQNITYHCKNSVAYMDQQTGNLKKALLLKGSNEIEIRAEGNSRFTYSVTV<br>DGCTSHTGAWGKTVIEYKTTKSSRLPIIDVAPLDVGAPDQEFGFDVGPVCFL | Full Length gp120 recombinant polypeptide (BG505 Strain) 819 aa |
| 4 | AENLWVTVYYGVPVWKDAETTLFCASDAKAYETEKHNVWATHACVPTDPNPQEIHLENV<br>TEEFNMWKNNMVEQMHTDIISLWDQSLKPCVKLTPLCVTLQCTNVTNNITDDMRGELKN<br>CSFNMTTELRDKKQKVYSLFYRLDVVQINENQGNRSNNSNKEYRLINCNTSAITQACPK<br>VSFEPIPIHYCAPAGFAILKCKDKKFNGTGPCPSVSTVQCTHGIKPVVSTQLLLNGSLA<br>EEEVMIRSENITNNAKNILVQFNTPVQINCTRPNNNTRKSIRIGPGQAFYATGDIIGDI<br>RQAACTVSKATWNETLGKVVKQLRKHFGNNTIIRFANSSGGDLEVITRSFNCGGEFFYC<br>NTSGLFNSTWISNTSVOGSNSTGSNDSITLPCRIKQIINMWQRIGQAMYAPPIQGVIRC<br>VSNITGLILTRDGGSTNSTTETFRPGGGDMRDNWRSELYKYKVVKIEPLGVAPTRAKRR<br>VVGREKRRSNGLPGPIGPPGPRGRTGDAGPVGPPGPPGPPGPPGPPSAGFDFSFLPQPP<br>QEKAHDGGRYYRANDANVVRDRDLEVDTTLKSLSQQIENIRSPEGSRKNPARTCRDLKM<br>CHSDWKSGEYWIDPNQGCNLDAIKVFCNMETGETCVYPTQPSVAQKNWYISKNPKDKRH<br>VWFGESMTDGFQFEYGGQGSDPADVAIQLTFLRLMSTEASQNITYHCKNSVAYMDQQTG<br>NLKKALLLKGSNEIEIRAEGNSRFTYSVTVDGCTSHTGAWGKTVIEYKTTKSSRLPIID<br>VAPLDVGAPDQEFGFDVGPVCFL | Mature gp120 recombinant polypeptide (BG505 Strain) 790 aa |
| 5 | MRVTEIRKSYQHWWRWGIMLLGILMICNAEEKLWVTVYYGVPVWKEATTTLFCASDAKA<br>YDTEVHNVWATHACVPTDPNPQEVELENVTENFNMWKNNMVEQMHEDIISLWDQSLKPC<br>VKLTPLCVILNCTDLRNATSRNVINTTSSSRGMVGGGEMKNCSFNITTGIRGKVQKEYA<br>LFYELDIVPIDNKIDRYRLISCNTSVITQACPKVSFEPIPIHYCAPAGFAILKCKDKKE<br>NGKGPCSNVSTVQCTHGIRPVVSTQLLLNGSLAEEEVVIRSENFTNNAKTIIVQLNESV | Full Length gp120 recombinant polypeptide (BaL-B strain) |

| SEQ ID NO. | SEQUENCE | DESCRIPTION |
|---|---|---|
| | EINCTRPNNNTRKSINIGPGRAFYTTGEIIGDIRQAHCNLSRAKWNDTLNKIVIKLREQ FGNKTIVFKHSSGGDPEIVTHSFNCGGEFFYCNSTQLFNSTWNVTEESNNTVENNTITL PCRIKQIINMWQEVGRAMYAPPIRGQIRCSSNITGLLLTRDGGPEDNKTEVFRPGGGDM RDNWRSELYKYKVVKIEPLGVAPTKAKRRVVQREKRRSNGLPGPIGPPGPRGRIGDAGP VGPPGPPGPPGPPGPPSAGFDFSFLPQPPQEKAHDGGRYYRANDANVVRDRDLEVDTTL KSLSQQIENIRSPEGSRKNPARTCRDLKMCHSDWKSGEYWIDPNQGCNLDAIKVFCNME TGETCVYPTQPSVAQKNWYISKNPKDKRHVWFGESMTDGFQFEYGGQGSDPADVAIQLT FLRLMSTEASQNITYHCKNSVAYMDQQTGNLKKALLLKGSNEIEIRAEGNSRFTYSVTV DGCTSHTGAWGKTVIEYKTTKSSRLPIIDVAPLDVGAPDQEFGFDVGPVCFL | (Type I trimerization peptide) 819 aa |
| 6 | EEKLWVTVYYGVPVWKEATTTLFCASDAKAYDTEVHNVWATHACVPTDPNPQEVELENV TENFNMWKNNMVEQMHEDIISLWDQSLKPCVKLTPLCVTLNCTDLRNATSRNVTNTTSS SRGMVGGGEMKNCSFNITTGIRGKVQKEYALFYELDIVPIDNKIDRYRLISCNTSVITQ ACPKVSFEPIPIHYCAPAGFAILKCKDKKFNGKGPCSNVSTVQCTHGIRPVVSTQLLLN GSLAEEEVVIRSENFTNNAKTIIVQLNESVEINCTRPNNNTRKSINIGPGRAFYTTGEI IGDIRQAHCNLSRAKWNDTLNKIVIKLREQFGNKTIVFKHSSGGDPEIVTHSFNCGGEE FYCNSTQLFNSTWNVTEESNNTVENNTITLPCRIKQIINMWQEVGRAMYAPPIRGQIRC SSNITGLLLTRDGGPEDNKTEVFRPGGGDMRDNWRSELYKYKVVKIEPLGVAPTKAKRR VVQREKRRSNGLPGPIGPPGPRGRTGDAGPVGPPGPPGPPGPPGPPSAGFDFSFLPQPP QEKAHDGGRYYRANDANVVRDRDLEVDTTLKSLSQQIENIRSPEGSRKNPARTCRDLKM CHSDWKSGEYWIDPNQGCNLDAIKVFCNMETGETCVYPTQPSVAQKNWYISKNPKDKRH VWFGESMTDGFQFEYGGQGSDPADVAIQLTFLRLMSTEASQNITYHCKNSVAYMDQQIG NLKKALLLKGSNEIEIRAEGNSRFTYSVTVDGCTSHTGAWGKTVIEYKTTKSSRLPIID VAPLDVGAPDQEFGFDVGPVCFL | Mature gp120 recombinant polypeptide (BaL-B strain) (Type I trimerizationn peptide) 790 aa |
| 7 | MRVTEIRKSYQHWWRWGIMLLGILMICNAEEKLWVTVYYGVPVWKEATTTLFCASDAKA YDTEVHNVWATHACVPTDPNPQEVELENVTENFNMWKNNMVEQMHEDIISLWDQSLKPC VKLTPLCVTLNCTDLRNATSRNVTNTTSSSRGMVGGGEMKNCSFNITTGIRGKVQKEYA LFYELDIVPIDNKIDRYRLISCNTSVITQACPKVSFEPIPIHYCAPAGFAILKCKDKKE NGKGPCSNVSTVQCTHGIRPVVSTQLLLNGSLAEEEVVIRSENFTNNAKTIIVQLNESV EINCTRPNNNTRKSINIGPGRAFYTTGEIIGDIRQARCNLSRAKWNDTLNKIVIKLREQ FGNKTIVFKHSSGGDPEIVTHSFNCGGEFFYCNSTQLFNSTWNVTEESNNTVENNTITL PCRIKQIINMWQEVGRAMYAPPIRGQIRCSSNITGLLLTRDGGPEDNKTEVFRPGGGDM RDNWRSSEPMDFKINTDEIMTSLKSVNGQIESLISPDGSRKNPARNCRDLKFCHPELKS GEYWVDPNQGCKLDAIKVFCNMETGETCISANPLNVPRKHWWTDSSAEKKHVWFGESMD GGFQFSYGNPELPEDVLDVQLAFLRLLSSRASQNITYHCKNSIAYMDQASGNVKKALKL MGSNEGEFKAEGNSKFTYTVLEDGCTKHTGEWSKTVFEYRTRKAVRLPIVDIAPYDIGG PDQEFGVDVGPVCFLL | Full Length gp120 recombinant polypeptide (BaL-B strain) (Type III trimerizationn peptide) 726 aa |
| 8 | EEKLWVTVYYGVPVWKEATTTLFCASDAKAYDTEVHNVWATHACVPTDPNPQEVELENV TENFNMWKNNMVEQMHEDIISLWDQSLKPCVKLTPLCVTLNCTDLRNATSRNVTNTTSS SRGMVGGGEMKNCSFNITTGIRGKVQKEYALFYELDIVPIDNKIDRYRLISCNTSVITQ ACPKVSFEPIPIHYCAPAGFAILKCKDKKFNGKGPCSNVSTVQCTHGIRPVVSTQLLLN GSLAEEEVVIRSENFTNNAKTIIVQLNESVEINCTRPNNNTRKSINIGPGRAFYTTGEI IGDIRQAHCNLSRAKWNDTLNKIVIKLREQFGNKTIVFKHSSGGDPEIVTHSFNCGGEE FYCNSTQLFNSTWNVTEESNNTVENNTITLPCRIKQIINMWQEVGRAMYAPPIRGQIRC SSNITGLLLTRDGGPEDNKTEVFRPGGGDMRDNWRSSEPMDFKINTDEIMTSLKSVNGQ IESLISPDGSRKNPARNCRDLKFCHPELKSGEYWVDPNQGCKLDAIKVFCNMETGETCI SANPLNVPRKHWWTDSSAEKKHVWFGESMDGGFQFSYGNPELPEDVLDVQLAFLRLLSS RASQNITYHCKNSIAYMDQASGNVKKALKLMGSNEGEFKAEGNSKFTYTVLEDGCTKHT GEWSKTVFEYRTRKAVRLPIVDIAPYDIGGPDQEFGVDVGPVCFLL | Mature gp120 recombinant polypeptide (BaL-B strain) (Type III trimerization peptide) 695 aa |
| 9 | MRVMGIQRNYPQWWIWSMLGFWMLMICNGMWVTVYYGVPVWKEAKTTLFCASDAKAYEK EVHNVWATHACVPTDPNPQEMVLKNVTENFNMWKNDMVDQMHEDVISLWDQSLKPCVKL TPLCVILNUINA1ASNSSIIEGMKNCSFNITTELRDKREKKNALFYKLDIVQLDGNSSQ YRLINCNTSVITQACPKVSFDPIPIHYCAPAGYAILKCNNKTFTGTGPCNNVSTVQCTH GIKPVVSTQLLLNGSLAEGEIIIRSENITNNVKTIIVHLNESVKIECTRPNNKIRTSIR IGPGQAFYATGQVIGDIREAYCNINESKWNETLQRVSKKLKEYFPRKNITFQPSSGGDL EITTHSFNCGGEFFYCNTSSLFNRTYMANSTDMANSTETNSTRTITIHCRIKQIINMWQ EVGRAMYAPPIAGNITCISNITGLLLTRDGGKNNTETFRPGGGNMKDNWRSELYKYKVV EVKPLGVAPTNARRRVVEREKRRSNGLPGPIGPPGPRGRTGDAGPVGPPGPPGPPGPPG PPSAGFDFSFLPQPPQEKARDGGRYYRANDANVVRDRDLEVDTTLKSLSQQIENIRSPE GSRKNPARTCRDLKMCHSDWKSGEYWIDPNQGCNLDAIKVFCNMETGETCVYPTQPSVA QKNWYISKNPKDKRHVWFGESMTDGFQFEYGGQGSDPADVAIQLTFLRLMSTEASQNIT YHCKNSVAYMDQQTGNLKKALLLKGSNEIEIRAEGNSRFTYSVTVDGCTSHTGAWGKTV IEYKTTKSSRLPIIDVAPLDVGAPDQEFGFDVGPVCFL | Full Length gp120 recombinant polypeptide (CH505 Strain) 805 aa |
| 10 | PVWKEAKTTLFCASDAKAYEKEVHNVWATHACVPTDPNPQEMVLKNVTENFNMWKNDMV DQMHEDVISLWDQSLKPCVKLTPLCVTLNCTNATASNSSIIEGMKNCSFNITTELRDKR EKKNALFYKLDIVQLDGNSSQYRLINCNTSVITQACPKVSFDPIPIHYCAPAGYAILKC NNKTFTGTGPCNNVSTVQCTHGIKPVVSTQLLLNGSLAEGEIIIRSENITNNVKTIIVH LNESVKIECTRPNNKTRTSIRIGPGQAFYATGQVIGDIREAYCNINESKWNETLQRVSK KLKEYFPHKNITFQPSSGGDLEITTHSFNCGGEFFYCNTSSLFNRTYMANSTDMANSTE TNSTRTITIHCRIKQIINMWQEVGRAMYAPPIAGNITCISNITGLLLTRDGGKNNTETE RPGGGNMKDNWRSELYKYKVVEVKPLGVAPTNARRRVVEREKRRSNGLPGPIGPPGPRG | Mature gp120 recombinant polypeptide (CH505 Strain) 767 aa |

SEQUENCES

| SEQ ID NO. | SEQUENCE | DESCRIPTION |
| --- | --- | --- |
| | RTGDAGPVGPPGPPGPPGPPGPPSAGFDFSFLPQPPQEKAHDGGRYYRANDANVVRDRD LEVDTTLKSLSQQIENIRSPEGSRKNPARTCRDLKMCHSDWKSGEYWIDPNQGCNLDAI KVFCNMETGETCVYPTQPSVAQKNWYISKNPKDKRHVWFGESMTDGFQFEYGGQGSDPA DVAIQLTFLRLMSTEASQNITYHCKNSVAYMDQQTGNLKKALLLKGSNEIEIRAEGNSR FTYSVTVDGCTSHTGAWGKTVIEYKTTKSSRLPIIDVAPLDVGAPDQEFGFDVGPVCFL | |
| 11 | MRVKGIRRNCQHSWRWGTTLTMLLGILMICRAAEQLWVTVYYGVPVWREAKTTLFCASD AKAYDTEVHNVWATHACVPTDPNPQELVLVNVTENFNAWENNMVEQMHEDIISLWDQSL KPCVKLTPLCVTLNCNDLNTTTSNTTGTEGLTMDKGEMKNCSFNITTDISNKKQKQYAL FYKLDVVQMNNNNSYRLISCNTSVITQACPKVSFEPIPIYYCAPAGFAILKCNDKSFS GKGECKNVSTVQCTHGIRPVVSTQLLLNGSLAEEDVIIRSDNFTDNAKTIIVQLNETVD IHCIRPNNNTRKRITMGPGKVYYTTGQIIGDIRQAHCNLSEAKWNNTLRRVVRKLREKF NKTIVFNQSSGGDPEIVMHTFNCGGEFFYCNSTKLFNSIWDNNKDSTKTNEPNDGKNIT LPCRIKQIINMWQGVGKAMYAPPIRGQIRCTSNITGLLLTRDGGKNNGTNGTEVFRPGG GNMKDNWRSELYKYKVVKIEPLGVAPTTAKRRVVQREKRRSNGLPGPIGPPGPRGRTGD AGPVGPPGPPGPPGPPGPPSAGFDFSFLPQPPQEKAHDGGRYYRANDANVVRDRDLEVD TTLKSLSQQIENIRSPEGSRKNPARTCRDLKMCHSDWKSGEYWIDPNQGCNLDAIKVFC NMETGETCVYPTQPSVAQKNWYISKNPKDKRHVWFGESMTDGFQFEYGGQGSDPADVAI QLTFLRLMSTEASQNITYHCKNSVAYMDQQTGNLRKALLLQGSNEIEIRAEGNSRFTYS VIVDGCTSHTGAWGKTVIEYKTTKTSRLPIIDVAPLDVGAPDQEFGFDVGPVCFL | Full Length gp120 recombinant polypeptide (B41 Strain) 822 aa |
| 12 | AEQLWVTVYYGVPVWREAKTTLFCASDAKAYDTEVHNVWATHACVPTDPNPQELVLVNV TENFNAWENNMVEQMHEDIISLWDQSLKPCVKLTPLCVTLNCNDLNTTTSNTTGTEGLT MDKGEMKNCSFNITTDISNKKQKQYALFYKLDVVQMNNNNSYRLISCNTSVITQACPK VSFEPIPIYYCAPAGFAILKCNDKSFSGKGECKNVSTVQCTHGIRPVVSTQLLLNGSLA EEDVIIRSDNFTDNAKTIIVQLNETVDIHCIRPNNNTRKRITMGPGKVYYTTGQIIGDI RQAHCNLSEAKWNNTLRRVVRKLREKFNKTIVFNQSSGGDPEIVMHTFNCGGEFFYCNS TKLFNSIWDNNKDSTKTNEPNDGKNITLPCRIKQIINMWQGVGKAMYAPPIRGQIRCTS NITGLLLTRDGGKNNGTNGTEVFRPGGGNMKDNWRSELYKYKVVKIEPLGVAPTTAKRR VVQREKRRSNGLPGPIGPPGPRGRTGDAGPVGPPGPPGPPGPPGPPSAGFDFSFLPQPP QEKAHDGGRYYRANDANVVRDRDLEVDTTLKSLSQQIENIRSPEGSRKNPARTCRDLKM CHSDWKSGEYWIDPNQGCNLDAIKVFCNMETGETCVYPTQPSVAQKNWYISKNPKDKRH VWFGESMTDGFQFEYGGQGSDPADVAIQLTFLRLMSTEASQNITYHCKNSVAYMDQQIG NLKKALLLQGSNEIEIRAEGNSRFTYSVTVDGCTSHTGAWGKTVIEYKTTKTSRLPIID VAPLDVGAPDQEFGFDVGPVCFL | Mature gp120 recombinant polypeptide (B41 Strain) 790 aa |
| 13 | MRVMGIQRNCQHLFRWGTMILGMIIICSAAENLWVTVYYGVPVWKDAETTLFCASDAKA YETEKHNVWATHACVPTDPNPQEIHLENVTEEFNMWKNNMVEQMHTDIISLWDQSLKPC VKLTPLCVILQCINVITNNITDDMRGELKNCSFNMTTELRDKKQKVYSLFYRLDVVQINE NQGNRSNNSNKEYRLINCNTSAITQACPKVSFEPIPIHYCAPAGFAILKCKDKKFNGTG PCPSVSTVQCTHGIKPVVSTQLLLNGSLAEEEVMIRSENITNNAKNILVQFNTPVQINC TRPNNNTRKSIRIGPGQAFYAIGDIIGDIRQAHCTVSKATWNETLGKVVKQLRKHFGNN TIIRFANSSGGDLEVTTHSFNCGGEFFYCNTSGLFNSTWISNTSVQGSNSTGSNDSITL PCRIKQIINMWQRIGQAMYAPPIQGVIRCVSNITGLILTRDGGSTNSTTETFRPGGGDM RDNWRSELYKYKVVKIEPLGVAPTRAKRRVVGREKRRSNGLPGPIGPPGPRGRIGAGPP VGPPGPPGPPGPPGPPSAGFDFSFLPQPPQEKAHDGGRYYRANDANVVRDRDLEVDTTL KSLSQQIENIRSPEGSRKNPARTCRDLKMCHSDWKSGEYWIDPNQGCNLDAIKVFCNME TGETCVYPTQPSVAQKNWYISKNPKDKRHVWFGESMTDGFQFEYGGQGSDPADVAIQLT FLRLMSTEASQNITYHCKNSVAYMDQQTGNLKKALLLQGSNEIEIRAEGNSRFTYSVTV DGCTSHTGAWGKTVIEYKTTKTSRLPIIDVAPLDVGAPDQEFGFDVGPVCFL | Full Length gp120 recombinant polypeptide (BG505 Strain) 819 aa |
| 14 | AENLWVTVYYGVPVWKDAETTLFCASDAKAYETEKHNVWATHACVPTDPNPQEIHLENV TEEFNMWKNNMVEQMHTDIISLWDQSLKPCVKLTPLCVTLQCTNVTNNITDDMRGELKN CSFNMTTELRDKKQKVYSLFYRLDVVQINENQGNRSNNSNKEYRLINCNTSAITQACPK VSFEPIPIHYCAPAGFAILKCKDKKFNGTGPCPSVSTVQCTHGIKPVVSTQLLLNGSLA EEEVMIRSENITNNAKNILVQFNTPVQINCTRPNNNTRKSIRIGPGQAFYATGDIIGDI RQAHCTVSKATWNETLGKVVKQLRKHFGNNTIIRFANSSGGDLEVTTHSFNCGGEFFYC NTSGLFNSTWISNTSVQGSNSTGSNDSITLPCRIKQIINMWQRIGQAMYAPPIQGVIRC VSNITGLILTRDGGSTNSTTETFRPGGGDMRDNWRSELYKYKVVKIEPLGVAPTRAKRR VVGREKRRSNGLPGPIGPPGPRGRTGDAGPVGPPGPPGPPGPPGPPSAGFDFSFLPQPP QEKAHDGGRYYRANDANVVRDRDLEVDTTLKSLSQQIENIRSPEGSRKNPARTCRDLKM CASDWKSGEYWIDPNQGCNLDAIKVFCNMETGETCVYPTQPSVAQKNWYISKNPKDKRH VWFGESMTDGFOFEYGGQGSDPADVAIQLTFLRLMSTEASQNITYHCKNSVAYMDQQTG NLKKALLLQGSNEIEIRAEGNSRFTYSVTVDGCTSHTGAWGKTVIEYKTTKTSRLPIID VAPLDVGAPDQEFGFDVGPVCFL | Mature gp120 recombinant polypeptide (BG505 Strain) 790 aa |
| 15 | MRVTEIRKSYQHWWRWGIMLLGILMICNAEEKLWVTVYYGVPVWKEATTTLFCASDAKA YDTEVHNVWATHACVPTDPNPQEVELENVTENFNMWKNNMVEQMHEDIISLWDQSLKPC VKLTPLCVTLNCTDLRNATSRNVTNTTSSSRGMVGGGEMKNCSFNITGIRGKVQKEYA LFYELDIVPIDNKIDRYRLISCNTSVITQACPKVSFEPIPIHYCAPAGFAILKCKDKKF NGKGPCSNVSTVQCTHGIRPVVSTQLLLNGSLAEEEVVIRSENFTNNAKTIIVQLNESV EINCTRPNNNTRKSINIGPGRAFYTTGEIIGDIRQAHCNLSRAKWNDTLNKIVIKLREQ FGNKTIVFKHSSGGDPEIVTHSFNCGGEFFYCNSTQLFNSTWNVTEESNNTVENNTITL PCRIKQIINMWQEVGRAMYAPPIRGQIRCSSNITGLLLTRDGGPEDNKTEVFRPGGGDM RDNWRSELYKYKVVKIEPLGVAPTKAKRRVVQREKRRSNGLPGPIGPPGPRGRTGDAGP | Full Length gp120 recombinant polypeptide (BaL-B strain) (Type I trimerization peptide) 819 aa |

SEQUENCES

| SEQ ID NO. | SEQUENCE | DESCRIPTION |
|---|---|---|
| | VGPPGPPGPPGPPGPPSAGFDFSFLPQPPQEKAHDGGRYYRANDANVVRDRDLEVDTTL KSLSQQIENIRSPEGSRKNPARTCRDLKMCHSDWKSGEYWIDPNQGCNLDAIKVFCNME TGETCVYPTQPSVAQKNWYISKNPKDKRHVWFGESMTDGFQFEYGGQGSDPADVAIQLT FLRLMSTEASQNITYHCKNSVAYMDQQTGNLKKALLLQGSNEIEIRAEGNSRFTYSVTV DGCTSHTGAWGKTVIEYKTTKTSRLPIIDVAPLDVGAPDQEFGFDVGPVCFL | |
| 16 | EEKLWVTVYYGVPVWKEATTTLFCASDAKAYDTEVHNVWATHACVPTDPNPQEVELENV TENFNMWKNNMVEQMHEDIISLWDQSLKPCVKLTPLCVTLNCTDLRNATSRNVTNTTSS SRGMVGGGEMKNCSFNITTGIRGKVQKEYALFYELDIVPIDNKIDRYRLISCNISVIIQ ACPKVSFEPIPIHYCAPAGFAILKCKDKKFNGKGPCSNVSTVQCTHGIRPVVSTQLLLN GSLAEEEVVIRSENFTNNAKTIIVQLNESVEINCTRPNNNTRKSINIGPGRAFYTTGEI IGDIRQAHCNLSRAKWNDTLNKIVIKLREQFGNKTIVFKHSSGGDPEIVTHSFNCGGEF FYCNSTQLFNSTWNVTEESNNTVENNTITLPCRIKQIINMWQEVGRAMYAPPIRGQIRC SSNITGLLLTRDGGPEDNKTEVFRPGGGDMRDNWRSELYKYKVVKIEPLGVAPTKAKRR VVQREKRRSNGLPGPIGPPGPRGRTGDAGPVGPPGPPGPPGPPGPPSAGFDFSFLPQPP QEKAHDGGRYYRANDANVVRDRDLEVDTTLKSLSQQIENIRSPEGSRKNPARTCRDLKM CHSDWKSGEYWIDPNQGCNLDAIKVFCNMETGETCVYPTQPSVAQKNWYISKNPKDKRH VWFGESMTDGFQFEYGGQGSDPADVAIQLTFLRLMSTEASQNITYHCKNSVAYMDQQTG NLKKALLLQGSNEIEIRAEGNSRFTYSVTVDGCTSHTGAWGKTVIEYKTTKTSRLPIID VAPLDVGAPDQEFGFDVGPVCFL | Mature gp120 recombinant polypeptide (BaL-B strain) (Type I trimerization peptide) 790 aa |
| 17 | MRVMGIQRNYPQWWIWSMLGFWMLMICNGMWVTVYYGVPVWKEAKTTLFCASDAKAYEK EVHNVWATHACVPTDPNPQEMVLKNVTENFNMWKNDMVDQMHEDVISLWDQSLKPCVKL TPLCVTLNCTNATASNSSIIEGMKNCSFNITTELRDKREKKNALFYKLDIVQLDGNSSQ YRLINCNTSVITQACPKVSFDPIPIHYCAPAGYAILKCNNKTFTGTGPCNNVSTVQCTH GIKPVVSTQLLLNGSLAEGEIIIRSENITNNVKTIIVHLNESVKIECTRPNNKTRTSIR IGPGQAFYATGQVIGDIREAYCNINESKWNETLQRVSKKLKEYFPHKNITFQPSSGGDL EITTTHSFNCGGEFFYCNTSSLFNRTYMANSTDMANSTETNSTRTITIHCRIKQIINMWQ EVGRAMYAPPIAGNITCISNITGLLLTRDGGKNNTETFRPGGGNMKDNWRSELYKYKVV EVKPLGVAPTNARRRVVEREKRRSNGLPGPIGPPGPRGRTGDAGPVGPPGPPGPPGPPG PPSAGFDFSFLPQPPQEKAHDGGRYYRANDANVVRDRDLEVDTTLKSLSQQIENIRSPE GSRKNPARTCRDLKMCHSDWKSGEYWIDPNQGCNLDAIKVFCNMETGETCVYPTQPSVA QKNWYISKNPKDKRHVWFGESMTDGFQFEYGGQGSDPADVAIQLTFLRLMSTEASQNIT YHCKNSVAYMDQQTGNLKKALLLQGSNEIEIRAEGNSRFTYSVTVDGCTSHTGAWGKTV IEYKTTKTSRLPIIDVAPLDVGAPDQEFGFDVGPVCFL | Full Length gp120 recombinant polypeptide (CH505 Strain) 805 aa |
| 18 | PVWKEAKTTLFCASDAKAYEKEVHNVWATHACVPTDPNPQEMVLKNVTENFNMWKNDMV DQMHEDVISLWDQSLKPCVKLTPLCVTLNCINATASNSSIIEGMKNCSFNITTELRDKR EKKNALFYKLDIVQLDGNSSQYRLINCNTSVITQACPKVSFDPIPIHYCAPAGYAILKC NNKTFTGTGPCNNVSTVQCTHGIKPVVSTQLLLNGSLAEGEIIIRSENITNNVKTIIVH LNESVKIECTRPNNKTRTSIRIGPGQAFYATGQVIGDIREAYCNINESKWNETLQRVSK KLKEYFPHKNITFQPSSGGDLEITTHSFNCGGEFFYCNTSSLFNRTYMANSTDMANSIE TNSTRTITIHCRIKQIINMWQEVGRAMYAPPIAGNITCISNITGLLLTRDGGKNNTETF RPGGGNMKDNWRSELYKYKVVEVKPLGVAPTNARRRVVEREKRRSNGLPGPIGPPGPRG RTGDAGPVGPPGPPGPPGPPGPPSAGFDFSFLPQPPQEKAHDGGRYYRANDANVVRDRD LEVDTTLKSLSQQIENIRSPEGSRKNPARTCRDLKMCHSDWKSGEYWIDPNQGCNLDAI KVFCNMETGETCVYPTQPSVAQKNWYISKNPKDKRHVWFGESMTDGFQFEYGGQGSDPA DVAIQLTFLRLMSTEASQNITYHCKNSVAYMDQQTGNLKKALLLQGSNEIEIRAEGNSR FTYSVTVDGCTSHTGAWGKTVIEYKTTKTSRLPIIDVAPLDVGAPDQEFGFDVGPVCFL | Mature gp120 recombinant polypeptide Strain) (CH505 Strain) 767 aa |
| 19 | MRVKGIRRNCQHSWRWGTTLTMLLGILMICRAAEQLWVTVYYGVPVWREAKTTLFCASD AKAYDTEVHNVWATHACVPTDPNPQELVLVNVTENFNAWENNMVEQMHEDIISLWDOSL KPCVKLTPLCVTLNCNDLNTTTSNTTGTEGLTMDKGEMKNCSFNITTDISNKKQKQYAL FYKLDVVQMNNNNSYRLISCNTSVITQACPKVSFEPIPIYYCAPAGFAILKCNDKSFS GKGECKNVSTVQCTHGIRPVVSTQLLLNGSLAEEDVIIRSDNFTDNAKTIIVQLNETVD IHCIRPNNNTRKRITMGPGKVYYTTGQIIGDIRQAHCNLSEAKWNNTLRRVVRKLREKE NKTIVFNQSSGGDPEIVMHTFNCGGEFFYCNSTKLFNSIWDNNKDSTKTNEPNDGKNIT LPCRIKQIINMWQGVGKAMYAPPIRGQIRCTSNITGLLLTRDGGKNNGTNGTEVFRPGG GNMKDNWRSELYKYKVVKIEPLGVAPTTAKRRVVQREKR | gp120 peptide (B41 Strain) with signal peptide |
| 20 | AEQLWVTVYYGVPVWREAKTTLFCASDAKAYDTEVHNVWATHACVPTDPNPQELVLVNV TENFNAWENNMVEQMHEDIISLWDQSLKPCVKLTPLCVTLNCNDLNTTTSNTTGTEGLT MDKGEMKNCSFNITTDISNKKQKQYALFYKLDVVQMNNNNSYRLISCNTSVITQACPK VSFEPIPIYYCAPAGFAILKCNDKSFSGKGECKNVSTVQCTHGIRPVVSTQLLLNGSLA EEDVIIRSDNFTDNAKTIIVQLNETVDIHCIRPNNNTRKRITMGPGKVYYTTGQIIGDI RQAACNLSEAKWNNTLRRVVRKLREKFNKTIVFNQSSGGDPEIVMHTFNCGGEFFYCNS TKLFNSIWDNNKDSTKTNEPNDGKNITLPCRIKQIINMWQGVGKAMYAPPIRGQIRCTS NITGLLLTRDGGKNNGTNGTEVFRPGGGNMKDNWRSELYKYKVVKIEPLGVAPTTAKRR VVQREKR | gp120 peptide (B41 Strain) without signal peptide |
| 21 | MRVKGIRRNCQHSWRWGTTLTMLLGILMICRA | gp120 peptide (B41 Strain) signal peptide |

-continued

| SEQ ID NO. | SEQUENCE | DESCRIPTION |
|---|---|---|
| 22 | MRVMGIQRNCQHLFRWGTMILGMIIICSAAENLWVTVYYGVPVWKDAETTLFCASDAKA YETEKHNVWATHACVPTDPNPQEIHLENVTEEFNMWKNNMVEQMHTDIISLWDQSLKPC VKLTPLCVTLQCTNVTNNITDDMRGELKNCSFNMTTELRDKKQKVYSLFYRLDVVQINE NQGNRSNNSNKEYRLINCNTSAITQACPKVSFEPIPIHYCAPAGFAILKCKDKKFNGTG PCPSVSTVQCTHGIKPVVSTQLLLNGSLAEEEVMIRSENITNNAKNILVQFNTPVQINC TRPNNNTRKSIRIGPGQAFYAIGDIIGDIRQAHCTVSKATWNETLGKVVKQLRKHFGNN TIIRFANSSGGDLEVTTHSFNCGGEFFYCNTSGLFNSTWISNTSVQGSNSTGSNDSITL PCRIKQIINMWQRIGQAMYAPPIQGVIRCVSNITGLILTRDGGSTNSTTETFRPGGGDM RDNWRSELYKYKVVKIEPLGVAPTRAKRRVVGREKR | gp120 peptide (BG505 Strain) with signal peptide |
| 23 | AENLWVTVYYGVPVWKDAETTLFCASDAKAYETEKHNVWATHACVPTDPNPQEIHLENV TEEFNMWKNNMVEQMHTDIISLWDQSLKPCVKLTPLCVTLQCTNVTNNITDDMRGELKN CSFNMTTELRDKKQKVYSLFYRLDVVQINENQGNRSNNSNKEYRLINCNTSAITQACPK VSFEPIPIHYCAPAGFAILKCKDKKFNGTGPCPSVSTVQCTHGIKPVVSTQLLLNGSLA EEEVMIRSENITNNAKNILVQFNTPVQINCTRPNNNTRKSIRIGPGQAFYATGDIIGDI RQAHCTVSKATWNETLGKVVKQLRKHFGNNTIIRFANSSGGDLEVTTHSFNCGGEFFYC NTSGLFNSTWISNTSVQGSNSIGSNDSITLPCRIKQIINMWQRIGQAMYAPPIQGVIRC VSNITGLILTRDGGSTNSTTETFRPGGGDMRDNWRSELYKYKVVKIEPLGVAPTRAKRR VVGREKR | gp120 peptide (BG505 Strain) without signal peptide |
| 24 | MRVMGIQRNCQHLFRWGTMILGMIIICSA | gp120 peptide (BG505 Strain) signal peptide |
| 25 | MRVTEIRKSYQHWWRWGIMLLGILMICNAEEKLWVTVYYGVPVWKEATTTLFCASDAKA YDTEVHNVWATHACVPTDPNPQEVELENVTENFNMWKNNMVEQMHEDIISLWDQSLKPC VKLTPLCVTLNCTDLRNATSRNVTNTTSSSRGMVGGGEMKNCSFNITTGIRGKVQKEYA LFYELDIVPIDNKIDRYRLISCNTSVITQACPKVSFEPIPIHYCAPAGFAILKCKDKKF NGKGPCSNVSTVQCTHGIRPVVSTQLLLNGSLAEEEVIRSENFTNNAKTIIVQLNESV EINCTRPNNNTRKSINIGPGRAFYTTGEIIGDIRQAHCNLSRAKWNDTLNKIVIKLREQ FGNKTIVFKHSSGGDPEIVTHSFNCGGEFFYCNSTQLFNSTWNVTEESNNTVENNTITL PCRIKQIINMWQEVGRAMYAPPIRGQIRCSSNITGLLLTRDGGPEDNKTEVFRPGGGDM RDNWRSELYKYKVVKIEPLGVAPTKAKRRVVQREKR | gp120 peptide (BaL-B strain) with signal peptide |
| 26 | EEKLWVTVYYGVPVWKEATTTLFCASDAKAYDTEVHNVWATHACVPTDPNPQEVELENV TENFNMWKNNMVEQMHEDIISLWDQSLKPCVKLTPLCVTLNCTDLRNATSRNVTNTTSS SRGMVGGGEMKNCSFNITTGIRGKVQKEYALFYELDIVPIDNKIDRYRLISCNTSVITQ ACPKVSFEPIPIHYCAPAGFAILKCKDKKFNGKGPCSNVSTVQCTHGIRPVVSTQLLLN GSLAEEEVIRSENFTNNAKTIIVQLNESVEINCTRPNNNTRKSINIGPGRAFYTTGEI IGDIRQAHCNLSRAKWNDTLNKIVIKLREQFGNKTIVFKHSSGGDPEIVTHSFNCGGEE FYCNSTQLFNSTWNVTEESNNTVENNTITLPCRIKQIINMWQEVGRAMYAPPIRGQIRC SSNITGLLLTRDGGPEDNKTEVTRPGGGDMRDNWRSELYKYKVVKIEPLGVAPTKAKRR VVQREKR | gp120 peptide (BaL-B strain) without signal peptide |
| 27 | MRVTEIRKSYQHWWRWGIMLLGILMICNA | gp120 peptide (BaL-B strain) signal peptide |
| 28 | MRVMGIQRNYPQWWIWSMLGFWMLMICNGMWVTVYYGVPVWKEAKTTLFCASDAKAYEK EVHNVWATHACVPTDPNPQEMVLKNVTENFNMWKNDMVDQMHEDVISLWDQSLKPCVKL TPLCVTLNCTNATASNSSIIEGMKNCSFNITTELRDKREKKNALFYKLDIVQLDGNSSQ YRLINCNTSVITQACPKVSFDPIPIHYCAPAGYAILKCNNKTFTGTGPCNNVSTVQCTH GIKPVVSTQLLLNGSLAEGEIIIRSENITNNVKTIIVHLNESVKIECTRPNNKTRTSIR IGPGQAFYATGQVIGDIREAYCNINESKWNETLQRVSKKLKEYFPHKNITFQPSSGGDL EITTHSFNCGGEFFYCNTSSLFNRTYMANSTDMANSTETNSTRTITIHCRIKQIINMWQ EVGRAMYAPPIAGNITCISNITGLLLTRDGGKNNTETFRPGGGNMKDNWRSELYKYKVV EVKPLGVAPTNARRRVVEREKR | gp120 peptide (CH505 Strain) with signal peptide |
| 29 | PVWKEAKTTLFCASDAKAYEKEVHNVWATHACVPTDPNPQEMVLKNVTENFNMWKNDMV DOMHEDVISLWDQSLKPCVKLTPLCVTLNCTNATASNSSIIEGMKNCSFNITTELRDKR EKKNALFYKLDIVQLDGNSSQYRLINCNTSVITQACPKVSFDPIPIHYCAPAGYAILKC NNKTFTGTGPCNNVSTVQCTHGIKPVVSTQLLLNGSLAEGEIIIRSENITNNVKTIIVH LNESVKIECTRPNNKTRTSIRIGPGQAFYATGQVIGDIREAYCNINESKWNETLQRVSK KLKEYFPHKNITFQPSSGGDLEITTHSFNCGGEFFYCNTSSLFNRTYMANSTDMANSTE TNSTRTITIHCRIKQIINMWQEVGRAMYAPPIAGNITCISNITGLLLTRDGGKNNTETF RPGGGNMKDNWRSELYKYKVVEVKPLGVAPTNARRRVVEREKR | gp120 peptide (CH505 Strain) without signal peptide |

| SEQ ID NO. | SEQUENCE | DESCRIPTION |
|---|---|---|
| 30 | MRVMGIQRNYPQWWIWSMLGFWMLMICNGMWVTVYYGV | gp120 peptide (CH505 Strain) signal peptide |
| 31 | ANVVRDRDLEVDTTLKSLSQQIENIRSPEGSRKNPARTCRDLKMCHSDWKSGEYWIDPN QGCNLDAIKVFCNMETGETCVYPTQPSVAQKNWYISKNPKDKRHVWFGESMTDGFQFEY GGQGSDPADVAIQLTFLRLMSTEASQNITYHCKNSVAYMDQQTGNLKKALLLQGSNEIE IRAEGNSRFTYSVTVDGCTSHTGAWGKTVIEYKTTKTSRLPIIDVAPLDVGAPDQEFGF DVGPVCFL | Trimerization peptide (Type I), QT version |
| 32 | RSANVVRDRDLEVDTTLKSLSQQIENIRSPEGSRKNPARTCRDLKMCHSDWKSGEYWID PNQGCNLDAIKVFCNMETGETCVYPTQPSVAQKNWYISKNPKDKRHVWFGESMTDGFQF EYGGQGSDPADVAIQLTFLRLMSTEASQNITYHCKNSVAYMDQQTGNLKKALLLQGSNE IEIRAEGNSRFTYSVTVDGCTSHIGAWGKTVIEYKTTKTSRLPIIDVAPLDVGAPDQEF GFDVGPVCFL | Trimerization peptide (Type I), QT version |
| 33 | NGLPGPIGPPGPRGRTGDAGPVGPPGPPGPPGPPGPPSAGFDFSFLPQPPQEKAHDGGR YYRANDANVVRDRDLEVDTTLKSLSQQIENIRSPEGSRKNPARTCRDLKMCHSDWKSGE YWIDPNQGCNLDAIKVFCNMETGETCVYPTQPSVAQKNWYISKNPKDKREVWFGESMID GFQFEYGGQGSDPADVAIQLTFLRLMSTEASQNITYHCKNSVAYMDQQTGNLKKALLLQ GSNEIEIRAEGNSRFTYSVTVDGCTSHTGAWGKTVIEYRTTKTSRLPIIDVAPLDVGAP DQEFGFDVGPVCFL | Trimerization peptide (Type I), with glycine-X-Y repeats and D→N mutation at BMP-1 site, QT version |
| 34 | NGLPGPIGPPGPRGRTGDAGPVGPPGPPGPPGPPGPPSAGFDFSFLPQPPQEKAHDGGR YYRNDDANVVRDRDLEVDTTLKSLSQQIENIRSPEGSRKNPARTCRDLKMCHSDWKSGE YWIDPNQGCNLDAIKVFCNMETGETCVYPTQPSVAQKNWYISKNPKDKRRVWFGESMTD GFQFEYGGQGSDPADVAIQLTFLRLMSTEASQNITYHCKNSVAYMDQQTGNLKKALLLQ GSNEIEIRAEGNSRFTYSVTVDGCTSHTGAWGKTVIEYKTTKTSRLPIIDVAPLDVGAP DQEFGFDVGPVCFL | Trimerization peptide (Type I), with glycine-X-Y repeats and A→N mutation at BMP-1 site, QT version |
| 35 | RSNGLPGPIGPPGPRGRTGDAGPVGPPGPPGPPGPPGPPSAGFDFSFLPQPPQEKAHDG GRYYRANDANVVRDRDLEVDTTLKSLSQQIENIRSPEGSRKNPARTCRDLKMCHSDWKS GEYWIDPNQGCNLDAIKVFCNMETGETCVYPTQPSVAQKNWYISKNPKDKRHVWFGESM TDGFQFEYGGQGSDPADVAIQLTFLRLMSTEASQNITYHCKNSVAYMDQQTGNLKKALL LQGSNEIEIRAEGNSRFTYSVTVDGCTSHTGAWGKTVIEYKTTKTSRLPIIDVAPLDVG APDQEFGFDVGPVCFL | Trimerization peptide (Type I), with glycine-X-Y repeats and D→N mutation at BMP-1 site, QT version |
| 36 | GSNGLPGPIGPPGPRGRTGDAGPVGPPGPPGPPGPPGPPSAGFDFSFLPQPPQEKAHDG GRYYRANDANVVRDRDLEVDTTLRSLSQQIENIRSPEGSRKNPARTCRDLKMCHSDWKS GEYWIDPNQGCNLDAIKVFCNMETGETCVYPTQPSVAQKNWYISKNPKDKRHVWFGESM TDGFQFEYGGQGSDPADVAIQLTFLRLMSTEASQNITYHCKNSVAYMDQQTGNLKKALL LQGSNEIEIRAEGNSRFTYSVTVDGCTSHTGAWGKTVIEYKTTKTSRLPIIDVAPLDVG APDQEFGFDVGPVCFL | Trimerization peptide (Type I), with glycine-X-Y repeats and D→N mutation at BMP-1 site, QT version |
| 37 | ANVVRDRDLEVDTTLKSLSQQIENIRSPEGSRKNPARTCRDLKMCHSDWKSGEYWIDPN QGCNLDAIKVFCNMETGETCVYPTQPSVAQKNWYISKNPKDKRHVWFGESMTDGFQFEY GGQGSDPADVAIQLTFLRLMSTEASQNITYHCKNSVAYMDQQTGNLKKALLLKGSNEIE IRAEGNSRFTYSVTVDGCTSHTGAWGKTVIEYKTTKSSRLPIIDVAPLDVGAPDQEFGE DVGPVCFL | Trimerization peptide (Type I), KS version |
| 38 | RSANVVRDRDLEVDTTLKSLSQQIENIRSPEGSRKNPARTCRDLKMCHSDWKSGEYWID PNQGCNLDAIKVFCNMETGETCVYPTQPSVAQKNWYISKNPKDKRHVWFGESMTDGFQF EYGGQGSDPADVAIQLTFLRLMSTEASQNITYHCKNSVAYMDQQTGNLKKALLLKGSNE IEIRAEGNSRFTYSVTVDGCTSHIGAWGKTVIEYKTTKSSRLPIIDVAPLDVGAPDQEE GFDVGPVCFL | Trimerization peptide (Type I), KS version |

-continued

| SEQUENCES | | |
|---|---|---|
| SEQ ID NO. | SEQUENCE | DESCRIPTION |
| 39 | NGLPGPIGPPGPRGRTGDAGPVGPPGPPGPPGPPGPPSAGFDFSFLPQPPQEKAHDGGR<br>YYRANDANVVRDRDLEVDTTLKSLSQQIENIRSPEGSRKNPARTCRDLKMCRSDWKSGE<br>YWIDPNQGCNLDAIKVFCNMETGETCVYPTQPSVAQKNWYISKNPKDKRHVWFGESMTD<br>GFQFEYGGQGSDPADVAIQLTFLRLMSTEASQNITYHCKNSVAYMDQQTGNLKKALLLK<br>GSNEIEIRAEGNSRFTYSVTVDGCTSHTGAWGKTVIEYKTTKSSRLPIIDVAPLDVGAP<br>DQEFGFDVGPVCFL | Trimerization peptide (Type I) with glycine-X-Y repeats and D→N mutation at BMP-1 site, KS version |
| 40 | NGLPGPIGPPGPRGRTGDAGPVGPPGPPGPPGPPGPPSAGFDFSFLPQPPQEKAHDGGR<br>YYRNDDANVVRDRDLEVDTTLKSLSQQIENIRSPEGSRKNPARTCRDLKMCHSDWKSGE<br>YWIDPNQGCNLDAIKVFCNMETGETCVYPTQPSVAQKNWYISKNPKDKRRVWFGESMTD<br>GFQFEYGGQGSDPADVAIQLTFLRLMSTEASQNITYHCKNSVAYMDQQTGNLKKALLLK<br>GSNEIEIRAEGNSRFTYSVTVDGCTSHTGAWGKTVIEYKTTKSSRLPIIDVAPLDVGAP<br>DQEFGFDVGPVCFL | Trimerization peptide (Type I) with glycine-X-Y repeats and A→N mutation at BMP-1 site, KS version |
| 41 | RSNGLPGPIGPPGPRGRTGDAGPVGPPGPPGPPGPPGPPSAGFDFSFLPQPPQEKAHDG<br>GRYYRANDANVVRDRDLEVDTTLKSLSQQIENIRSPEGSRKNPARTCRDLKMCHSDWKS<br>GEYWIDPNQGCNLDAIKVFCNMETGETCVYPTQPSVAQKNWYISKNPKDKRHVWFGESM<br>TDGFQFEYGGQGSDPADVAIQLTFLRLMSTEASQNITYHCKNSVAYMDQQTGNLKKALL<br>LKGSNEIEIRAEGNSRFTYSVTVDGCTSHTGAWGKTVIEYKTTKSSRLPIIDVAPLDVG<br>APDQEFGFDVGPVCFL | Trimerization peptide (Type I) with glycine-X-Y repeats and D→N mutation at BMP-1 site, KS version |
| 42 | GSNGLPGPIGPPGPRGRTGDAGPVGPPGPPGPPGPPGPPSAGFDFSFLPQPPQEKAHDG<br>GRYYRANDANVVRDRDLEVDTTLKSLSQQIENIRSPEGSRKNPARTCRDLKMCHSDWKS<br>GEYWIDPNQGCNLDAIKVFCNMETGETCVYPTQPSVAQKNWYISKNPKDKRHVWFGESM<br>TDGFQFEYGGQGSDPADVAIQLTFLRLMSTEASQNITYHCKNSVAYMDQQTGNLKKALL<br>LKGSNEIEIRAEGNSRFTYSVTVDGCTSHTGAWGKTVIEYKTTKSSRLPIIDVAPLDVG<br>APDQEFGFDVGPVCFL | Trimerization peptide (Type I) with glycine-X-Y repeats and D→N mutation at BMP-1 site, KS version |
| 43 | DEIMTSLKSVNGQIESLISPDGSRKNPARNCRDLKFCHPELKSGEYWVDPNQGCKLDAI<br>KVFCNMETGETCISANPLNVPRKHWWTDSSAEKKHVWFGESMDGGFQFSYGNPELPEDV<br>LDVQLAFLRLLSSRASQNITYHCKNSIAYMDQASGNVKKALKLMGSNEGEFKAEGNSKF<br>TYTVLEDGCTKHTGEWSKTVFEYRTRKAVRLPIVDIAPYDIGGPDQEFGVDVGPVCF | Trimerization peptide (Type III) |
| 44 | EPMDFKINTDEIMTSLKSVNGQIESLISPDGSRKNPARNCRDLKFCHPELKSGEYWVDP<br>NQGCKLDAIKVFCNMETGETCISANPLNVPRKRWWTDSSAEKKHVWFGESMDGGFQFSY<br>GNPELPEDVLDVQLAFLRLLSSRASQNITYHCKNSIAYMDQASGNVKKALKLMGSNEGE<br>FKAEGNSKFTYTVLEDGCTKHTGEWSKTVFEYRTRKAVRLPIVDIAPYDIGGPDQEFGV<br>DVGPVCFL | Trimerization peptide (Type III) |
| 45 | SEPMDFKINTDEIMTSLKSVNGQIESLISPDGSRKNPARNCRDLKFCHPELKSGEYWVD<br>PNQGCKLDAIKVFCNMETGETCISANPLNVPRKHWWTDSSAEKKHVWFGESMDGGFQFS<br>YGNPELPEDVLDVQLAFLRLLSSRASQNITYHCKNSIAYMDQASGNVKKALKLMGSNEG<br>EFKAEGNSKFTYTVLEDGCTKHTGEWSKTVFEYRTRKAVRLPIVDIAPYDIGGPDQEFG<br>VDVGPVCFL | Trimerization peptide (Type III) |
| 46 | RSEPMDFKINTDEIMTSLKSVNGQIESLISPDGSRKNPARNCRDLKFCHPELKSGEYWV<br>DPNQGCKLDAIKVFCNMETGETCISANPLNVPRKHWWTDSSAEKKHVWFGESMDGGFQF<br>SYGNPELPEDVLDVQLAFLRLLSSRASQNITYRCKNSIAYMDQASGNVKKALKLMGSNE<br>GEFKAEGNSKFTYTVLEDGCTKHTGEWSKTVFEYRTRKAVRLPIVDIAPYDIGGPDQEF<br>GVDVGPVCFL | Trimerization peptide (Type III) |

The invention claimed is:

1. A method for preventing infection by an HIV in a mammal, comprising immunizing a mammal with an effective amount of a recombinant subunit vaccine comprising a soluble HIV viral surface antigen joined by in-frame fusion to a collagen to form a disulfide bond-linked trimeric fusion protein.

2. The method of claim 1, wherein the HIV is an HIV-1, wherein the HIV-1 is a tier 1B, tier 1A, tier 2, or tier 3 virus.

3. The method of claim 1, wherein the HIV viral surface antigen comprises a gp120 protein or a fragment or epitope thereof.

4. The method of claim 3, wherein the gp120 protein peptide comprises an outer domain subunit peptide, an inner domain subunit peptide, or any combination thereof, and wherein the protein comprises three recombinant polypeptides.

5. The method of claim 3, wherein the gp120 protein peptide comprises one, two, three, four, or five C regions, and one, two, three, four, or five variable regions, optionally separated by a bridging sheet.

6. The method of claim 1, wherein the HIV viral surface antigen comprises a mutated gp120 protein.

7. The method of claim 1, wherein the fusion protein comprises a sequence selected from sequences set forth in SEQ ID NOs: 1-18, and any combination thereof.

8. The method of claim 1, wherein the fusion protein comprises a first sequence set forth in any of SEQ ID NOs: 19-30 linked to a second sequence set forth in any of SEQ ID NOs: 31-46, wherein the C terminus of the first sequence is directly or indirectly linked to the N terminus of the second sequence.

9. The method of claim 1, wherein the recombinant subunit vaccine is administered via intramuscular injection.

10. The method of claim 1, wherein the recombinant subunit vaccine is administered via intra-nasal spray.

11. The method of claim 1, wherein the recombinant subunit vaccine is administered in a single dose or a series of doses separated by intervals of weeks or months.

12. The method of claim 1, wherein the recombinant subunit vaccine is administered without adjuvant.

13. The method of claim 1, wherein the recombinant subunit vaccine is administered with an adjuvant.

14. The method of claim 1, wherein the recombinant subunit vaccine is administered with more than one adjuvant.

15. A method for detecting antibodies to an HIV from sera of a mammal comprising the step of contacting the sera with a soluble HIV viral surface antigen joined by in-frame fusion to a portion of collagen to form a disulfide bond-linked trimeric fusion protein.

16. The method of claim 15, wherein the soluble HIV viral surface antigen is a gp120 protein or peptide.

17. A method of using a recombinant subunit vaccine comprising a soluble surface antigen from an HIV, which is joined by in-frame fusion to a C-terminal portion of collagen to form a disulfide bond-linked trimeric fusion protein, the method comprising: immunize a mammal, purifying the neutralizing antibody generated, and treating patients infected by the said HIV via passive immunization using said neutralizing antibody.

18. The method of claim 17, wherein the neutralizing antibody comprises polyclonal antibodies or a monoclonal antibody.

19. A recombinant subunit vaccine comprising a soluble HIV viral surface antigen joined by in-frame fusion to a C-terminal portion of a collagen to form a disulfide bond-linked trimeric fusion protein.

20. The recombinant subunit vaccine of claim 19, wherein the HIV viral surface antigen comprises a gp120 protein or a fragment or epitope thereof.

* * * * *

SEQUENCE LISTING

<160> NUMBER OF SEQ ID NOS: 46

<210> SEQ ID NO 1
<211> LENGTH: 822
<212> TYPE: PRT
<213> ORGANISM: Artificial Sequence
<220> FEATURE:
<223> OTHER INFORMATION: Synthetic construct

<400> SEQUENCE: 1

```
Met Arg Val Lys Gly Ile Arg Arg Asn Cys Gln His Ser Trp Arg Trp
1               5                   10                  15

Gly Thr Thr Leu Thr Met Leu Leu Gly Ile Leu Met Ile Cys Arg Ala
            20                  25                  30

Ala Glu Gln Leu Trp Val Thr Val Tyr Tyr Gly Val Pro Val Trp Arg
        35                  40                  45

Glu Ala Lys Thr Thr Leu Phe Cys Ala Ser Asp Ala Lys Ala Tyr Asp
    50                  55                  60

Thr Glu Val His Asn Val Trp Ala Thr His Ala Cys Val Pro Thr Asp
65                  70                  75                  80

Pro Asn Pro Gln Glu Leu Val Leu Val Asn Val Thr Glu Asn Phe Asn
                85                  90                  95

Ala Trp Glu Asn Asn Met Val Glu Gln Met His Glu Asp Ile Ile Ser
            100                 105                 110

Leu Trp Asp Gln Ser Leu Lys Pro Cys Val Lys Leu Thr Pro Leu Cys
        115                 120                 125

Val Thr Leu Asn Cys Asn Asp Leu Asn Thr Thr Thr Ser Asn Thr Thr
    130                 135                 140

Gly Thr Glu Gly Leu Thr Met Asp Lys Gly Glu Met Lys Asn Cys Ser
145                 150                 155                 160

Phe Asn Ile Thr Thr Asp Ile Ser Asn Lys Lys Gln Lys Gln Tyr Ala
                165                 170                 175

Leu Phe Tyr Lys Leu Asp Val Val Gln Met Asn Asn Asn Asn Asn Ser
            180                 185                 190

Tyr Arg Leu Ile Ser Cys Asn Thr Ser Val Ile Thr Gln Ala Cys Pro
        195                 200                 205

Lys Val Ser Phe Glu Pro Ile Pro Ile Tyr Tyr Cys Ala Pro Ala Gly
    210                 215                 220

Phe Ala Ile Leu Lys Cys Asn Asp Lys Ser Phe Ser Gly Lys Gly Glu
225                 230                 235                 240

Cys Lys Asn Val Ser Thr Val Gln Cys Thr His Gly Ile Arg Pro Val
                245                 250                 255

Val Ser Thr Gln Leu Leu Leu Asn Gly Ser Leu Ala Glu Glu Asp Val
            260                 265                 270

Ile Ile Arg Ser Asp Asn Phe Thr Asp Asn Ala Lys Thr Ile Ile Val
        275                 280                 285

Gln Leu Asn Glu Thr Val Asp Ile His Cys Ile Arg Pro Asn Asn Asn
    290                 295                 300

Thr Arg Lys Arg Ile Thr Met Gly Pro Gly Lys Val Tyr Tyr Thr Thr
305                 310                 315                 320

Gly Gln Ile Ile Gly Asp Ile Arg Gln Ala His Cys Asn Leu Ser Glu
                325                 330                 335

Ala Lys Trp Asn Asn Thr Leu Arg Arg Val Val Arg Lys Leu Arg Glu
            340                 345                 350

Lys Phe Asn Lys Thr Ile Val Phe Asn Gln Ser Ser Gly Gly Asp Pro
```

```
                355                 360                 365
Glu Ile Val Met His Thr Phe Asn Cys Gly Gly Glu Phe Phe Tyr Cys
    370                 375                 380

Asn Ser Thr Lys Leu Phe Asn Ser Ile Trp Asp Asn Lys Asp Ser
385                 390                 395                 400

Thr Lys Thr Asn Glu Pro Asn Asp Gly Lys Asn Ile Thr Leu Pro Cys
                405                 410                 415

Arg Ile Lys Gln Ile Ile Asn Met Trp Gln Gly Val Gly Lys Ala Met
                420                 425                 430

Tyr Ala Pro Pro Ile Arg Gly Gln Ile Arg Cys Thr Ser Asn Ile Thr
                435                 440                 445

Gly Leu Leu Leu Thr Arg Asp Gly Gly Lys Asn Asn Gly Thr Asn Gly
            450                 455                 460

Thr Glu Val Phe Arg Pro Gly Gly Gly Asn Met Lys Asp Asn Trp Arg
465                 470                 475                 480

Ser Glu Leu Tyr Lys Tyr Lys Val Val Lys Ile Glu Pro Leu Gly Val
                485                 490                 495

Ala Pro Thr Thr Ala Lys Arg Arg Val Val Gln Arg Glu Lys Arg Arg
                500                 505                 510

Ser Asn Gly Leu Pro Gly Pro Ile Gly Pro Pro Gly Pro Arg Gly Arg
            515                 520                 525

Thr Gly Asp Ala Gly Pro Val Gly Pro Pro Gly Pro Pro Gly Pro Pro
        530                 535                 540

Gly Pro Pro Gly Pro Pro Ser Ala Gly Phe Asp Phe Ser Phe Leu Pro
545                 550                 555                 560

Gln Pro Pro Gln Glu Lys Ala His Asp Gly Gly Arg Tyr Tyr Arg Ala
                565                 570                 575

Asn Asp Ala Asn Val Val Arg Asp Arg Asp Leu Glu Val Asp Thr Thr
            580                 585                 590

Leu Lys Ser Leu Ser Gln Gln Ile Glu Asn Ile Arg Ser Pro Glu Gly
        595                 600                 605

Ser Arg Lys Asn Pro Ala Arg Thr Cys Arg Asp Leu Lys Met Cys His
    610                 615                 620

Ser Asp Trp Lys Ser Gly Glu Tyr Trp Ile Asp Pro Asn Gln Gly Cys
625                 630                 635                 640

Asn Leu Asp Ala Ile Lys Val Phe Cys Asn Met Glu Thr Gly Glu Thr
                645                 650                 655

Cys Val Tyr Pro Thr Gln Pro Ser Val Ala Gln Lys Asn Trp Tyr Ile
                660                 665                 670

Ser Lys Asn Pro Lys Asp Lys Arg His Val Trp Phe Gly Glu Ser Met
            675                 680                 685

Thr Asp Gly Phe Gln Phe Glu Tyr Gly Gly Gln Gly Ser Asp Pro Ala
        690                 695                 700

Asp Val Ala Ile Gln Leu Thr Phe Leu Arg Leu Met Ser Thr Glu Ala
705                 710                 715                 720

Ser Gln Asn Ile Thr Tyr His Cys Lys Asn Ser Val Ala Tyr Met Asp
                725                 730                 735

Gln Gln Thr Gly Asn Leu Lys Lys Ala Leu Leu Leu Lys Gly Ser Asn
            740                 745                 750

Glu Ile Glu Ile Arg Ala Glu Gly Asn Ser Arg Phe Thr Tyr Ser Val
        755                 760                 765

Thr Val Asp Gly Cys Thr Ser His Thr Gly Ala Trp Gly Lys Thr Val
    770                 775                 780
```

```
Ile Glu Tyr Lys Thr Thr Lys Ser Ser Arg Leu Pro Ile Ile Asp Val
785                 790                 795                 800

Ala Pro Leu Asp Val Gly Ala Pro Asp Gln Glu Phe Gly Phe Asp Val
                805                 810                 815

Gly Pro Val Cys Phe Leu
            820

<210> SEQ ID NO 2
<211> LENGTH: 790
<212> TYPE: PRT
<213> ORGANISM: Artificial Sequence
<220> FEATURE:
<223> OTHER INFORMATION: Synthetic construct

<400> SEQUENCE: 2

Ala Glu Gln Leu Trp Val Thr Val Tyr Tyr Gly Val Pro Val Trp Arg
1               5                   10                  15

Glu Ala Lys Thr Thr Leu Phe Cys Ala Ser Asp Ala Lys Ala Tyr Asp
                20                  25                  30

Thr Glu Val His Asn Val Trp Ala Thr His Ala Cys Val Pro Thr Asp
            35                  40                  45

Pro Asn Pro Gln Glu Leu Val Leu Val Asn Val Thr Glu Asn Phe Asn
    50                  55                  60

Ala Trp Glu Asn Asn Met Val Glu Gln Met His Glu Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Asn Cys Asn Asp Leu Asn Thr Thr Thr Ser Asn Thr Thr
            100                 105                 110

Gly Thr Glu Gly Leu Thr Met Asp Lys Gly Glu Met Lys Asn Cys Ser
        115                 120                 125

Phe Asn Ile Thr Thr Asp Ile Ser Asn Lys Lys Gln Lys Gln Tyr Ala
130                 135                 140

Leu Phe Tyr Lys Leu Asp Val Val Gln Met Asn Asn Asn Asn Asn Ser
145                 150                 155                 160

Tyr Arg Leu Ile Ser Cys Asn Thr Ser Val Ile Thr Gln Ala Cys Pro
                165                 170                 175

Lys Val Ser Phe Glu Pro Ile Pro Ile Tyr Tyr Cys Ala Pro Ala Gly
            180                 185                 190

Phe Ala Ile Leu Lys Cys Asn Asp Lys Ser Phe Ser Gly Lys Gly Glu
        195                 200                 205

Cys Lys Asn Val Ser Thr Val Gln Cys Thr His Gly Ile Arg Pro Val
    210                 215                 220

Val Ser Thr Gln Leu Leu Asn Gly Ser Leu Ala Glu Glu Asp Val
225                 230                 235                 240

Ile Ile Arg Ser Asp Asn Phe Thr Asp Asn Ala Lys Thr Ile Ile Val
                245                 250                 255

Gln Leu Asn Glu Thr Val Asp Ile His Cys Ile Arg Pro Asn Asn Asn
            260                 265                 270

Thr Arg Lys Arg Ile Thr Met Gly Pro Gly Lys Val Tyr Tyr Thr Thr
        275                 280                 285

Gly Gln Ile Ile Gly Asp Ile Arg Gln Ala His Cys Asn Leu Ser Glu
    290                 295                 300

Ala Lys Trp Asn Asn Thr Leu Arg Arg Val Val Arg Lys Leu Arg Glu
305                 310                 315                 320
```

```
Lys Phe Asn Lys Thr Ile Val Phe Asn Gln Ser Ser Gly Gly Asp Pro
                325                 330                 335

Glu Ile Val Met His Thr Phe Asn Cys Gly Gly Glu Phe Phe Tyr Cys
                340                 345                 350

Asn Ser Thr Lys Leu Phe Asn Ser Ile Trp Asp Asn Asn Lys Asp Ser
                355                 360                 365

Thr Lys Thr Asn Glu Pro Asn Asp Gly Lys Asn Ile Thr Leu Pro Cys
                370                 375                 380

Arg Ile Lys Gln Ile Ile Asn Met Trp Gln Gly Val Gly Lys Ala Met
385                 390                 395                 400

Tyr Ala Pro Pro Ile Arg Gly Gln Ile Arg Cys Thr Ser Asn Ile Thr
                405                 410                 415

Gly Leu Leu Leu Thr Arg Asp Gly Gly Lys Asn Asn Gly Thr Asn Gly
                420                 425                 430

Thr Glu Val Phe Arg Pro Gly Gly Asn Met Lys Asp Asn Trp Arg
                435                 440                 445

Ser Glu Leu Tyr Lys Tyr Lys Val Val Lys Ile Glu Pro Leu Gly Val
                450                 455                 460

Ala Pro Thr Thr Ala Lys Arg Arg Val Val Gln Arg Glu Lys Arg Arg
465                 470                 475                 480

Ser Asn Gly Leu Pro Gly Pro Ile Gly Pro Pro Gly Pro Arg Gly Arg
                485                 490                 495

Thr Gly Asp Ala Gly Pro Val Gly Pro Pro Gly Pro Pro Gly Pro Pro
                500                 505                 510

Gly Pro Pro Gly Pro Pro Ser Ala Gly Phe Asp Phe Ser Phe Leu Pro
                515                 520                 525

Gln Pro Pro Gln Glu Lys Ala His Asp Gly Gly Arg Tyr Tyr Arg Ala
                530                 535                 540

Asn Asp Ala Asn Val Val Arg Asp Arg Asp Leu Glu Val Asp Thr Thr
545                 550                 555                 560

Leu Lys Ser Leu Ser Gln Gln Ile Glu Asn Ile Arg Ser Pro Glu Gly
                565                 570                 575

Ser Arg Lys Asn Pro Ala Arg Thr Cys Arg Asp Leu Lys Met Cys His
                580                 585                 590

Ser Asp Trp Lys Ser Gly Glu Tyr Trp Ile Asp Pro Asn Gln Gly Cys
                595                 600                 605

Asn Leu Asp Ala Ile Lys Val Phe Cys Asn Met Glu Thr Gly Glu Thr
                610                 615                 620

Cys Val Tyr Pro Thr Gln Pro Ser Val Ala Gln Lys Asn Trp Tyr Ile
625                 630                 635                 640

Ser Lys Asn Pro Lys Asp Lys Arg His Val Trp Phe Gly Glu Ser Met
                645                 650                 655

Thr Asp Gly Phe Gln Phe Glu Tyr Gly Gly Gln Gly Ser Asp Pro Ala
                660                 665                 670

Asp Val Ala Ile Gln Leu Thr Phe Leu Arg Leu Met Ser Thr Glu Ala
                675                 680                 685

Ser Gln Asn Ile Thr Tyr His Cys Lys Asn Ser Val Ala Tyr Met Asp
                690                 695                 700

Gln Gln Thr Gly Asn Leu Lys Lys Ala Leu Leu Leu Lys Gly Ser Asn
705                 710                 715                 720

Glu Ile Glu Ile Arg Ala Glu Gly Asn Ser Arg Phe Thr Tyr Ser Val
                725                 730                 735
```

```
Thr Val Asp Gly Cys Thr Ser His Thr Gly Ala Trp Gly Lys Thr Val
            740                 745                 750

Ile Glu Tyr Lys Thr Thr Lys Ser Ser Arg Leu Pro Ile Ile Asp Val
        755                 760                 765

Ala Pro Leu Asp Val Gly Ala Pro Asp Gln Glu Phe Gly Phe Asp Val
    770                 775                 780

Gly Pro Val Cys Phe Leu
785                 790

<210> SEQ ID NO 3
<211> LENGTH: 819
<212> TYPE: PRT
<213> ORGANISM: Artificial Sequence
<220> FEATURE:
<223> OTHER INFORMATION: Synthetic construct

<400> SEQUENCE: 3

Met Arg Val Met Gly Ile Gln Arg Asn Cys Gln His Leu Phe Arg Trp
1               5                   10                  15

Gly Thr Met Ile Leu Gly Met Ile Ile Cys Ser Ala Ala Glu Asn
            20                  25                  30

Leu Trp Val Thr Val Tyr Tyr Gly Val Pro Val Trp Lys Asp Ala Glu
        35                  40                  45

Thr Thr Leu Phe Cys Ala Ser Asp Ala Lys Ala Tyr Glu Thr Glu Lys
    50                  55                  60

His Asn Val Trp Ala Thr His Ala Cys Val Pro Thr Asp Pro Asn Pro
65                  70                  75                  80

Gln Glu Ile His Leu Glu Asn Val Thr Glu Gly Phe Asn Met Trp Lys
                85                  90                  95

Asn Asn Met Val Glu Gln Met His Thr Asp Ile Ile Ser Leu Trp Asp
            100                 105                 110

Gln Ser Leu Lys Pro Cys Val Lys Leu Thr Pro Leu Cys Val Thr Leu
        115                 120                 125

Gln Cys Thr Asn Val Thr Asn Asn Ile Thr Asp Asp Met Arg Gly Glu
    130                 135                 140

Leu Lys Asn Cys Ser Phe Asn Met Thr Thr Glu Leu Arg Asp Lys Lys
145                 150                 155                 160

Gln Lys Val Tyr Ser Leu Phe Tyr Arg Leu Asp Val Val Gln Ile Asn
                165                 170                 175

Glu Asn Gln Gly Asn Arg Ser Asn Asn Ser Asn Lys Glu Tyr Arg Leu
            180                 185                 190

Ile Asn Cys Asn Thr Ser Ala Ile Thr Gln Ala Cys Pro Lys Val Ser
        195                 200                 205

Phe Glu Pro Ile Pro Ile His Tyr Cys Ala Pro Ala Gly Phe Ala Ile
    210                 215                 220

Leu Lys Cys Lys Asp Lys Lys Phe Asn Gly Thr Gly Pro Cys Pro Ser
225                 230                 235                 240

Val Ser Thr Val Gln Cys Thr His Gly Ile Lys Pro Val Val Ser Thr
                245                 250                 255

Gln Leu Leu Leu Asn Gly Ser Leu Ala Glu Glu Val Met Ile Arg
            260                 265                 270

Ser Glu Asn Ile Thr Asn Asn Ala Lys Asn Ile Leu Val Gln Phe Asn
        275                 280                 285

Thr Pro Val Gln Ile Asn Cys Thr Arg Pro Asn Asn Thr Arg Lys
    290                 295                 300
```

```
Ser Ile Arg Ile Gly Pro Gly Gln Ala Phe Tyr Ala Thr Gly Asp Ile
305                 310                 315                 320

Ile Gly Asp Ile Arg Gln Ala His Cys Thr Val Ser Lys Ala Thr Trp
            325                 330                 335

Asn Glu Thr Leu Gly Lys Val Val Lys Gln Leu Arg Lys His Phe Gly
                340                 345                 350

Asn Asn Thr Ile Ile Arg Phe Ala Asn Ser Ser Gly Gly Asp Leu Glu
            355                 360                 365

Val Thr Thr His Ser Phe Asn Cys Gly Gly Glu Phe Phe Tyr Cys Asn
        370                 375                 380

Thr Ser Gly Leu Phe Asn Ser Thr Trp Ile Ser Asn Thr Ser Val Gln
385                 390                 395                 400

Gly Ser Asn Ser Thr Gly Ser Asn Asp Ser Ile Thr Leu Pro Cys Arg
                405                 410                 415

Ile Lys Gln Ile Ile Asn Met Trp Gln Arg Ile Gly Gln Ala Met Tyr
            420                 425                 430

Ala Pro Pro Ile Gln Gly Val Ile Arg Cys Val Ser Asn Ile Thr Gly
        435                 440                 445

Leu Ile Leu Thr Arg Asp Gly Gly Ser Thr Asn Ser Thr Thr Glu Thr
450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Arg Ala Lys Arg Val Val Gly Arg Glu Lys Arg Ser Asn Gly
            500                 505                 510

Leu Pro Gly Pro Ile Gly Pro Gly Pro Arg Gly Arg Thr Gly Asp
                515                 520                 525

Ala Gly Pro Val Gly Pro Pro Gly Pro Pro Gly Pro Pro Gly Pro Pro
            530                 535                 540

Gly Pro Pro Ser Ala Gly Phe Asp Phe Ser Phe Leu Pro Gln Pro Pro
545                 550                 555                 560

Gln Glu Lys Ala His Asp Gly Gly Arg Tyr Tyr Arg Ala Asn Asp Ala
                565                 570                 575

Asn Val Val Arg Asp Arg Asp Leu Glu Val Asp Thr Thr Leu Lys Ser
            580                 585                 590

Leu Ser Gln Gln Ile Glu Asn Ile Arg Ser Pro Glu Gly Ser Arg Lys
        595                 600                 605

Asn Pro Ala Arg Thr Cys Arg Asp Leu Lys Met Cys His Ser Asp Trp
610                 615                 620

Lys Ser Gly Glu Tyr Trp Ile Asp Pro Asn Gln Gly Cys Asn Leu Asp
625                 630                 635                 640

Ala Ile Lys Val Phe Cys Asn Met Glu Thr Gly Glu Thr Cys Val Tyr
                645                 650                 655

Pro Thr Gln Pro Ser Val Ala Gln Lys Asn Trp Tyr Ile Ser Lys Asn
            660                 665                 670

Pro Lys Asp Lys Arg His Val Trp Phe Gly Glu Ser Met Thr Asp Gly
        675                 680                 685

Phe Gln Phe Glu Tyr Gly Gly Gln Gly Ser Asp Pro Ala Asp Val Ala
    690                 695                 700

Ile Gln Leu Thr Phe Leu Arg Leu Met Ser Thr Glu Ala Ser Gln Asn
705                 710                 715                 720

Ile Thr Tyr His Cys Lys Asn Ser Val Ala Tyr Met Asp Gln Gln Thr
```

-continued

```
                725                 730                 735
Gly Asn Leu Lys Lys Ala Leu Leu Lys Gly Ser Asn Glu Ile Glu
            740                 745                 750

Ile Arg Ala Glu Gly Asn Ser Arg Phe Thr Tyr Ser Val Thr Val Asp
            755                 760                 765

Gly Cys Thr Ser His Thr Gly Ala Trp Gly Lys Thr Val Ile Glu Tyr
770                 775                 780

Lys Thr Thr Lys Ser Ser Arg Leu Pro Ile Ile Asp Val Ala Pro Leu
785                 790                 795                 800

Asp Val Gly Ala Pro Asp Gln Glu Phe Gly Phe Asp Val Gly Pro Val
                805                 810                 815

Cys Phe Leu

<210> SEQ ID NO 4
<211> LENGTH: 790
<212> TYPE: PRT
<213> ORGANISM: Artificial Sequence
<220> FEATURE:
<223> OTHER INFORMATION: Synthetic construct

<400> SEQUENCE: 4

Ala Glu Asn Leu Trp Val Thr Val Tyr Tyr Gly Val Pro Val Trp Lys
1               5                   10                  15

Asp Ala Glu Thr Thr Leu Phe Cys Ala Ser Asp Ala Lys Ala Tyr Glu
            20                  25                  30

Thr Glu Lys His Asn Val Trp Ala Thr His Ala Cys Val Pro Thr Asp
        35                  40                  45

Pro Asn Pro Gln Glu Ile His Leu Glu Asn Val Thr Glu Glu Phe Asn
    50                  55                  60

Met Trp Lys Asn Asn Met Val Glu Gln Met His Thr Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Gln Cys Thr Asn Val Thr Asn Asn Ile Thr Asp Asp Met
            100                 105                 110

Arg Gly Glu Leu Lys Asn Cys Ser Phe Asn Met Thr Thr Glu Leu Arg
        115                 120                 125

Asp Lys Lys Gln Lys Val Tyr Ser Leu Phe Tyr Arg Leu Asp Val Val
    130                 135                 140

Gln Ile Asn Glu Asn Gln Gly Asn Arg Ser Asn Asn Ser Asn Lys Glu
145                 150                 155                 160

Tyr Arg Leu Ile Asn Cys Asn Thr Ser Ala Ile Thr Gln Ala Cys Pro
                165                 170                 175

Lys Val Ser Phe Glu Pro Ile Pro Ile His Tyr Cys Ala Pro Ala Gly
            180                 185                 190

Phe Ala Ile Leu Lys Cys Lys Asp Lys Lys Phe Asn Gly Thr Gly Pro
        195                 200                 205

Cys Pro Ser Val Ser Thr Val Gln Cys Thr His Gly Ile Lys Pro Val
    210                 215                 220

Val Ser Thr Gln Leu Leu Leu Asn Gly Ser Leu Ala Glu Glu Val
225                 230                 235                 240

Met Ile Arg Ser Glu Asn Ile Thr Asn Asn Ala Lys Asn Ile Leu Val
                245                 250                 255

Gln Phe Asn Thr Pro Val Gln Ile Asn Cys Thr Arg Pro Asn Asn Asn
            260                 265                 270
```

```
Thr Arg Lys Ser Ile Arg Ile Gly Pro Gly Gln Ala Phe Tyr Ala Thr
        275                 280                 285
Gly Asp Ile Ile Gly Asp Ile Arg Gln Ala His Cys Thr Val Ser Lys
    290                 295                 300
Ala Thr Trp Asn Glu Thr Leu Gly Lys Val Val Lys Gln Leu Arg Lys
305                 310                 315                 320
His Phe Gly Asn Thr Ile Ile Arg Phe Ala Asn Ser Ser Gly Gly
                325                 330                 335
Asp Leu Glu Val Thr Thr His Ser Phe Asn Cys Gly Gly Glu Phe Phe
            340                 345                 350
Tyr Cys Asn Thr Ser Gly Leu Phe Asn Ser Thr Trp Ile Ser Asn Thr
        355                 360                 365
Ser Val Gln Gly Ser Asn Ser Thr Gly Ser Asn Asp Ser Ile Thr Leu
    370                 375                 380
Pro Cys Arg Ile Lys Gln Ile Ile Asn Met Trp Gln Arg Ile Gly Gln
385                 390                 395                 400
Ala Met Tyr Ala Pro Pro Ile Gln Gly Val Ile Arg Cys Val Ser Asn
                405                 410                 415
Ile Thr Gly Leu Ile Leu Thr Arg Asp Gly Gly Ser Thr Asn Ser Thr
            420                 425                 430
Thr Glu Thr Phe Arg Pro Gly Gly Gly Asp Met Arg Asp Asn Trp Arg
        435                 440                 445
Ser Glu Leu Tyr Lys Tyr Lys Val Val Lys Ile Glu Pro Leu Gly Val
    450                 455                 460
Ala Pro Thr Arg Ala Lys Arg Arg Val Val Gly Arg Glu Lys Arg Arg
465                 470                 475                 480
Ser Asn Gly Leu Pro Gly Pro Ile Gly Pro Pro Gly Pro Arg Gly Arg
                485                 490                 495
Thr Gly Asp Ala Gly Pro Val Gly Pro Pro Gly Pro Pro Gly Pro Pro
            500                 505                 510
Gly Pro Pro Gly Pro Pro Ser Ala Gly Phe Asp Phe Ser Phe Leu Pro
        515                 520                 525
Gln Pro Pro Gln Glu Lys Ala His Asp Gly Gly Arg Tyr Tyr Arg Ala
    530                 535                 540
Asn Asp Ala Asn Val Val Arg Asp Arg Asp Leu Glu Val Asp Thr Thr
545                 550                 555                 560
Leu Lys Ser Leu Ser Gln Gln Ile Glu Asn Ile Arg Ser Pro Glu Gly
                565                 570                 575
Ser Arg Lys Asn Pro Ala Arg Thr Cys Arg Asp Leu Lys Met Cys His
            580                 585                 590
Ser Asp Trp Lys Ser Gly Glu Tyr Trp Ile Asp Pro Asn Gln Gly Cys
        595                 600                 605
Asn Leu Asp Ala Ile Lys Val Phe Cys Asn Met Glu Thr Gly Glu Thr
    610                 615                 620
Cys Val Tyr Pro Thr Gln Pro Ser Val Ala Gln Lys Asn Trp Tyr Ile
625                 630                 635                 640
Ser Lys Asn Pro Lys Asp Lys Arg His Val Trp Phe Gly Glu Ser Met
                645                 650                 655
Thr Asp Gly Phe Gln Phe Glu Tyr Gly Gly Gln Gly Ser Asp Pro Ala
            660                 665                 670
Asp Val Ala Ile Gln Leu Thr Phe Leu Arg Leu Met Ser Thr Glu Ala
        675                 680                 685
```

Ser Gln Asn Ile Thr Tyr His Cys Lys Asn Ser Val Ala Tyr Met Asp
    690                 695                 700

Gln Gln Thr Gly Asn Leu Lys Lys Ala Leu Leu Leu Lys Gly Ser Asn
705                 710                 715                 720

Glu Ile Glu Ile Arg Ala Glu Gly Asn Ser Arg Phe Thr Tyr Ser Val
                725                 730                 735

Thr Val Asp Gly Cys Thr Ser His Thr Gly Ala Trp Gly Lys Thr Val
            740                 745                 750

Ile Glu Tyr Lys Thr Thr Lys Ser Ser Arg Leu Pro Ile Ile Asp Val
        755                 760                 765

Ala Pro Leu Asp Val Gly Ala Pro Asp Gln Glu Phe Gly Phe Asp Val
770                 775                 780

Gly Pro Val Cys Phe Leu
785                 790

<210> SEQ ID NO 5
<211> LENGTH: 819
<212> TYPE: PRT
<213> ORGANISM: Artificial Sequence
<220> FEATURE:
<223> OTHER INFORMATION: Synthetic construct

<400> SEQUENCE: 5

Met Arg Val Thr Glu Ile Arg Lys Ser Tyr Gln His Trp Trp Arg Trp
1               5                   10                  15

Gly Ile Met Leu Leu Gly Ile Leu Met Ile Cys Asn Ala Glu Glu Lys
                20                  25                  30

Leu Trp Val Thr Val Tyr Tyr Gly Val Pro Val Trp Lys Glu Ala Thr
            35                  40                  45

Thr Thr Leu Phe Cys Ala Ser Asp Ala Lys Ala Tyr Asp Thr Glu Val
        50                  55                  60

His Asn Val Trp Ala Thr His Ala Cys Val Pro Thr Asp Pro Asn Pro
65                  70                  75                  80

Gln Glu Val Glu Leu Glu Asn Val Thr Glu Asn Phe Asn Met Trp Lys
                85                  90                  95

Asn Asn Met Val Glu Gln Met His Glu Asp Ile Ile Ser Leu Trp Asp
            100                 105                 110

Gln Ser Leu Lys Pro Cys Val Lys Leu Thr Pro Leu Cys Val Thr Leu
        115                 120                 125

Asn Cys Thr Asp Leu Arg Asn Ala Thr Ser Arg Asn Val Thr Asn Thr
130                 135                 140

Thr Ser Ser Ser Arg Gly Met Val Gly Gly Glu Met Lys Asn Cys
145                 150                 155                 160

Ser Phe Asn Ile Thr Thr Gly Ile Arg Gly Lys Val Gln Lys Glu Tyr
                165                 170                 175

Ala Leu Phe Tyr Glu Leu Asp Ile Val Pro Ile Asp Asn Lys Ile Asp
            180                 185                 190

Arg Tyr Arg Leu Ile Ser Cys Asn Thr Ser Val Ile Thr Gln Ala Cys
        195                 200                 205

Pro Lys Val Ser Phe Glu Pro Ile Pro Ile His Tyr Cys Ala Pro Ala
210                 215                 220

Gly Phe Ala Ile Leu Lys Cys Lys Asp Lys Lys Phe Asn Gly Lys Gly
225                 230                 235                 240

Pro Cys Ser Asn Val Ser Thr Val Gln Cys Thr His Gly Ile Arg Pro
                245                 250                 255

-continued

```
Val Val Ser Thr Gln Leu Leu Leu Asn Gly Ser Leu Ala Glu Glu
            260                 265                 270

Val Val Ile Arg Ser Glu Asn Phe Thr Asn Asn Ala Lys Thr Ile Ile
        275                 280                 285

Val Gln Leu Asn Glu Ser Val Glu Ile Asn Cys Thr Arg Pro Asn Asn
    290                 295                 300

Asn Thr Arg Lys Ser Ile Asn Ile Gly Pro Gly Arg Ala Phe Tyr Thr
305                 310                 315                 320

Thr Gly Glu Ile Ile Gly Asp Ile Arg Gln Ala His Cys Asn Leu Ser
                325                 330                 335

Arg Ala Lys Trp Asn Asp Thr Leu Asn Lys Ile Val Ile Lys Leu Arg
            340                 345                 350

Glu Gln Phe Gly Asn Lys Thr Ile Val Phe Lys His Ser Ser Gly Gly
        355                 360                 365

Asp Pro Glu Ile Val Thr His Ser Phe Asn Cys Gly Gly Glu Phe Phe
    370                 375                 380

Tyr Cys Asn Ser Thr Gln Leu Phe Asn Ser Thr Trp Asn Val Thr Glu
385                 390                 395                 400

Glu Ser Asn Asn Thr Val Glu Asn Asn Thr Ile Thr Leu Pro Cys Arg
                405                 410                 415

Ile Lys Gln Ile Ile Asn Met Trp Gln Glu Val Gly Arg Ala Met Tyr
            420                 425                 430

Ala Pro Pro Ile Arg Gly Gln Ile Arg Cys Ser Ser Asn Ile Thr Gly
        435                 440                 445

Leu Leu Leu Thr Arg Asp Gly Gly Pro Glu Asp Asn Lys Thr Glu Val
    450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Lys Ala Lys Arg Arg Val Val Gln Arg Glu Lys Arg Arg Ser Asn Gly
            500                 505                 510

Leu Pro Gly Pro Ile Gly Pro Pro Gly Pro Arg Gly Arg Thr Gly Asp
        515                 520                 525

Ala Gly Pro Val Gly Pro Pro Gly Pro Pro Gly Pro Pro Gly Pro Pro
    530                 535                 540

Gly Pro Pro Ser Ala Gly Phe Asp Phe Ser Phe Leu Pro Gln Pro Pro
545                 550                 555                 560

Gln Glu Lys Ala His Asp Gly Gly Arg Tyr Tyr Arg Ala Asn Asp Ala
                565                 570                 575

Asn Val Val Arg Asp Arg Asp Leu Glu Val Asp Thr Thr Leu Lys Ser
            580                 585                 590

Leu Ser Gln Gln Ile Glu Asn Ile Arg Ser Pro Glu Gly Ser Arg Lys
        595                 600                 605

Asn Pro Ala Arg Thr Cys Arg Asp Leu Lys Met Cys His Ser Asp Trp
    610                 615                 620

Lys Ser Gly Glu Tyr Trp Ile Asp Pro Asn Gln Gly Cys Asn Leu Asp
625                 630                 635                 640

Ala Ile Lys Val Phe Cys Asn Met Glu Thr Gly Glu Thr Cys Val Tyr
                645                 650                 655

Pro Thr Gln Pro Ser Val Ala Gln Lys Asn Trp Tyr Ile Ser Lys Asn
            660                 665                 670

Pro Lys Asp Lys Arg His Val Trp Phe Gly Glu Ser Met Thr Asp Gly
```

```
            675                 680                 685
Phe Gln Phe Glu Tyr Gly Gly Gln Gly Ser Asp Pro Ala Asp Val Ala
    690                 695                 700
Ile Gln Leu Thr Phe Leu Arg Leu Met Ser Thr Glu Ala Ser Gln Asn
705                 710                 715                 720
Ile Thr Tyr His Cys Lys Asn Ser Val Ala Tyr Met Asp Gln Gln Thr
                725                 730                 735
Gly Asn Leu Lys Lys Ala Leu Leu Leu Lys Gly Ser Asn Glu Ile Glu
            740                 745                 750
Ile Arg Ala Glu Gly Asn Ser Arg Phe Thr Tyr Ser Val Thr Val Asp
        755                 760                 765
Gly Cys Thr Ser His Thr Gly Ala Trp Gly Lys Thr Val Ile Glu Tyr
    770                 775                 780
Lys Thr Thr Lys Ser Ser Arg Leu Pro Ile Ile Asp Val Ala Pro Leu
785                 790                 795                 800
Asp Val Gly Ala Pro Asp Gln Glu Phe Gly Phe Asp Val Gly Pro Val
                805                 810                 815
Cys Phe Leu

<210> SEQ ID NO 6
<211> LENGTH: 790
<212> TYPE: PRT
<213> ORGANISM: Artificial Sequence
<220> FEATURE:
<223> OTHER INFORMATION: Synthetic construct

<400> SEQUENCE: 6

Glu Glu Lys Leu Trp Val Thr Val Tyr Tyr Gly Val Pro Val Trp Lys
1               5                   10                  15
Glu Ala Thr Thr Thr Leu Phe Cys Ala Ser Asp Ala Lys Ala Tyr Asp
            20                  25                  30
Thr Glu Val His Asn Val Trp Ala Thr His Ala Cys Val Pro Thr Asp
        35                  40                  45
Pro Asn Pro Gln Glu Val Glu Leu Glu Asn Val Thr Glu Asn Phe Asn
    50                  55                  60
Met Trp Lys Asn Asn Met Val Glu Gln Met His Glu Asp Ile Ile Ser
65                  70                  75                  80
Leu Trp Asp Gln Ser Leu Lys Pro Cys Val Lys Leu Thr Pro Leu Cys
                85                  90                  95
Val Thr Leu Asn Cys Thr Asp Leu Arg Asn Ala Thr Ser Arg Asn Val
            100                 105                 110
Thr Asn Thr Thr Ser Ser Arg Gly Met Val Gly Gly Gly Glu Met
            115                 120                 125
Lys Asn Cys Ser Phe Asn Ile Thr Thr Gly Ile Arg Gly Lys Val Gln
    130                 135                 140
Lys Glu Tyr Ala Leu Phe Tyr Glu Leu Asp Ile Val Pro Ile Asp Asn
145                 150                 155                 160
Lys Ile Asp Arg Tyr Arg Leu Ile Ser Cys Asn Thr Ser Val Ile Thr
                165                 170                 175
Gln Ala Cys Pro Lys Val Ser Phe Glu Pro Ile Pro Ile His Tyr Cys
            180                 185                 190
Ala Pro Ala Gly Phe Ala Ile Leu Lys Cys Lys Asp Lys Lys Phe Asn
        195                 200                 205
Gly Lys Gly Pro Cys Ser Asn Val Ser Thr Val Gln Cys Thr His Gly
    210                 215                 220
```

```
Ile Arg Pro Val Val Ser Thr Gln Leu Leu Leu Asn Gly Ser Leu Ala
225                 230                 235                 240

Glu Glu Glu Val Val Ile Arg Ser Glu Asn Phe Thr Asn Asn Ala Lys
                245                 250                 255

Thr Ile Ile Val Gln Leu Asn Glu Ser Val Glu Ile Asn Cys Thr Arg
            260                 265                 270

Pro Asn Asn Asn Thr Arg Lys Ser Ile Asn Ile Gly Pro Gly Arg Ala
        275                 280                 285

Phe Tyr Thr Thr Gly Glu Ile Ile Gly Asp Ile Arg Gln Ala His Cys
    290                 295                 300

Asn Leu Ser Arg Ala Lys Trp Asn Asp Thr Leu Asn Lys Ile Val Ile
305                 310                 315                 320

Lys Leu Arg Glu Gln Phe Gly Asn Lys Thr Ile Val Phe Lys His Ser
                325                 330                 335

Ser Gly Gly Asp Pro Glu Ile Val Thr His Ser Phe Asn Cys Gly Gly
            340                 345                 350

Glu Phe Phe Tyr Cys Asn Ser Thr Gln Leu Phe Asn Ser Thr Trp Asn
        355                 360                 365

Val Thr Glu Glu Ser Asn Asn Thr Val Glu Asn Asn Thr Ile Thr Leu
    370                 375                 380

Pro Cys Arg Ile Lys Gln Ile Ile Asn Met Trp Gln Glu Val Gly Arg
385                 390                 395                 400

Ala Met Tyr Ala Pro Pro Ile Arg Gly Gln Ile Arg Cys Ser Ser Asn
                405                 410                 415

Ile Thr Gly Leu Leu Leu Thr Arg Asp Gly Gly Pro Glu Asp Asn Lys
            420                 425                 430

Thr Glu Val Phe Arg Pro Gly Gly Gly Asp Met Arg Asp Asn Trp Arg
        435                 440                 445

Ser Glu Leu Tyr Lys Tyr Lys Val Val Lys Ile Glu Pro Leu Gly Val
    450                 455                 460

Ala Pro Thr Lys Ala Lys Arg Arg Val Val Gln Arg Glu Lys Arg Arg
465                 470                 475                 480

Ser Asn Gly Leu Pro Gly Pro Ile Gly Pro Pro Gly Pro Arg Gly Arg
                485                 490                 495

Thr Gly Asp Ala Gly Pro Val Gly Pro Pro Gly Pro Pro Gly Pro Pro
            500                 505                 510

Gly Pro Pro Gly Pro Pro Ser Ala Gly Phe Asp Phe Ser Phe Leu Pro
        515                 520                 525

Gln Pro Pro Gln Glu Lys Ala His Asp Gly Gly Arg Tyr Tyr Arg Ala
    530                 535                 540

Asn Asp Ala Asn Val Val Arg Asp Arg Asp Leu Glu Val Asp Thr Thr
545                 550                 555                 560

Leu Lys Ser Leu Ser Gln Gln Ile Glu Asn Ile Arg Ser Pro Glu Gly
                565                 570                 575

Ser Arg Lys Asn Pro Ala Arg Thr Cys Arg Asp Leu Lys Met Cys His
            580                 585                 590

Ser Asp Trp Lys Ser Gly Glu Tyr Trp Ile Asp Pro Asn Gln Gly Cys
        595                 600                 605

Asn Leu Asp Ala Ile Lys Val Phe Cys Asn Met Glu Thr Gly Glu Thr
    610                 615                 620

Cys Val Tyr Pro Thr Gln Pro Ser Val Ala Gln Lys Asn Trp Tyr Ile
625                 630                 635                 640
```

```
Ser Lys Asn Pro Lys Asp Lys Arg His Val Trp Phe Gly Glu Ser Met
             645                 650                 655

Thr Asp Gly Phe Gln Phe Glu Tyr Gly Gly Gln Gly Ser Asp Pro Ala
             660                 665                 670

Asp Val Ala Ile Gln Leu Thr Phe Leu Arg Leu Met Ser Thr Glu Ala
             675                 680                 685

Ser Gln Asn Ile Thr Tyr His Cys Lys Asn Ser Val Ala Tyr Met Asp
690                 695                 700

Gln Gln Thr Gly Asn Leu Lys Lys Ala Leu Leu Leu Lys Gly Ser Asn
705                 710                 715                 720

Glu Ile Glu Ile Arg Ala Glu Gly Asn Ser Arg Phe Thr Tyr Ser Val
                725                 730                 735

Thr Val Asp Gly Cys Thr Ser His Thr Gly Ala Trp Gly Lys Thr Val
            740                 745                 750

Ile Glu Tyr Lys Thr Thr Lys Ser Ser Arg Leu Pro Ile Ile Asp Val
            755                 760                 765

Ala Pro Leu Asp Val Gly Ala Pro Asp Gln Glu Phe Gly Phe Asp Val
        770                 775                 780

Gly Pro Val Cys Phe Leu
785                 790

<210> SEQ ID NO 7
<211> LENGTH: 724
<212> TYPE: PRT
<213> ORGANISM: Artificial Sequence
<220> FEATURE:
<223> OTHER INFORMATION: Synthetic construct

<400> SEQUENCE: 7

Met Arg Val Thr Glu Ile Arg Lys Ser Tyr Gln His Trp Trp Arg Trp
1               5                   10                  15

Gly Ile Met Leu Leu Gly Ile Leu Met Ile Cys Asn Ala Glu Glu Lys
            20                  25                  30

Leu Trp Val Thr Val Tyr Tyr Gly Val Pro Val Trp Lys Glu Ala Thr
        35                  40                  45

Thr Thr Leu Phe Cys Ala Ser Asp Ala Lys Ala Tyr Asp Thr Glu Val
    50                  55                  60

His Asn Val Trp Ala Thr His Ala Cys Val Pro Thr Asp Pro Asn Pro
65                  70                  75                  80

Gln Glu Val Glu Leu Glu Asn Val Thr Glu Asn Phe Asn Met Trp Lys
                85                  90                  95

Asn Asn Met Val Glu Gln Met His Glu Asp Ile Ile Ser Leu Trp Asp
            100                 105                 110

Gln Ser Leu Lys Pro Cys Val Lys Leu Thr Pro Leu Cys Val Thr Leu
        115                 120                 125

Asn Cys Thr Asp Leu Arg Asn Ala Thr Ser Arg Asn Val Thr Asn Thr
    130                 135                 140

Thr Ser Ser Ser Arg Gly Met Val Gly Gly Glu Met Lys Asn Cys
145                 150                 155                 160

Ser Phe Asn Ile Thr Thr Gly Ile Arg Gly Lys Val Gln Lys Glu Tyr
                165                 170                 175

Ala Leu Phe Tyr Glu Leu Asp Ile Val Pro Ile Asp Asn Lys Ile Asp
            180                 185                 190

Arg Tyr Arg Leu Ile Ser Cys Asn Thr Ser Val Ile Thr Gln Ala Cys
        195                 200                 205
```

-continued

```
Pro Lys Val Ser Phe Glu Pro Ile Pro Ile His Tyr Cys Ala Pro Ala
    210                 215                 220
Gly Phe Ala Ile Leu Lys Cys Lys Asp Lys Lys Phe Asn Gly Lys Gly
225                 230                 235                 240
Pro Cys Ser Asn Val Ser Thr Val Gln Cys Thr His Gly Ile Arg Pro
                245                 250                 255
Val Val Ser Thr Gln Leu Leu Leu Asn Gly Ser Leu Ala Glu Glu Glu
            260                 265                 270
Val Val Ile Arg Ser Glu Asn Phe Thr Asn Asn Ala Lys Thr Ile Ile
        275                 280                 285
Val Gln Leu Asn Glu Ser Val Glu Ile Asn Cys Thr Arg Pro Asn Asn
290                 295                 300
Asn Thr Arg Lys Ser Ile Asn Ile Gly Pro Gly Arg Ala Phe Tyr Thr
305                 310                 315                 320
Thr Gly Glu Ile Ile Gly Asp Ile Arg Gln Ala His Cys Asn Leu Ser
                325                 330                 335
Arg Ala Lys Trp Asn Asp Thr Leu Asn Lys Ile Val Ile Lys Leu Arg
            340                 345                 350
Glu Gln Phe Gly Asn Lys Thr Ile Val Phe Lys His Ser Ser Gly Gly
        355                 360                 365
Asp Pro Glu Ile Val Thr His Ser Phe Asn Cys Gly Gly Glu Phe Phe
370                 375                 380
Tyr Cys Asn Ser Thr Gln Leu Phe Asn Ser Thr Trp Asn Val Thr Glu
385                 390                 395                 400
Glu Ser Asn Asn Thr Val Glu Asn Asn Thr Ile Thr Leu Pro Cys Arg
                405                 410                 415
Ile Lys Gln Ile Ile Asn Met Trp Gln Glu Val Gly Arg Ala Met Tyr
            420                 425                 430
Ala Pro Pro Ile Arg Gly Gln Ile Arg Cys Ser Ser Asn Ile Thr Gly
        435                 440                 445
Leu Leu Leu Thr Arg Asp Gly Gly Pro Glu Asp Asn Lys Thr Glu Val
450                 455                 460
Phe Arg Pro Gly Gly Gly Asp Met Arg Asp Asn Trp Arg Ser Ser Glu
465                 470                 475                 480
Pro Met Asp Phe Lys Ile Asn Thr Asp Glu Ile Met Thr Ser Leu Lys
                485                 490                 495
Ser Val Asn Gly Gln Ile Glu Ser Leu Ile Ser Pro Asp Gly Ser Arg
            500                 505                 510
Lys Asn Pro Ala Arg Asn Cys Arg Asp Leu Lys Phe Cys His Pro Glu
        515                 520                 525
Leu Lys Ser Gly Glu Tyr Trp Val Asp Pro Asn Gln Gly Cys Lys Leu
530                 535                 540
Asp Ala Ile Lys Val Phe Cys Asn Met Glu Thr Gly Glu Thr Cys Ile
545                 550                 555                 560
Ser Ala Asn Pro Leu Asn Val Pro Arg Lys His Trp Trp Thr Asp Ser
                565                 570                 575
Ser Ala Glu Lys Lys His Val Trp Phe Gly Glu Ser Met Asp Gly Gly
            580                 585                 590
Phe Gln Phe Ser Tyr Gly Asn Pro Glu Leu Pro Glu Asp Val Leu Asp
        595                 600                 605
Val Gln Leu Ala Phe Leu Arg Leu Leu Ser Ser Arg Ala Ser Gln Asn
610                 615                 620
Ile Thr Tyr His Cys Lys Asn Ser Ile Ala Tyr Met Asp Gln Ala Ser
```

```
                625                 630                 635                 640
Gly Asn Val Lys Lys Ala Leu Lys Leu Met Gly Ser Asn Glu Gly Glu
                    645                 650                 655
Phe Lys Ala Glu Gly Asn Ser Lys Phe Thr Tyr Thr Val Leu Glu Asp
                660                 665                 670
Gly Cys Thr Lys His Thr Gly Glu Trp Ser Lys Thr Val Phe Glu Tyr
                675                 680                 685
Arg Thr Arg Lys Ala Val Arg Leu Pro Ile Val Asp Ile Ala Pro Tyr
            690                 695                 700
Asp Ile Gly Gly Pro Asp Gln Glu Phe Gly Val Asp Val Gly Pro Val
705                 710                 715                 720
Cys Phe Leu Leu

<210> SEQ ID NO 8
<211> LENGTH: 695
<212> TYPE: PRT
<213> ORGANISM: Artificial Sequence
<220> FEATURE:
<223> OTHER INFORMATION: Synthetic construct

<400> SEQUENCE: 8

Glu Glu Lys Leu Trp Val Thr Val Tyr Tyr Gly Val Pro Val Trp Lys
1               5                   10                  15
Glu Ala Thr Thr Thr Leu Phe Cys Ala Ser Asp Ala Lys Ala Tyr Asp
            20                  25                  30
Thr Glu Val His Asn Val Trp Ala Thr His Ala Cys Val Pro Thr Asp
        35                  40                  45
Pro Asn Pro Gln Glu Val Glu Leu Glu Asn Val Thr Glu Asn Phe Asn
    50                  55                  60
Met Trp Lys Asn Asn Met Val Glu Gln Met His Glu Asp Ile Ile Ser
65                  70                  75                  80
Leu Trp Asp Gln Ser Leu Lys Pro Cys Val Lys Leu Thr Pro Leu Cys
                85                  90                  95
Val Thr Leu Asn Cys Thr Asp Leu Arg Asn Ala Thr Ser Arg Asn Val
            100                 105                 110
Thr Asn Thr Thr Ser Ser Ser Arg Gly Met Val Gly Gly Gly Glu Met
        115                 120                 125
Lys Asn Cys Ser Phe Asn Ile Thr Thr Gly Ile Arg Gly Lys Val Gln
    130                 135                 140
Lys Glu Tyr Ala Leu Phe Tyr Glu Leu Asp Ile Val Pro Ile Asp Asn
145                 150                 155                 160
Lys Ile Asp Arg Tyr Arg Leu Ile Ser Cys Asn Thr Ser Val Ile Thr
                165                 170                 175
Gln Ala Cys Pro Lys Val Ser Phe Glu Pro Ile Pro Ile His Tyr Cys
            180                 185                 190
Ala Pro Ala Gly Phe Ala Ile Leu Lys Cys Lys Asp Lys Lys Phe Asn
        195                 200                 205
Gly Lys Gly Pro Cys Ser Asn Val Ser Thr Val Gln Cys Thr His Gly
    210                 215                 220
Ile Arg Pro Val Val Ser Thr Gln Leu Leu Asn Gly Ser Leu Ala
225                 230                 235                 240
Glu Glu Glu Val Val Ile Arg Ser Glu Asn Phe Thr Asn Asn Ala Lys
                245                 250                 255
Thr Ile Ile Val Gln Leu Asn Glu Ser Val Glu Ile Asn Cys Thr Arg
            260                 265                 270
```

```
Pro Asn Asn Asn Thr Arg Lys Ser Ile Asn Ile Gly Pro Gly Arg Ala
        275                 280                 285

Phe Tyr Thr Thr Gly Glu Ile Ile Gly Asp Ile Arg Gln Ala His Cys
    290                 295                 300

Asn Leu Ser Arg Ala Lys Trp Asn Asp Thr Leu Asn Lys Ile Val Ile
305                 310                 315                 320

Lys Leu Arg Glu Gln Phe Gly Asn Lys Thr Ile Val Phe Lys His Ser
                325                 330                 335

Ser Gly Gly Asp Pro Glu Ile Val Thr His Ser Phe Asn Cys Gly Gly
            340                 345                 350

Glu Phe Phe Tyr Cys Asn Ser Thr Gln Leu Phe Asn Ser Thr Trp Asn
        355                 360                 365

Val Thr Glu Glu Ser Asn Asn Thr Val Glu Asn Asn Thr Ile Thr Leu
    370                 375                 380

Pro Cys Arg Ile Lys Gln Ile Ile Asn Met Trp Gln Glu Val Gly Arg
385                 390                 395                 400

Ala Met Tyr Ala Pro Pro Ile Arg Gly Gln Ile Arg Cys Ser Ser Asn
                405                 410                 415

Ile Thr Gly Leu Leu Leu Thr Arg Asp Gly Gly Pro Glu Asp Asn Lys
            420                 425                 430

Thr Glu Val Phe Arg Pro Gly Gly Gly Asp Met Arg Asp Asn Trp Arg
        435                 440                 445

Ser Ser Glu Pro Met Asp Phe Lys Ile Asn Thr Asp Glu Ile Met Thr
    450                 455                 460

Ser Leu Lys Ser Val Asn Gly Gln Ile Glu Ser Leu Ile Ser Pro Asp
465                 470                 475                 480

Gly Ser Arg Lys Asn Pro Ala Arg Asn Cys Arg Asp Leu Lys Phe Cys
                485                 490                 495

His Pro Glu Leu Lys Ser Gly Glu Tyr Trp Val Asp Pro Asn Gln Gly
            500                 505                 510

Cys Lys Leu Asp Ala Ile Lys Val Phe Cys Asn Met Glu Thr Gly Glu
        515                 520                 525

Thr Cys Ile Ser Ala Asn Pro Leu Asn Val Pro Arg Lys His Trp Trp
    530                 535                 540

Thr Asp Ser Ser Ala Glu Lys Lys His Val Trp Phe Gly Glu Ser Met
545                 550                 555                 560

Asp Gly Gly Phe Gln Phe Ser Tyr Gly Asn Pro Glu Leu Pro Glu Asp
                565                 570                 575

Val Leu Asp Val Gln Leu Ala Phe Leu Arg Leu Leu Ser Ser Arg Ala
            580                 585                 590

Ser Gln Asn Ile Thr Tyr His Cys Lys Asn Ser Ile Ala Tyr Met Asp
        595                 600                 605

Gln Ala Ser Gly Asn Val Lys Lys Ala Leu Lys Leu Met Gly Ser Asn
    610                 615                 620

Glu Gly Glu Phe Lys Ala Glu Gly Asn Ser Lys Phe Thr Tyr Thr Val
625                 630                 635                 640

Leu Glu Asp Gly Cys Thr Lys His Thr Gly Glu Trp Ser Lys Thr Val
                645                 650                 655

Phe Glu Tyr Arg Thr Arg Lys Ala Val Arg Leu Pro Ile Val Asp Ile
            660                 665                 670

Ala Pro Tyr Asp Ile Gly Gly Pro Asp Gln Glu Phe Gly Val Asp Val
        675                 680                 685
```

-continued

Gly Pro Val Cys Phe Leu Leu
    690             695

<210> SEQ ID NO 9
<211> LENGTH: 805
<212> TYPE: PRT
<213> ORGANISM: Artificial Sequence
<220> FEATURE:
<223> OTHER INFORMATION: Synthetic construct

<400> SEQUENCE: 9

Met Arg Val Met Gly Ile Gln Arg Asn Tyr Pro Gln Trp Trp Ile Trp
1               5                   10                  15

Ser Met Leu Gly Phe Trp Met Leu Met Ile Cys Asn Gly Met Trp Val
            20                  25                  30

Thr Val Tyr Tyr Gly Val Pro Val Trp Lys Glu Ala Lys Thr Thr Leu
        35                  40                  45

Phe Cys Ala Ser Asp Ala Lys Ala Tyr Glu Lys Glu Val His Asn Val
    50                  55                  60

Trp Ala Thr His Ala Cys Val Pro Thr Asp Pro Asn Pro Gln Glu Met
65                  70                  75                  80

Val Leu Lys Asn Val Thr Glu Asn Phe Asn Met Trp Lys Asn Asp Met
                85                  90                  95

Val Asp Gln Met His Glu Asp Val Ile Ser Leu Trp Asp Gln Ser Leu
            100                 105                 110

Lys Pro Cys Val Lys Leu Thr Pro Leu Cys Val Thr Leu Asn Cys Thr
        115                 120                 125

Asn Ala Thr Ala Ser Asn Ser Ser Ile Ile Glu Gly Met Lys Asn Cys
    130                 135                 140

Ser Phe Asn Ile Thr Thr Glu Leu Arg Asp Lys Arg Glu Lys Lys Asn
145                 150                 155                 160

Ala Leu Phe Tyr Lys Leu Asp Ile Val Gln Leu Asp Gly Asn Ser Ser
                165                 170                 175

Gln Tyr Arg Leu Ile Asn Cys Asn Thr Ser Val Ile Thr Gln Ala Cys
            180                 185                 190

Pro Lys Val Ser Phe Asp Pro Ile Pro Ile His Tyr Cys Ala Pro Ala
        195                 200                 205

Gly Tyr Ala Ile Leu Lys Cys Asn Asn Lys Thr Phe Thr Gly Thr Gly
    210                 215                 220

Pro Cys Asn Asn Val Ser Thr Val Gln Cys Thr His Gly Ile Lys Pro
225                 230                 235                 240

Val Val Ser Thr Gln Leu Leu Leu Asn Gly Ser Leu Ala Glu Gly Glu
                245                 250                 255

Ile Ile Ile Arg Ser Glu Asn Ile Thr Asn Asn Val Lys Thr Ile Ile
            260                 265                 270

Val His Leu Asn Glu Ser Val Lys Ile Glu Cys Thr Arg Pro Asn Asn
        275                 280                 285

Lys Thr Arg Thr Ser Ile Arg Ile Gly Pro Gly Gln Ala Phe Tyr Ala
    290                 295                 300

Thr Gly Gln Val Ile Gly Asp Ile Arg Glu Ala Tyr Cys Asn Ile Asn
305                 310                 315                 320

Glu Ser Lys Trp Asn Glu Thr Leu Gln Arg Val Ser Lys Lys Leu Lys
                325                 330                 335

Glu Tyr Phe Pro His Lys Asn Ile Thr Phe Gln Pro Ser Ser Gly Gly
            340                 345                 350

-continued

Asp Leu Glu Ile Thr Thr His Ser Phe Asn Cys Gly Glu Phe Phe
            355                 360                 365

Tyr Cys Asn Thr Ser Ser Leu Phe Asn Arg Thr Tyr Met Ala Asn Ser
370                 375                 380

Thr Asp Met Ala Asn Ser Thr Glu Thr Asn Ser Thr Arg Thr Ile Thr
385                 390                 395                 400

Ile His Cys Arg Ile Lys Gln Ile Ile Asn Met Trp Gln Glu Val Gly
                405                 410                 415

Arg Ala Met Tyr Ala Pro Pro Ile Gly Asn Ile Thr Cys Ile Ser
            420                 425                 430

Asn Ile Thr Gly Leu Leu Leu Thr Arg Asp Gly Gly Lys Asn Asn Thr
            435                 440                 445

Glu Thr Phe Arg Pro Gly Gly Gly Asn Met Lys Asp Asn Trp Arg Ser
    450                 455                 460

Glu Leu Tyr Lys Tyr Lys Val Val Glu Val Lys Pro Leu Gly Val Ala
465                 470                 475                 480

Pro Thr Asn Ala Arg Arg Arg Val Val Glu Arg Glu Lys Arg Arg Ser
                485                 490                 495

Asn Gly Leu Pro Gly Pro Ile Gly Pro Pro Gly Pro Arg Gly Arg Thr
                500                 505                 510

Gly Asp Ala Gly Pro Val Gly Pro Gly Pro Pro Gly Pro Pro Gly
            515                 520                 525

Pro Pro Gly Pro Pro Ser Ala Gly Phe Asp Phe Ser Phe Leu Pro Gln
        530                 535                 540

Pro Pro Gln Glu Lys Ala His Asp Gly Gly Arg Tyr Tyr Arg Ala Asn
545                 550                 555                 560

Asp Ala Asn Val Val Arg Asp Arg Asp Leu Glu Val Asp Thr Thr Leu
                565                 570                 575

Lys Ser Leu Ser Gln Gln Ile Glu Asn Ile Arg Ser Pro Glu Gly Ser
            580                 585                 590

Arg Lys Asn Pro Ala Arg Thr Cys Arg Asp Leu Lys Met Cys His Ser
            595                 600                 605

Asp Trp Lys Ser Gly Glu Tyr Trp Ile Asp Pro Asn Gln Gly Cys Asn
    610                 615                 620

Leu Asp Ala Ile Lys Val Phe Cys Asn Met Glu Thr Gly Glu Thr Cys
625                 630                 635                 640

Val Tyr Pro Thr Gln Pro Ser Val Ala Gln Lys Asn Trp Tyr Ile Ser
                645                 650                 655

Lys Asn Pro Lys Asp Lys Arg His Val Trp Phe Gly Glu Ser Met Thr
            660                 665                 670

Asp Gly Phe Gln Phe Glu Tyr Gly Gly Gln Gly Ser Asp Pro Ala Asp
        675                 680                 685

Val Ala Ile Gln Leu Thr Phe Leu Arg Leu Met Ser Thr Glu Ala Ser
    690                 695                 700

Gln Asn Ile Thr Tyr His Cys Lys Asn Ser Val Ala Tyr Met Asp Gln
705                 710                 715                 720

Gln Thr Gly Asn Leu Lys Lys Ala Leu Leu Leu Lys Gly Ser Asn Glu
            725                 730                 735

Ile Glu Ile Arg Ala Glu Gly Asn Ser Arg Phe Thr Tyr Ser Val Thr
                740                 745                 750

Val Asp Gly Cys Thr Ser His Thr Gly Ala Trp Gly Lys Thr Val Ile
        755                 760                 765

Glu Tyr Lys Thr Thr Lys Ser Ser Arg Leu Pro Ile Ile Asp Val Ala

```
                770                 775                 780
Pro Leu Asp Val Gly Ala Pro Asp Gln Glu Phe Gly Phe Asp Val Gly
785                 790                 795                 800

Pro Val Cys Phe Leu
                805

<210> SEQ ID NO 10
<211> LENGTH: 767
<212> TYPE: PRT
<213> ORGANISM: Artificial Sequence
<220> FEATURE:
<223> OTHER INFORMATION: Synthetic construct

<400> SEQUENCE: 10

Pro Val Trp Lys Glu Ala Lys Thr Thr Leu Phe Cys Ala Ser Asp Ala
1               5                   10                  15

Lys Ala Tyr Glu Lys Glu Val His Asn Val Trp Ala Thr His Ala Cys
                20                  25                  30

Val Pro Thr Asp Pro Asn Pro Gln Glu Met Val Leu Lys Asn Val Thr
            35                  40                  45

Glu Asn Phe Asn Met Trp Lys Asn Asp Met Val Asp Gln Met His Glu
        50                  55                  60

Asp Val Ile Ser Leu Trp Asp Gln Ser Leu Lys Pro Cys Val Lys Leu
65                  70                  75                  80

Thr Pro Leu Cys Val Thr Leu Asn Cys Thr Asn Ala Thr Ala Ser Asn
                85                  90                  95

Ser Ser Ile Ile Glu Gly Met Lys Asn Cys Ser Phe Asn Ile Thr Thr
            100                 105                 110

Glu Leu Arg Asp Lys Arg Glu Lys Lys Asn Ala Leu Phe Tyr Lys Leu
        115                 120                 125

Asp Ile Val Gln Leu Asp Gly Asn Ser Ser Gln Tyr Arg Leu Ile Asn
130                 135                 140

Cys Asn Thr Ser Val Ile Thr Gln Ala Cys Pro Lys Val Ser Phe Asp
145                 150                 155                 160

Pro Ile Pro Ile His Tyr Cys Ala Pro Ala Gly Tyr Ala Ile Leu Lys
                165                 170                 175

Cys Asn Asn Lys Thr Phe Thr Gly Thr Gly Pro Cys Asn Asn Val Ser
            180                 185                 190

Thr Val Gln Cys Thr His Gly Ile Lys Pro Val Val Ser Thr Gln Leu
        195                 200                 205

Leu Leu Asn Gly Ser Leu Ala Glu Gly Glu Ile Ile Arg Ser Glu
210                 215                 220

Asn Ile Thr Asn Asn Val Lys Thr Ile Ile Val His Leu Asn Glu Ser
225                 230                 235                 240

Val Lys Ile Glu Cys Thr Arg Pro Asn Asn Lys Thr Arg Thr Ser Ile
                245                 250                 255

Arg Ile Gly Pro Gly Gln Ala Phe Tyr Ala Thr Gly Gln Val Ile Gly
            260                 265                 270

Asp Ile Arg Glu Ala Tyr Cys Asn Ile Asn Glu Ser Lys Trp Asn Glu
        275                 280                 285

Thr Leu Gln Arg Val Ser Lys Lys Leu Lys Glu Tyr Phe Pro His Lys
        290                 295                 300

Asn Ile Thr Phe Gln Pro Ser Ser Gly Gly Asp Leu Glu Ile Thr Thr
305                 310                 315                 320

His Ser Phe Asn Cys Gly Gly Glu Phe Phe Tyr Cys Asn Thr Ser Ser
```

```
                         325                 330                 335
Leu Phe Asn Arg Thr Tyr Met Ala Asn Ser Thr Asp Met Ala Asn Ser
                340                 345                 350

Thr Glu Thr Asn Ser Thr Arg Thr Ile Thr Ile His Cys Arg Ile Lys
            355                 360                 365

Gln Ile Ile Asn Met Trp Gln Glu Val Gly Arg Ala Met Tyr Ala Pro
        370                 375                 380

Pro Ile Ala Gly Asn Ile Thr Cys Ile Ser Asn Ile Thr Gly Leu Leu
385                 390                 395                 400

Leu Thr Arg Asp Gly Gly Lys Asn Asn Thr Glu Thr Phe Arg Pro Gly
                405                 410                 415

Gly Gly Asn Met Lys Asp Asn Trp Arg Ser Glu Leu Tyr Lys Tyr Lys
            420                 425                 430

Val Val Glu Val Lys Pro Leu Gly Val Ala Pro Thr Asn Ala Arg Arg
        435                 440                 445

Arg Val Val Glu Arg Glu Lys Arg Arg Ser Asn Gly Leu Pro Gly Pro
450                 455                 460

Ile Gly Pro Pro Gly Pro Arg Gly Arg Thr Gly Asp Ala Gly Pro Val
465                 470                 475                 480

Gly Pro Pro Gly Pro Pro Gly Pro Pro Gly Pro Pro Gly Pro Pro Ser
                485                 490                 495

Ala Gly Phe Asp Phe Ser Phe Leu Pro Gln Pro Pro Gln Glu Lys Ala
            500                 505                 510

His Asp Gly Gly Arg Tyr Tyr Arg Ala Asn Asp Ala Asn Val Val Arg
        515                 520                 525

Asp Arg Asp Leu Glu Val Asp Thr Thr Leu Lys Ser Leu Ser Gln Gln
530                 535                 540

Ile Glu Asn Ile Arg Ser Pro Glu Gly Ser Arg Lys Asn Pro Ala Arg
545                 550                 555                 560

Thr Cys Arg Asp Leu Lys Met Cys His Ser Asp Trp Lys Ser Gly Glu
                565                 570                 575

Tyr Trp Ile Asp Pro Asn Gln Gly Cys Asn Leu Asp Ala Ile Lys Val
            580                 585                 590

Phe Cys Asn Met Glu Thr Gly Glu Thr Cys Val Tyr Pro Thr Gln Pro
        595                 600                 605

Ser Val Ala Gln Lys Asn Trp Tyr Ile Ser Lys Asn Pro Lys Asp Lys
610                 615                 620

Arg His Val Trp Phe Gly Glu Ser Met Thr Asp Gly Phe Gln Phe Glu
625                 630                 635                 640

Tyr Gly Gly Gln Gly Ser Asp Pro Ala Asp Val Ala Ile Gln Leu Thr
                645                 650                 655

Phe Leu Arg Leu Met Ser Thr Glu Ala Ser Gln Asn Ile Thr Tyr His
            660                 665                 670

Cys Lys Asn Ser Val Ala Tyr Met Asp Gln Gln Thr Gly Asn Leu Lys
        675                 680                 685

Lys Ala Leu Leu Leu Lys Gly Ser Asn Glu Ile Glu Ile Arg Ala Glu
690                 695                 700

Gly Asn Ser Arg Phe Thr Tyr Ser Val Thr Val Asp Gly Cys Thr Ser
705                 710                 715                 720

His Thr Gly Ala Trp Gly Lys Thr Val Ile Glu Tyr Lys Thr Thr Lys
                725                 730                 735

Ser Ser Arg Leu Pro Ile Ile Asp Val Ala Pro Leu Asp Val Gly Ala
            740                 745                 750
```

```
Pro Asp Gln Glu Phe Gly Phe Asp Val Gly Pro Val Cys Phe Leu
        755                 760                 765

<210> SEQ ID NO 11
<211> LENGTH: 822
<212> TYPE: PRT
<213> ORGANISM: Artificial Sequence
<220> FEATURE:
<223> OTHER INFORMATION: Synthetic construct

<400> SEQUENCE: 11

Met Arg Val Lys Gly Ile Arg Arg Asn Cys Gln His Ser Trp Arg Trp
1               5                   10                  15

Gly Thr Thr Leu Thr Met Leu Leu Gly Ile Leu Met Ile Cys Arg Ala
            20                  25                  30

Ala Glu Gln Leu Trp Val Thr Val Tyr Tyr Gly Val Pro Val Trp Arg
        35                  40                  45

Glu Ala Lys Thr Thr Leu Phe Cys Ala Ser Asp Ala Lys Ala Tyr Asp
    50                  55                  60

Thr Glu Val His Asn Val Trp Ala Thr His Ala Cys Val Pro Thr Asp
65                  70                  75                  80

Pro Asn Pro Gln Glu Leu Val Leu Val Asn Val Thr Glu Asn Phe Asn
                85                  90                  95

Ala Trp Glu Asn Asn Met Val Glu Gln Met His Glu Asp Ile Ile Ser
            100                 105                 110

Leu Trp Asp Gln Ser Leu Lys Pro Cys Val Lys Leu Thr Pro Leu Cys
        115                 120                 125

Val Thr Leu Asn Cys Asn Asp Leu Asn Thr Thr Thr Ser Asn Thr Thr
    130                 135                 140

Gly Thr Glu Gly Leu Thr Met Asp Lys Gly Met Lys Asn Cys Ser
145                 150                 155                 160

Phe Asn Ile Thr Thr Asp Ile Ser Asn Lys Lys Gln Lys Gln Tyr Ala
                165                 170                 175

Leu Phe Tyr Lys Leu Asp Val Val Gln Met Asn Asn Asn Asn Ser
            180                 185                 190

Tyr Arg Leu Ile Ser Cys Asn Thr Ser Val Ile Thr Gln Ala Cys Pro
        195                 200                 205

Lys Val Ser Phe Glu Pro Ile Pro Ile Tyr Tyr Cys Ala Pro Ala Gly
    210                 215                 220

Phe Ala Ile Leu Lys Cys Asn Asp Lys Ser Phe Ser Gly Lys Gly Glu
225                 230                 235                 240

Cys Lys Asn Val Ser Thr Val Gln Cys Thr His Gly Ile Arg Pro Val
                245                 250                 255

Val Ser Thr Gln Leu Leu Leu Asn Gly Ser Leu Ala Glu Glu Asp Val
            260                 265                 270

Ile Ile Arg Ser Asp Asn Phe Thr Asp Asn Ala Lys Thr Ile Ile Val
        275                 280                 285

Gln Leu Asn Glu Thr Val Asp Ile His Cys Ile Arg Pro Asn Asn Asn
    290                 295                 300

Thr Arg Lys Arg Ile Thr Met Gly Pro Gly Lys Val Tyr Tyr Thr Thr
305                 310                 315                 320

Gly Gln Ile Ile Gly Asp Ile Arg Gln Ala His Cys Asn Leu Ser Glu
                325                 330                 335

Ala Lys Trp Asn Asn Thr Leu Arg Arg Val Val Arg Lys Leu Arg Glu
            340                 345                 350
```

-continued

```
Lys Phe Asn Lys Thr Ile Val Phe Asn Gln Ser Ser Gly Gly Asp Pro
        355                 360                 365
Glu Ile Val Met His Thr Phe Asn Cys Gly Gly Glu Phe Phe Tyr Cys
370                 375                 380
Asn Ser Thr Lys Leu Phe Asn Ser Ile Trp Asp Asn Asn Lys Asp Ser
385                 390                 395                 400
Thr Lys Thr Asn Glu Pro Asn Asp Gly Lys Asn Ile Thr Leu Pro Cys
            405                 410                 415
Arg Ile Lys Gln Ile Ile Asn Met Trp Gln Gly Val Gly Lys Ala Met
            420                 425                 430
Tyr Ala Pro Pro Ile Arg Gly Gln Ile Arg Cys Thr Ser Asn Ile Thr
        435                 440                 445
Gly Leu Leu Leu Thr Arg Asp Gly Gly Lys Asn Asn Gly Thr Asn Gly
        450                 455                 460
Thr Glu Val Phe Arg Pro Gly Gly Asn Met Lys Asp Asn Trp Arg
465                 470                 475                 480
Ser Glu Leu Tyr Lys Tyr Lys Val Val Lys Ile Glu Pro Leu Gly Val
                485                 490                 495
Ala Pro Thr Thr Ala Lys Arg Arg Val Val Gln Arg Glu Lys Arg Arg
            500                 505                 510
Ser Asn Gly Leu Pro Gly Pro Ile Gly Pro Pro Gly Pro Arg Gly Arg
            515                 520                 525
Thr Gly Asp Ala Gly Pro Val Gly Pro Pro Gly Pro Pro Gly Pro Pro
            530                 535                 540
Gly Pro Pro Gly Pro Pro Ser Ala Gly Phe Asp Phe Ser Phe Leu Pro
545                 550                 555                 560
Gln Pro Pro Gln Glu Lys Ala His Asp Gly Gly Arg Tyr Tyr Arg Ala
                565                 570                 575
Asn Asp Ala Asn Val Val Arg Asp Arg Asp Leu Glu Val Asp Thr Thr
            580                 585                 590
Leu Lys Ser Leu Ser Gln Gln Ile Glu Asn Ile Arg Ser Pro Glu Gly
        595                 600                 605
Ser Arg Lys Asn Pro Ala Arg Thr Cys Arg Asp Leu Lys Met Cys His
        610                 615                 620
Ser Asp Trp Lys Ser Gly Glu Tyr Trp Ile Asp Pro Asn Gln Gly Cys
625                 630                 635                 640
Asn Leu Asp Ala Ile Lys Val Phe Cys Asn Met Glu Thr Gly Glu Thr
                645                 650                 655
Cys Val Tyr Pro Thr Gln Pro Ser Val Ala Gln Lys Asn Trp Tyr Ile
            660                 665                 670
Ser Lys Asn Pro Lys Asp Lys Arg His Val Trp Phe Gly Glu Ser Met
            675                 680                 685
Thr Asp Gly Phe Gln Phe Glu Tyr Gly Gly Gln Gly Ser Asp Pro Ala
        690                 695                 700
Asp Val Ala Ile Gln Leu Thr Phe Leu Arg Leu Met Ser Thr Glu Ala
705                 710                 715                 720
Ser Gln Asn Ile Thr Tyr His Cys Lys Asn Ser Val Ala Tyr Met Asp
                725                 730                 735
Gln Gln Thr Gly Asn Leu Lys Lys Ala Leu Leu Leu Gln Gly Ser Asn
            740                 745                 750
Glu Ile Glu Ile Arg Ala Glu Gly Asn Ser Arg Phe Thr Tyr Ser Val
        755                 760                 765
```

Thr Val Asp Gly Cys Thr Ser His Thr Gly Ala Trp Gly Lys Thr Val
770                 775                 780

Ile Glu Tyr Lys Thr Thr Lys Thr Ser Arg Leu Pro Ile Ile Asp Val
785                 790                 795                 800

Ala Pro Leu Asp Val Gly Ala Pro Asp Gln Glu Phe Gly Phe Asp Val
            805                 810                 815

Gly Pro Val Cys Phe Leu
            820

<210> SEQ ID NO 12
<211> LENGTH: 790
<212> TYPE: PRT
<213> ORGANISM: Artificial Sequence
<220> FEATURE:
<223> OTHER INFORMATION: Synthetic construct

<400> SEQUENCE: 12

Ala Glu Gln Leu Trp Val Thr Val Tyr Tyr Gly Val Pro Val Trp Arg
1               5                   10                  15

Glu Ala Lys Thr Thr Leu Phe Cys Ala Ser Asp Ala Lys Ala Tyr Asp
            20                  25                  30

Thr Glu Val His Asn Val Trp Ala Thr His Ala Cys Val Pro Thr Asp
        35                  40                  45

Pro Asn Pro Gln Glu Leu Val Leu Val Asn Val Thr Glu Asn Phe Asn
50                  55                  60

Ala Trp Glu Asn Asn Met Val Glu Gln Met His Glu Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Asn Cys Asn Asp Leu Asn Thr Thr Thr Ser Asn Thr Thr
            100                 105                 110

Gly Thr Glu Gly Leu Thr Met Asp Lys Gly Glu Met Lys Asn Cys Ser
        115                 120                 125

Phe Asn Ile Thr Thr Asp Ile Ser Asn Lys Lys Gln Lys Gln Tyr Ala
130                 135                 140

Leu Phe Tyr Lys Leu Asp Val Val Gln Met Asn Asn Asn Asn Asn Ser
145                 150                 155                 160

Tyr Arg Leu Ile Ser Cys Asn Thr Ser Val Ile Thr Gln Ala Cys Pro
                165                 170                 175

Lys Val Ser Phe Glu Pro Ile Pro Ile Tyr Tyr Cys Ala Pro Ala Gly
            180                 185                 190

Phe Ala Ile Leu Lys Cys Asn Asp Lys Ser Phe Ser Gly Lys Gly Glu
        195                 200                 205

Cys Lys Asn Val Ser Thr Val Gln Cys Thr His Gly Ile Arg Pro Val
210                 215                 220

Val Ser Thr Gln Leu Leu Leu Asn Gly Ser Leu Ala Glu Glu Asp Val
225                 230                 235                 240

Ile Ile Arg Ser Asp Asn Phe Thr Asp Asn Ala Lys Thr Ile Ile Val
                245                 250                 255

Gln Leu Asn Glu Thr Val Asp Ile His Cys Ile Arg Pro Asn Asn Asn
            260                 265                 270

Thr Arg Lys Arg Ile Thr Met Gly Pro Gly Lys Val Tyr Tyr Thr Thr
        275                 280                 285

Gly Gln Ile Ile Gly Asp Ile Arg Gln Ala His Cys Asn Leu Ser Glu
290                 295                 300

```
Ala Lys Trp Asn Asn Thr Leu Arg Arg Val Val Arg Lys Leu Arg Glu
305                 310                 315                 320

Lys Phe Asn Lys Thr Ile Val Phe Asn Gln Ser Ser Gly Gly Asp Pro
                325                 330                 335

Glu Ile Val Met His Thr Phe Asn Cys Gly Gly Glu Phe Phe Tyr Cys
            340                 345                 350

Asn Ser Thr Lys Leu Phe Asn Ser Ile Trp Asp Asn Asn Lys Asp Ser
        355                 360                 365

Thr Lys Thr Asn Glu Pro Asn Asp Gly Lys Asn Ile Thr Leu Pro Cys
370                 375                 380

Arg Ile Lys Gln Ile Ile Asn Met Trp Gln Gly Val Gly Lys Ala Met
385                 390                 395                 400

Tyr Ala Pro Pro Ile Arg Gly Gln Ile Arg Cys Thr Ser Asn Ile Thr
                405                 410                 415

Gly Leu Leu Leu Thr Arg Asp Gly Gly Lys Asn Asn Gly Thr Asn Gly
            420                 425                 430

Thr Glu Val Phe Arg Pro Gly Gly Gly Asn Met Lys Asp Asn Trp Arg
        435                 440                 445

Ser Glu Leu Tyr Lys Tyr Lys Val Val Lys Ile Glu Pro Leu Gly Val
450                 455                 460

Ala Pro Thr Thr Ala Lys Arg Arg Val Val Gln Arg Glu Lys Arg Arg
465                 470                 475                 480

Ser Asn Gly Leu Pro Gly Pro Ile Gly Pro Pro Gly Pro Arg Gly Arg
                485                 490                 495

Thr Gly Asp Ala Gly Pro Val Gly Pro Pro Gly Pro Pro Gly Pro Pro
            500                 505                 510

Gly Pro Pro Gly Pro Pro Ser Ala Gly Phe Asp Phe Ser Phe Leu Pro
        515                 520                 525

Gln Pro Pro Gln Glu Lys Ala His Asp Gly Gly Arg Tyr Tyr Arg Ala
530                 535                 540

Asn Asp Ala Asn Val Val Arg Asp Arg Asp Leu Glu Val Asp Thr Thr
545                 550                 555                 560

Leu Lys Ser Leu Ser Gln Gln Ile Glu Asn Ile Arg Ser Pro Glu Gly
                565                 570                 575

Ser Arg Lys Asn Pro Ala Arg Thr Cys Arg Asp Leu Lys Met Cys His
            580                 585                 590

Ser Asp Trp Lys Ser Gly Glu Tyr Trp Ile Asp Pro Asn Gln Gly Cys
        595                 600                 605

Asn Leu Asp Ala Ile Lys Val Phe Cys Asn Met Glu Thr Gly Glu Thr
610                 615                 620

Cys Val Tyr Pro Thr Gln Pro Ser Val Ala Gln Lys Asn Trp Tyr Ile
625                 630                 635                 640

Ser Lys Asn Pro Lys Asp Lys Arg His Val Trp Phe Gly Glu Ser Met
                645                 650                 655

Thr Asp Gly Phe Gln Phe Glu Tyr Gly Gly Gln Gly Ser Asp Pro Ala
            660                 665                 670

Asp Val Ala Ile Gln Leu Thr Phe Leu Arg Leu Met Ser Thr Glu Ala
        675                 680                 685

Ser Gln Asn Ile Thr Tyr His Cys Lys Asn Ser Val Ala Tyr Met Asp
690                 695                 700

Gln Gln Thr Gly Asn Leu Lys Lys Ala Leu Leu Leu Gln Gly Ser Asn
705                 710                 715                 720

Glu Ile Glu Ile Arg Ala Glu Gly Asn Ser Arg Phe Thr Tyr Ser Val
```

```
                    725                 730                 735
Thr Val Asp Gly Cys Thr Ser His Thr Gly Ala Trp Gly Lys Thr Val
                740                 745                 750
Ile Glu Tyr Lys Thr Thr Lys Thr Ser Arg Leu Pro Ile Ile Asp Val
                755                 760                 765
Ala Pro Leu Asp Val Gly Ala Pro Asp Gln Glu Phe Gly Phe Asp Val
                770                 775                 780
Gly Pro Val Cys Phe Leu
785                 790

<210> SEQ ID NO 13
<211> LENGTH: 819
<212> TYPE: PRT
<213> ORGANISM: Artificial Sequence
<220> FEATURE:
<223> OTHER INFORMATION: Synthetic construct

<400> SEQUENCE: 13

Met Arg Val Met Gly Ile Gln Arg Asn Cys Gln His Leu Phe Arg Trp
1               5                   10                  15
Gly Thr Met Ile Leu Gly Met Ile Ile Cys Ser Ala Ala Glu Asn
                20                  25                  30
Leu Trp Val Thr Val Tyr Tyr Gly Val Pro Val Trp Lys Asp Ala Glu
                35                  40                  45
Thr Thr Leu Phe Cys Ala Ser Asp Ala Lys Ala Tyr Glu Thr Glu Lys
            50                  55                  60
His Asn Val Trp Ala Thr His Ala Cys Val Pro Thr Asp Pro Asn Pro
65              70                  75                  80
Gln Glu Ile His Leu Glu Asn Val Thr Glu Glu Phe Asn Met Trp Lys
                85                  90                  95
Asn Asn Met Val Glu Gln Met His Thr Asp Ile Ile Ser Leu Trp Asp
                100                 105                 110
Gln Ser Leu Lys Pro Cys Val Lys Leu Thr Pro Leu Cys Val Thr Leu
                115                 120                 125
Gln Cys Thr Asn Val Thr Asn Asn Ile Thr Asp Asp Met Arg Gly Glu
            130                 135                 140
Leu Lys Asn Cys Ser Phe Asn Met Thr Thr Glu Leu Arg Asp Lys Lys
145             150                 155                 160
Gln Lys Val Tyr Ser Leu Phe Tyr Arg Leu Asp Val Val Gln Ile Asn
                165                 170                 175
Glu Asn Gln Gly Asn Arg Ser Asn Asn Ser Lys Glu Tyr Arg Leu
                180                 185                 190
Ile Asn Cys Asn Thr Ser Ala Ile Thr Gln Ala Cys Pro Lys Val Ser
                195                 200                 205
Phe Glu Pro Ile Pro Ile His Tyr Cys Ala Pro Ala Gly Phe Ala Ile
                210                 215                 220
Leu Lys Cys Lys Asp Lys Lys Phe Asn Gly Thr Gly Pro Cys Pro Ser
225             230                 235                 240
Val Ser Thr Val Gln Cys Thr His Gly Ile Lys Pro Val Val Ser Thr
                245                 250                 255
Gln Leu Leu Leu Asn Gly Ser Leu Ala Glu Glu Val Met Ile Arg
                260                 265                 270
Ser Glu Asn Ile Thr Asn Asn Ala Lys Asn Ile Leu Val Gln Phe Asn
                275                 280                 285
Thr Pro Val Gln Ile Asn Cys Thr Arg Pro Asn Asn Asn Thr Arg Lys
```

-continued

```
                290                 295                 300
Ser Ile Arg Ile Gly Pro Gly Gln Ala Phe Tyr Ala Thr Gly Asp Ile
305                 310                 315                 320

Ile Gly Asp Ile Arg Gln Ala His Cys Thr Val Ser Lys Ala Thr Trp
                325                 330                 335

Asn Glu Thr Leu Gly Lys Val Val Lys Gln Leu Arg Lys His Phe Gly
                340                 345                 350

Asn Asn Thr Ile Ile Arg Phe Ala Asn Ser Ser Gly Gly Asp Leu Glu
                355                 360                 365

Val Thr Thr His Ser Phe Asn Cys Gly Gly Glu Phe Phe Tyr Cys Asn
                370                 375                 380

Thr Ser Gly Leu Phe Asn Ser Thr Trp Ile Ser Asn Thr Ser Val Gln
385                 390                 395                 400

Gly Ser Asn Ser Thr Gly Ser Asn Asp Ser Ile Thr Leu Pro Cys Arg
                405                 410                 415

Ile Lys Gln Ile Ile Asn Met Trp Gln Arg Ile Gly Gln Ala Met Tyr
                420                 425                 430

Ala Pro Pro Ile Gln Gly Val Ile Arg Cys Val Ser Asn Ile Thr Gly
                435                 440                 445

Leu Ile Leu Thr Arg Asp Gly Gly Ser Thr Asn Ser Thr Thr Glu Thr
                450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Arg Ala Lys Arg Arg Val Val Gly Arg Glu Lys Arg Arg Ser Asn Gly
                500                 505                 510

Leu Pro Gly Pro Ile Gly Pro Pro Gly Pro Arg Gly Arg Thr Gly Asp
                515                 520                 525

Ala Gly Pro Val Gly Pro Pro Gly Pro Pro Gly Pro Pro Gly Pro Pro
530                 535                 540

Gly Pro Pro Ser Ala Gly Phe Asp Phe Ser Phe Leu Pro Gln Pro Pro
545                 550                 555                 560

Gln Glu Lys Ala His Asp Gly Gly Arg Tyr Tyr Arg Ala Asn Asp Ala
                565                 570                 575

Asn Val Val Arg Asp Arg Asp Leu Glu Val Asp Thr Thr Leu Lys Ser
                580                 585                 590

Leu Ser Gln Gln Ile Glu Asn Ile Arg Ser Pro Glu Gly Ser Arg Lys
                595                 600                 605

Asn Pro Ala Arg Thr Cys Arg Asp Leu Lys Met Cys His Ser Asp Trp
610                 615                 620

Lys Ser Gly Glu Tyr Trp Ile Asp Pro Asn Gln Gly Cys Asn Leu Asp
625                 630                 635                 640

Ala Ile Lys Val Phe Cys Asn Met Glu Thr Gly Glu Thr Cys Val Tyr
                645                 650                 655

Pro Thr Gln Pro Ser Val Ala Gln Lys Asn Trp Tyr Ile Ser Lys Asn
                660                 665                 670

Pro Lys Asp Lys Arg His Val Trp Phe Gly Glu Ser Met Thr Asp Gly
                675                 680                 685

Phe Gln Phe Glu Tyr Gly Gly Gln Gly Ser Asp Pro Ala Asp Val Ala
                690                 695                 700

Ile Gln Leu Thr Phe Leu Arg Leu Met Ser Thr Glu Ala Ser Gln Asn
705                 710                 715                 720
```

```
Ile Thr Tyr His Cys Lys Asn Ser Val Ala Tyr Met Asp Gln Gln Thr
                725                 730                 735

Gly Asn Leu Lys Lys Ala Leu Leu Leu Gln Gly Ser Asn Glu Ile Glu
                740                 745                 750

Ile Arg Ala Glu Gly Asn Ser Arg Phe Thr Tyr Ser Val Thr Val Asp
                755                 760                 765

Gly Cys Thr Ser His Thr Gly Ala Trp Gly Lys Thr Val Ile Glu Tyr
770                 775                 780

Lys Thr Thr Lys Thr Ser Arg Leu Pro Ile Ile Asp Val Ala Pro Leu
785                 790                 795                 800

Asp Val Gly Ala Pro Asp Gln Glu Phe Gly Phe Asp Val Gly Pro Val
                805                 810                 815

Cys Phe Leu

<210> SEQ ID NO 14
<211> LENGTH: 790
<212> TYPE: PRT
<213> ORGANISM: Artificial Sequence
<220> FEATURE:
<223> OTHER INFORMATION: Synthetic construct

<400> SEQUENCE: 14

Ala Glu Asn Leu Trp Val Thr Val Tyr Tyr Gly Val Pro Val Trp Lys
1               5                   10                  15

Asp Ala Glu Thr Thr Leu Phe Cys Ala Ser Asp Ala Lys Ala Tyr Glu
                20                  25                  30

Thr Glu Lys His Asn Val Trp Ala Thr His Ala Cys Val Pro Thr Asp
            35                  40                  45

Pro Asn Pro Gln Glu Ile His Leu Glu Asn Val Thr Glu Glu Phe Asn
        50                  55                  60

Met Trp Lys Asn Asn Met Val Glu Gln Met His Thr Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Gln Cys Thr Asn Val Thr Asn Asn Ile Thr Asp Asp Met
                100                 105                 110

Arg Gly Glu Leu Lys Asn Cys Ser Phe Asn Met Thr Thr Glu Leu Arg
            115                 120                 125

Asp Lys Lys Gln Lys Val Tyr Ser Leu Phe Tyr Arg Leu Asp Val Val
        130                 135                 140

Gln Ile Asn Glu Asn Gln Gly Asn Arg Ser Asn Ser Asn Ser Lys Glu
145                 150                 155                 160

Tyr Arg Leu Ile Asn Cys Asn Thr Ser Ala Ile Thr Gln Ala Cys Pro
                165                 170                 175

Lys Val Ser Phe Glu Pro Ile Pro Ile His Tyr Cys Ala Pro Ala Gly
                180                 185                 190

Phe Ala Ile Leu Lys Cys Lys Asp Lys Lys Phe Asn Gly Thr Gly Pro
            195                 200                 205

Cys Pro Ser Val Ser Thr Val Gln Cys Thr His Gly Ile Lys Pro Val
        210                 215                 220

Val Ser Thr Gln Leu Leu Leu Asn Gly Ser Leu Ala Glu Glu Glu Val
225                 230                 235                 240

Met Ile Arg Ser Glu Asn Ile Thr Asn Asn Ala Lys Asn Ile Leu Val
                245                 250                 255
```

-continued

```
Gln Phe Asn Thr Pro Val Gln Ile Asn Cys Thr Arg Pro Asn Asn
                260                 265                 270
Thr Arg Lys Ser Ile Arg Ile Gly Pro Gly Gln Ala Phe Tyr Ala Thr
            275                 280                 285
Gly Asp Ile Ile Gly Asp Ile Arg Gln Ala His Cys Thr Val Ser Lys
290                 295                 300
Ala Thr Trp Asn Glu Thr Leu Gly Lys Val Val Lys Gln Leu Arg Lys
305                 310                 315                 320
His Phe Gly Asn Asn Thr Ile Ile Arg Phe Ala Asn Ser Ser Gly Gly
                325                 330                 335
Asp Leu Glu Val Thr Thr His Ser Phe Asn Cys Gly Gly Glu Phe Phe
            340                 345                 350
Tyr Cys Asn Thr Ser Gly Leu Phe Asn Ser Thr Trp Ile Ser Asn Thr
        355                 360                 365
Ser Val Gln Gly Ser Asn Ser Thr Gly Ser Asn Asp Ser Ile Thr Leu
    370                 375                 380
Pro Cys Arg Ile Lys Gln Ile Ile Asn Met Trp Gln Arg Ile Gly Gln
385                 390                 395                 400
Ala Met Tyr Ala Pro Pro Ile Gln Gly Val Ile Arg Cys Val Ser Asn
                405                 410                 415
Ile Thr Gly Leu Ile Leu Thr Arg Asp Gly Gly Ser Thr Asn Ser Thr
            420                 425                 430
Thr Glu Thr Phe Arg Pro Gly Gly Gly Asp Met Arg Asp Asn Trp Arg
        435                 440                 445
Ser Glu Leu Tyr Lys Tyr Lys Val Val Lys Ile Glu Pro Leu Gly Val
    450                 455                 460
Ala Pro Thr Arg Ala Lys Arg Arg Val Val Gly Arg Glu Lys Arg Arg
465                 470                 475                 480
Ser Asn Gly Leu Pro Gly Pro Ile Gly Pro Pro Gly Pro Arg Gly Arg
                485                 490                 495
Thr Gly Asp Ala Gly Pro Val Gly Pro Pro Gly Pro Pro Gly Pro Pro
            500                 505                 510
Gly Pro Pro Gly Pro Pro Ser Ala Gly Phe Asp Phe Ser Phe Leu Pro
        515                 520                 525
Gln Pro Pro Gln Glu Lys Ala His Asp Gly Gly Arg Tyr Tyr Arg Ala
    530                 535                 540
Asn Asp Ala Asn Val Val Arg Asp Arg Asp Leu Glu Val Asp Thr Thr
545                 550                 555                 560
Leu Lys Ser Leu Ser Gln Gln Ile Glu Asn Ile Arg Ser Pro Glu Gly
                565                 570                 575
Ser Arg Lys Asn Pro Ala Arg Thr Cys Arg Asp Leu Lys Met Cys His
            580                 585                 590
Ser Asp Trp Lys Ser Gly Glu Tyr Trp Ile Asp Pro Asn Gln Gly Cys
        595                 600                 605
Asn Leu Asp Ala Ile Lys Val Phe Cys Asn Met Glu Thr Gly Glu Thr
    610                 615                 620
Cys Val Tyr Pro Thr Gln Pro Ser Val Ala Gln Lys Asn Trp Tyr Ile
625                 630                 635                 640
Ser Lys Asn Pro Lys Asp Lys Arg His Val Trp Phe Gly Glu Ser Met
                645                 650                 655
Thr Asp Gly Phe Gln Phe Glu Tyr Gly Gly Gln Gly Ser Asp Pro Ala
            660                 665                 670
Asp Val Ala Ile Gln Leu Thr Phe Leu Arg Leu Met Ser Thr Glu Ala
```

```
                675                 680                 685
Ser Gln Asn Ile Thr Tyr His Cys Lys Asn Ser Val Ala Tyr Met Asp
            690                 695                 700

Gln Gln Thr Gly Asn Leu Lys Lys Ala Leu Leu Leu Gln Gly Ser Asn
705                 710                 715                 720

Glu Ile Glu Ile Arg Ala Glu Gly Asn Ser Arg Phe Thr Tyr Ser Val
                725                 730                 735

Thr Val Asp Gly Cys Thr Ser His Thr Gly Ala Trp Gly Lys Thr Val
            740                 745                 750

Ile Glu Tyr Lys Thr Thr Lys Thr Ser Arg Leu Pro Ile Ile Asp Val
                755                 760                 765

Ala Pro Leu Asp Val Gly Ala Pro Asp Gln Glu Phe Gly Phe Asp Val
            770                 775                 780

Gly Pro Val Cys Phe Leu
785                 790

<210> SEQ ID NO 15
<211> LENGTH: 819
<212> TYPE: PRT
<213> ORGANISM: Artificial Sequence
<220> FEATURE:
<223> OTHER INFORMATION: Synthetic construct

<400> SEQUENCE: 15

Met Arg Val Thr Glu Ile Arg Lys Ser Tyr Gln His Trp Trp Arg Trp
1               5                   10                  15

Gly Ile Met Leu Leu Gly Ile Leu Met Ile Cys Asn Ala Glu Glu Lys
                20                  25                  30

Leu Trp Val Thr Val Tyr Tyr Gly Val Pro Val Trp Lys Glu Ala Thr
            35                  40                  45

Thr Thr Leu Phe Cys Ala Ser Asp Ala Lys Ala Tyr Asp Thr Glu Val
        50                  55                  60

His Asn Val Trp Ala Thr His Ala Cys Val Pro Thr Asp Pro Asn Pro
65                  70                  75                  80

Gln Glu Val Glu Leu Glu Asn Val Thr Glu Asn Phe Asn Met Trp Lys
                85                  90                  95

Asn Asn Met Val Glu Gln Met His Glu Asp Ile Ile Ser Leu Trp Asp
                100                 105                 110

Gln Ser Leu Lys Pro Cys Val Lys Leu Thr Pro Leu Cys Val Thr Leu
            115                 120                 125

Asn Cys Thr Asp Leu Arg Asn Ala Thr Ser Arg Asn Val Thr Asn Thr
        130                 135                 140

Thr Ser Ser Arg Gly Met Val Gly Gly Glu Met Lys Asn Cys
145                 150                 155                 160

Ser Phe Asn Ile Thr Thr Gly Ile Arg Gly Lys Val Gln Lys Glu Tyr
                165                 170                 175

Ala Leu Phe Tyr Glu Leu Asp Ile Val Pro Ile Asp Asn Lys Ile Asp
            180                 185                 190

Arg Tyr Arg Leu Ile Ser Cys Asn Thr Ser Val Ile Thr Gln Ala Cys
        195                 200                 205

Pro Lys Val Ser Phe Glu Pro Ile Pro Ile His Tyr Cys Ala Pro Ala
    210                 215                 220

Gly Phe Ala Ile Leu Lys Cys Lys Asp Lys Lys Phe Asn Gly Lys Gly
225                 230                 235                 240

Pro Cys Ser Asn Val Ser Thr Val Gln Cys Thr His Gly Ile Arg Pro
```

-continued

```
                245                 250                 255
Val Val Ser Thr Gln Leu Leu Asn Gly Ser Leu Ala Glu Glu Glu
            260                 265                 270

Val Val Ile Arg Ser Glu Asn Phe Thr Asn Asn Ala Lys Thr Ile Ile
            275                 280                 285

Val Gln Leu Asn Glu Ser Val Glu Ile Asn Cys Thr Arg Pro Asn Asn
            290                 295                 300

Asn Thr Arg Lys Ser Ile Asn Ile Gly Pro Gly Arg Ala Phe Tyr Thr
305                 310                 315                 320

Thr Gly Glu Ile Ile Gly Asp Ile Arg Gln Ala His Cys Asn Leu Ser
                325                 330                 335

Arg Ala Lys Trp Asn Asp Thr Leu Asn Lys Ile Val Ile Lys Leu Arg
                340                 345                 350

Glu Gln Phe Gly Asn Lys Thr Ile Val Phe Lys His Ser Ser Gly Gly
                355                 360                 365

Asp Pro Glu Ile Val Thr His Ser Phe Asn Cys Gly Gly Glu Phe Phe
            370                 375                 380

Tyr Cys Asn Ser Thr Gln Leu Phe Asn Ser Thr Trp Asn Val Thr Glu
385                 390                 395                 400

Glu Ser Asn Asn Thr Val Glu Asn Asn Thr Ile Thr Leu Pro Cys Arg
                405                 410                 415

Ile Lys Gln Ile Ile Asn Met Trp Gln Glu Val Gly Arg Ala Met Tyr
                420                 425                 430

Ala Pro Pro Ile Arg Gly Gln Ile Arg Cys Ser Ser Asn Ile Thr Gly
            435                 440                 445

Leu Leu Leu Thr Arg Asp Gly Gly Pro Glu Asp Asn Lys Thr Glu Val
            450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Lys Ala Lys Arg Arg Val Val Gln Arg Glu Lys Arg Ser Asn Gly
                500                 505                 510

Leu Pro Gly Pro Ile Gly Pro Pro Gly Pro Arg Gly Arg Thr Gly Asp
            515                 520                 525

Ala Gly Pro Val Gly Pro Pro Gly Pro Gly Pro Pro Gly Pro Pro
            530                 535                 540

Gly Pro Pro Ser Ala Gly Phe Asp Phe Ser Phe Leu Pro Gln Pro Pro
545                 550                 555                 560

Gln Glu Lys Ala His Asp Gly Gly Arg Tyr Tyr Arg Ala Asn Asp Ala
                565                 570                 575

Asn Val Val Arg Asp Arg Asp Leu Glu Val Asp Thr Thr Leu Lys Ser
                580                 585                 590

Leu Ser Gln Gln Ile Glu Asn Ile Arg Ser Pro Glu Gly Ser Arg Lys
                595                 600                 605

Asn Pro Ala Arg Thr Cys Arg Asp Leu Lys Met Cys His Ser Asp Trp
            610                 615                 620

Lys Ser Gly Glu Tyr Trp Ile Asp Pro Asn Gln Gly Cys Asn Leu Asp
625                 630                 635                 640

Ala Ile Lys Val Phe Cys Asn Met Glu Thr Gly Glu Thr Cys Val Tyr
                645                 650                 655

Pro Thr Gln Pro Ser Val Ala Gln Lys Asn Trp Tyr Ile Ser Lys Asn
                660                 665                 670
```

```
Pro Lys Asp Lys Arg His Val Trp Phe Gly Glu Ser Met Thr Asp Gly
            675                 680                 685

Phe Gln Phe Glu Tyr Gly Gly Gln Gly Ser Asp Pro Ala Asp Val Ala
690                 695                 700

Ile Gln Leu Thr Phe Leu Arg Leu Met Ser Thr Glu Ala Ser Gln Asn
705                 710                 715                 720

Ile Thr Tyr His Cys Lys Asn Ser Val Ala Tyr Met Asp Gln Gln Thr
                725                 730                 735

Gly Asn Leu Lys Lys Ala Leu Leu Gln Gly Ser Asn Glu Ile Glu
                740                 745                 750

Ile Arg Ala Glu Gly Asn Ser Arg Phe Thr Tyr Ser Val Thr Val Asp
            755                 760                 765

Gly Cys Thr Ser His Thr Gly Ala Trp Gly Lys Thr Val Ile Glu Tyr
            770                 775                 780

Lys Thr Thr Lys Thr Ser Arg Leu Pro Ile Ile Asp Val Ala Pro Leu
785                 790                 795                 800

Asp Val Gly Ala Pro Asp Gln Glu Phe Gly Phe Asp Val Gly Pro Val
                805                 810                 815

Cys Phe Leu

<210> SEQ ID NO 16
<211> LENGTH: 790
<212> TYPE: PRT
<213> ORGANISM: Artificial Sequence
<220> FEATURE:
<223> OTHER INFORMATION: Synthetic construct

<400> SEQUENCE: 16

Glu Glu Lys Leu Trp Val Thr Val Tyr Tyr Gly Val Pro Val Trp Lys
1               5                   10                  15

Glu Ala Thr Thr Thr Leu Phe Cys Ala Ser Asp Ala Lys Ala Tyr Asp
            20                  25                  30

Thr Glu Val His Asn Val Trp Ala Thr His Ala Cys Val Pro Thr Asp
        35                  40                  45

Pro Asn Pro Gln Glu Val Glu Leu Glu Asn Val Thr Glu Asn Phe Asn
    50                  55                  60

Met Trp Lys Asn Asn Met Val Glu Gln Met His Glu Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Asn Cys Thr Asp Leu Arg Asn Ala Thr Ser Arg Asn Val
            100                 105                 110

Thr Asn Thr Thr Ser Ser Ser Arg Gly Met Val Gly Gly Gly Glu Met
        115                 120                 125

Lys Asn Cys Ser Phe Asn Ile Thr Thr Gly Ile Arg Gly Lys Val Gln
    130                 135                 140

Lys Glu Tyr Ala Leu Phe Tyr Glu Leu Asp Ile Val Pro Ile Asp Asn
145                 150                 155                 160

Lys Ile Asp Arg Tyr Arg Leu Ile Ser Cys Asn Thr Ser Val Ile Thr
                165                 170                 175

Gln Ala Cys Pro Lys Val Ser Phe Glu Pro Ile Pro Ile His Tyr Cys
            180                 185                 190

Ala Pro Ala Gly Phe Ala Ile Leu Lys Cys Lys Asp Lys Lys Phe Asn
        195                 200                 205
```

```
Gly Lys Gly Pro Cys Ser Asn Val Ser Thr Val Gln Cys Thr His Gly
    210             215                 220
Ile Arg Pro Val Val Ser Thr Gln Leu Leu Asn Gly Ser Leu Ala
225             230                 235                 240
Glu Glu Glu Val Val Ile Arg Ser Asn Phe Thr Asn Asn Ala Lys
                245                 250                 255
Thr Ile Ile Val Gln Leu Asn Glu Ser Val Glu Ile Asn Cys Thr Arg
            260                 265                 270
Pro Asn Asn Asn Thr Arg Lys Ser Ile Asn Ile Gly Pro Gly Arg Ala
                275                 280                 285
Phe Tyr Thr Thr Gly Glu Ile Ile Gly Asp Ile Arg Gln Ala His Cys
    290                 295                 300
Asn Leu Ser Arg Ala Lys Trp Asn Asp Thr Leu Asn Lys Ile Val Ile
305             310                 315                 320
Lys Leu Arg Glu Gln Phe Gly Asn Lys Thr Ile Val Phe Lys His Ser
                325                 330                 335
Ser Gly Gly Asp Pro Glu Ile Val Thr His Ser Phe Asn Cys Gly Gly
            340                 345                 350
Glu Phe Phe Tyr Cys Asn Ser Thr Gln Leu Phe Asn Ser Thr Trp Asn
    355                 360                 365
Val Thr Glu Glu Ser Asn Asn Thr Val Glu Asn Asn Thr Ile Thr Leu
    370                 375                 380
Pro Cys Arg Ile Lys Gln Ile Ile Asn Met Trp Gln Glu Val Gly Arg
385             390                 395                 400
Ala Met Tyr Ala Pro Pro Ile Arg Gly Gln Ile Arg Cys Ser Ser Asn
                405                 410                 415
Ile Thr Gly Leu Leu Leu Thr Arg Asp Gly Gly Pro Glu Asp Asn Lys
            420                 425                 430
Thr Glu Val Phe Arg Pro Gly Gly Gly Asp Met Arg Asp Asn Trp Arg
                435                 440                 445
Ser Glu Leu Tyr Lys Tyr Lys Val Val Lys Ile Glu Pro Leu Gly Val
    450                 455                 460
Ala Pro Thr Lys Ala Lys Arg Arg Val Val Gln Arg Glu Lys Arg Arg
465             470                 475                 480
Ser Asn Gly Leu Pro Gly Pro Ile Gly Pro Pro Gly Pro Arg Gly Arg
                485                 490                 495
Thr Gly Asp Ala Gly Pro Val Gly Pro Pro Gly Pro Pro Gly Pro Pro
            500                 505                 510
Gly Pro Pro Gly Pro Pro Ser Ala Gly Phe Asp Phe Ser Phe Leu Pro
    515                 520                 525
Gln Pro Pro Gln Glu Lys Ala His Asp Gly Gly Arg Tyr Tyr Arg Ala
    530                 535                 540
Asn Asp Ala Asn Val Val Arg Asp Arg Asp Leu Glu Val Asp Thr Thr
545             550                 555                 560
Leu Lys Ser Leu Ser Gln Gln Ile Glu Asn Ile Arg Ser Pro Glu Gly
                565                 570                 575
Ser Arg Lys Asn Pro Ala Arg Thr Cys Arg Asp Leu Lys Met Cys His
            580                 585                 590
Ser Asp Trp Lys Ser Gly Glu Tyr Trp Ile Asp Pro Asn Gln Gly Cys
    595                 600                 605
Asn Leu Asp Ala Ile Lys Val Phe Cys Asn Met Glu Thr Gly Glu Thr
    610                 615                 620
Cys Val Tyr Pro Thr Gln Pro Ser Val Ala Gln Lys Asn Trp Tyr Ile
```

```
                625                 630                 635                 640
Ser Lys Asn Pro Lys Asp Lys Arg His Val Trp Phe Gly Glu Ser Met
                645                 650                 655

Thr Asp Gly Phe Gln Phe Glu Tyr Gly Gly Gln Gly Ser Asp Pro Ala
                660                 665                 670

Asp Val Ala Ile Gln Leu Thr Phe Leu Arg Leu Met Ser Thr Glu Ala
                675                 680                 685

Ser Gln Asn Ile Thr Tyr His Cys Lys Asn Ser Val Ala Tyr Met Asp
                690                 695                 700

Gln Gln Thr Gly Asn Leu Lys Lys Ala Leu Leu Leu Gln Gly Ser Asn
705                 710                 715                 720

Glu Ile Glu Ile Arg Ala Glu Gly Asn Ser Arg Phe Thr Tyr Ser Val
                725                 730                 735

Thr Val Asp Gly Cys Thr Ser His Thr Gly Ala Trp Gly Lys Thr Val
                740                 745                 750

Ile Glu Tyr Lys Thr Thr Lys Thr Ser Arg Leu Pro Ile Ile Asp Val
                755                 760                 765

Ala Pro Leu Asp Val Gly Ala Pro Asp Gln Glu Phe Gly Phe Asp Val
770                 775                 780

Gly Pro Val Cys Phe Leu
785                 790

<210> SEQ ID NO 17
<211> LENGTH: 805
<212> TYPE: PRT
<213> ORGANISM: Artificial Sequence
<220> FEATURE:
<223> OTHER INFORMATION: Synthetic construct

<400> SEQUENCE: 17

Met Arg Val Met Gly Ile Gln Arg Asn Tyr Pro Gln Trp Trp Ile Trp
1               5                   10                  15

Ser Met Leu Gly Phe Trp Met Leu Met Ile Cys Asn Gly Met Trp Val
                20                  25                  30

Thr Val Tyr Tyr Gly Val Pro Val Trp Lys Glu Ala Lys Thr Thr Leu
                35                  40                  45

Phe Cys Ala Ser Asp Ala Lys Ala Tyr Glu Lys Glu Val His Asn Val
                50                  55                  60

Trp Ala Thr His Ala Cys Val Pro Thr Asp Pro Asn Pro Gln Glu Met
65                  70                  75                  80

Val Leu Lys Asn Val Thr Glu Asn Phe Asn Met Trp Lys Asn Asp Met
                85                  90                  95

Val Asp Gln Met His Glu Asp Val Ile Ser Leu Trp Asp Gln Ser Leu
                100                 105                 110

Lys Pro Cys Val Lys Leu Thr Pro Leu Cys Val Thr Leu Asn Cys Thr
                115                 120                 125

Asn Ala Thr Ala Ser Asn Ser Ser Ile Ile Glu Gly Met Lys Asn Cys
                130                 135                 140

Ser Phe Asn Ile Thr Thr Glu Leu Arg Asp Lys Arg Glu Lys Lys Asn
145                 150                 155                 160

Ala Leu Phe Tyr Lys Leu Asp Ile Val Gln Leu Asp Gly Asn Ser Ser
                165                 170                 175

Gln Tyr Arg Leu Ile Asn Cys Asn Thr Ser Val Ile Thr Gln Ala Cys
                180                 185                 190

Pro Lys Val Ser Phe Asp Pro Ile Pro Ile His Tyr Cys Ala Pro Ala
```

-continued

```
              195                 200                 205
Gly Tyr Ala Ile Leu Lys Cys Asn Asn Lys Thr Phe Thr Gly Thr Gly
            210                 215                 220
Pro Cys Asn Asn Val Ser Thr Val Gln Cys Thr His Gly Ile Lys Pro
225                 230                 235                 240
Val Val Ser Thr Gln Leu Leu Leu Asn Gly Ser Leu Ala Glu Gly Glu
                245                 250                 255
Ile Ile Ile Arg Ser Glu Asn Ile Thr Asn Asn Val Lys Thr Ile Ile
            260                 265                 270
Val His Leu Asn Glu Ser Val Lys Ile Glu Cys Thr Arg Pro Asn Asn
        275                 280                 285
Lys Thr Arg Thr Ser Ile Arg Ile Gly Pro Gly Gln Ala Phe Tyr Ala
290                 295                 300
Thr Gly Gln Val Ile Gly Asp Ile Arg Glu Ala Tyr Cys Asn Ile Asn
305                 310                 315                 320
Glu Ser Lys Trp Asn Glu Thr Leu Gln Arg Val Ser Lys Lys Leu Lys
                325                 330                 335
Glu Tyr Phe Pro His Lys Asn Ile Thr Phe Gln Pro Ser Ser Gly Gly
            340                 345                 350
Asp Leu Glu Ile Thr Thr His Ser Phe Asn Cys Gly Gly Glu Phe Phe
        355                 360                 365
Tyr Cys Asn Thr Ser Ser Leu Phe Asn Arg Thr Tyr Met Ala Asn Ser
    370                 375                 380
Thr Asp Met Ala Asn Ser Thr Glu Thr Asn Ser Thr Arg Thr Ile Thr
385                 390                 395                 400
Ile His Cys Arg Ile Lys Gln Ile Ile Asn Met Trp Gln Glu Val Gly
                405                 410                 415
Arg Ala Met Tyr Ala Pro Pro Ile Ala Gly Asn Ile Thr Cys Ile Ser
            420                 425                 430
Asn Ile Thr Gly Leu Leu Leu Thr Arg Asp Gly Gly Lys Asn Asn Thr
        435                 440                 445
Glu Thr Phe Arg Pro Gly Gly Gly Asn Met Lys Asp Asn Trp Arg Ser
    450                 455                 460
Glu Leu Tyr Lys Tyr Lys Val Val Glu Val Lys Pro Leu Gly Val Ala
465                 470                 475                 480
Pro Thr Asn Ala Arg Arg Arg Val Val Glu Arg Glu Lys Arg Arg Ser
                485                 490                 495
Asn Gly Leu Pro Gly Pro Ile Gly Pro Pro Gly Pro Arg Gly Arg Thr
            500                 505                 510
Gly Asp Ala Gly Pro Val Gly Pro Pro Gly Pro Gly Pro Pro Gly Pro
        515                 520                 525
Pro Pro Gly Pro Pro Ser Ala Gly Phe Asp Phe Ser Phe Leu Pro Gln
    530                 535                 540
Pro Pro Gln Glu Lys Ala His Asp Gly Gly Arg Tyr Tyr Arg Ala Asn
545                 550                 555                 560
Asp Ala Asn Val Val Arg Asp Arg Asp Leu Glu Val Asp Thr Thr Leu
                565                 570                 575
Lys Ser Leu Ser Gln Gln Ile Glu Asn Ile Arg Ser Pro Glu Gly Ser
            580                 585                 590
Arg Lys Asn Pro Ala Arg Thr Cys Arg Asp Leu Lys Met Cys His Ser
        595                 600                 605
Asp Trp Lys Ser Gly Glu Tyr Trp Ile Asp Pro Asn Gln Gly Cys Asn
    610                 615                 620
```

Leu Asp Ala Ile Lys Val Phe Cys Asn Met Glu Thr Gly Glu Thr Cys
625                 630                 635                 640

Val Tyr Pro Thr Gln Pro Ser Val Ala Gln Lys Asn Trp Tyr Ile Ser
                645                 650                 655

Lys Asn Pro Lys Asp Lys Arg His Val Trp Phe Gly Glu Ser Met Thr
            660                 665                 670

Asp Gly Phe Gln Phe Glu Tyr Gly Gly Gln Gly Ser Asp Pro Ala Asp
        675                 680                 685

Val Ala Ile Gln Leu Thr Phe Leu Arg Leu Met Ser Thr Glu Ala Ser
690                 695                 700

Gln Asn Ile Thr Tyr His Cys Lys Asn Ser Val Ala Tyr Met Asp Gln
705                 710                 715                 720

Gln Thr Gly Asn Leu Lys Lys Ala Leu Leu Gln Gly Ser Asn Glu
                725                 730                 735

Ile Glu Ile Arg Ala Glu Gly Asn Ser Arg Phe Thr Tyr Ser Val Thr
            740                 745                 750

Val Asp Gly Cys Thr Ser His Thr Gly Ala Trp Gly Lys Thr Val Ile
        755                 760                 765

Glu Tyr Lys Thr Thr Lys Thr Ser Arg Leu Pro Ile Ile Asp Val Ala
770                 775                 780

Pro Leu Asp Val Gly Ala Pro Asp Gln Glu Phe Gly Phe Asp Val Gly
785                 790                 795                 800

Pro Val Cys Phe Leu
                805

<210> SEQ ID NO 18
<211> LENGTH: 767
<212> TYPE: PRT
<213> ORGANISM: Artificial Sequence
<220> FEATURE:
<223> OTHER INFORMATION: Synthetic construct

<400> SEQUENCE: 18

Pro Val Trp Lys Glu Ala Lys Thr Thr Leu Phe Cys Ala Ser Asp Ala
1               5                   10                  15

Lys Ala Tyr Glu Lys Glu Val His Asn Val Trp Ala Thr His Ala Cys
            20                  25                  30

Val Pro Thr Asp Pro Asn Pro Gln Glu Met Val Leu Lys Asn Val Thr
        35                  40                  45

Glu Asn Phe Asn Met Trp Lys Asn Asp Met Val Asp Gln Met His Glu
    50                  55                  60

Asp Val Ile Ser Leu Trp Asp Gln Ser Leu Lys Pro Cys Val Lys Leu
65                  70                  75                  80

Thr Pro Leu Cys Val Thr Leu Asn Cys Thr Asn Ala Thr Ala Ser Asn
                85                  90                  95

Ser Ser Ile Ile Glu Gly Met Lys Asn Cys Ser Phe Asn Ile Thr Thr
            100                 105                 110

Glu Leu Arg Asp Lys Arg Glu Lys Lys Asn Ala Leu Phe Tyr Lys Leu
        115                 120                 125

Asp Ile Val Gln Leu Asp Gly Asn Ser Ser Gln Tyr Arg Leu Ile Asn
    130                 135                 140

Cys Asn Thr Ser Val Ile Thr Gln Ala Cys Pro Lys Val Ser Phe Asp
145                 150                 155                 160

Pro Ile Pro Ile His Tyr Cys Ala Pro Ala Gly Tyr Ala Ile Leu Lys
                165                 170                 175

```
Cys Asn Asn Lys Thr Phe Thr Gly Thr Gly Pro Cys Asn Asn Val Ser
                180                 185                 190

Thr Val Gln Cys Thr His Gly Ile Lys Pro Val Val Ser Thr Gln Leu
            195                 200                 205

Leu Leu Asn Gly Ser Leu Ala Glu Gly Glu Ile Ile Arg Ser Glu
        210                 215                 220

Asn Ile Thr Asn Val Lys Thr Ile Ile Val His Leu Asn Glu Ser
225                 230                 235                 240

Val Lys Ile Glu Cys Thr Arg Pro Asn Asn Lys Thr Arg Thr Ser Ile
                245                 250                 255

Arg Ile Gly Pro Gly Gln Ala Phe Tyr Ala Thr Gly Gln Val Ile Gly
            260                 265                 270

Asp Ile Arg Glu Ala Tyr Cys Asn Ile Asn Glu Ser Lys Trp Asn Glu
            275                 280                 285

Thr Leu Gln Arg Val Ser Lys Lys Leu Lys Glu Tyr Phe Pro His Lys
        290                 295                 300

Asn Ile Thr Phe Gln Pro Ser Ser Gly Gly Asp Leu Glu Ile Thr Thr
305                 310                 315                 320

His Ser Phe Asn Cys Gly Gly Glu Phe Phe Tyr Cys Asn Thr Ser Ser
                325                 330                 335

Leu Phe Asn Arg Thr Tyr Met Ala Asn Ser Thr Asp Met Ala Asn Ser
            340                 345                 350

Thr Glu Thr Asn Ser Thr Arg Thr Ile Thr Ile His Cys Arg Ile Lys
        355                 360                 365

Gln Ile Ile Asn Met Trp Gln Glu Val Gly Arg Ala Met Tyr Ala Pro
            370                 375                 380

Pro Ile Ala Gly Asn Ile Thr Cys Ile Ser Asn Ile Thr Gly Leu Leu
385                 390                 395                 400

Leu Thr Arg Asp Gly Gly Lys Asn Asn Thr Glu Thr Phe Arg Pro Gly
            405                 410                 415

Gly Gly Asn Met Lys Asp Asn Trp Arg Ser Glu Leu Tyr Lys Tyr Lys
            420                 425                 430

Val Val Glu Val Lys Pro Leu Gly Val Ala Pro Thr Asn Ala Arg Arg
        435                 440                 445

Arg Val Val Glu Arg Glu Lys Arg Arg Ser Asn Gly Leu Pro Gly Pro
450                 455                 460

Ile Gly Pro Pro Gly Pro Arg Gly Arg Thr Gly Asp Ala Gly Pro Val
465                 470                 475                 480

Gly Pro Pro Gly Pro Gly Pro Pro Gly Pro Pro Gly Pro Gly Pro Ser
            485                 490                 495

Ala Gly Phe Asp Phe Ser Phe Leu Pro Gln Pro Pro Gln Glu Lys Ala
            500                 505                 510

His Asp Gly Gly Arg Tyr Tyr Arg Ala Asn Asp Ala Asn Val Val Arg
            515                 520                 525

Asp Arg Asp Leu Glu Val Asp Thr Thr Leu Lys Ser Leu Ser Gln Gln
            530                 535                 540

Ile Glu Asn Ile Arg Ser Pro Glu Gly Ser Arg Lys Asn Pro Ala Arg
545                 550                 555                 560

Thr Cys Arg Asp Leu Lys Met Cys His Ser Asp Trp Lys Ser Gly Glu
            565                 570                 575

Tyr Trp Ile Asp Pro Asn Gln Gly Cys Asn Leu Asp Ala Ile Lys Val
            580                 585                 590
```

```
Phe Cys Asn Met Glu Thr Gly Glu Thr Cys Val Tyr Pro Thr Gln Pro
            595                 600                 605

Ser Val Ala Gln Lys Asn Trp Tyr Ile Ser Lys Asn Pro Lys Asp Lys
610                 615                 620

Arg His Val Trp Phe Gly Glu Ser Met Thr Asp Gly Phe Gln Phe Glu
625                 630                 635                 640

Tyr Gly Gly Gln Gly Ser Asp Pro Ala Asp Val Ala Ile Gln Leu Thr
                645                 650                 655

Phe Leu Arg Leu Met Ser Thr Glu Ala Ser Gln Asn Ile Thr Tyr His
            660                 665                 670

Cys Lys Asn Ser Val Ala Tyr Met Asp Gln Gln Thr Gly Asn Leu Lys
        675                 680                 685

Lys Ala Leu Leu Leu Gln Gly Ser Asn Glu Ile Glu Ile Arg Ala Glu
690                 695                 700

Gly Asn Ser Arg Phe Thr Tyr Ser Val Thr Val Asp Gly Cys Thr Ser
705                 710                 715                 720

His Thr Gly Ala Trp Gly Lys Thr Val Ile Glu Tyr Lys Thr Thr Lys
                725                 730                 735

Thr Ser Arg Leu Pro Ile Ile Asp Val Ala Pro Leu Asp Val Gly Ala
            740                 745                 750

Pro Asp Gln Glu Phe Gly Phe Asp Val Gly Pro Val Cys Phe Leu
        755                 760                 765

<210> SEQ ID NO 19
<211> LENGTH: 511
<212> TYPE: PRT
<213> ORGANISM: Artificial Sequence
<220> FEATURE:
<223> OTHER INFORMATION: Synthetic construct

<400> SEQUENCE: 19

Met Arg Val Lys Gly Ile Arg Arg Asn Cys Gln His Ser Trp Arg Trp
1               5                   10                  15

Gly Thr Thr Leu Thr Met Leu Leu Gly Ile Leu Met Ile Cys Arg Ala
                20                  25                  30

Ala Glu Gln Leu Trp Val Thr Val Tyr Tyr Gly Val Pro Val Trp Arg
            35                  40                  45

Glu Ala Lys Thr Thr Leu Phe Cys Ala Ser Asp Ala Lys Ala Tyr Asp
    50                  55                  60

Thr Glu Val His Asn Val Trp Ala Thr His Ala Cys Val Pro Thr Asp
65                  70                  75                  80

Pro Asn Pro Gln Glu Leu Val Leu Val Asn Val Thr Glu Asn Phe Asn
                85                  90                  95

Ala Trp Glu Asn Asn Met Val Glu Gln Met His Glu Asp Ile Ile Ser
            100                 105                 110

Leu Trp Asp Gln Ser Leu Lys Pro Cys Val Lys Leu Thr Pro Leu Cys
        115                 120                 125

Val Thr Leu Asn Cys Asn Asp Leu Asn Thr Thr Thr Ser Asn Thr Thr
    130                 135                 140

Gly Thr Glu Gly Leu Thr Met Asp Lys Gly Glu Met Lys Asn Cys Ser
145                 150                 155                 160

Phe Asn Ile Thr Thr Asp Ile Ser Asn Lys Lys Gln Lys Gln Tyr Ala
                165                 170                 175

Leu Phe Tyr Lys Leu Asp Val Val Gln Met Asn Asn Asn Asn Asn Ser
            180                 185                 190
```

Tyr Arg Leu Ile Ser Cys Asn Thr Ser Val Ile Thr Gln Ala Cys Pro
            195                 200                 205

Lys Val Ser Phe Glu Pro Ile Pro Ile Tyr Tyr Cys Ala Pro Ala Gly
    210                 215                 220

Phe Ala Ile Leu Lys Cys Asn Asp Lys Ser Phe Ser Gly Lys Gly Glu
225                 230                 235                 240

Cys Lys Asn Val Ser Thr Val Gln Cys Thr His Gly Ile Arg Pro Val
                245                 250                 255

Val Ser Thr Gln Leu Leu Leu Asn Gly Ser Leu Ala Glu Glu Asp Val
                260                 265                 270

Ile Ile Arg Ser Asp Asn Phe Thr Asp Asn Ala Lys Thr Ile Ile Val
                275                 280                 285

Gln Leu Asn Glu Thr Val Asp Ile His Cys Ile Arg Pro Asn Asn Asn
    290                 295                 300

Thr Arg Lys Arg Ile Thr Met Gly Pro Gly Lys Val Tyr Tyr Thr Thr
305                 310                 315                 320

Gly Gln Ile Ile Gly Asp Ile Arg Gln Ala His Cys Asn Leu Ser Glu
                325                 330                 335

Ala Lys Trp Asn Asn Thr Leu Arg Arg Val Val Arg Lys Leu Arg Glu
                340                 345                 350

Lys Phe Asn Lys Thr Ile Val Phe Asn Gln Ser Ser Gly Gly Asp Pro
    355                 360                 365

Glu Ile Val Met His Thr Phe Asn Cys Gly Gly Glu Phe Phe Tyr Cys
    370                 375                 380

Asn Ser Thr Lys Leu Phe Asn Ser Ile Trp Asp Asn Asn Lys Asp Ser
385                 390                 395                 400

Thr Lys Thr Asn Glu Pro Asn Asp Gly Lys Asn Ile Thr Leu Pro Cys
                405                 410                 415

Arg Ile Lys Gln Ile Ile Asn Met Trp Gln Gly Val Gly Lys Ala Met
                420                 425                 430

Tyr Ala Pro Pro Ile Arg Gly Gln Ile Arg Cys Thr Ser Asn Ile Thr
                435                 440                 445

Gly Leu Leu Leu Thr Arg Asp Gly Gly Lys Asn Asn Gly Thr Asn Gly
    450                 455                 460

Thr Glu Val Phe Arg Pro Gly Gly Asn Met Lys Asp Asn Trp Arg
465                 470                 475                 480

Ser Glu Leu Tyr Lys Tyr Lys Val Val Lys Ile Glu Pro Leu Gly Val
                485                 490                 495

Ala Pro Thr Thr Ala Lys Arg Arg Val Val Gln Arg Glu Lys Arg
                500                 505                 510

<210> SEQ ID NO 20
<211> LENGTH: 479
<212> TYPE: PRT
<213> ORGANISM: Artificial Sequence
<220> FEATURE:
<223> OTHER INFORMATION: Synthetic construct

<400> SEQUENCE: 20

Ala Glu Gln Leu Trp Val Thr Val Tyr Tyr Gly Val Pro Val Trp Arg
1               5                   10                  15

Glu Ala Lys Thr Thr Leu Phe Cys Ala Ser Asp Ala Lys Ala Tyr Asp
                20                  25                  30

Thr Glu Val His Asn Val Trp Ala Thr His Ala Cys Val Pro Thr Asp
                35                  40                  45

```
Pro Asn Pro Gln Glu Leu Val Leu Val Asn Val Thr Glu Asn Phe Asn
 50                  55                  60
Ala Trp Glu Asn Asn Met Val Glu Gln Met His Glu Asp Ile Ile Ser
 65                  70                  75                  80
Leu Trp Asp Gln Ser Leu Lys Pro Cys Val Lys Leu Thr Pro Leu Cys
                 85                  90                  95
Val Thr Leu Asn Cys Asn Asp Leu Asn Thr Thr Ser Asn Thr Thr
            100                 105                 110
Gly Thr Glu Gly Leu Thr Met Asp Lys Gly Glu Met Lys Asn Cys Ser
            115                 120                 125
Phe Asn Ile Thr Thr Asp Ile Ser Asn Lys Gln Lys Gln Tyr Ala
130                 135                 140
Leu Phe Tyr Lys Leu Asp Val Val Gln Met Asn Asn Asn Asn Ser
145                 150                 155                 160
Tyr Arg Leu Ile Ser Cys Asn Thr Ser Val Ile Thr Gln Ala Cys Pro
                165                 170                 175
Lys Val Ser Phe Glu Pro Ile Pro Ile Tyr Tyr Cys Ala Pro Ala Gly
            180                 185                 190
Phe Ala Ile Leu Lys Cys Asn Asp Lys Ser Phe Ser Gly Lys Gly Glu
            195                 200                 205
Cys Lys Asn Val Ser Thr Val Gln Cys Thr His Gly Ile Arg Pro Val
210                 215                 220
Val Ser Thr Gln Leu Leu Leu Asn Gly Ser Leu Ala Glu Glu Asp Val
225                 230                 235                 240
Ile Ile Arg Ser Asp Asn Phe Thr Asp Asn Ala Lys Thr Ile Ile Val
                245                 250                 255
Gln Leu Asn Glu Thr Val Asp Ile His Cys Ile Arg Pro Asn Asn Asn
            260                 265                 270
Thr Arg Lys Arg Ile Thr Met Gly Pro Gly Lys Val Tyr Tyr Thr Thr
            275                 280                 285
Gly Gln Ile Ile Gly Asp Ile Arg Gln Ala His Cys Asn Leu Ser Glu
            290                 295                 300
Ala Lys Trp Asn Asn Thr Leu Arg Arg Val Val Arg Lys Leu Arg Glu
305                 310                 315                 320
Lys Phe Asn Lys Thr Ile Val Phe Asn Gln Ser Ser Gly Gly Asp Pro
                325                 330                 335
Glu Ile Val Met His Thr Phe Asn Cys Gly Gly Glu Phe Phe Tyr Cys
            340                 345                 350
Asn Ser Thr Lys Leu Phe Asn Ser Ile Trp Asp Asn Asn Lys Asp Ser
            355                 360                 365
Thr Lys Thr Asn Glu Pro Asn Asp Gly Lys Asn Ile Thr Leu Pro Cys
            370                 375                 380
Arg Ile Lys Gln Ile Ile Asn Met Trp Gln Gly Val Gly Lys Ala Met
385                 390                 395                 400
Tyr Ala Pro Pro Ile Arg Gly Gln Ile Arg Cys Thr Ser Asn Ile Thr
                405                 410                 415
Gly Leu Leu Leu Thr Arg Asp Gly Gly Lys Asn Asn Gly Thr Asn Gly
            420                 425                 430
Thr Glu Val Phe Arg Pro Gly Gly Asn Met Lys Asp Asn Trp Arg
            435                 440                 445
Ser Glu Leu Tyr Lys Tyr Lys Val Val Lys Ile Glu Pro Leu Gly Val
450                 455                 460
Ala Pro Thr Thr Ala Lys Arg Arg Val Val Gln Arg Glu Lys Arg
```

<210> SEQ ID NO 21
<211> LENGTH: 32
<212> TYPE: PRT
<213> ORGANISM: Artificial Sequence
<220> FEATURE:
<223> OTHER INFORMATION: Synthetic construct

<400> SEQUENCE: 21

```
Met Arg Val Lys Gly Ile Arg Arg Asn Cys Gln His Ser Trp Arg Trp
1               5                   10                  15

Gly Thr Thr Leu Thr Met Leu Leu Gly Ile Leu Met Ile Cys Arg Ala
            20                  25                  30
```

<210> SEQ ID NO 22
<211> LENGTH: 508
<212> TYPE: PRT
<213> ORGANISM: Artificial Sequence
<220> FEATURE:
<223> OTHER INFORMATION: Synthetic construct

<400> SEQUENCE: 22

```
Met Arg Val Met Gly Ile Gln Arg Asn Cys Gln His Leu Phe Arg Trp
1               5                   10                  15

Gly Thr Met Ile Leu Gly Met Ile Ile Cys Ser Ala Ala Glu Asn
            20                  25                  30

Leu Trp Val Thr Val Tyr Tyr Gly Val Pro Val Trp Lys Asp Ala Glu
            35                  40                  45

Thr Thr Leu Phe Cys Ala Ser Asp Ala Lys Ala Tyr Glu Thr Glu Lys
        50                  55                  60

His Asn Val Trp Ala Thr His Ala Cys Val Pro Thr Asp Pro Asn Pro
65                  70                  75                  80

Gln Glu Ile His Leu Glu Asn Val Thr Glu Glu Phe Asn Met Trp Lys
                85                  90                  95

Asn Asn Met Val Glu Gln Met His Thr Asp Ile Ile Ser Leu Trp Asp
            100                 105                 110

Gln Ser Leu Lys Pro Cys Val Lys Leu Thr Pro Leu Cys Val Thr Leu
        115                 120                 125

Gln Cys Thr Asn Val Thr Asn Asn Ile Thr Asp Asp Met Arg Gly Glu
    130                 135                 140

Leu Lys Asn Cys Ser Phe Asn Met Thr Thr Glu Leu Arg Asp Lys Lys
145                 150                 155                 160

Gln Lys Val Tyr Ser Leu Phe Tyr Arg Leu Asp Val Val Gln Ile Asn
                165                 170                 175

Glu Asn Gln Gly Asn Arg Ser Asn Asn Ser Lys Glu Tyr Arg Leu
            180                 185                 190

Ile Asn Cys Asn Thr Ser Ala Ile Thr Gln Ala Cys Pro Lys Val Ser
        195                 200                 205

Phe Glu Pro Ile Pro Ile His Tyr Cys Ala Pro Ala Gly Phe Ala Ile
    210                 215                 220

Leu Lys Cys Lys Asp Lys Lys Phe Asn Gly Thr Gly Pro Cys Pro Ser
225                 230                 235                 240

Val Ser Thr Val Gln Cys Thr His Gly Ile Lys Pro Val Val Ser Thr
                245                 250                 255

Gln Leu Leu Leu Asn Gly Ser Leu Ala Glu Glu Glu Val Met Ile Arg
            260                 265                 270
```

Ser Glu Asn Ile Thr Asn Asn Ala Lys Asn Ile Leu Val Gln Phe Asn
        275                 280                 285

Thr Pro Val Gln Ile Asn Cys Thr Arg Pro Asn Asn Asn Thr Arg Lys
    290                 295                 300

Ser Ile Arg Ile Gly Pro Gly Gln Ala Phe Tyr Ala Thr Gly Asp Ile
305                 310                 315                 320

Ile Gly Asp Ile Arg Gln Ala His Cys Thr Val Ser Lys Ala Thr Trp
                325                 330                 335

Asn Glu Thr Leu Gly Lys Val Val Gln Leu Arg Lys His Phe Gly
            340                 345                 350

Asn Asn Thr Ile Ile Arg Phe Ala Asn Ser Ser Gly Gly Asp Leu Glu
        355                 360                 365

Val Thr Thr His Ser Phe Asn Cys Gly Gly Glu Phe Phe Tyr Cys Asn
    370                 375                 380

Thr Ser Gly Leu Phe Asn Ser Thr Trp Ile Ser Asn Thr Ser Val Gln
385                 390                 395                 400

Gly Ser Asn Ser Thr Gly Ser Asn Asp Ser Ile Thr Leu Pro Cys Arg
                405                 410                 415

Ile Lys Gln Ile Ile Asn Met Trp Gln Arg Ile Gly Gln Ala Met Tyr
            420                 425                 430

Ala Pro Pro Ile Gln Gly Val Ile Arg Cys Val Ser Asn Ile Thr Gly
        435                 440                 445

Leu Ile Leu Thr Arg Asp Gly Gly Ser Thr Asn Ser Thr Thr Glu Thr
    450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Arg Ala Lys Arg Arg Val Val Gly Arg Glu Lys Arg
            500                 505

<210> SEQ ID NO 23
<211> LENGTH: 479
<212> TYPE: PRT
<213> ORGANISM: Artificial Sequence
<220> FEATURE:
<223> OTHER INFORMATION: Synthetic construct

<400> SEQUENCE: 23

Ala Glu Asn Leu Trp Val Thr Val Tyr Tyr Gly Val Pro Val Trp Lys
1               5                   10                  15

Asp Ala Glu Thr Thr Leu Phe Cys Ala Ser Asp Ala Lys Ala Tyr Glu
            20                  25                  30

Thr Glu Lys His Asn Val Trp Ala Thr His Ala Cys Val Pro Thr Asp
        35                  40                  45

Pro Asn Pro Gln Glu Ile His Leu Glu Asn Val Thr Glu Glu Phe Asn
    50                  55                  60

Met Trp Lys Asn Asn Met Val Glu Gln Met His Thr Asp Ile Ile Ser
65                  70                  75                  80

Leu Trp Asp Gln Ser Leu Lys Pro Cys Val Lys Leu Thr Pro Leu Cys
                85                  90                  95

Val Thr Leu Gln Cys Thr Asn Val Thr Asn Asn Ile Thr Asp Asp Met
            100                 105                 110

Arg Gly Glu Leu Lys Asn Cys Ser Phe Asn Met Thr Thr Glu Leu Arg
        115                 120                 125

Asp Lys Lys Gln Lys Val Tyr Ser Leu Phe Tyr Arg Leu Asp Val Val
    130                 135                 140

Gln Ile Asn Glu Asn Gln Gly Asn Arg Ser Asn Asn Ser Asn Lys Glu
145                 150                 155                 160

Tyr Arg Leu Ile Asn Cys Asn Thr Ser Ala Ile Thr Gln Ala Cys Pro
                165                 170                 175

Lys Val Ser Phe Glu Pro Ile Pro Ile His Tyr Cys Ala Pro Ala Gly
            180                 185                 190

Phe Ala Ile Leu Lys Cys Lys Asp Lys Lys Phe Asn Gly Thr Gly Pro
        195                 200                 205

Cys Pro Ser Val Ser Thr Val Gln Cys Thr His Gly Ile Lys Pro Val
210                 215                 220

Val Ser Thr Gln Leu Leu Leu Asn Gly Ser Leu Ala Glu Glu Glu Val
225                 230                 235                 240

Met Ile Arg Ser Glu Asn Ile Thr Asn Asn Ala Lys Asn Ile Leu Val
                245                 250                 255

Gln Phe Asn Thr Pro Val Gln Ile Asn Cys Thr Arg Pro Asn Asn Asn
            260                 265                 270

Thr Arg Lys Ser Ile Arg Ile Gly Pro Gly Gln Ala Phe Tyr Ala Thr
        275                 280                 285

Gly Asp Ile Ile Gly Asp Ile Arg Gln Ala His Cys Thr Val Ser Lys
290                 295                 300

Ala Thr Trp Asn Glu Thr Leu Gly Lys Val Val Lys Gln Leu Arg Lys
305                 310                 315                 320

His Phe Gly Asn Asn Thr Ile Ile Arg Phe Ala Asn Ser Ser Gly Gly
                325                 330                 335

Asp Leu Glu Val Thr Thr His Ser Phe Asn Cys Gly Gly Glu Phe Phe
            340                 345                 350

Tyr Cys Asn Thr Ser Gly Leu Phe Asn Ser Thr Trp Ile Ser Asn Thr
        355                 360                 365

Ser Val Gln Gly Ser Asn Ser Thr Gly Ser Asn Asp Ser Ile Thr Leu
370                 375                 380

Pro Cys Arg Ile Lys Gln Ile Ile Asn Met Trp Gln Arg Ile Gly Gln
385                 390                 395                 400

Ala Met Tyr Ala Pro Pro Ile Gln Gly Val Ile Arg Cys Val Ser Asn
                405                 410                 415

Ile Thr Gly Leu Ile Leu Thr Arg Asp Gly Gly Ser Thr Asn Ser Thr
            420                 425                 430

Thr Glu Thr Phe Arg Pro Gly Gly Gly Asp Met Arg Asp Asn Trp Arg
        435                 440                 445

Ser Glu Leu Tyr Lys Tyr Lys Val Val Lys Ile Glu Pro Leu Gly Val
450                 455                 460

Ala Pro Thr Arg Ala Lys Arg Val Val Gly Arg Glu Lys Arg
465                 470                 475

<210> SEQ ID NO 24
<211> LENGTH: 29
<212> TYPE: PRT
<213> ORGANISM: Artificial Sequence
<220> FEATURE:
<223> OTHER INFORMATION: Synthetic construct

<400> SEQUENCE: 24

Met Arg Val Met Gly Ile Gln Arg Asn Cys Gln His Leu Phe Arg Trp
1               5                   10                  15

```
Gly Thr Met Ile Leu Gly Met Ile Ile Ile Cys Ser Ala
            20                  25
```

<210> SEQ ID NO 25
<211> LENGTH: 508
<212> TYPE: PRT
<213> ORGANISM: Artificial Sequence
<220> FEATURE:
<223> OTHER INFORMATION: Synthetic construct

<400> SEQUENCE: 25

```
Met Arg Val Thr Glu Ile Arg Lys Ser Tyr Gln His Trp Trp Arg Trp
1               5                   10                  15

Gly Ile Met Leu Leu Gly Ile Leu Met Ile Cys Asn Ala Glu Glu Lys
            20                  25                  30

Leu Trp Val Thr Val Tyr Tyr Gly Val Pro Val Trp Lys Glu Ala Thr
        35                  40                  45

Thr Thr Leu Phe Cys Ala Ser Asp Ala Lys Ala Tyr Asp Thr Glu Val
    50                  55                  60

His Asn Val Trp Ala Thr His Ala Cys Val Pro Thr Asp Pro Asn Pro
65                  70                  75                  80

Gln Glu Val Glu Leu Glu Asn Val Thr Glu Asn Phe Asn Met Trp Lys
                85                  90                  95

Asn Asn Met Val Glu Gln Met His Glu Asp Ile Ile Ser Leu Trp Asp
            100                 105                 110

Gln Ser Leu Lys Pro Cys Val Lys Leu Thr Pro Leu Cys Val Thr Leu
        115                 120                 125

Asn Cys Thr Asp Leu Arg Asn Ala Thr Ser Arg Asn Val Thr Asn Thr
    130                 135                 140

Thr Ser Ser Ser Arg Gly Met Val Gly Gly Glu Met Lys Asn Cys
145                 150                 155                 160

Ser Phe Asn Ile Thr Thr Gly Ile Arg Gly Lys Val Gln Lys Glu Tyr
                165                 170                 175

Ala Leu Phe Tyr Glu Leu Asp Ile Val Pro Ile Asp Asn Lys Ile Asp
            180                 185                 190

Arg Tyr Arg Leu Ile Ser Cys Asn Thr Ser Val Ile Thr Gln Ala Cys
        195                 200                 205

Pro Lys Val Ser Phe Glu Pro Ile Pro Ile His Tyr Cys Ala Pro Ala
    210                 215                 220

Gly Phe Ala Ile Leu Lys Cys Lys Asp Lys Lys Phe Asn Gly Lys Gly
225                 230                 235                 240

Pro Cys Ser Asn Val Ser Thr Val Gln Cys Thr His Gly Ile Arg Pro
                245                 250                 255

Val Val Ser Thr Gln Leu Leu Leu Asn Gly Ser Leu Ala Glu Glu Glu
            260                 265                 270

Val Val Ile Arg Ser Glu Asn Phe Thr Asn Asn Ala Lys Thr Ile Ile
        275                 280                 285

Val Gln Leu Asn Glu Ser Val Glu Ile Asn Cys Thr Arg Pro Asn Asn
    290                 295                 300

Asn Thr Arg Lys Ser Ile Asn Ile Gly Pro Gly Arg Ala Phe Tyr Thr
305                 310                 315                 320

Thr Gly Glu Ile Ile Gly Asp Ile Arg Gln Ala His Cys Asn Leu Ser
                325                 330                 335

Arg Ala Lys Trp Asn Asp Thr Leu Asn Lys Ile Val Ile Lys Leu Arg
            340                 345                 350
```

-continued

```
Glu Gln Phe Gly Asn Lys Thr Ile Val Phe Lys His Ser Gly Gly
                355                 360                 365

Asp Pro Glu Ile Val Thr His Ser Phe Asn Cys Gly Gly Phe Phe
    370                 375                 380

Tyr Cys Asn Ser Thr Gln Leu Phe Asn Ser Thr Trp Asn Val Thr Glu
385                 390                 395                 400

Glu Ser Asn Asn Thr Val Glu Asn Asn Thr Ile Thr Leu Pro Cys Arg
                405                 410                 415

Ile Lys Gln Ile Ile Asn Met Trp Gln Glu Val Gly Arg Ala Met Tyr
                420                 425                 430

Ala Pro Pro Ile Arg Gly Gln Ile Arg Cys Ser Ser Asn Ile Thr Gly
            435                 440                 445

Leu Leu Leu Thr Arg Asp Gly Gly Pro Glu Asp Asn Lys Thr Glu Val
        450                 455                 460

Phe Arg Pro Gly Gly Gly Asp Met Arg Asp Asn Trp Arg Ser Glu Leu
465                 470                 475                 480

Tyr Lys Tyr Lys Val Val Lys Ile Glu Pro Leu Gly Val Ala Pro Thr
                485                 490                 495

Lys Ala Lys Arg Arg Val Val Gln Arg Glu Lys Arg
                500                 505

<210> SEQ ID NO 26
<211> LENGTH: 479
<212> TYPE: PRT
<213> ORGANISM: Artificial Sequence
<220> FEATURE:
<223> OTHER INFORMATION: Synthetic construct

<400> SEQUENCE: 26

Glu Glu Lys Leu Trp Val Thr Val Tyr Tyr Gly Val Pro Val Trp Lys
1               5                   10                  15

Glu Ala Thr Thr Thr Leu Phe Cys Ala Ser Asp Ala Lys Ala Tyr Asp
                20                  25                  30

Thr Glu Val His Asn Val Trp Ala Thr His Ala Cys Val Pro Thr Asp
            35                  40                  45

Pro Asn Pro Gln Glu Val Glu Leu Glu Asn Val Thr Glu Asn Phe Asn
    50                  55                  60

Met Trp Lys Asn Asn Met Val Glu Gln Met His Glu Asp Ile Ile Ser
65              70                  75                  80

Leu Trp Asp Gln Ser Leu Lys Pro Cys Val Lys Leu Thr Pro Leu Cys
                85                  90                  95

Val Thr Leu Asn Cys Thr Asp Leu Arg Asn Ala Thr Ser Arg Asn Val
                100                 105                 110

Thr Asn Thr Thr Ser Ser Ser Arg Gly Met Val Gly Gly Gly Glu Met
            115                 120                 125

Lys Asn Cys Ser Phe Asn Ile Thr Thr Gly Ile Arg Gly Lys Val Gln
    130                 135                 140

Lys Glu Tyr Ala Leu Phe Tyr Glu Leu Asp Ile Val Pro Ile Asp Asn
145                 150                 155                 160

Lys Ile Asp Arg Tyr Arg Leu Ile Ser Cys Asn Thr Ser Val Ile Thr
                165                 170                 175

Gln Ala Cys Pro Lys Val Ser Phe Glu Pro Ile Pro Ile His Tyr Cys
                180                 185                 190

Ala Pro Ala Gly Phe Ala Ile Leu Lys Cys Lys Asp Lys Lys Phe Asn
            195                 200                 205
```

```
Gly Lys Gly Pro Cys Ser Asn Val Ser Thr Val Cys Thr His Gly
    210                 215                 220

Ile Arg Pro Val Val Ser Thr Gln Leu Leu Asn Gly Ser Leu Ala
225                 230                 235                 240

Glu Glu Glu Val Val Ile Arg Ser Glu Asn Phe Thr Asn Asn Ala Lys
                245                 250                 255

Thr Ile Ile Val Gln Leu Asn Glu Ser Val Glu Ile Asn Cys Thr Arg
            260                 265                 270

Pro Asn Asn Asn Thr Arg Lys Ser Ile Asn Ile Gly Pro Gly Arg Ala
                275                 280                 285

Phe Tyr Thr Thr Gly Glu Ile Ile Gly Asp Ile Arg Gln Ala His Cys
290                 295                 300

Asn Leu Ser Arg Ala Lys Trp Asn Asp Thr Leu Asn Lys Ile Val Ile
305                 310                 315                 320

Lys Leu Arg Glu Gln Phe Gly Asn Lys Thr Ile Val Phe Lys His Ser
                325                 330                 335

Ser Gly Gly Asp Pro Glu Ile Val Thr His Ser Phe Asn Cys Gly Gly
            340                 345                 350

Glu Phe Phe Tyr Cys Asn Ser Thr Gln Leu Phe Asn Ser Thr Trp Asn
        355                 360                 365

Val Thr Glu Glu Ser Asn Asn Thr Val Glu Asn Asn Thr Ile Thr Leu
    370                 375                 380

Pro Cys Arg Ile Lys Gln Ile Ile Asn Met Trp Gln Glu Val Gly Arg
385                 390                 395                 400

Ala Met Tyr Ala Pro Pro Ile Arg Gly Gln Ile Arg Cys Ser Ser Asn
                405                 410                 415

Ile Thr Gly Leu Leu Leu Thr Arg Asp Gly Gly Pro Glu Asp Asn Lys
            420                 425                 430

Thr Glu Val Phe Arg Pro Gly Gly Gly Asp Met Arg Asp Asn Trp Arg
        435                 440                 445

Ser Glu Leu Tyr Lys Tyr Lys Val Val Lys Ile Glu Pro Leu Gly Val
    450                 455                 460

Ala Pro Thr Lys Ala Lys Arg Arg Val Val Gln Arg Glu Lys Arg
465                 470                 475

<210> SEQ ID NO 27
<211> LENGTH: 29
<212> TYPE: PRT
<213> ORGANISM: Artificial Sequence
<220> FEATURE:
<223> OTHER INFORMATION: Synthetic construct

<400> SEQUENCE: 27

Met Arg Val Thr Glu Ile Arg Lys Ser Tyr Gln His Trp Trp Arg Trp
1               5                   10                  15

Gly Ile Met Leu Leu Gly Ile Leu Met Ile Cys Asn Ala
            20                  25

<210> SEQ ID NO 28
<211> LENGTH: 494
<212> TYPE: PRT
<213> ORGANISM: Artificial Sequence
<220> FEATURE:
<223> OTHER INFORMATION: Synthetic construct

<400> SEQUENCE: 28

Met Arg Val Met Gly Ile Gln Arg Asn Tyr Pro Gln Trp Trp Ile Trp
1               5                   10                  15
```

```
Ser Met Leu Gly Phe Trp Met Leu Met Ile Cys Asn Gly Met Trp Val
            20                  25                  30

Thr Val Tyr Tyr Gly Val Pro Val Trp Lys Glu Ala Lys Thr Thr Leu
            35                  40                  45

Phe Cys Ala Ser Asp Ala Lys Ala Tyr Glu Lys Glu Val His Asn Val
50                  55                  60

Trp Ala Thr His Ala Cys Val Pro Thr Asp Pro Asn Pro Gln Glu Met
65                  70                  75                  80

Val Leu Lys Asn Val Thr Glu Asn Phe Asn Met Trp Lys Asn Asp Met
                85                  90                  95

Val Asp Gln Met His Glu Asp Val Ile Ser Leu Trp Asp Gln Ser Leu
                100                 105                 110

Lys Pro Cys Val Lys Leu Thr Pro Leu Cys Val Thr Leu Asn Cys Thr
            115                 120                 125

Asn Ala Thr Ala Ser Asn Ser Ser Ile Ile Glu Gly Met Lys Asn Cys
130                 135                 140

Ser Phe Asn Ile Thr Thr Glu Leu Arg Asp Lys Arg Glu Lys Lys Asn
145                 150                 155                 160

Ala Leu Phe Tyr Lys Leu Asp Ile Val Gln Leu Asp Gly Asn Ser Ser
            165                 170                 175

Gln Tyr Arg Leu Ile Asn Cys Asn Thr Ser Val Ile Thr Gln Ala Cys
            180                 185                 190

Pro Lys Val Ser Phe Asp Pro Ile Pro Ile His Tyr Cys Ala Pro Ala
            195                 200                 205

Gly Tyr Ala Ile Leu Lys Cys Asn Asn Lys Thr Phe Thr Gly Thr Gly
            210                 215                 220

Pro Cys Asn Asn Val Ser Thr Val Gln Cys Thr His Gly Ile Lys Pro
225                 230                 235                 240

Val Val Ser Thr Gln Leu Leu Leu Asn Gly Ser Leu Ala Glu Gly Glu
                245                 250                 255

Ile Ile Ile Arg Ser Glu Asn Ile Thr Asn Asn Val Lys Thr Ile Ile
            260                 265                 270

Val His Leu Asn Glu Ser Val Lys Ile Glu Cys Thr Arg Pro Asn Asn
            275                 280                 285

Lys Thr Arg Thr Ser Ile Arg Ile Gly Pro Gly Gln Ala Phe Tyr Ala
            290                 295                 300

Thr Gly Gln Val Ile Gly Asp Ile Arg Glu Ala Tyr Cys Asn Ile Asn
305                 310                 315                 320

Glu Ser Lys Trp Asn Glu Thr Leu Gln Arg Val Ser Lys Lys Leu Lys
                325                 330                 335

Glu Tyr Phe Pro His Lys Asn Ile Thr Phe Gln Pro Ser Ser Gly Gly
                340                 345                 350

Asp Leu Glu Ile Thr Thr His Ser Phe Asn Cys Gly Gly Glu Phe Phe
            355                 360                 365

Tyr Cys Asn Thr Ser Ser Leu Phe Asn Arg Thr Tyr Met Ala Asn Ser
            370                 375                 380

Thr Asp Met Ala Asn Ser Thr Glu Thr Asn Ser Thr Arg Thr Ile Thr
385                 390                 395                 400

Ile His Cys Arg Ile Lys Gln Ile Ile Asn Met Trp Gln Glu Val Gly
            405                 410                 415

Arg Ala Met Tyr Ala Pro Pro Ile Ala Gly Asn Ile Thr Cys Ile Ser
            420                 425                 430
```

```
Asn Ile Thr Gly Leu Leu Leu Thr Arg Asp Gly Lys Asn Asn Thr
            435                 440                 445

Glu Thr Phe Arg Pro Gly Gly Asn Met Lys Asp Asn Trp Arg Ser
450                 455                 460

Glu Leu Tyr Lys Tyr Lys Val Val Glu Val Lys Pro Leu Gly Val Ala
465                 470                 475                 480

Pro Thr Asn Ala Arg Arg Val Val Glu Arg Glu Lys Arg
                485                 490

<210> SEQ ID NO 29
<211> LENGTH: 456
<212> TYPE: PRT
<213> ORGANISM: Artificial Sequence
<220> FEATURE:
<223> OTHER INFORMATION: Synthetic construct

<400> SEQUENCE: 29

Pro Val Trp Lys Glu Ala Lys Thr Thr Leu Phe Cys Ala Ser Asp Ala
1               5                   10                  15

Lys Ala Tyr Glu Lys Glu Val His Asn Val Trp Ala Thr His Ala Cys
                20                  25                  30

Val Pro Thr Asp Pro Asn Pro Gln Glu Met Val Leu Lys Asn Val Thr
            35                  40                  45

Glu Asn Phe Asn Met Trp Lys Asn Asp Met Val Asp Gln Met His Glu
50                  55                  60

Asp Val Ile Ser Leu Trp Asp Gln Ser Leu Lys Pro Cys Val Lys Leu
65                  70                  75                  80

Thr Pro Leu Cys Val Thr Leu Asn Cys Thr Asn Ala Thr Ala Ser Asn
                85                  90                  95

Ser Ser Ile Ile Glu Gly Met Lys Asn Cys Ser Phe Asn Ile Thr Thr
            100                 105                 110

Glu Leu Arg Asp Lys Arg Glu Lys Lys Asn Ala Leu Phe Tyr Lys Leu
        115                 120                 125

Asp Ile Val Gln Leu Asp Gly Asn Ser Ser Gln Tyr Arg Leu Ile Asn
    130                 135                 140

Cys Asn Thr Ser Val Ile Thr Gln Ala Cys Pro Lys Val Ser Phe Asp
145                 150                 155                 160

Pro Ile Pro Ile His Tyr Cys Ala Pro Ala Gly Tyr Ala Ile Leu Lys
                165                 170                 175

Cys Asn Asn Lys Thr Phe Thr Gly Thr Gly Pro Cys Asn Asn Val Ser
            180                 185                 190

Thr Val Gln Cys Thr His Gly Ile Lys Pro Val Val Ser Thr Gln Leu
        195                 200                 205

Leu Leu Asn Gly Ser Leu Ala Glu Gly Glu Ile Ile Ile Arg Ser Glu
    210                 215                 220

Asn Ile Thr Asn Asn Val Lys Thr Ile Ile Val His Leu Asn Glu Ser
225                 230                 235                 240

Val Lys Ile Glu Cys Thr Arg Pro Asn Asn Lys Thr Arg Thr Ser Ile
                245                 250                 255

Arg Ile Gly Pro Gly Gln Ala Phe Tyr Ala Thr Gly Gln Val Ile Gly
            260                 265                 270

Asp Ile Arg Glu Ala Tyr Cys Asn Ile Asn Glu Ser Lys Trp Asn Glu
        275                 280                 285

Thr Leu Gln Arg Val Ser Lys Lys Leu Lys Glu Tyr Phe Pro His Lys
    290                 295                 300
```

```
Asn Ile Thr Phe Gln Pro Ser Ser Gly Gly Asp Leu Glu Ile Thr Thr
305                 310                 315                 320

His Ser Phe Asn Cys Gly Gly Glu Phe Phe Tyr Cys Asn Thr Ser Ser
                325                 330                 335

Leu Phe Asn Arg Thr Tyr Met Ala Asn Ser Thr Asp Met Ala Asn Ser
            340                 345                 350

Thr Glu Thr Asn Ser Thr Arg Thr Ile Thr Ile His Cys Arg Ile Lys
        355                 360                 365

Gln Ile Ile Asn Met Trp Gln Glu Val Gly Arg Ala Met Tyr Ala Pro
370                 375                 380

Pro Ile Ala Gly Asn Ile Thr Cys Ile Ser Asn Ile Thr Gly Leu Leu
385                 390                 395                 400

Leu Thr Arg Asp Gly Gly Lys Asn Asn Thr Glu Thr Phe Arg Pro Gly
                405                 410                 415

Gly Gly Asn Met Lys Asp Asn Trp Arg Ser Glu Leu Tyr Lys Tyr Lys
            420                 425                 430

Val Val Glu Val Lys Pro Leu Gly Val Ala Pro Thr Asn Ala Arg Arg
        435                 440                 445

Arg Val Val Glu Arg Glu Lys Arg
    450                 455
```

<210> SEQ ID NO 30
<211> LENGTH: 38
<212> TYPE: PRT
<213> ORGANISM: Artificial Sequence
<220> FEATURE:
<223> OTHER INFORMATION: Synthetic construct

<400> SEQUENCE: 30

```
Met Arg Val Met Gly Ile Gln Arg Asn Tyr Pro Gln Trp Trp Ile Trp
1               5                   10                  15

Ser Met Leu Gly Phe Trp Met Leu Met Ile Cys Asn Gly Met Trp Val
            20                  25                  30

Thr Val Tyr Tyr Gly Val
        35
```

<210> SEQ ID NO 31
<211> LENGTH: 244
<212> TYPE: PRT
<213> ORGANISM: Artificial Sequence
<220> FEATURE:
<223> OTHER INFORMATION: Synthetic construct

<400> SEQUENCE: 31

```
Ala Asn Val Val Arg Asp Arg Asp Leu Glu Val Asp Thr Thr Leu Lys
1               5                   10                  15

Ser Leu Ser Gln Gln Ile Glu Asn Ile Arg Ser Pro Glu Gly Ser Arg
            20                  25                  30

Lys Asn Pro Ala Arg Thr Cys Arg Asp Leu Lys Met Cys His Ser Asp
        35                  40                  45

Trp Lys Ser Gly Glu Tyr Trp Ile Asp Pro Asn Gln Gly Cys Asn Leu
    50                  55                  60

Asp Ala Ile Lys Val Phe Cys Asn Met Glu Thr Gly Thr Cys Val
65                  70                  75                  80

Tyr Pro Thr Gln Pro Ser Val Ala Gln Lys Asn Trp Tyr Ile Ser Lys
            85                  90                  95

Asn Pro Lys Asp Lys Arg His Val Trp Phe Gly Glu Ser Met Thr Asp
        100                 105                 110
```

```
Gly Phe Gln Phe Glu Tyr Gly Gly Gln Gly Ser Asp Pro Ala Asp Val
            115                 120                 125

Ala Ile Gln Leu Thr Phe Leu Arg Leu Met Ser Thr Glu Ala Ser Gln
130                 135                 140

Asn Ile Thr Tyr His Cys Lys Asn Ser Val Ala Tyr Met Asp Gln Gln
145                 150                 155                 160

Thr Gly Asn Leu Lys Lys Ala Leu Leu Leu Gln Gly Ser Asn Glu Ile
            165                 170                 175

Glu Ile Arg Ala Glu Gly Asn Ser Arg Phe Thr Tyr Ser Val Thr Val
            180                 185                 190

Asp Gly Cys Thr Ser His Thr Gly Ala Trp Gly Lys Thr Val Ile Glu
            195                 200                 205

Tyr Lys Thr Thr Lys Thr Ser Arg Leu Pro Ile Ile Asp Val Ala Pro
            210                 215                 220

Leu Asp Val Gly Ala Pro Asp Gln Glu Phe Gly Phe Asp Val Gly Pro
225                 230                 235                 240

Val Cys Phe Leu

<210> SEQ ID NO 32
<211> LENGTH: 246
<212> TYPE: PRT
<213> ORGANISM: Artificial Sequence
<220> FEATURE:
<223> OTHER INFORMATION: Synthetic construct

<400> SEQUENCE: 32

Arg Ser Ala Asn Val Val Arg Asp Arg Asp Leu Glu Val Asp Thr Thr
1               5                   10                  15

Leu Lys Ser Leu Ser Gln Gln Ile Glu Asn Ile Arg Ser Pro Glu Gly
            20                  25                  30

Ser Arg Lys Asn Pro Ala Arg Thr Cys Arg Asp Leu Lys Met Cys His
            35                  40                  45

Ser Asp Trp Lys Ser Gly Glu Tyr Trp Ile Asp Pro Asn Gln Gly Cys
50                  55                  60

Asn Leu Asp Ala Ile Lys Val Phe Cys Asn Met Glu Thr Gly Glu Thr
65                  70                  75                  80

Cys Val Tyr Pro Thr Gln Pro Ser Val Ala Gln Lys Asn Trp Tyr Ile
            85                  90                  95

Ser Lys Asn Pro Lys Asp Lys Arg His Val Trp Phe Gly Glu Ser Met
            100                 105                 110

Thr Asp Gly Phe Gln Phe Glu Tyr Gly Gly Gln Gly Ser Asp Pro Ala
            115                 120                 125

Asp Val Ala Ile Gln Leu Thr Phe Leu Arg Leu Met Ser Thr Glu Ala
130                 135                 140

Ser Gln Asn Ile Thr Tyr His Cys Lys Asn Ser Val Ala Tyr Met Asp
145                 150                 155                 160

Gln Gln Thr Gly Asn Leu Lys Lys Ala Leu Leu Leu Gln Gly Ser Asn
            165                 170                 175

Glu Ile Glu Ile Arg Ala Glu Gly Asn Ser Arg Phe Thr Tyr Ser Val
            180                 185                 190

Thr Val Asp Gly Cys Thr Ser His Thr Gly Ala Trp Gly Lys Thr Val
            195                 200                 205

Ile Glu Tyr Lys Thr Thr Lys Thr Ser Arg Leu Pro Ile Ile Asp Val
            210                 215                 220
```

```
Ala Pro Leu Asp Val Gly Ala Pro Asp Gln Glu Phe Gly Phe Asp Val
225                 230                 235                 240

Gly Pro Val Cys Phe Leu
            245
```

<210> SEQ ID NO 33
<211> LENGTH: 309
<212> TYPE: PRT
<213> ORGANISM: Artificial Sequence
<220> FEATURE:
<223> OTHER INFORMATION: Synthetic construct

<400> SEQUENCE: 33

```
Asn Gly Leu Pro Gly Pro Ile Gly Pro Pro Gly Pro Arg Gly Arg Thr
1               5                   10                  15

Gly Asp Ala Gly Pro Val Gly Pro Pro Gly Pro Pro Gly Pro Pro Gly
            20                  25                  30

Pro Pro Gly Pro Pro Ser Ala Gly Phe Asp Phe Ser Phe Leu Pro Gln
        35                  40                  45

Pro Pro Gln Glu Lys Ala His Asp Gly Gly Arg Tyr Tyr Arg Ala Asn
    50                  55                  60

Asp Ala Asn Val Val Arg Asp Arg Asp Leu Glu Val Asp Thr Thr Leu
65                  70                  75                  80

Lys Ser Leu Ser Gln Gln Ile Glu Asn Ile Arg Ser Pro Glu Gly Ser
                85                  90                  95

Arg Lys Asn Pro Ala Arg Thr Cys Arg Asp Leu Lys Met Cys His Ser
            100                 105                 110

Asp Trp Lys Ser Gly Glu Tyr Trp Ile Asp Pro Asn Gln Gly Cys Asn
        115                 120                 125

Leu Asp Ala Ile Lys Val Phe Cys Asn Met Glu Thr Gly Glu Thr Cys
130                 135                 140

Val Tyr Pro Thr Gln Pro Ser Val Ala Gln Lys Asn Trp Tyr Ile Ser
145                 150                 155                 160

Lys Asn Pro Lys Asp Lys Arg His Val Trp Phe Gly Glu Ser Met Thr
                165                 170                 175

Asp Gly Phe Gln Phe Glu Tyr Gly Gly Gln Gly Ser Asp Pro Ala Asp
            180                 185                 190

Val Ala Ile Gln Leu Thr Phe Leu Arg Leu Met Ser Thr Glu Ala Ser
        195                 200                 205

Gln Asn Ile Thr Tyr His Cys Lys Asn Ser Val Ala Tyr Met Asp Gln
    210                 215                 220

Gln Thr Gly Asn Leu Lys Lys Ala Leu Leu Leu Gln Gly Ser Asn Glu
225                 230                 235                 240

Ile Glu Ile Arg Ala Glu Gly Asn Ser Arg Phe Thr Tyr Ser Val Thr
                245                 250                 255

Val Asp Gly Cys Thr Ser His Thr Gly Ala Trp Gly Lys Thr Val Ile
            260                 265                 270

Glu Tyr Lys Thr Thr Lys Thr Ser Arg Leu Pro Ile Ile Asp Val Ala
        275                 280                 285

Pro Leu Asp Val Gly Ala Pro Asp Gln Glu Phe Gly Phe Asp Val Gly
    290                 295                 300

Pro Val Cys Phe Leu
305
```

<210> SEQ ID NO 34
<211> LENGTH: 309

<212> TYPE: PRT
<213> ORGANISM: Artificial Sequence
<220> FEATURE:
<223> OTHER INFORMATION: Synthetic construct

<400> SEQUENCE: 34

| | | | | | | | | | | | | | | |
|---|---|---|---|---|---|---|---|---|---|---|---|---|---|---|
| Asn | Gly | Leu | Pro | Gly | Pro | Ile | Gly | Pro | Pro | Gly | Pro | Arg | Gly | Arg | Thr |
| 1 | | | | 5 | | | | | 10 | | | | | 15 | |
| Gly | Asp | Ala | Gly | Pro | Val | Gly | Pro | Pro | Gly | Pro | Pro | Gly | Pro | Pro | Gly |
| | | | 20 | | | | | 25 | | | | | 30 | | |
| Pro | Pro | Gly | Pro | Pro | Ser | Ala | Gly | Phe | Asp | Phe | Ser | Phe | Leu | Pro | Gln |
| | | 35 | | | | | 40 | | | | | 45 | | | |
| Pro | Pro | Gln | Glu | Lys | Ala | His | Asp | Gly | Gly | Arg | Tyr | Tyr | Arg | Asn | Asp |
| 50 | | | | | 55 | | | | | 60 | | | | | |
| Asp | Ala | Asn | Val | Val | Arg | Asp | Arg | Asp | Leu | Glu | Val | Asp | Thr | Thr | Leu |
| 65 | | | | | 70 | | | | | 75 | | | | | 80 |
| Lys | Ser | Leu | Ser | Gln | Gln | Ile | Glu | Asn | Ile | Arg | Ser | Pro | Glu | Gly | Ser |
| | | | | 85 | | | | | 90 | | | | | 95 | |
| Arg | Lys | Asn | Pro | Ala | Arg | Thr | Cys | Arg | Asp | Leu | Lys | Met | Cys | His | Ser |
| | | | 100 | | | | | 105 | | | | | 110 | | |
| Asp | Trp | Lys | Ser | Gly | Glu | Tyr | Trp | Ile | Asp | Pro | Asn | Gln | Gly | Cys | Asn |
| | | 115 | | | | | 120 | | | | | 125 | | | |
| Leu | Asp | Ala | Ile | Lys | Val | Phe | Cys | Asn | Met | Glu | Thr | Gly | Glu | Thr | Cys |
| 130 | | | | | 135 | | | | | 140 | | | | | |
| Val | Tyr | Pro | Thr | Gln | Pro | Ser | Val | Ala | Gln | Lys | Asn | Trp | Tyr | Ile | Ser |
| 145 | | | | | 150 | | | | | 155 | | | | | 160 |
| Lys | Asn | Pro | Lys | Asp | Lys | Arg | His | Val | Trp | Phe | Gly | Glu | Ser | Met | Thr |
| | | | | 165 | | | | | 170 | | | | | 175 | |
| Asp | Gly | Phe | Gln | Phe | Glu | Tyr | Gly | Gly | Gln | Gly | Ser | Asp | Pro | Ala | Asp |
| | | | 180 | | | | | 185 | | | | | 190 | | |
| Val | Ala | Ile | Gln | Leu | Thr | Phe | Leu | Arg | Leu | Met | Ser | Thr | Glu | Ala | Ser |
| | | | | 195 | | | | | 200 | | | | | 205 | |
| Gln | Asn | Ile | Thr | Tyr | His | Cys | Lys | Asn | Ser | Val | Ala | Tyr | Met | Asp | Gln |
| 210 | | | | | 215 | | | | | 220 | | | | | |
| Gln | Thr | Gly | Asn | Leu | Lys | Lys | Ala | Leu | Leu | Leu | Gln | Gly | Ser | Asn | Glu |
| 225 | | | | | 230 | | | | | 235 | | | | | 240 |
| Ile | Glu | Ile | Arg | Ala | Glu | Gly | Asn | Ser | Arg | Phe | Thr | Tyr | Ser | Val | Thr |
| | | | | 245 | | | | | 250 | | | | | 255 | |
| Val | Asp | Gly | Cys | Thr | Ser | His | Thr | Gly | Ala | Trp | Gly | Lys | Thr | Val | Ile |
| | | | 260 | | | | | 265 | | | | | 270 | | |
| Glu | Tyr | Lys | Thr | Thr | Lys | Thr | Ser | Arg | Leu | Pro | Ile | Ile | Asp | Val | Ala |
| | | | 275 | | | | | 280 | | | | | 285 | | |
| Pro | Leu | Asp | Val | Gly | Ala | Pro | Asp | Gln | Glu | Phe | Gly | Phe | Asp | Val | Gly |
| | | 290 | | | | | 295 | | | | | 300 | | | |
| Pro | Val | Cys | Phe | Leu |
| 305 | | | | |

<210> SEQ ID NO 35
<211> LENGTH: 311
<212> TYPE: PRT
<213> ORGANISM: Artificial Sequence
<220> FEATURE:
<223> OTHER INFORMATION: Synthetic construct

<400> SEQUENCE: 35

| | | | | | | | | | | | | | | | |
|---|---|---|---|---|---|---|---|---|---|---|---|---|---|---|---|
| Arg | Ser | Asn | Gly | Leu | Pro | Gly | Pro | Ile | Gly | Pro | Pro | Gly | Pro | Arg | Gly |
| 1 | | | | | 5 | | | | | 10 | | | | | 15 |

Arg Thr Gly Asp Ala Gly Pro Val Gly Pro Pro Gly Pro
            20                  25                  30

Pro Gly Pro Gly Pro Pro Ser Ala Gly Phe Asp Phe Ser Phe Leu
            35                  40                  45

Pro Gln Pro Pro Gln Glu Lys Ala His Asp Gly Gly Arg Tyr Tyr Arg
 50                  55                  60

Ala Asn Asp Ala Asn Val Val Arg Asp Arg Asp Leu Glu Val Asp Thr
 65                  70                  75                  80

Thr Leu Lys Ser Leu Ser Gln Gln Ile Glu Asn Ile Arg Ser Pro Glu
            85                  90                  95

Gly Ser Arg Lys Asn Pro Ala Arg Thr Cys Arg Asp Leu Lys Met Cys
            100                 105                 110

His Ser Asp Trp Lys Ser Gly Glu Tyr Trp Ile Asp Pro Asn Gln Gly
            115                 120                 125

Cys Asn Leu Asp Ala Ile Lys Val Phe Cys Asn Met Glu Thr Gly Glu
130                 135                 140

Thr Cys Val Tyr Pro Thr Gln Pro Ser Val Ala Gln Lys Asn Trp Tyr
145                 150                 155                 160

Ile Ser Lys Asn Pro Lys Asp Lys Arg His Val Trp Phe Gly Glu Ser
            165                 170                 175

Met Thr Asp Gly Phe Gln Phe Glu Tyr Gly Gly Gln Gly Ser Asp Pro
            180                 185                 190

Ala Asp Val Ala Ile Gln Leu Thr Phe Leu Arg Leu Met Ser Thr Glu
            195                 200                 205

Ala Ser Gln Asn Ile Thr Tyr His Cys Lys Asn Ser Val Ala Tyr Met
 210                 215                 220

Asp Gln Gln Thr Gly Asn Leu Lys Lys Ala Leu Leu Leu Gln Gly Ser
225                 230                 235                 240

Asn Glu Ile Glu Ile Arg Ala Glu Gly Asn Ser Arg Phe Thr Tyr Ser
            245                 250                 255

Val Thr Val Asp Gly Cys Thr Ser His Thr Gly Ala Trp Gly Lys Thr
            260                 265                 270

Val Ile Glu Tyr Lys Thr Thr Lys Thr Ser Arg Leu Pro Ile Ile Asp
            275                 280                 285

Val Ala Pro Leu Asp Val Gly Ala Pro Asp Gln Glu Phe Gly Phe Asp
 290                 295                 300

Val Gly Pro Val Cys Phe Leu
305                 310

<210> SEQ ID NO 36
<211> LENGTH: 311
<212> TYPE: PRT
<213> ORGANISM: Artificial Sequence
<220> FEATURE:
<223> OTHER INFORMATION: Synthetic construct

<400> SEQUENCE: 36

Gly Ser Asn Gly Leu Pro Gly Pro Ile Gly Pro Pro Gly Pro Arg Gly
 1                5                  10                  15

Arg Thr Gly Asp Ala Gly Pro Val Gly Pro Pro Gly Pro
            20                  25                  30

Pro Gly Pro Gly Pro Pro Ser Ala Gly Phe Asp Phe Ser Phe Leu
            35                  40                  45

Pro Gln Pro Pro Gln Glu Lys Ala His Asp Gly Gly Arg Tyr Tyr Arg
 50                  55                  60

```
Ala Asn Asp Ala Asn Val Val Arg Asp Arg Asp Leu Glu Val Asp Thr
 65                  70                  75                  80

Thr Leu Lys Ser Leu Ser Gln Gln Ile Glu Asn Ile Arg Ser Pro Glu
                 85                  90                  95

Gly Ser Arg Lys Asn Pro Ala Arg Thr Cys Arg Asp Leu Lys Met Cys
            100                 105                 110

His Ser Asp Trp Lys Ser Gly Glu Tyr Trp Ile Asp Pro Asn Gln Gly
            115                 120                 125

Cys Asn Leu Asp Ala Ile Lys Val Phe Cys Asn Met Glu Thr Gly Glu
130                 135                 140

Thr Cys Val Tyr Pro Thr Gln Pro Ser Val Ala Gln Lys Asn Trp Tyr
145                 150                 155                 160

Ile Ser Lys Asn Pro Lys Asp Lys Arg His Val Trp Phe Gly Glu Ser
                165                 170                 175

Met Thr Asp Gly Phe Gln Phe Glu Tyr Gly Gly Gln Gly Ser Asp Pro
            180                 185                 190

Ala Asp Val Ala Ile Gln Leu Thr Phe Leu Arg Leu Met Ser Thr Glu
            195                 200                 205

Ala Ser Gln Asn Ile Thr Tyr His Cys Lys Asn Ser Val Ala Tyr Met
210                 215                 220

Asp Gln Gln Thr Gly Asn Leu Lys Lys Ala Leu Leu Leu Gln Gly Ser
225                 230                 235                 240

Asn Glu Ile Glu Ile Arg Ala Glu Gly Asn Ser Arg Phe Thr Tyr Ser
                245                 250                 255

Val Thr Val Asp Gly Cys Thr Ser His Thr Gly Ala Trp Gly Lys Thr
            260                 265                 270

Val Ile Glu Tyr Lys Thr Thr Lys Thr Ser Arg Leu Pro Ile Ile Asp
            275                 280                 285

Val Ala Pro Leu Asp Val Gly Ala Pro Asp Gln Glu Phe Gly Phe Asp
290                 295                 300

Val Gly Pro Val Cys Phe Leu
305                 310

<210> SEQ ID NO 37
<211> LENGTH: 244
<212> TYPE: PRT
<213> ORGANISM: Artificial Sequence
<220> FEATURE:
<223> OTHER INFORMATION: Synthetic construct

<400> SEQUENCE: 37

Ala Asn Val Val Arg Asp Arg Asp Leu Glu Val Asp Thr Thr Leu Lys
 1               5                  10                  15

Ser Leu Ser Gln Gln Ile Glu Asn Ile Arg Ser Pro Glu Gly Ser Arg
                20                  25                  30

Lys Asn Pro Ala Arg Thr Cys Arg Asp Leu Lys Met Cys His Ser Asp
            35                  40                  45

Trp Lys Ser Gly Glu Tyr Trp Ile Asp Pro Asn Gln Gly Cys Asn Leu
        50                  55                  60

Asp Ala Ile Lys Val Phe Cys Asn Met Glu Thr Gly Glu Thr Cys Val
 65                  70                  75                  80

Tyr Pro Thr Gln Pro Ser Val Ala Gln Lys Asn Trp Tyr Ile Ser Lys
                85                  90                  95

Asn Pro Lys Asp Lys Arg His Val Trp Phe Gly Glu Ser Met Thr Asp
            100                 105                 110
```

```
Gly Phe Gln Phe Glu Tyr Gly Gly Gln Gly Ser Asp Pro Ala Asp Val
            115                 120                 125

Ala Ile Gln Leu Thr Phe Leu Arg Leu Met Ser Thr Glu Ala Ser Gln
130                 135                 140

Asn Ile Thr Tyr His Cys Lys Asn Ser Val Ala Tyr Met Asp Gln Gln
145                 150                 155                 160

Thr Gly Asn Leu Lys Lys Ala Leu Leu Leu Lys Gly Ser Asn Glu Ile
                165                 170                 175

Glu Ile Arg Ala Glu Gly Asn Ser Arg Phe Thr Tyr Ser Val Thr Val
            180                 185                 190

Asp Gly Cys Thr Ser His Thr Gly Ala Trp Gly Lys Thr Val Ile Glu
            195                 200                 205

Tyr Lys Thr Thr Lys Ser Ser Arg Leu Pro Ile Ile Asp Val Ala Pro
            210                 215                 220

Leu Asp Val Gly Ala Pro Asp Gln Glu Phe Gly Phe Asp Val Gly Pro
225                 230                 235                 240

Val Cys Phe Leu

<210> SEQ ID NO 38
<211> LENGTH: 246
<212> TYPE: PRT
<213> ORGANISM: Artificial Sequence
<220> FEATURE:
<223> OTHER INFORMATION: Synthetic construct

<400> SEQUENCE: 38

Arg Ser Ala Asn Val Val Arg Asp Arg Asp Leu Glu Val Asp Thr Thr
1               5                   10                  15

Leu Lys Ser Leu Ser Gln Gln Ile Glu Asn Ile Arg Ser Pro Glu Gly
                20                  25                  30

Ser Arg Lys Asn Pro Ala Arg Thr Cys Arg Asp Leu Lys Met Cys His
            35                  40                  45

Ser Asp Trp Lys Ser Gly Glu Tyr Trp Ile Asp Pro Asn Gln Gly Cys
50                  55                  60

Asn Leu Asp Ala Ile Lys Val Phe Cys Asn Met Glu Thr Gly Glu Thr
65                  70                  75                  80

Cys Val Tyr Pro Thr Gln Pro Ser Val Ala Gln Lys Asn Trp Tyr Ile
                85                  90                  95

Ser Lys Asn Pro Lys Asp Lys Arg His Val Trp Phe Gly Glu Ser Met
                100                 105                 110

Thr Asp Gly Phe Gln Phe Glu Tyr Gly Gly Gln Gly Ser Asp Pro Ala
            115                 120                 125

Asp Val Ala Ile Gln Leu Thr Phe Leu Arg Leu Met Ser Thr Glu Ala
130                 135                 140

Ser Gln Asn Ile Thr Tyr His Cys Lys Asn Ser Val Ala Tyr Met Asp
145                 150                 155                 160

Gln Gln Thr Gly Asn Leu Lys Lys Ala Leu Leu Leu Lys Gly Ser Asn
                165                 170                 175

Glu Ile Glu Ile Arg Ala Glu Gly Asn Ser Arg Phe Thr Tyr Ser Val
            180                 185                 190

Thr Val Asp Gly Cys Thr Ser His Thr Gly Ala Trp Gly Lys Thr Val
            195                 200                 205

Ile Glu Tyr Lys Thr Thr Lys Ser Ser Arg Leu Pro Ile Ile Asp Val
210                 215                 220
```

Ala Pro Leu Asp Val Gly Ala Pro Asp Gln Glu Phe Gly Phe Asp Val
225                 230                 235                 240

Gly Pro Val Cys Phe Leu
            245

<210> SEQ ID NO 39
<211> LENGTH: 309
<212> TYPE: PRT
<213> ORGANISM: Artificial Sequence
<220> FEATURE:
<223> OTHER INFORMATION: Synthetic construct

<400> SEQUENCE: 39

Asn Gly Leu Pro Gly Pro Ile Gly Pro Pro Gly Arg Gly Arg Thr
1               5                   10                  15

Gly Asp Ala Gly Pro Val Gly Pro Pro Gly Pro Pro Gly Pro Pro Gly
            20                  25                  30

Pro Pro Gly Pro Pro Ser Ala Gly Phe Asp Phe Ser Phe Leu Pro Gln
        35                  40                  45

Pro Pro Gln Glu Lys Ala His Asp Gly Gly Arg Tyr Tyr Arg Ala Asn
    50                  55                  60

Asp Ala Asn Val Val Arg Asp Arg Asp Leu Glu Val Asp Thr Thr Leu
65                  70                  75                  80

Lys Ser Leu Ser Gln Gln Ile Glu Asn Ile Arg Ser Pro Glu Gly Ser
                85                  90                  95

Arg Lys Asn Pro Ala Arg Thr Cys Arg Asp Leu Lys Met Cys His Ser
            100                 105                 110

Asp Trp Lys Ser Gly Glu Tyr Trp Ile Asp Pro Asn Gln Gly Cys Asn
        115                 120                 125

Leu Asp Ala Ile Lys Val Phe Cys Asn Met Glu Thr Gly Glu Thr Cys
130                 135                 140

Val Tyr Pro Thr Gln Pro Ser Val Ala Gln Lys Asn Trp Tyr Ile Ser
145                 150                 155                 160

Lys Asn Pro Lys Asp Lys Arg His Val Trp Phe Gly Glu Ser Met Thr
                165                 170                 175

Asp Gly Phe Gln Phe Glu Tyr Gly Gly Gln Gly Ser Asp Pro Ala Asp
            180                 185                 190

Val Ala Ile Gln Leu Thr Phe Leu Arg Leu Met Ser Thr Glu Ala Ser
        195                 200                 205

Gln Asn Ile Thr Tyr His Cys Lys Asn Ser Val Ala Tyr Met Asp Gln
    210                 215                 220

Gln Thr Gly Asn Leu Lys Lys Ala Leu Leu Leu Lys Gly Ser Asn Glu
225                 230                 235                 240

Ile Glu Ile Arg Ala Glu Gly Asn Ser Arg Phe Thr Tyr Ser Val Thr
                245                 250                 255

Val Asp Gly Cys Thr Ser His Thr Gly Ala Trp Gly Lys Thr Val Ile
            260                 265                 270

Glu Tyr Lys Thr Thr Lys Ser Ser Arg Leu Pro Ile Ile Asp Val Ala
        275                 280                 285

Pro Leu Asp Val Gly Ala Pro Asp Gln Glu Phe Gly Phe Asp Val Gly
    290                 295                 300

Pro Val Cys Phe Leu
305

<210> SEQ ID NO 40
<211> LENGTH: 309

```
<212> TYPE: PRT
<213> ORGANISM: Artificial Sequence
<220> FEATURE:
<223> OTHER INFORMATION: Synthetic construct

<400> SEQUENCE: 40

Asn Gly Leu Pro Gly Pro Ile Gly Pro Pro Gly Pro Arg Gly Arg Thr
1               5                   10                  15

Gly Asp Ala Gly Pro Val Gly Pro Pro Gly Pro Pro Gly Pro Pro Gly
            20                  25                  30

Pro Pro Gly Pro Pro Ser Ala Gly Phe Asp Phe Ser Phe Leu Pro Gln
        35                  40                  45

Pro Pro Gln Glu Lys Ala His Asp Gly Arg Tyr Tyr Arg Asn Asp
    50                  55                  60

Asp Ala Asn Val Val Arg Asp Arg Asp Leu Glu Val Asp Thr Thr Leu
65                  70                  75                  80

Lys Ser Leu Ser Gln Gln Ile Glu Asn Ile Arg Ser Pro Glu Gly Ser
                85                  90                  95

Arg Lys Asn Pro Ala Arg Thr Cys Arg Asp Leu Lys Met Cys His Ser
            100                 105                 110

Asp Trp Lys Ser Gly Glu Tyr Trp Ile Asp Pro Asn Gln Gly Cys Asn
        115                 120                 125

Leu Asp Ala Ile Lys Val Phe Cys Asn Met Glu Thr Gly Glu Thr Cys
130                 135                 140

Val Tyr Pro Thr Gln Pro Ser Val Ala Gln Lys Asn Trp Tyr Ile Ser
145                 150                 155                 160

Lys Asn Pro Lys Asp Lys Arg His Val Trp Phe Gly Glu Ser Met Thr
                165                 170                 175

Asp Gly Phe Gln Phe Glu Tyr Gly Gly Gln Gly Ser Asp Pro Ala Asp
            180                 185                 190

Val Ala Ile Gln Leu Thr Phe Leu Arg Leu Met Ser Thr Glu Ala Ser
        195                 200                 205

Gln Asn Ile Thr Tyr His Cys Lys Asn Ser Val Ala Tyr Met Asp Gln
    210                 215                 220

Gln Thr Gly Asn Leu Lys Lys Ala Leu Leu Leu Lys Gly Ser Asn Glu
225                 230                 235                 240

Ile Glu Ile Arg Ala Glu Gly Asn Ser Arg Phe Thr Tyr Ser Val Thr
                245                 250                 255

Val Asp Gly Cys Thr Ser His Thr Gly Ala Trp Gly Lys Thr Val Ile
            260                 265                 270

Glu Tyr Lys Thr Thr Lys Ser Ser Arg Leu Pro Ile Ile Asp Val Ala
        275                 280                 285

Pro Leu Asp Val Gly Ala Pro Asp Gln Glu Phe Gly Phe Asp Val Gly
    290                 295                 300

Pro Val Cys Phe Leu
305

<210> SEQ ID NO 41
<211> LENGTH: 311
<212> TYPE: PRT
<213> ORGANISM: Artificial Sequence
<220> FEATURE:
<223> OTHER INFORMATION: Synthetic construct

<400> SEQUENCE: 41

Arg Ser Asn Gly Leu Pro Gly Pro Ile Gly Pro Pro Gly Pro Arg Gly
1               5                   10                  15
```

Arg Thr Gly Asp Ala Gly Pro Val Gly Pro Pro Gly Pro
                 20                  25                  30

Pro Gly Pro Gly Pro Pro Ser Ala Gly Phe Asp Phe Ser Phe Leu
             35                  40                  45

Pro Gln Pro Pro Gln Glu Lys Ala His Asp Gly Gly Arg Tyr Tyr Arg
 50                  55                  60

Ala Asn Asp Ala Asn Val Val Arg Asp Arg Asp Leu Glu Val Asp Thr
 65                  70                  75                  80

Thr Leu Lys Ser Leu Ser Gln Gln Ile Glu Asn Ile Arg Ser Pro Glu
                 85                  90                  95

Gly Ser Arg Lys Asn Pro Ala Arg Thr Cys Arg Asp Leu Lys Met Cys
                 100                 105                 110

His Ser Asp Trp Lys Ser Gly Glu Tyr Trp Ile Asp Pro Asn Gln Gly
             115                 120                 125

Cys Asn Leu Asp Ala Ile Lys Val Phe Cys Asn Met Glu Thr Gly Glu
 130                 135                 140

Thr Cys Val Tyr Pro Thr Gln Pro Ser Val Ala Gln Lys Asn Trp Tyr
145                 150                 155                 160

Ile Ser Lys Asn Pro Lys Asp Lys Arg His Val Trp Phe Gly Glu Ser
                 165                 170                 175

Met Thr Asp Gly Phe Gln Phe Glu Tyr Gly Gly Gln Gly Ser Asp Pro
             180                 185                 190

Ala Asp Val Ala Ile Gln Leu Thr Phe Leu Arg Leu Met Ser Thr Glu
         195                 200                 205

Ala Ser Gln Asn Ile Thr Tyr His Cys Lys Asn Ser Val Ala Tyr Met
 210                 215                 220

Asp Gln Gln Thr Gly Asn Leu Lys Lys Ala Leu Leu Leu Lys Gly Ser
225                 230                 235                 240

Asn Glu Ile Glu Ile Arg Ala Glu Gly Asn Ser Arg Phe Thr Tyr Ser
                 245                 250                 255

Val Thr Val Asp Gly Cys Thr Ser His Thr Gly Ala Trp Gly Lys Thr
             260                 265                 270

Val Ile Glu Tyr Lys Thr Thr Lys Ser Ser Arg Leu Pro Ile Ile Asp
         275                 280                 285

Val Ala Pro Leu Asp Val Gly Ala Pro Asp Gln Glu Phe Gly Phe Asp
 290                 295                 300

Val Gly Pro Val Cys Phe Leu
305                 310

<210> SEQ ID NO 42
<211> LENGTH: 311
<212> TYPE: PRT
<213> ORGANISM: Artificial Sequence
<220> FEATURE:
<223> OTHER INFORMATION: Synthetic construct

<400> SEQUENCE: 42

Gly Ser Asn Gly Leu Pro Gly Pro Ile Gly Pro Pro Gly Pro Arg Gly
 1               5                  10                  15

Arg Thr Gly Asp Ala Gly Pro Val Gly Pro Pro Gly Pro
                 20                  25                  30

Pro Gly Pro Pro Gly Pro Pro Ser Ala Gly Phe Asp Phe Ser Phe Leu
             35                  40                  45

Pro Gln Pro Pro Gln Glu Lys Ala His Asp Gly Gly Arg Tyr Tyr Arg
 50                  55                  60

Ala Asn Asp Ala Asn Val Val Arg Asp Arg Asp Leu Glu Val Asp Thr
 65                  70                  75                  80

Thr Leu Lys Ser Leu Ser Gln Gln Ile Glu Asn Ile Arg Ser Pro Glu
             85                  90                  95

Gly Ser Arg Lys Asn Pro Ala Arg Thr Cys Arg Asp Leu Lys Met Cys
            100                 105                 110

His Ser Asp Trp Lys Ser Gly Glu Tyr Trp Ile Asp Pro Asn Gln Gly
        115                 120                 125

Cys Asn Leu Asp Ala Ile Lys Val Phe Cys Asn Met Glu Thr Gly Glu
130                 135                 140

Thr Cys Val Tyr Pro Thr Gln Pro Ser Val Ala Gln Lys Asn Trp Tyr
145                 150                 155                 160

Ile Ser Lys Asn Pro Lys Asp Lys Arg His Val Trp Phe Gly Glu Ser
                165                 170                 175

Met Thr Asp Gly Phe Gln Phe Glu Tyr Gly Gly Gln Gly Ser Asp Pro
            180                 185                 190

Ala Asp Val Ala Ile Gln Leu Thr Phe Leu Arg Leu Met Ser Thr Glu
        195                 200                 205

Ala Ser Gln Asn Ile Thr Tyr His Cys Lys Asn Ser Val Ala Tyr Met
210                 215                 220

Asp Gln Gln Thr Gly Asn Leu Lys Lys Ala Leu Leu Leu Lys Gly Ser
225                 230                 235                 240

Asn Glu Ile Glu Ile Arg Ala Glu Gly Asn Ser Arg Phe Thr Tyr Ser
                245                 250                 255

Val Thr Val Asp Gly Cys Thr Ser His Thr Gly Ala Trp Gly Lys Thr
            260                 265                 270

Val Ile Glu Tyr Lys Thr Thr Lys Ser Ser Arg Leu Pro Ile Ile Asp
        275                 280                 285

Val Ala Pro Leu Asp Val Gly Ala Pro Asp Gln Glu Phe Gly Phe Asp
290                 295                 300

Val Gly Pro Val Cys Phe Leu
305                 310

<210> SEQ ID NO 43
<211> LENGTH: 234
<212> TYPE: PRT
<213> ORGANISM: Artificial Sequence
<220> FEATURE:
<223> OTHER INFORMATION: Synthetic construct

<400> SEQUENCE: 43

Asp Glu Ile Met Thr Ser Leu Lys Ser Val Asn Gly Gln Ile Glu Ser
1               5                   10                  15

Leu Ile Ser Pro Asp Gly Ser Arg Lys Asn Pro Ala Arg Asn Cys Arg
            20                  25                  30

Asp Leu Lys Phe Cys His Pro Glu Leu Lys Ser Gly Glu Tyr Trp Val
        35                  40                  45

Asp Pro Asn Gln Gly Cys Lys Leu Asp Ala Ile Lys Val Phe Cys Asn
    50                  55                  60

Met Glu Thr Gly Glu Thr Cys Ile Ser Ala Asn Pro Leu Asn Val Pro
65                  70                  75                  80

Arg Lys His Trp Trp Thr Asp Ser Ser Ala Glu Lys Lys His Val Trp
                85                  90                  95

Phe Gly Glu Ser Met Asp Gly Gly Phe Gln Phe Ser Tyr Gly Asn Pro
            100                 105                 110

```
Glu Leu Pro Glu Asp Val Leu Asp Val Gln Leu Ala Phe Leu Arg Leu
        115                 120                 125

Leu Ser Ser Arg Ala Ser Gln Asn Ile Thr Tyr His Cys Lys Asn Ser
    130                 135                 140

Ile Ala Tyr Met Asp Gln Ala Ser Gly Asn Val Lys Lys Ala Leu Lys
145                 150                 155                 160

Leu Met Gly Ser Asn Glu Gly Glu Phe Lys Ala Glu Gly Asn Ser Lys
                165                 170                 175

Phe Thr Tyr Thr Val Leu Glu Asp Gly Cys Thr Lys His Thr Gly Glu
                180                 185                 190

Trp Ser Lys Thr Val Phe Glu Tyr Arg Thr Arg Lys Ala Val Arg Leu
            195                 200                 205

Pro Ile Val Asp Ile Ala Pro Tyr Asp Ile Gly Gly Pro Asp Gln Glu
        210                 215                 220

Phe Gly Val Asp Val Gly Pro Val Cys Phe
225                 230

<210> SEQ ID NO 44
<211> LENGTH: 244
<212> TYPE: PRT
<213> ORGANISM: Artificial Sequence
<220> FEATURE:
<223> OTHER INFORMATION: Synthetic construct

<400> SEQUENCE: 44

Glu Pro Met Asp Phe Lys Ile Asn Thr Asp Glu Ile Met Thr Ser Leu
1               5                   10                  15

Lys Ser Val Asn Gly Gln Ile Glu Ser Leu Ile Ser Pro Asp Gly Ser
            20                  25                  30

Arg Lys Asn Pro Ala Arg Asn Cys Arg Asp Leu Lys Phe Cys His Pro
        35                  40                  45

Glu Leu Lys Ser Gly Glu Tyr Trp Val Asp Pro Asn Gln Gly Cys Lys
    50                  55                  60

Leu Asp Ala Ile Lys Val Phe Cys Asn Met Glu Thr Gly Glu Thr Cys
65                  70                  75                  80

Ile Ser Ala Asn Pro Leu Asn Val Pro Arg Lys His Trp Trp Thr Asp
                85                  90                  95

Ser Ser Ala Glu Lys Lys His Val Trp Phe Gly Glu Ser Met Asp Gly
            100                 105                 110

Gly Phe Gln Phe Ser Tyr Gly Asn Pro Glu Leu Pro Glu Asp Val Leu
        115                 120                 125

Asp Val Gln Leu Ala Phe Leu Arg Leu Leu Ser Ser Arg Ala Ser Gln
    130                 135                 140

Asn Ile Thr Tyr His Cys Lys Asn Ser Ile Ala Tyr Met Asp Gln Ala
145                 150                 155                 160

Ser Gly Asn Val Lys Lys Ala Leu Lys Leu Met Gly Ser Asn Glu Gly
                165                 170                 175

Glu Phe Lys Ala Glu Gly Asn Ser Lys Phe Thr Tyr Thr Val Leu Glu
            180                 185                 190

Asp Gly Cys Thr Lys His Thr Gly Glu Trp Ser Lys Thr Val Phe Glu
        195                 200                 205

Tyr Arg Thr Arg Lys Ala Val Arg Leu Pro Ile Val Asp Ile Ala Pro
    210                 215                 220

Tyr Asp Ile Gly Gly Pro Asp Gln Glu Phe Gly Val Asp Val Gly Pro
225                 230                 235                 240
```

```
Val Cys Phe Leu

<210> SEQ ID NO 45
<211> LENGTH: 245
<212> TYPE: PRT
<213> ORGANISM: Artificial Sequence
<220> FEATURE:
<223> OTHER INFORMATION: Synthetic construct

<400> SEQUENCE: 45

Ser Glu Pro Met Asp Phe Lys Ile Asn Thr Asp Glu Ile Met Thr Ser
1               5                   10                  15

Leu Lys Ser Val Asn Gly Gln Ile Glu Ser Leu Ile Ser Pro Asp Gly
            20                  25                  30

Ser Arg Lys Asn Pro Ala Arg Asn Cys Arg Asp Leu Lys Phe Cys His
        35                  40                  45

Pro Glu Leu Lys Ser Gly Glu Tyr Trp Val Asp Pro Asn Gln Gly Cys
    50                  55                  60

Lys Leu Asp Ala Ile Lys Val Phe Cys Asn Met Glu Thr Gly Glu Thr
65                  70                  75                  80

Cys Ile Ser Ala Asn Pro Leu Asn Val Pro Arg Lys His Trp Trp Thr
                85                  90                  95

Asp Ser Ser Ala Glu Lys Lys His Val Trp Phe Gly Glu Ser Met Asp
            100                 105                 110

Gly Gly Phe Gln Phe Ser Tyr Gly Asn Pro Glu Leu Pro Glu Asp Val
        115                 120                 125

Leu Asp Val Gln Leu Ala Phe Leu Arg Leu Leu Ser Ser Arg Ala Ser
    130                 135                 140

Gln Asn Ile Thr Tyr His Cys Lys Asn Ser Ile Ala Tyr Met Asp Gln
145                 150                 155                 160

Ala Ser Gly Asn Val Lys Lys Ala Leu Lys Leu Met Gly Ser Asn Glu
                165                 170                 175

Gly Glu Phe Lys Ala Glu Gly Asn Ser Lys Phe Thr Tyr Thr Val Leu
            180                 185                 190

Glu Asp Gly Cys Thr Lys His Thr Gly Glu Trp Ser Lys Thr Val Phe
        195                 200                 205

Glu Tyr Arg Thr Arg Lys Ala Val Arg Leu Pro Ile Val Asp Ile Ala
    210                 215                 220

Pro Tyr Asp Ile Gly Gly Pro Asp Gln Glu Phe Gly Val Asp Val Gly
225                 230                 235                 240

Pro Val Cys Phe Leu
                245

<210> SEQ ID NO 46
<211> LENGTH: 246
<212> TYPE: PRT
<213> ORGANISM: Artificial Sequence
<220> FEATURE:
<223> OTHER INFORMATION: Synthetic construct

<400> SEQUENCE: 46

Arg Ser Glu Pro Met Asp Phe Lys Ile Asn Thr Asp Glu Ile Met Thr
1               5                   10                  15

Ser Leu Lys Ser Val Asn Gly Gln Ile Glu Ser Leu Ile Ser Pro Asp
            20                  25                  30

Gly Ser Arg Lys Asn Pro Ala Arg Asn Cys Arg Asp Leu Lys Phe Cys
        35                  40                  45
```

```
His Pro Glu Leu Lys Ser Gly Glu Tyr Trp Val Asp Pro Asn Gln Gly
    50                  55                  60
Cys Lys Leu Asp Ala Ile Lys Val Phe Cys Asn Met Glu Thr Gly Glu
65                  70                  75                  80
Thr Cys Ile Ser Ala Asn Pro Leu Asn Val Pro Arg Lys His Trp Trp
                85                  90                  95
Thr Asp Ser Ser Ala Glu Lys Lys His Val Trp Phe Gly Glu Ser Met
                100                 105                 110
Asp Gly Gly Phe Gln Phe Ser Tyr Gly Asn Pro Glu Leu Pro Glu Asp
            115                 120                 125
Val Leu Asp Val Gln Leu Ala Phe Leu Arg Leu Leu Ser Ser Arg Ala
    130                 135                 140
Ser Gln Asn Ile Thr Tyr His Cys Lys Asn Ser Ile Ala Tyr Met Asp
145                 150                 155                 160
Gln Ala Ser Gly Asn Val Lys Lys Ala Leu Lys Leu Met Gly Ser Asn
                165                 170                 175
Glu Gly Glu Phe Lys Ala Glu Gly Asn Ser Lys Phe Thr Tyr Thr Val
                180                 185                 190
Leu Glu Asp Gly Cys Thr Lys His Thr Gly Glu Trp Ser Lys Thr Val
            195                 200                 205
Phe Glu Tyr Arg Thr Arg Lys Ala Val Arg Leu Pro Ile Val Asp Ile
    210                 215                 220
Ala Pro Tyr Asp Ile Gly Gly Pro Asp Gln Glu Phe Gly Val Asp Val
225                 230                 235                 240
Gly Pro Val Cys Phe Leu
                245
```